US012190206B2

(12) United States Patent
Semo et al.

(10) Patent No.: US 12,190,206 B2
(45) Date of Patent: Jan. 7, 2025

(54) DETECTORS, OPTICAL SWITCHES, AND WAVEGUIDES

(71) Applicants: QUANTUM SOURCE LABS LTD., Tel Aviv-Jaffa (IL); YEDA RESEARCH AND DEVELOPMENT CO. LTD., Rehovot (IL)

(72) Inventors: Gil Semo, Tel-Aviv (IL); Ziv Aqua, Rehovot (IL); Oded Melamed, Shoham (IL); Dan Charash, Herzliya (IL); Serge Rosenblum, Rehovot (IL); Barak Dayan, Tel-Aviv (IL)

(73) Assignees: Yeda Research and Development Co. Ltd., Rehovot (IL); Quantum Source Labs Ltd., Tel Aviv-Jaffa (IL)

( * ) Notice: Subject to any disclaimer, the term of this patent is extended or adjusted under 35 U.S.C. 154(b) by 7 days.

(21) Appl. No.: 18/300,644

(22) Filed: Apr. 14, 2023

(65) Prior Publication Data

US 2024/0272514 A1    Aug. 15, 2024

Related U.S. Application Data

(63) Continuation of application No. PCT/IB2023/052601, filed on Mar. 16, 2023, which
(Continued)

(51) Int. Cl.
*G06N 10/40*    (2022.01)
*G02F 1/313*    (2006.01)
(Continued)

(52) U.S. Cl.
CPC .......... *G06N 10/40* (2022.01); *G02F 1/3131* (2013.01); *G21K 1/006* (2013.01); *H01S 3/042* (2013.01)

(58) Field of Classification Search
CPC ...... G06N 10/40; G02F 1/3131; G21K 1/006; H01S 3/042
See application file for complete search history.

(56) References Cited

U.S. PATENT DOCUMENTS

| 5,640,022 A | 6/1997 | Inai |
| 5,917,195 A | 6/1999 | Brown |

(Continued)

FOREIGN PATENT DOCUMENTS

| IL | 282705 A | 11/2022 |
| WO | WO 2016/157184 A1 | 10/2016 |

OTHER PUBLICATIONS

Orel Bechler et Al. Demonstration of a passive photon-atom swap gate. arXiv:1711.10974 [quant-ph]. 2017. (Year: 2017).*
(Continued)

*Primary Examiner* — Collin X Beatty
(74) *Attorney, Agent, or Firm* — Finnegan, Henderson, Farabow, Garrett & Dunner, L.L.P.

(57) ABSTRACT

A quantum computing system, method and computer readable medium involve a vacuum enclosure for sustaining a vacuum below $10^{-3}$ millibar, optical resonators tuned to a resonance of an alkali atom, and a trapping laser for maintaining the alkali atom within a mode of the optical resonators. An atom excitation laser induces photon emissions, a plurality of waveguides couple photons to and from the optical resonators, and a plurality of detectors detect a presence or absence of an atom-resonator coupling. A processor receives output signals from the detectors and controls optical switches for switching between two or more of the plurality of waveguides.

20 Claims, 33 Drawing Sheets

Related U.S. Application Data is a continuation-in-part of application No. PCT/IB2022/000564, filed on Apr. 27, 2022.

(60) Provisional application No. 63/320,454, filed on Mar. 16, 2022.

(51) Int. Cl.
*G21K 1/00* (2006.01)
*H01S 3/042* (2006.01)

(56) References Cited

U.S. PATENT DOCUMENTS

| | | | |
|---|---|---|---|
| 8,941,053 B1 | 1/2015 | Biedermann et al. | |
| 8,975,617 B2 | 3/2015 | Berco | |
| 9,858,531 B1 | 1/2018 | Monroe et al. | |
| 10,304,535 B2 | 5/2019 | Dayan et al. | |
| 10,423,887 B2 | 9/2019 | Roetteler et al. | |
| 10,504,033 B1 | 12/2019 | King et al. | |
| 11,150,609 B1 | 10/2021 | Parazzoli et al. | |
| 11,475,347 B1 | 10/2022 | Rudolph et al. | |
| 11,501,198 B1 | 11/2022 | Birchall et al. | |
| 11,832,467 B2 | 11/2023 | Shin et al. | |
| 2007/0104420 A1 | 5/2007 | Franson et al. | |
| 2007/0288684 A1 | 12/2007 | Bergou et al. | |
| 2010/0033256 A1 | 2/2010 | Strabley et al. | |
| 2014/0140651 A1 | 5/2014 | Hafezi et al. | |
| 2015/0077821 A1 | 3/2015 | Smith et al. | |
| 2018/0053551 A1* | 2/2018 | Dayan | G02F 1/0126 |
| 2019/0181611 A1 | 6/2019 | Maleki et al. | |
| 2020/0116623 A1 | 4/2020 | Cooper-Rot et al. | |
| 2021/0296558 A1 | 9/2021 | Englund et al. | |
| 2021/0304053 A1 | 9/2021 | Pant et al. | |
| 2021/0406756 A1 | 12/2021 | Amini et al. | |
| 2023/0194343 A1 | 6/2023 | Knaut et al. | |
| 2023/0419157 A1 | 12/2023 | Wan et al. | |

OTHER PUBLICATIONS

International Search Report and Written Opinion for PCT International Application No. PCT/IB2023/052601, filed Mar. 16, 2023, 13 pages, mailed Apr. 18, 2023.
International Search Report and Written Opinion for PCT International Application No. PCT/IB2022/000564, filed Apr. 27, 2022, 20 pages, mailed Mar. 31, 2023.
Israeli Office Action and International Search Report issued by the Israeli Patent Office for patent application No. 282705, dated Mar. 3, 2022.
Alton et al.; "Strong interactions of single atoms and photons near a dielectric boundary" Nature Physics, vol. 7, No. 2 (2011): 159-165.
Armani et al.; "Ultra-high-Q toroid microcavity on a chip", Letter to Nature, vol. 421.6926 (2003): pp. 925-928.
Bartolucci et al.; "Fusion-based quantum computation", Nature Communications 14 (2021). arXiv preprint arXiv:2101.09310.
Baur et al.; "Single-photon switch based on Rydberg blockade.", Physical review letters 112.7, pp. 073901-1-073901-05 and Supplemental Material pp. 1-8, (2014).
Bechler et al.; "A passive photon-atom qubit swap operation", Letters, Nature Physics, vol. 14, pp. 996-1000, (2018). http://dx.doi.org/10.1038/NPHOTON.2015.227.
Birnbaum et al.; "Photon blockade in an optical cavity with one trapped atom", Nature, vol. 436.7047, pp. 87-90, (2005).
Blinov et al.; "Observation of entanglement between a single trapped atom and a single photon" Nature, vol. 428.6979, pp. 153-157; (2004).
Carmichael, H.J.; "Quantum trajectory theory for cascaded open systems", Physical Review Letters, vol. 70, No. 15, 2 pages of coversheets and pp. 2273-2276, (1993).
Chang et al.; "A single-photon transistor using nanoscale surface plasmons", Nature Physics, vol. 3, No. 11, pp. 807-812, (2007).

Chang et al.; "Efficiently coupled microring circuit for on-chip cavity QED with trapped atoms", Applied Physics Letters 117, 174001, coversheet and pp. 1-6, (2020). https://doi.org/10.1063/5.0023464.
Chen et al.; "All-optical switch and transistor gated by one stored photon", Science, vol. 341, issue 6147, Table of Contents pp. 691 and 693 and pp. 768-770, (2013).
Cirac et al.; "Quantum state transfer and entanglement distribution among distant nodes in a quantum network", Physical Review Letters, vol. 78, No. 16, cover sheets 2 pages and pp. 3221-3224, (1997).
Dawes et al.; "All-optical switching in rubidium vapor" Science, vol. 308, No. 5722, Table of Contents pp. 589, 591 and 593, pp. 672-674, (2005).
Dayan et al.; "A photon turnstile dynamically regulated by one atom" Science. vol. 319.5866, cover sheet and pp. 1-8, (2008).
Đorđević et al.; "Entanglement transport and a nanophotonic interface for atoms in optical tweezers", Science 373, pp. 1-16 (2021) https://arxiv.org/pdf/2105.06485.pdf.
Duan et al.; "Scalable photonic quantum computation through cavity-assisted interactions", Physical Review Letters, vol. 92, No. 12, Cover sheet 2 pages, pp. 127902-1-127902-4, (2004).
Fleischhauer et al.; "Electromagnetically induced transparency: Optics in coherent media", Reviews of Modern Physics, vol. 77, No. 2, pp. 633-673, (2005).
Fushman et al.; "Controlled phase shifts with a single quantum dot", Science, 320.5877, coversheet, pp. 1-7, (2008).
Gaetan et al.; "Observation of collective excitation of two individual atoms in the Rydberg blockade regime", Nature Physics, Letters, vol. 5, pp. 115-118, (2009).
Gea-Banacloche et al.; "Photon subtraction and addition by a three-level atom in an optical cavity", Physical Review A 88.3, pp. 033832-1-033832-8, (2013).
Hacker et al.; "A photon-photon quantum gate based on a single atom in an optical resonator", Nature, vol. 536, pp. 193-196 (2016).
Hacker et al.; "Deterministic creation of entangled atom-light Schrödinger-cat states" Nature Photonics 13.2, 110-114; (2019).
Hofmann et al.; "Optimized phase switching using a single-atom nonlinearity", Journal of Optics B: Quantum and Semiclassical Optics, Institute of Physics Publishing, vol. 5, pp. 218-221, (2003).
Hoi et al.; "Demonstration of a single-photon router in the microwave regime.", Physical review letters, American Physical Society, 107 .7, pp. 073601-1-073601-5, (2011).
Jaksch et al.; "Fast quantum gates for neutral atoms", Physical Review Letters, vol. 85, No. 10, pp. 2 cover sheet pages, pp. 2208-2211, (2000).
Junge et al.; "Strong coupling between single atoms and nontransversal photons", Physical Review Letters, American Physical Society, 110.21, pp. 213604-1-213604-5, (2013).
Kimble; "The quantum internet", Nature vol. 453, issue No. 7198, 1 coversheet, p. iii and pp. 1023-1030, (2008).
Koshino et al.; "Deterministic photon-photon SWAP gate using a Λ system", American Physical Society, Physical Review A, 82.1, pp. 010301-1-010301-4, (2010).
Kuhn et al.; "Deterministic single-photon source for distributed quantum networking", Physical review letters, vol. 89, No. 6, Cover sheet 2 pages and pp. 067901-1-067901-4, (2002).
McKeever et al.; "Deterministic generation of single photons from one atom trapped in a cavity" Science, vol. 303(5666), pp. 1935 and 1937 and pp. 1992-1994, (2004).
Morin et al.; "Deterministic Shaping and Reshaping of Single-Photon Temporal Wave Functions", Phys. Rev. Lett., pp. 1-5 and supplemental material pp. 1-6, vol. 123, 133602 (2019).
Mücke et al.; "Generation of single photons from an atom-cavity system", Physical Review A, 87(6), pp. 063805-1-063805-6, (2013).
Peyronel et al.; "Quantum nonlinear optics with single photons enabled by strongly interacting atoms", Nature, Letter, vol. 488, issue No. 7409, cover sheet, p. 4 and pp. 57-60, (2012).
Pichler et al.; "Universal photonic quantum computation via time-delayed feedback", Proceedings of the National Academy of Sciences, vol. 114, No. 43, pp. 11362-11367, (2017) www.pnas.org/cgi/doi/10.1073/pnas.1711003114.

(56) References Cited

OTHER PUBLICATIONS

Pinotsi et al.; "Single photon absorption by a single quantum emitter", American Physical Society, Physical Review Letters 100. 9, pp. 093603-1-093603-4, (2008).

Press et al.; "Photon antibunching from a single quantum-dot-microcavity system in the strong coupling regime.", American Physical Society, Physical Review Letters 98.11, pp. 117402-1-117402-4.

Reiserer et al.; "Nondestructive detection of an optical photon", Science, vol. 342, cover sheet, p. 1237 and pp. 1349-1351, (2013).

Reiserer et al.; "A quantum gate between a flying optical photon and a single trapped atom", Nature, Letter, vol. 508, issue No. 7495, Cover sheet, p. 148, and pp. 237-240, (2014).

Righini et al.; "Whispering gallery mode microresonators: fundamentals and applications", Società Italiana di Fisica, Rivista del Nuovo Cimento vol. 34, No. 7, 435-488, (2011).

Rosenblum et al.; "Photon routing in cavity QED: Beyond the fundamental limit of photon blockade", American Physical Society, Physical Review A, 84.3, pp. 033854-1-033854-11, (2011).

Rosenblum et al. "Extraction of a single photon from an optical pulse", Nature Photonics, vol. 10, 19-22 (2016). http://dx.doi.org/10.1038/NPHOTON.2015.227.

Shomroni et al.; "All-optical routing of single photons by a one-atom switch controlled by a single photon", Aug. 22, 2014, Science, vol. 345, Issue 6199, pp. 903-906 and supplementary material (2014).

Tamura; "Microring resonators on a suspended membrane circuit for atom-light interactions", Proceeding of the SPIE, SPIE, US, vol. 11689, Coversheet, p. 853 and p. 116891D1-116891D6, XP060140267, ISSN: 0277-786X, DOI: 10.1117/12.2579079, (2021).

Thompson et al.; "Observation of normal-mode splitting for an atom in an optical cavity", The American Physical Society, Physical Review Letters, vol. 68, No. 8, pp. 1132-1135, (1992).

Thompson; "A quantum interface between single atoms and nanophotonic structures", Doctoral dissertation Harvard University, sheets iii-x and pp. 1-133, XP055750243, (2014).

Tiecke et al.; "Nanophotonic quantum phase switch with a single atom", Nature, vol. 508, No. 7495, coversheet, p. 148, and pp. 241-244, (2014).

Turchette et al.; "Measurement of conditional phase shifts for quantum logic", The American Physical Society, Physical Review Letters vol. 75, No. 25, 2 coversheets and pp. 4710-4713, (1995).

Volz et al.; "Nonlinear π phase shift for single fibre-guided photons interacting with a single resonator-enhanced atom", Nature Photonics, vol. 8, No. 12, pp. 965-970, (2014).

Weber et al.; "Photon-photon entanglement with a single trapped atom", Physical review letters, 102.3: 030501-1-030501-4, (2009).

Witthaut et al.; "Photon scattering by a three-level emitter in a one-dimensional waveguide", New Journal of Physics, vol. 12, No. 4, 043052, pp. 1-18, (2010).

Borregaard et al.; "One-Way Quantum Repeater Based on Near-Deterministic Photon-Emitter Interfaces", Physical Review X, vol. 10, 021071-1-021071-13, (2020).

Brown et al.; "Co-designing a scalable quantum computer with trapped atomic ions" Nature Partner Journals, Quantum Information (2016) 2, 16034, pp. 1-10.

Chang et al.; "Microring resonators on a suspended membrane circuit for atom-light interactions", Optical Society of America, Optica, vol. 6, No. 9, pp. 1203-1210, (2019).

Kroh et al., "Slow and Fast single photons from a quantum dot interacting with the excited state hyperfine structure of the Cesium D1-line", Nature Research Scientific Reports, 9:13728, 11 pages (2019).

* cited by examiner

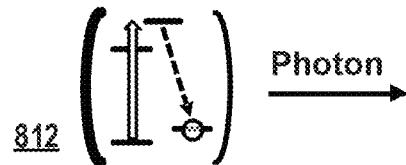
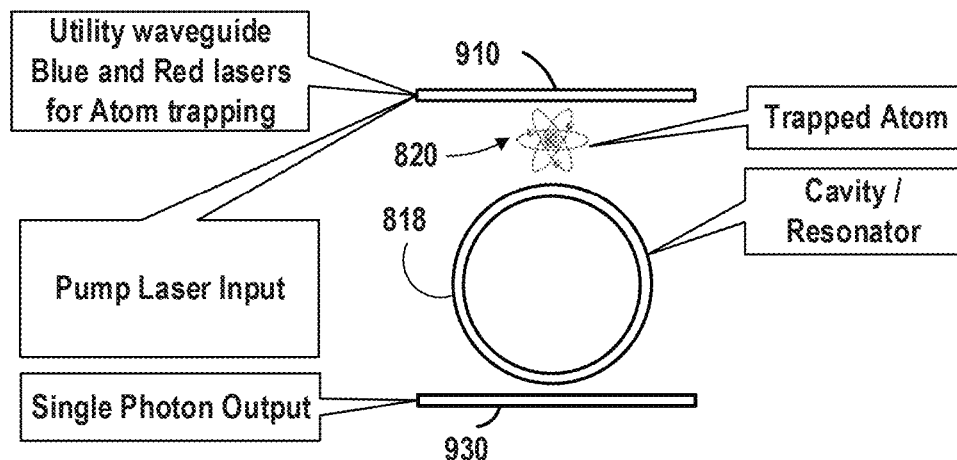
Fig. 9B - Photon generation
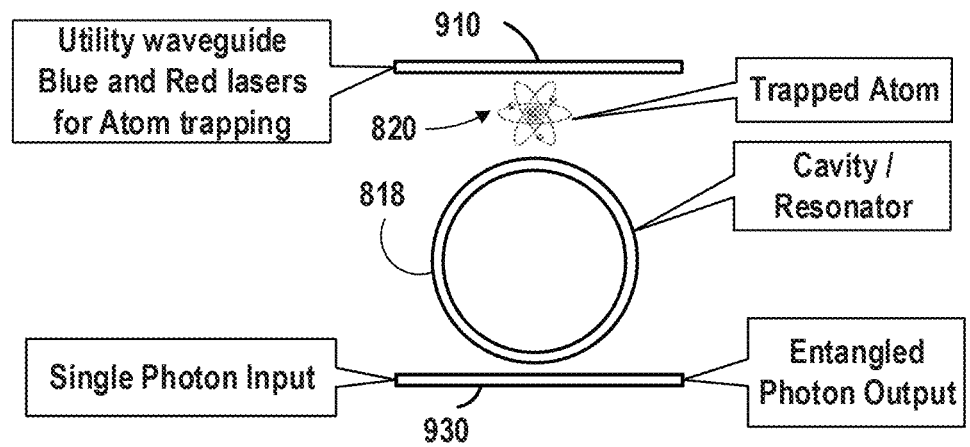
Fig. 9C - Entangling gate

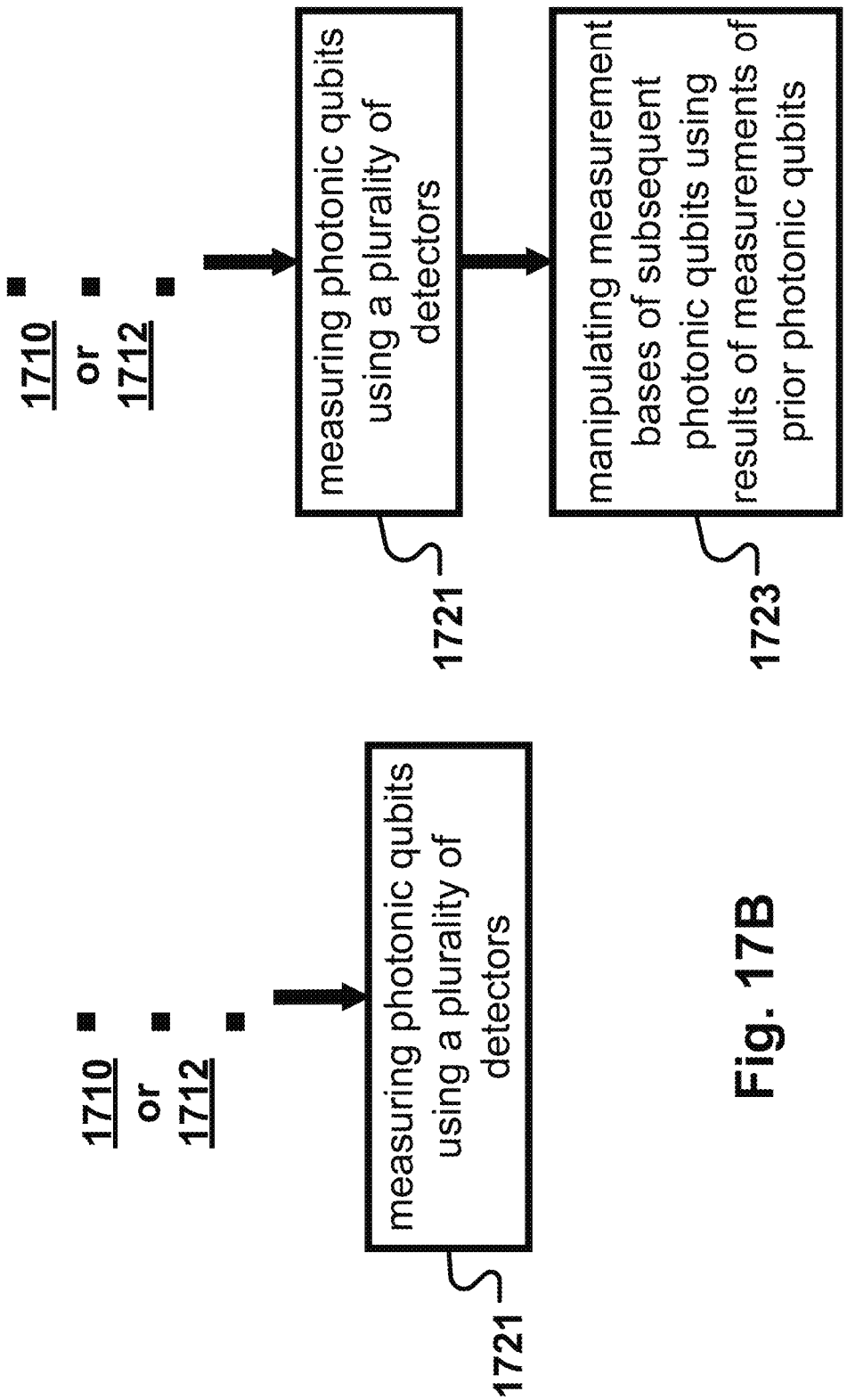

DETECTORS, OPTICAL SWITCHES, AND WAVEGUIDES

RELATED APPLICATIONS

The application is a continuation of PCT International Application No. PCT/IB2023/052601, filed Mar. 16, 2023, which is based upon and claims priority to U.S. Provisional Application No. 63/320,454, filed Mar. 16, 2022, and Patent Cooperation Treaty (PCT) Application No. PCT/IB2022/000564, filed Apr. 27, 2022, the entire contents of all of which are incorporated herein by reference.

FIELD

The present disclosure relates generally to quantum computing using cavity quantum electrodynamics (Cavity QED), and related apparatuses, systems, computer readable media, and methods. Some embodiments involve the generation of photonic qubits and generating entanglement therebetween.

BACKGROUND

Building commercially useful quantum computers (QC) can be challenging for many reasons, for example due to scalability issues which arise from increasing complexity, noise and crosstalk as more qubits are added. Also, quantum computation algorithms can exploit entangled states, and some quantum computation architectures may use a source of entangled states (also referred to as a Resource State Generator) for obtaining those entangled states. The present disclosure relates to a mechanism for use in or with such a source of entangled states. Currently, quantum computing remains restricted to the proof-of-concept stage, with a relatively small number of qubits sufficient only to demonstrate that quantum computing is feasible in principle. To make quantum computing practical for handling real-world problems, current devices need to be scaled up to handle large numbers of qubits, over $10^6$, including qubits for error correction.

Qubits for quantum computing are often hosted in one of three physical platforms (or regimes): superconductors (superconducting states), atoms (e.g. ionic states), and photons (photonic states).

The photonic platform offers a number of significant practical advantages over the other platforms. Photons are relatively easy to generate and do not require cryogenic or ultra-high vacuum environments, and construction of microminiaturized, reliable photonic devices and their communication infrastructure is accomplished utilizing readily available fabrication technologies. Thus, the photonic platform is currently a leading candidate for achieving the high-level scaling necessary for practical quantum computing devices.

The full potential of the photonic platform, however, is not presently realized, in large part because generating entangled photonic states for use as an entanglement resource in photonic quantum computing is currently highly inefficient. Conventional arrangements rely on nonlinear effects in crystals to generate single photons. In order to produce photonic graph states, these photons are entangled in a probabilistic manner using linear optics elements. For this purpose, generated photons should be indistinguishable, generated according to perfectly timed and identically shaped pulses. Unfortunately, this requirement comes at the expense of the generation efficiency. Furthermore, in order to end up with a photonic graph state of a certain number of qubits, the probabilistic entangling process would require a much larger number of initial single photons, and hence a larger number of elements. These points of inefficiency are cumulative and seriously restrict efforts to scale the photonic platform to meaningful numbers of qubits.

It is therefore highly desirable to have apparatuses and methods for generating a plurality of entangled photonic qubits or photonic graph states which reduce or eliminate probabilistic processes and their inherent inefficiencies, and which instead deterministically generate photonic graph states at maximal efficiency, or at an improved efficiency, for use as qubits. This goal is met, or facilitated, by embodiments of the present disclosure.

SUMMARY

A source of entangled states for use in a quantum computation architecture can use a matter-based or a light-based mechanism. Matter-based quantum computation mechanisms, e.g., those using trapped ions, superconducting qubits, or quantum dots, are sometimes considered more efficient for achieving entangled states than light-based ones. Light-based quantum computation mechanisms. e.g., silicon photonics, are considered to be more scalable and modular. So light-based mechanisms may be useful in addressing the above scalability problem.

Using the embodiments consistent with the present disclosure, a source of entangled states for use with quantum computation using a high number of qubits may be possible, for example with a photonic quantum computation. Such architectures may also offer a scalable architecture which can be manufactured in a standard silicon fabrication lab. A cavity quantum electrodynamics (Cavity QED) based mechanism for use in the embodiments consistent with the present disclosure can exploit both light and matter properties, and hence can serve as a source of entangled states in such architectures, leading to a scalable architecture that can be manufactured even in a standard silicon fabrication lab at a potentially reasonable cost.

As examples, some embodiments consistent with the present disclosure include a novel entangled photon cluster state generation apparatus. More particularly, the disclosure includes description of a chip implementation of a Cavity-QED system. The entangled photons can be used as the basic building blocks for a quantum computer.

Photon-based quantum computing is one of several approaches for quantum computing. In a photonic quantum computer, the quantum data may be stored in the photon's quantum state. A building block of photonic quantum computers may include entangled photons. Therefore, a need exists for generating entangled photons efficiently.

Embodiments of the present disclosure are capable of providing, or enabling this provision of, deterministic apparatuses and methods for generating, and entanglement of, single photons, multiple photons, and photonic graph states usable in quantum computing. By avoiding at least some of the probabilistic processes, the present disclosure may achieve high efficiency, allowing a high degree of generated photons to be usable in qubits.

According to aspects of the present disclosure, there are provided systems, methods, devices, integrated circuitry devices, circuitries, layouts of integrated circuitry devices, computer-readable storage media, non-transitory computer-readable storage media, and signals as described herein or as set forth in the appended claims. Other features of disclosed embodiments will be apparent from dependent claims, clauses, the attached drawings, and the description of exemplary embodiments with reference to the attached drawings, which follow.

According to aspects of the presently disclosed subject-matter, a deterministic photonic graph state generator and a method related thereto are provided. Deterministic single photon generation is combined with deterministic cavity-enhanced photon-atom entanglement to produce time-sequenced entangled photons, and in related embodiments, generating and entanglement units are incorporated into integrated arrays which emit multi-dimensional cluster states of entangled photons having one temporal dimension and one or two additional dimensions such as one or two spatial dimensions.

Single photon generation, atom-photon entanglement, and photon-photon entanglement may be accomplished by a four-state atomic system within an optical cavity, whose transitions are independently addressable according to energy and polarization of incoming photons. Types of operation include single-photon sourcing, atom-photon entanglement, multiple photon entanglement, and preparation and measurement of the atomic qubit.

According to one aspect, there is provided a method for sourcing a graph state of quantum-entangled photons, the method comprising (a photon source unit may also be referred to as a photon generator):
  providing a photon source unit for sourcing single photons, the photon source unit comprising a source unit atom disposed within an intra-cavity field of a source-optical cavity;
  providing a photon entanglement unit for quantum entanglement of photonic states, the photon entanglement unit atom disposed within an intra-cavity field of an entanglement-optical cavity;
  sending a photon pulse to the photon entanglement the entanglement unit atom to an atomic quantum superposition state $$\frac{1}{\sqrt{2}}(|0\rangle + |1\rangle);$$

sending a photon pulse to the photon source unit to initialize the source unit atom to a quantum state $|1\rangle$
  sending a photon pulse of photons in a first photonic mode into the photon source unit to cause the source unit atom to output a single photon in a second photonic mode, wherein the first photonic mode couples to a first transition of the source unit atom, and wherein the second photonic mode couples to a second transition of the source unit atom;
  routing the single photon in the second photonic mode to the photon entanglement unit to a superposition of a third photonic mode and a fourth photonic mode;
    wherein the third photonic mode couples to a third transition of the entanglement unit atom;
    wherein the fourth photonic mode does not couple to any transition of the source unit atom;
    wherein the fourth photonic mode does not couple to the entanglement-optical cavity; and
    wherein the photon in a superposition of a third photonic mode and a fourth photonic mode is quantum-entangled with the entanglement unit atom;
  repeating the routing at least once to route at least one additional single photon in the second photonic mode to the photon entanglement unit in a superposition of the third photonic mode and the fourth photonic mode in quantum entanglement with the entanglement unit atom;
  performing a measurement on the entanglement unit atom, thereby disentangling it from the photons in the superposition state of the third photonic mode and the fourth photonic mode;
    wherein the at least two photons in the superposition state of the third photonic mode and the fourth photonic mode are quantum entangled; and
  outputting the at least two photons in the superposition state of the third photonic mode and the fourth photonic mode as time-sequenced mutually entangled photons.

Performing a measurement on the entanglement unit atom may include performing a measurement in an x-y plane of a Bloch sphere.

According to another aspect, there is provided a device for sourcing a graph state of quantum-entangled photons, the device comprising:
  a plurality of single photon source units;
  a first stage of linear optics elements; and
  a first plurality of entanglement units;
    wherein the plurality of single photon source units, the first stage of linear optics elements, and the first plurality of entanglement units are correspondingly displaced along a predetermined spatial axis;
    wherein each single photon source unit of the plurality of photon source units outputs single photons to the first stage of linear optics elements, and therefrom into a respective entanglement unit of the first plurality of entanglement units; and
    wherein the first plurality of entanglement unit outputs a one-dimensional spatial array of entangled photons in a time-dimensional sequence.

The single photon source units and/or the entanglement units may each comprise an atom being in a first ground state, a first excited state, a second ground state, a second excited state, or a superposition thereof, the atom being further configured to selectively undergo:
  a first transition between the first ground state and the first excited state;
  a second transition between the first excited state and the second ground state; and
  a third transition between the second ground state and the second excited state; the device comprising an optical cavity defining an intra-cavity field for disposing therewithin the atom, a photonic waveguide coupled to the optical cavity, a magnet configured to produce a magnetic field on the atom, and a laser source configured to produce pulses of photons in coherent states, the device being configured such that each of the transitions are within the resonance of the optical cavity.

The first and second transitions may be selected such that they are orthogonally polarized with respect to each other. The first and second excited states may be at the same energy level. The first and second ground states may be at different energy levels from one another.

The laser source may be configured for selectively generating:
  a pulse of initializing photons configured to initialize the atom by inducing it to undergo the first and second transitions from the first ground state to the second ground state via the first excited state; and
  a pulse of sourcing photons configured to source a single photon from the atom by inducing it to undergo the second and first transitions from the second ground state to the first ground state via the first excited state.

The laser source may be configured for selectively generating preparation photons configured to set the state of the atom to a quantum superposition state, the preparation photons being in state of superposition of first and second preparation modes, wherein interaction of the preparation photons with the atom results in its first and second ground states being in a state of superposition corresponding to the state of superposition of the first and second preparation modes, i.e., the interaction results in the first and second ground states of the atom being in a superposition with probability amplitudes equal to the probability amplitudes of the first and second preparation modes of the incoming preparation photons.

The atom may be a Rubidium atom. The magnet may be a solenoid. The first stage of linear optics elements may include phase control.

The device may further comprise:
a second stage of linear optics elements; and
a second plurality of entanglement units;
wherein the second stage of linear optics elements, and the second plurality of entanglement units are correspondingly displaced with the plurality of single photon source units, the first stage of linear optics elements, and the first plurality of entanglement units along the predetermined spatial axis; and
wherein the single photons in an entangled state output from each respective entanglement unit of the first plurality of entanglement units are input to the second stage of linear optics elements and therefrom into a respective entanglement unit of the second plurality of entanglement units.

The second plurality of entanglement units may be configured to output a two-dimensional spatial array of entangled photons in a time-dimensional sequence.

The device may be configured to produce entangled qubits for use with a quantum computer.

The device may be configured for carrying out the method of any of the aspects of the presently disclosed subject matter.

The foregoing summary provides certain examples of disclosed embodiments to provide a flavor for this disclosure and is not intended to summarize all aspects of the disclosed embodiments. Additional features and advantages of the disclosed embodiments will be set forth in part in the description that follows, and in part will be apparent from the description, or may be learned by practice of the disclosed embodiments. The features and advantages of the disclosed embodiments will be realized and attained by the elements and combinations particularly pointed out in the appended claims.

It is to be understood that both the foregoing general description and the following detailed description are examples and explanatory only and are not restrictive of the disclosed embodiments as claimed. The accompanying drawings constitute a part of this specification. The drawings illustrate several embodiments of the present disclosure and, together with the description, serve to explain the principles of the disclosed embodiments as set forth in the accompanying claims.

BRIEF DESCRIPTION OF THE DRAWINGS

The subject matter disclosed may best be understood by reference to the following detailed description when read with the accompanying drawings in which:

FIG. 9B schematically illustrates a photon generation according to some embodiments of the present disclosure.

FIG. 9C schematically illustrates an entangling gate according to some embodiments of the present disclosure.

FIG. 17B and FIG. 17C are exemplary continuations of the flowchart shown in FIG. 17A.

Figure 1:
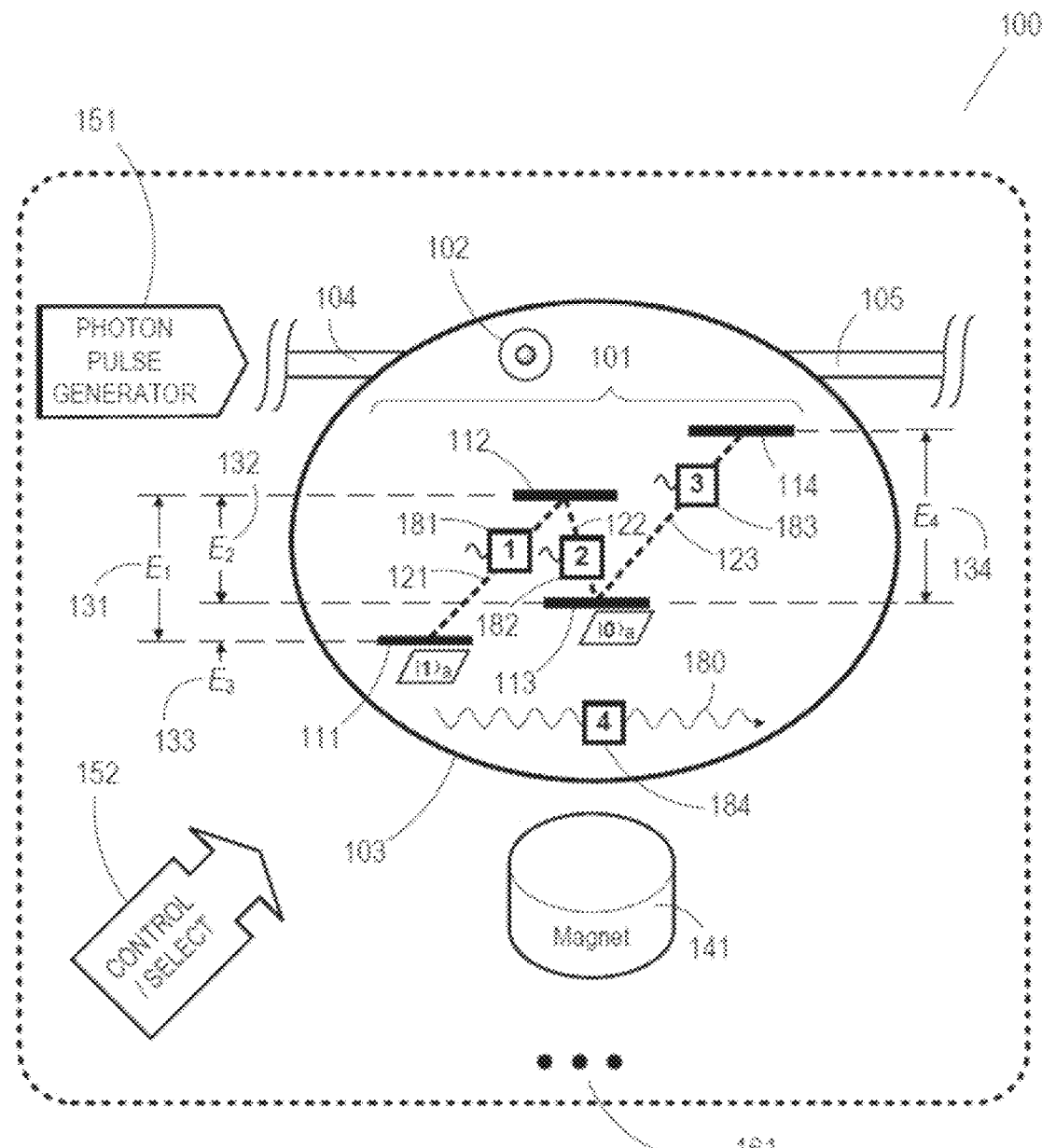
FIG. 1 schematically illustrates a device for use in quantum computing according to a disclosed embodiment.

For simplicity and clarity of illustration, elements shown in the figures are not necessarily drawn to scale, and the dimensions of some elements may be exaggerated relative to other elements. In addition, reference numerals may be repeated among the figures to indicate corresponding or analogous elements.

In the following description, various working examples are provided for illustrative purposes. However, it is to be understood the present disclosure may be practiced without one or more of these details. Reference will now be made in detail to non-limiting examples of this disclosure, examples of which are illustrated in the accompanying drawings. The examples are described below by referring to the drawings, wherein like reference numerals refer to like elements. When similar reference numerals are shown, corresponding description(s) are not repeated, and the interested reader is referred to the previously discussed figure(s) for a description of the like element(s).

Various embodiments are described herein with reference to systems, methods, devices, or computer readable media. It is intended that the disclosure of one is a disclosure of all. For example, it is to be understood that disclosure of a computer readable medium described herein also constitutes a disclosure of methods implemented by the computer readable medium, and systems and devices for implementing those methods, via for example, at least one processor or a circuitry. It is to be understood that this form of disclosure is for ease of discussion only, and one or more aspects of one embodiment herein may be combined with one or more aspects of other embodiments herein, within the intended scope of this disclosure.

DETAILED DESCRIPTION

Exemplary embodiments are described with reference to the accompanying drawings. The figures are not necessarily drawn to scale. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It should also be noted that as used herein and in the appended claims, the singular forms "a," "an," and "the" include plural references unless the context clearly dictates otherwise. Moreover, the relational terms herein such as "first" and "second" are used only to differentiate an entity or operation from another entity or operation, and do not require or imply any actual relationship or sequence between these entities or operations. As used herein, unless specifically stated otherwise, the term "or" encompasses all possible combinations, except where infeasible. For example, if it is stated that a component can include A or B, then, unless specifically stated otherwise or infeasible, the component can include A, or B, or A and B. As a second example, if it is stated that a component can include A, B, or C, then, unless specifically stated otherwise or infeasible, the component can include A, or B, or C, or A and B, or A and C, or B and C, or A and B and C.

Embodiments described herein may refer to a non-transitory computer readable medium or a computer readable medium containing instructions that when executed by at least one processor (or a system or a circuitry or a device), cause the at least one processor (or the system or the circuitry or the device) to perform a method according to an embodiment of the present disclosure. Non-transitory computer readable media (or computer readable media) may be any medium capable of storing data, e.g., in any memory, in a way that may be read by any computing device (or any system) with a processor to carry out methods or any other stored instructions stored, e.g. stored in the memory. The non-transitory computer readable medium (or the computer readable medium) may be implemented as hardware, firmware, software, or any combination thereof. Moreover, the software may preferably be implemented as an application program tangibly embodied on a program storage unit or computer readable medium consisting of parts, or of certain devices and/or a combination of devices. The application program may be uploaded to, and executed by, a machine comprising any suitable architecture (or circuitry). Preferably, the machine may be implemented on a computer platform having hardware (or circuitry) such as one or more central processing units ("CPUs"), a memory, and input/output interfaces. The computer platform may also include an operating system and microinstruction code. The various processes and functions described in this disclosure may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a vacuum chamber. Furthermore, computer-readable medium may comprise a signal, and a non-transitory computer readable medium may be any computer readable medium except for a transitory propagating signal.

The memory may include a Random Access Memory (RAM), a Read-Only Memory (ROM), a hard disk, an optical disk, a magnetic medium, a solid-state storage device, a flash memory, other permanent, fixed, volatile or non-volatile memory, or any other mechanism capable of storing instructions. The memory may include one or more separate storage devices collocated or disbursed, capable of storing data structures, instructions, or any other data. The memory may further include a memory portion containing instructions for the processor to execute. The memory may also be used as a working scratch pad for the processors or as a temporary storage.

Some embodiments involve at least one processor. "At least one processor" may include any physical device or group of devices having electric circuitry that performs a logic operation on an input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory. The memory may include a Random Access Memory (RAM), a Read-Only Memory (ROM), a hard disk, an optical disk, a magnetic medium, a solid-state storage device, a flash memory, other permanent, fixed, or volatile memory, or any other mechanism capable of storing instructions. In some embodiments, the at least one processor may include more than one processor. Each processor may have a similar construction, or the processors may be of differing constructions that are electrically connected or disconnected from each other. For example, the processors may be separate circuits or integrated in a single circuit. When more than one processor is used, the processors may be configured to operate independently or collaboratively and may be co-located or located remotely from each other. The processors may be coupled electrically, magnetically, optically, acoustically, mechanically or by other means that permit them to interact.

Alternatively or additionally, some embodiments involve circuitry (or an integrated circuit or a layout of an integrated circuit device). The circuitry (or the integrated circuit or the layout of an integrated circuit device) may include one or more functional units (or one or more layout portions), wherein each functional unit (or each layout portion) is configured to perform one or more process steps. The one or more functional units (or the one or more layout portions) may be arranged (e.g., positioned and connected with each other or with another functional unit or with another layout portion) so that the circuitry (or the integrated circuit or the layout of an integrated circuit device) is capable of performing some or all steps of the method or the process. For example, circuitry (or an integrated circuit or a layout of an integrated circuit device) may perform some or all steps of a method or a process according to some disclosed embodiments.

In the examples or embodiments described herein, at least some of the features of the system, device, apparatus, integrated circuit device, or circuitry, such as a photonic chip or a photonic integrated circuit (PIC), are formed using a fabrication method such as lithography, for example using lithographic processing on a silicon-based substrate to form those features on the silicon-based substrate. It is also understood that other types of substrates may be used with the lithography process to form those features thereon. It is also to be understood that other techniques (e.g., other semiconductor device fabrication techniques such as etching, doping, diffusion, sputtering, or deposition, or self-assembly techniques) in the alternative, or in addition to, lithography may be used to form those features on a substrate, wherein such other techniques enable fabrication of those features with structures capable of serving their functions described herein.

FIG. 1 schematically illustrates a device 100 for use in quantum computing according to an embodiment of the present disclosure. For example, device 100 may be a part of a deterministic photonic graph state generator according to an embodiment of the present disclosure. Device 100 includes a four-state system 101 of an atom 102 contained within an optical cavity 103 having input/output photon waveguides 104 and 105. For example, the atom 102, the optical cavity 103 and waveguides 104, 105 arrangement used in the four-state system 101 may be any one of the atom coupled to a cavity (or a resonator) and waveguides arrangements illustrated in FIG. 9A to FIG. 9C or the quantum emitter coupled to a cavity (or a resonator) and waveguides arrangements described herein. A laser source 151 provides pulses for altering the state of atom 102 and to induce emission of photons therefrom. Four-state system 101 includes the following states of atom 102, a first ground state 111, a first excited state 112, a second ground state 113, and a second excited state 114. A transition 121 between first ground state 111 and first excited state 112 has an energy $E_1$, and is associated with an interacting photonic mode 1. A transition 122 between first excited state 112 and second ground state 113 has an energy $E_2$, and is associated with an interacting photonic mode 2. A transition 123 between second ground state 113 and second excited state 114 has an energy $E_4$, and is associated with an interacting photonic mode 3. The transitions 122 and 123 may be selected such that they are orthogonally polarized with respect to each other. A photon 180 is in a non-interacting photonic mode 4, which is not associated with any transitions of atom 102 in optical cavity 103. Photon 180 in photonic mode 4 does not pass through the waveguide associated with optical cavity 103 and atom 102, and therefore does not interact therewith. The modes are indicated in the text by their mode numbers in underlined bold, and in drawings by bold mode numbers in square boxes.

The device 100 further comprises a magnet 141 generating a magnetic field. The magnetic field may be configured to ensure that the transitions are within the bandwidth of the optical cavity 103. It may be further configured to ensure that the first and second excited states 112, 114 are at the same energy level, i.e., that $E_2$ and $E_4$ are equal. Accordingly, a photon emitted in in transition 122 (photonic mode 2) have the same energy as one emitted in transition 123 (photonic mode 3). The first and second ground states 111, 113 may be maintained at different energy levels (i.e., $E_1 \neq E_4$), facilitating addressing transition 121 and transition 123 independently of each other.

The term "mode" (or "photonic mode") herein denotes a solution of the electromagnetic wave equation under some boundary conditions. As a non-limiting example, a given mode might apply to a pulse of photons having a particular pulse shape centered at a wavelength of 780 nm, propagating left in a (single mode) fiber and having a vertical polarization. A change of any parameter (direction, polarization, size, divergence, etc.) renders the originally assigned mode no longer applicable, and changes the mode of the photons to a different, perhaps undefined mode. In embodiments of the present disclosure, atomic transitions are coupled to mode 1, mode 2, or mode 3 of the incoming/outgoing photons. As noted and illustrated in FIG. 1, however, there is no coupling between atomic transitions of this embodiment and a photon in mode 4.

There is no direct transition between first ground state 111 and second ground state 113. The energy difference $E_3$ between them arises on account of an energy splitting of the ground states due to the magnetic field of a magnet 141 located proximate to optical cavity 103. According to this embodiment, the energy differences of the transitions—notably on account of the magnetic field—are one factor that provides the ability to individually address the different transitions. Another factor for individually addressing the transitions involves the polarization of photons used to excite the transitions, as is discussed in more detail below. Consequently, a control/selection capability 152 uses individual addressing of the transitions for control and selection of the various functions enabled by the individual addressing of the different transitions.

In a related embodiment, magnet 141 is a solenoid or another type of an electromagnet. In another related embodiment, the magnetic field in the region of atom 102 is 50 Gauss or greater. In a further related embodiment, laser source 151 is located within device 101 or external to device 101; and in yet another related embodiment, multiple dedicated laser sources are provided.

In another embodiment, device 100 is incorporated into a miniaturized component along with additional functional units (indicated by ellipsis 161) for specialized purposes.

In another related embodiment, atom 102 is a Rubidium atom, such as an atom of the isotope $^{87}$Rb.

Figure 2A:
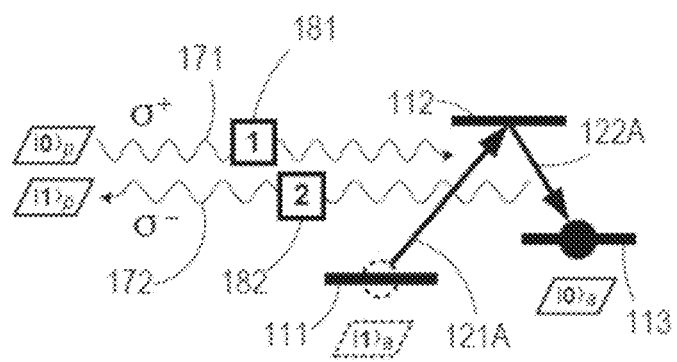
FIG. 2A is a state diagram for a process of the device shown in FIG. 1.

FIG. 2A is a state diagram for a transition of atom 102 of device 100 (FIG. 1), which is initially in first ground state 111, designated as a state $|1\rangle_a$ (shown in dotted lines). An incoming photon 171 via waveguide 104 (FIG. 1) excites a transition 121A in atom 102, from first ground state 111 to first excited state 112. Transition 121A followed by a transition 122A from first excited state 112 to second ground state 113, is a transition sequence which results in an emission of an outgoing photon 172 via waveguide 104 in a direction opposite to that of incoming photon 171. Photon 171 is designated as being in a state $|1\rangle_p$ with a circular polarization denoted as $\sigma^+$. In contrast, photon 172 is designated as being in a state $|1\rangle_p$ with a circular polarization denoted as $\sigma^-$. After transition 122A, atom 102 is designated as being in a state $|0\rangle_a$.

The transition described above and illustrated in FIG. 2A is used in a single-photon source unit according to an embodiment of the present disclosure, as described and illustrated below. The verb "source" and its inflected forms herein denote the providing of photons according to embodiments of the present disclosure, including the providing of single photons, the providing of photon pulses, and the providing of cluster states of single photons. The term "single photon source" herein denotes the case where only a single photon is sourced at a time.

Figure 2B:
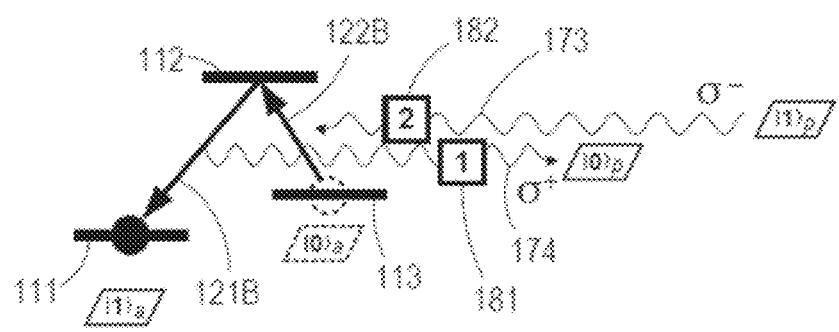
FIG. 2B is a state diagram for another process of the device shown in FIG. 1.

FIG. 2B is a state diagram for a transition of atom 102 of device 100 (FIG. 1), which is initially in second ground state 113, state $|0\rangle_a$ (shown in dotted lines). An incoming photon 173 via waveguide 105 (FIG. 1) excites a transition 122B in atom 102, from second ground state 113 to first excited state 112. Transition 122B followed by a transition 121B from first excited state 112 to first ground state 111, is a transition sequence which results in an emission of an outgoing photon 174 via waveguide 105 in a direction opposite to that of incoming photon 173. Photon 173 is in a state $|1\rangle_p$ with a circular polarization $\sigma^-$. In contrast, photon 174 is in state $|0\rangle$, with a circular polarization $\sigma^+$. After transition 121B, atom 102 is in state $|1\rangle$.

The transition described above and illustrated in FIG. 2B is also used in the source unit according to an embodiment, as described and illustrated below.

Figure 2C:
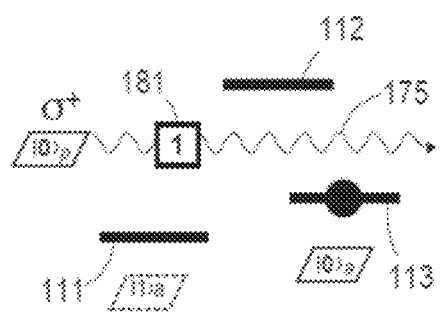
FIG. 2C is a state diagram showing a no interaction condition of the device shown in FIG. 1.

FIG. 2C is a state diagram showing no transitions of atom 102 in second ground state 113 (in state $|0\rangle_a$) for an incoming $\sigma^+$ photon 175 in state $|0\rangle_p$. Incoming $\sigma^+$ photon 175 continues on its way unchanged.

Figure 2D:
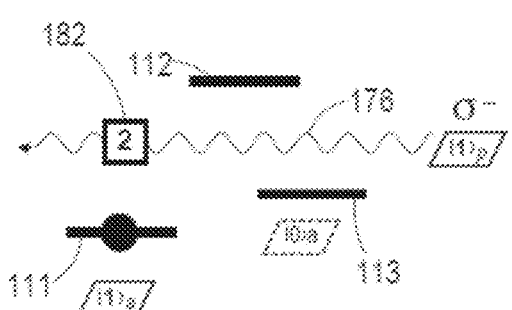
FIG. 2D is a state diagram showing another no interaction condition of the device shown in FIG. 1.

Likewise, FIG. 2D is a state diagram showing no transitions of atom 102 in first ground state 111 (in state $|1\rangle_a$) for an incoming $\sigma^-$ photon 176 in state $|1\rangle_p$. Incoming $\sigma^-$ photon 176 continues on its way unchanged.

Figure 2E:
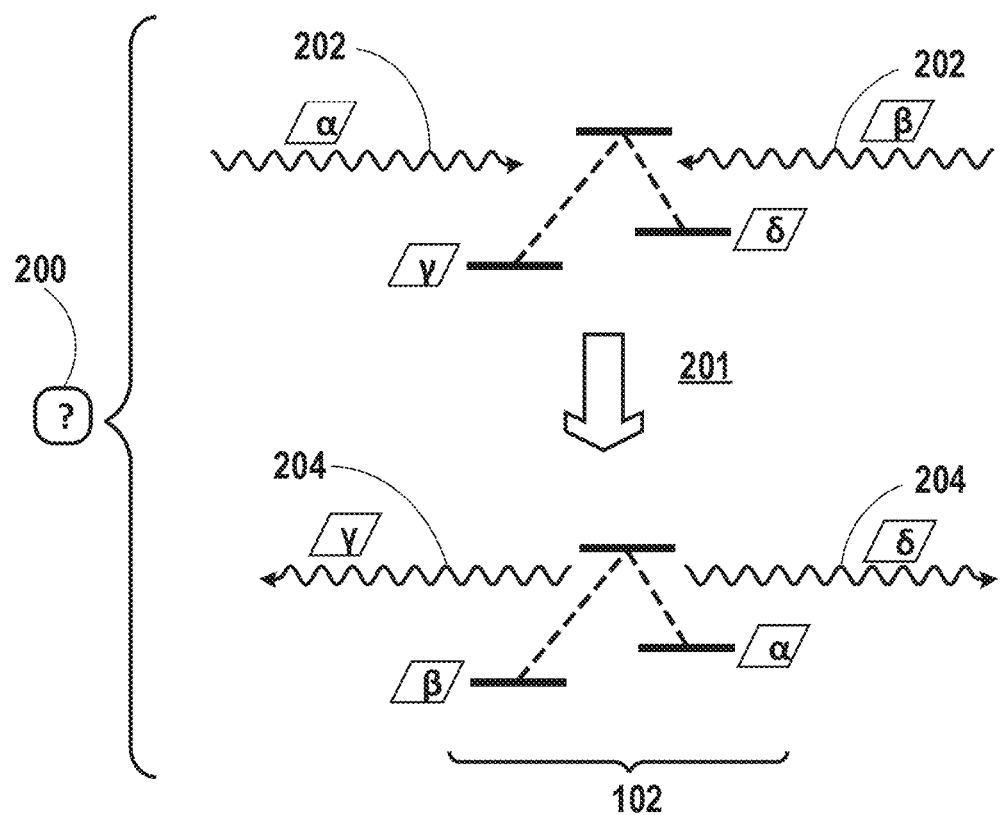
FIG. 2E schematically illustrates making a measurement on an atom of the device shown in FIG. 1, according to a disclosed embodiment.

FIG. 2E illustrates a swap gate 201 performing "read" and "write" operations of a qubit on the atom 102, enabling, inter alia, a measurement 200 of the atom of the device 100, according to an embodiment of the present disclosure. This figure combines the results of the transitions previously discussed and illustrated in FIG. 2A through FIG. 2D. In FIG. 2E, the atom 102 is initially in a superposition state of the first and second ground states 111, 113 with probability amplitudes $\gamma$ and $\delta$, respectively. The incoming photon 202 is in a superposition of photonic modes 1 and 2 with probability amplitudes $\alpha$ and $\beta$, respectively (in FIG. 2E, a single photon, e.g., 202, in a superposition of photonic modes is illustrated as two photons; it will be appreciated that this is not meant to imply the presence of two separate photons). Since the processes described in FIG. 2A through 2D are coherent, the state of the incoming photon is swapped with the state of the atom; the outgoing photon 204 is in a superposition state of modes 1 and 2 with probability amplitudes δ and γ, respectively, and the atom 102 is left in a superposition state of the first and second ground states 111, 113 with probability amplitudes β and α, respectively. This interaction allows measuring and setting the state of atom 102 in a single step, by appropriately choosing the state of the incoming photon and by measuring the direction-polarization of the outgoing photon 204. In a related embodiment, this is utilized in an entanglement method, as discussed below.

Figure 3:
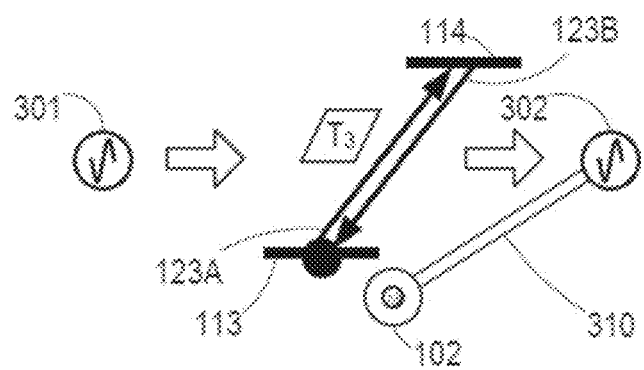
FIG. 3 schematically illustrates entanglement of an atom with a photon using the device shown in FIG. 1.

As illustrated in FIG. 3, the atom 102 is initially in a superposition of ground states 111 and 113, and incoming photon 301 is in a superposition of mode 3 and (non-interacting) mode 4 and has energy $E_4$. (In order to distinguish from the description above of the photon in modes 1 and 2, the photon in modes 3 and 4 will be indicated as $|1\rangle_{p*}$ and $|0\rangle_{p*}$, respectively.) As the atom 102 and the incoming photon 301 may initially be described by their respective superpositions, the atom and the emitted photon 302 are entangled. In particular, the atom 102 and the emitted photon 302 are in a size-2 cluster state, in which a first mode corresponds to a superposition of modes 3 and 4 of the outgoing photon 302

$$\left(\frac{1}{\sqrt{2}}[|0\rangle_{p*} - |1\rangle_{p*}]\right)$$

with the atom in its first ground state 111 of the atom 102, and the second mode corresponds to a complementary superposition of modes 3 and 4 of the outgoing photon 302

$$\left(\frac{1}{\sqrt{2}}[|0\rangle_{p*} + |1\rangle_{p*}]\right)$$

with the atom in its second ground state 113 of the atom 102. (One having skill in the art will recognize that this is one implementation of controlled-Z gate with the Duan-Kimble protocol.) The different input states may be summarized as follows:

the incoming photon 301 is in mode 4 and the atom 102 is in its first ground state 111; no interaction therebetween.

the incoming photon 301 is in mode 4 and the atom 102 is in its second ground state 113: no interaction therebetween.

the incoming photon 301 is in mode 3 and the atom 102 is in its first ground state 111: atom is unaffected, but the waveform of the photon is phase-flipped (i.e., the atom is in a non-interacting state with the intra-cavity field, implying that the photon interacts with an empty cavity; accordingly, a photon on resonance with the empty cavity induces an intra-cavity field buildup which in turn results in a phase flip of the outgoing photon 302 relative to a the photon in non-interacting mode 4); and the incoming photon 301 is in mode 3 and the atom 102 is in its second ground state 113: the atom transitions from the second ground state to the second excited state 114 (shown as transition 123A), then transitions back to the second ground state (shown as transition 123B), and in the process emits a photon 302, also with energy $E_4$ (i.e., the atom is in an interacting state with the intra-cavity field, implying that the transition 123 is addressed by the incoming photon in mode 3; accordingly, the atom eliminates the intra-cavity field build up, and no phase flip of the outgoing photon 302 occurs).

The quantum entanglement is graphically represented in the drawings by a double line 310 connecting atom 102 with photon 302. The double-line graphical convention also indicates quantum entanglement among photons, where applicable.

Figure 4A:
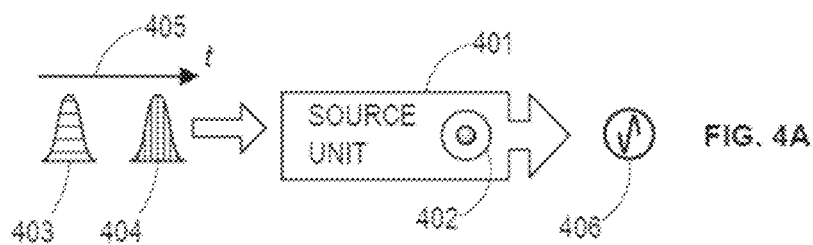
FIG. 4A schematically shows a single-photon source unit according to a disclosed embodiment.

FIG. 4A schematically shows a single-photon source unit 401 according to an embodiment of the present disclosure. Source unit 401 includes a device corresponding to device 100 of FIG. 1. In particular, a source unit atom 402 corresponds to atom 102 in FIG. 1, but for clarity the other elements corresponding to those of device 100, such as optical cavity 103, are omitted from FIG. 4A.

To initialize source unit 401 into an initial $|1\rangle_a$ state, an initialization pulse 403 of multiple σ"photons in state $|1\rangle_p$ is introduced. If atom 402 is already in first ground state 111 (in state $|1\rangle_a$), then as shown in FIG. 2D and described above, initialization pulse 403 will have no effect on atom 402, which will remain in state $|1\rangle_a$. However, if atom 402 is in second ground state 113 (in state $|0\rangle_a$), the first photon of initialization pulse 403 to enter source unit 401 will cause atom 402 to transition to first ground state 111 (in state $|1\rangle_a$), as shown in FIG. 2B and described above, thereby initializing source unit 401 into the desired initial state.

Returning to FIG. 4A, after introducing initialization pulse 403, a generating pulse 404 of multiple σ⁺ photons in state $|0\rangle_p$ is introduced into source unit 401. A time axis 405 shows the sequence of initialization pulse 403 followed by generating pulse 404. Having first initialized source unit 401 such that atom 402 is in the $|1\rangle_a$ state, the first σ⁺ photon in state $|0\rangle_p$ of generating pulse 404 will cause the transition of FIG. 2A, as previously described, resulting in the output of a single σ⁻ photon 406 in state $|1\rangle_p$. Photon 406 is output in the opposite direction from the photons of generating pulse 404 and therefore is easily separated from the other photons of generating pulse 404, which are discarded.

Figure 4B:
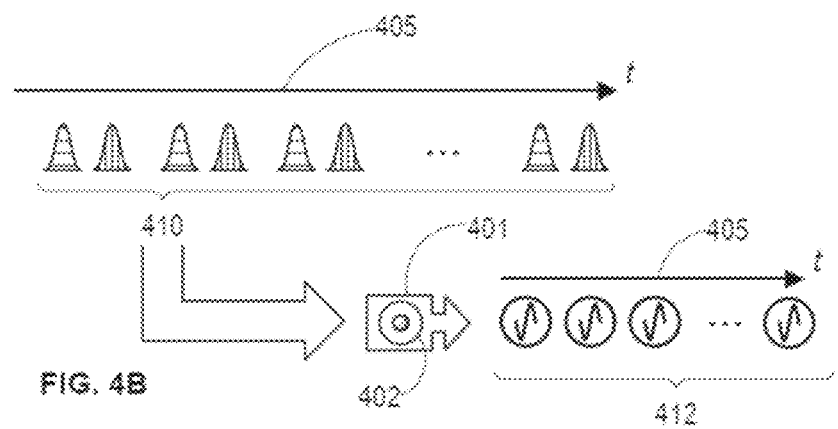
FIG. 4B schematically shows producing a sequential series of single photons from the photon source unit of FIG. 4A.

FIG. 4B schematically shows producing a time-sequenced series 412 of a specific number of single photons from single-photon source unit 401 according to an embodiment of the present disclosure. A time-sequenced series 410 of initialization pulse-generating pulse pairs is input into source unit 401, resulting in a time-sequenced series 412 having a single photon output for each pair of initialization pulse—generating pulse input. The output photons are individually output and are not yet entangled as of this operation.

It is emphasized that the single photons which emanate from single-photon source unit 401 according to embodiments of the present disclosure are all usable in this architecture; entangling photons through the cavity-enhanced atom-photon interaction does not require the use of indistinguishable photons, as is the case for the probabilistic entanglement with linear optics. In particular, input photon pulses (e.g., pulse 404) do not have to be precisely timed and shaped. Single photons produced according to embodiments of the present disclosure are perfectly suitable for qubit entanglement even when they exhibit irregularities that make them readily distinguishable.

Figure 5A:
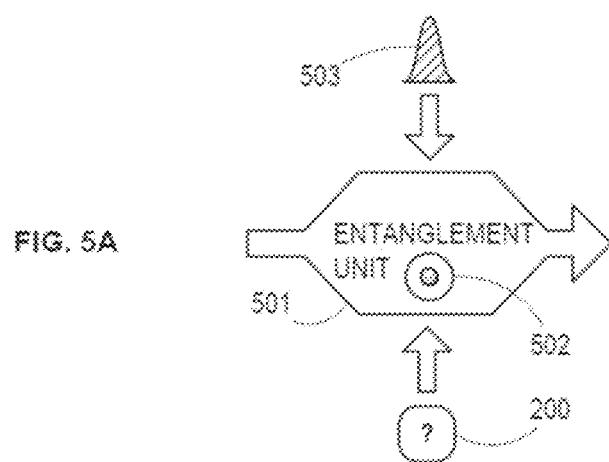
FIG. 5A schematically shows an entanglement unit for quantum entanglement of a photonic state with an atomic state according to a disclosed embodiment.

FIG. 5A schematically shows an entanglement unit 501 for quantum entanglement of a photonic state with an atomic state of an entanglement unit atom 502 according to an embodiment of the present disclosure. Entanglement unit 501 includes a device corresponding to device 100 of FIG. 1. In particular, atom 502 corresponds to atom 102 in FIG. 1, but for clarity the other elements corresponding to those of device 100 are omitted from FIG. 5A.

Entanglement unit first be prepared by setting atom 502 into the quantum superposition state $$\frac{1}{\sqrt{2}}(|0\rangle_a + |1\rangle_a).$$

This is done by introducing a pulse 503 in the appropriate superposition of modes 1 and 2, in order to swap in the desired state. Thereafter, the entanglement mechanism relating to atom 502 corresponds to the process shown in FIG. 3 and described previously. By making a measurement 200 of the state of atom 502, the entanglement between atom 502 and any photon(s) previously entangled therewith is broken. Measurement 200 according to an embodiment of the present disclosure is illustrated in FIG. 2E as previously described. It is noted that device 100 as described above with reference to and as illustrated in FIG. 1 is thus capable of both entanglement of a photon with atom 102 as well as breaking the entanglement (via measurement 200).

Figure 5B:
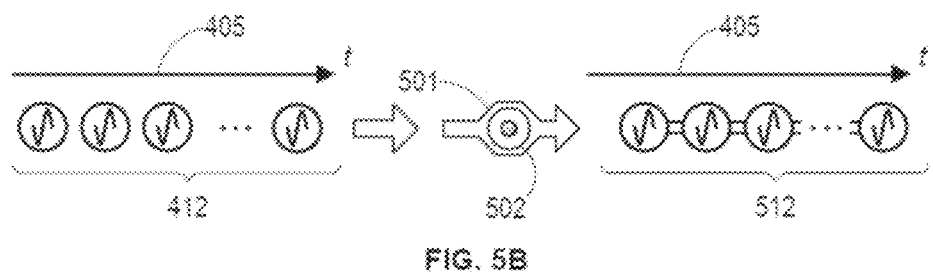
FIG. 5B schematically illustrates quantum entanglement of a sequential series of photonic states with an atomic state according to a disclosed embodiment.

FIG. 5B schematically illustrates quantum entanglement of time-sequential series 412 of single photonic states with the prepared superposition state of atom 502 according to an embodiment of the present disclosure. The entanglement operation results in a time-sequential series 512 of entangled photons. After measurement 200 is performed, atom 502 itself is no longer entangled with the photons of series 512, but the photons remain entangled with each other. The photons of series 512 are represented mutually connected by double lines to a single atom, indicating that they are mutually entangled therewith.

Figure 6:
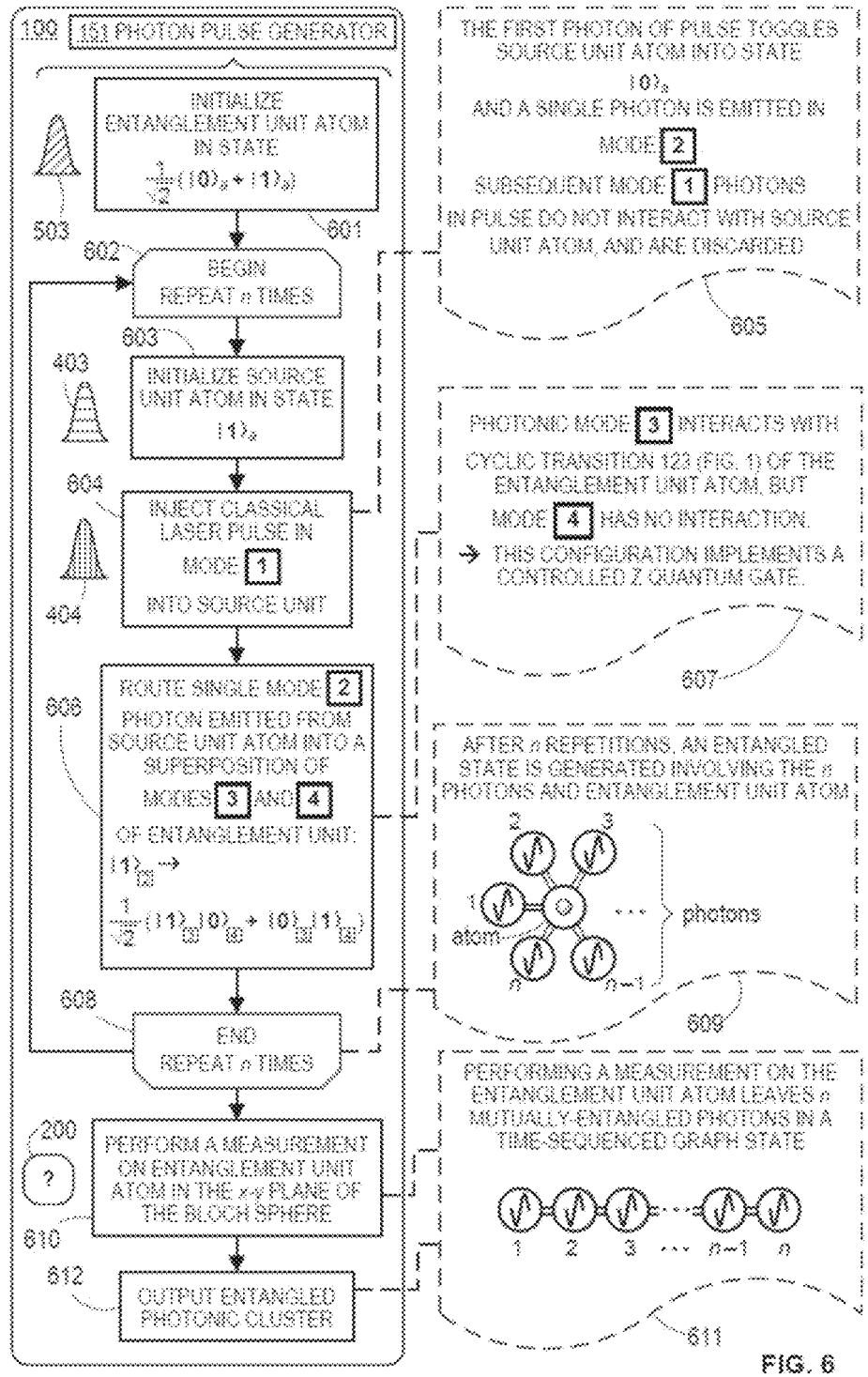
FIG. 6 is a flowchart of a method for sourcing photonic graph states according to a disclosed embodiment.

FIG. 6 is a flowchart of a method for sourcing a photonic graph state according to an embodiment of the present disclosure. In a related embodiment, this method is performed by a control/select unit 152 of device 100 as detailed in FIG. 1 and described previously. In a preparation step 601, an entanglement unit atom (such as entanglement unit 501 atom 502) is set to state $$\frac{1}{\sqrt{2}}(|0\rangle_a + |1\rangle_a)$$

by utilizing a pulse 503 in the appropriate superposition of modes 1 and 2, in order to swap in the desired state as previously described.

After preparation, a loop begins point 602 starts a loop of steps to repeat n times through a loop end point 608.

Inside loop 602-608 a step 603 initializes a source unit atom (such as source unit 401 atom 402) to a state $|1\rangle_a$ by injecting a pulse 403 of $\sigma^-$ photons in state $|1\rangle_p$, as previously illustrated and described.

Next, in a step 604, a single photon is generated by injecting a classical laser pulse 404 of mode 1 photons into the source unit, as previously illustrated and detailed, and illuminated in a caption 605.

Following, in a step 606, the single mode 2 photon from step 604 is routed into an entanglement unit (such as entanglement unit 501 with atom 502) in a superposition of mode 3 and mode 4:

$$|1\rangle_2 \rightarrow \frac{1}{\sqrt{2}}(|1\rangle_3|0\rangle_4 + |0\rangle_3|1\rangle_4),$$

and which is subsequently quantum-entangled with the entanglement unit atom.

A caption 607 details how photonic mode 3 interacts with cyclic transition 123 (FIG. 1) of entanglement unit 501 atom 502, whereas photonic mode 4 has no interaction. This particular configuration implements a controlled-Z quantum gate.

At loop end 608, after n repetitions the state of entanglement unit atom (such as atom 502) w % ill be entangled with the states of n photons, as illuminated in a caption 609.

In a step 610, a measurement is performed on the entanglement unit atom (such as atom 502) in the x-y plane of the Bloch sphere, such as measurement 200, which is illustrated schematically in FIG. 2E and as detailed previously. Carrying out measurement 200 disentangles the entanglement unit atom from being quantum entangled with the photons, leaving a time-sequenced cluster state of n photonic states in an entangled state. It is again noted that device 100 as provided by an embodiment of the present disclosure is capable both of operation as an entanglement unit (such as entanglement unit 501) and of carrying out measurement 200 without the need for additional measurement apparatus. This step is illuminated in a caption 611.

Finally, in a step 612, the time-sequenced cluster state of n entangled photons is output for qubit use in quantum computing.

Figure 7:
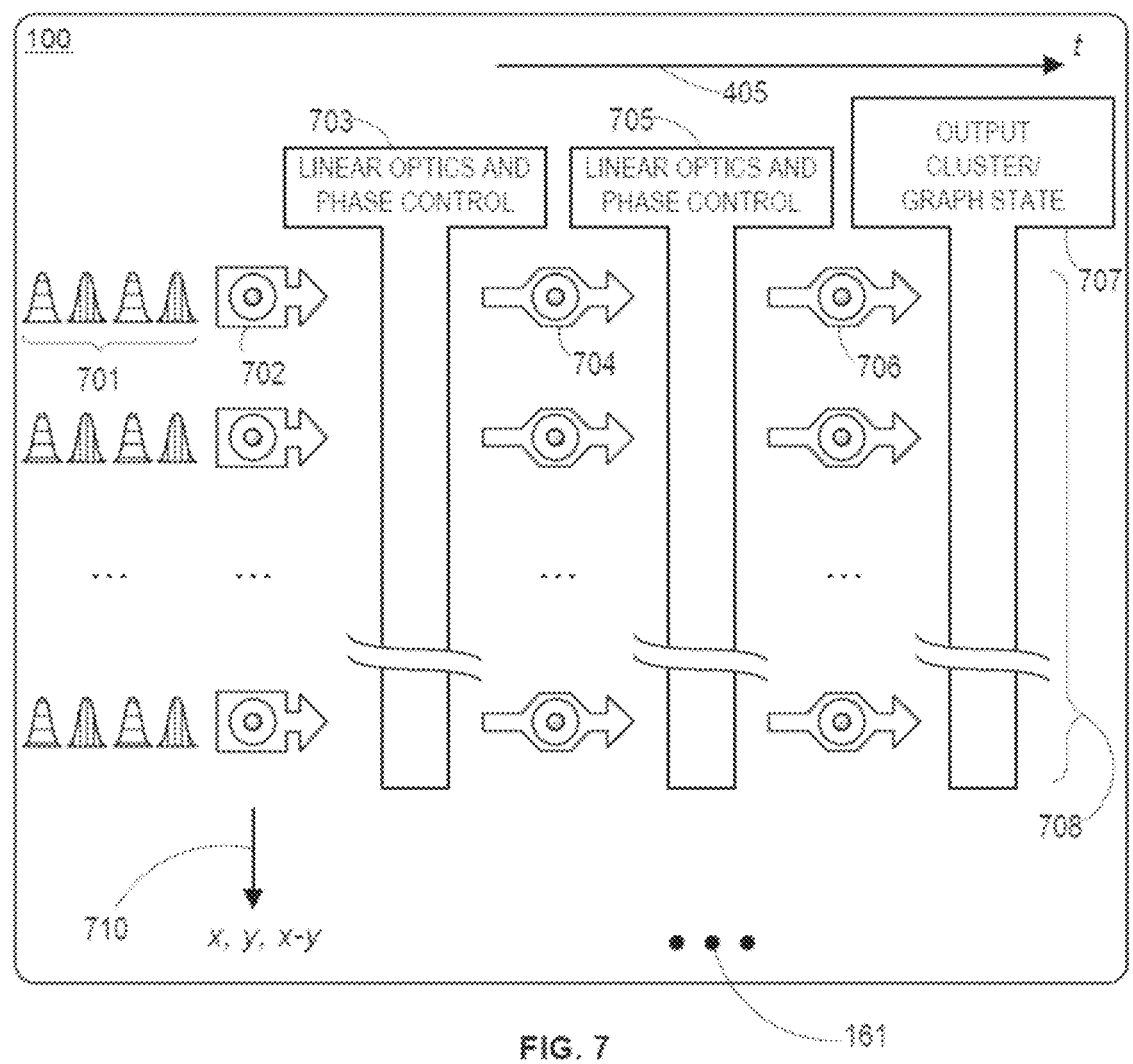
FIG. 7 schematically illustrates an apparatus for sourcing a multi-dimensional cluster state of quantum-entangled photonic states according to a disclosed embodiment.

FIG. 7 schematically illustrates an apparatus according to an embodiment of the present disclosure, which employs an arrangement of multiple devices based on device 100 for sourcing a multi-dimensional graph state or cluster state of quantum-entangled photonic states. In this embodiment, a one-dimensional spatial array combined with a time-dimensional sequence of entangled photons is output, and in a related embodiment, a two-dimensional spatial array combined with a time-dimensional sequence of entangled photons is output. In these embodiments, linear optics elements are used judiciously in a limited capacity to perform specific adjunct functions, rather than as basic components, thereby avoiding the difficulties and shortcomings of linear optics as previously discussed.

In the embodiment illustrated, a series of pulses 701 is fed to a single-photon source unit 702 whose single photon output passes through first stage linear optics and phase control elements 703 to a first stage entanglement unit 704, and from then to second stage linear optics and phase control elements 705, to a second stage entanglement unit 706, and from thence to an output channel 707, which outputs a time-sequence 405 of entangled photons in photonic cluster states and/or graph states. Arranged along a spatial axis 710 is an array 708 of similar components fed by similar series of pulses, as shown in FIG. 7. In related embodiments, spatial axis 710 is an x-axis, ay-axis, or a combination thereof in an x-y plane. For a one-dimensional spatial array, only the first stage linear optics, phase control elements, and entanglement units may be needed, for output of a one-dimensional spatial array of entangled photons in a time-dimensional sequence. With both x-axis and y-axis for a two-dimensional spatial array, the second stage linear optics, phase control elements, and entanglement units are also used, for output of a two-dimensional spatial array of entangled photons in a time-dimensional sequence. In all cases, each single-photon source, the linear optics and phase control elements, and respective entanglement unit (or respective entanglement units, in the case of two-stage operation) are correspondingly displaced along the appropriate spatial axis 710.

Figure 11A:
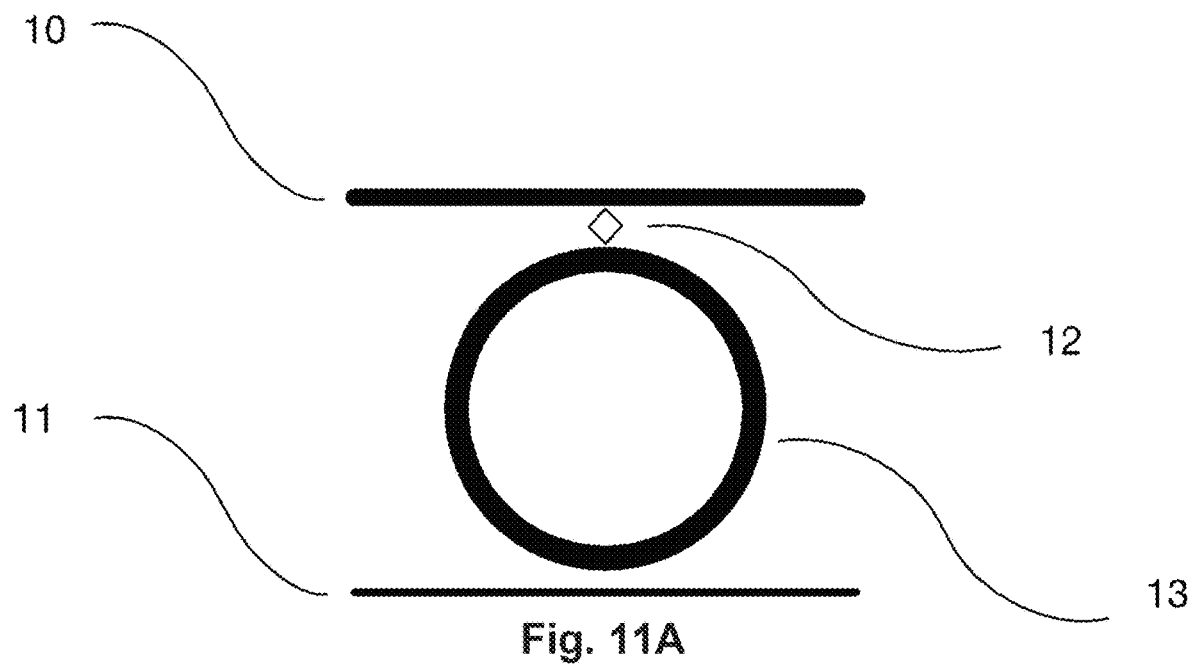
FIG. 11A schematically illustrates an example of a photonic circuit according to some embodiments of the present disclosure relating to a photonic circuit with a circular resonator and two waveguides.

FIG. 11A illustrates an example of a photonic circuit which implements a Cavity-QED system for use in quantum computing according to an embodiment of the present disclosure. Such a circuit may include a resonator 13, and two waveguides. In the example shown in FIG. 11A, the resonator has a substantially circular shape, or a circular shape, in a plane, e.g., a plane that is parallel to the largest dimension of the resonator and/or is perpendicular to a line of sight. Resonators of other shapes may also be used to perform the same function, e.g, an oval shape, an elongated oval shape, an elliptic shape, a rounded rectangular shape, and others. A "Utility" waveguide 10 (which can be either an on-chip waveguide or a free-space photonic mode), "Quantum" waveguide 11 and an Atom or other quantum emitter "trap" 12 (also referred to as a coupling location) are also shown in the example. The Utility waveguide 10 may be used, in conjunction with coupled lasers to trap and cool the Atom or other particle or quantum emitter. The Utility waveguide 10 is not coupled to the resonator 13. The Quantum waveguide 11 may be coupled to the resonator 13 and may be used, in conjunction with coupled lasers to access (e.g., enable an interaction with) the Atom or other quantum emitter and manipulate its quantum state. The Quantum waveguide 11 may also be used to output a single photon from the resonator 13. The Cavity-QED circuit can be used to generate single photons and/or create entanglement between photons.

Figure 11B:
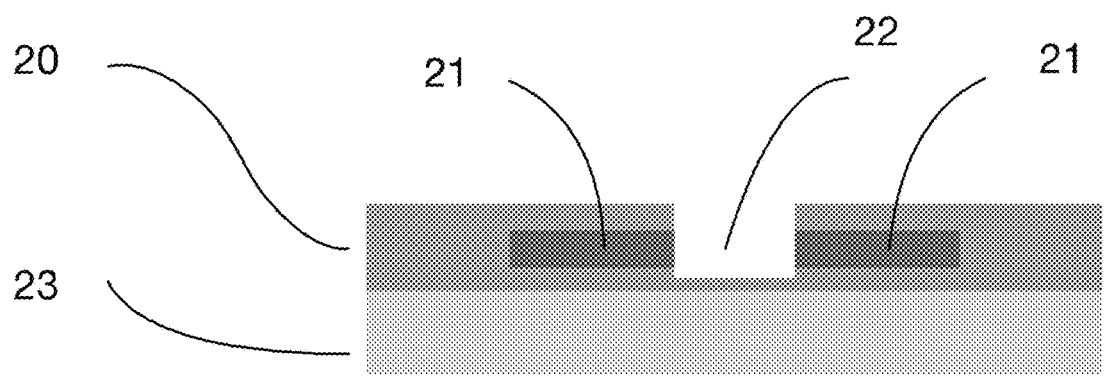
FIG. 11B schematically illustrates an example of a cross section of the example photonic circuit shown FIG. 11A.

FIG. 11B illustrates a cross section example of a photonic chip, e.g., the example photonic chip shown in FIG. 11A. The example shows a trap opening (e.g, a coupling location opening) for an Atom or quantum emitter or other particle. The opening may be configured to trap the particle as close as possible to the resonator. The example depicts the embodiments of two waveguides 21 and an opening 22 between them. One waveguide is a section of the resonator, and the other waveguide is used to deliver a laser protocol to trap and cool the particle. Some complementary trapping and cooling laser may also come from the resonator.

Figure 12A:
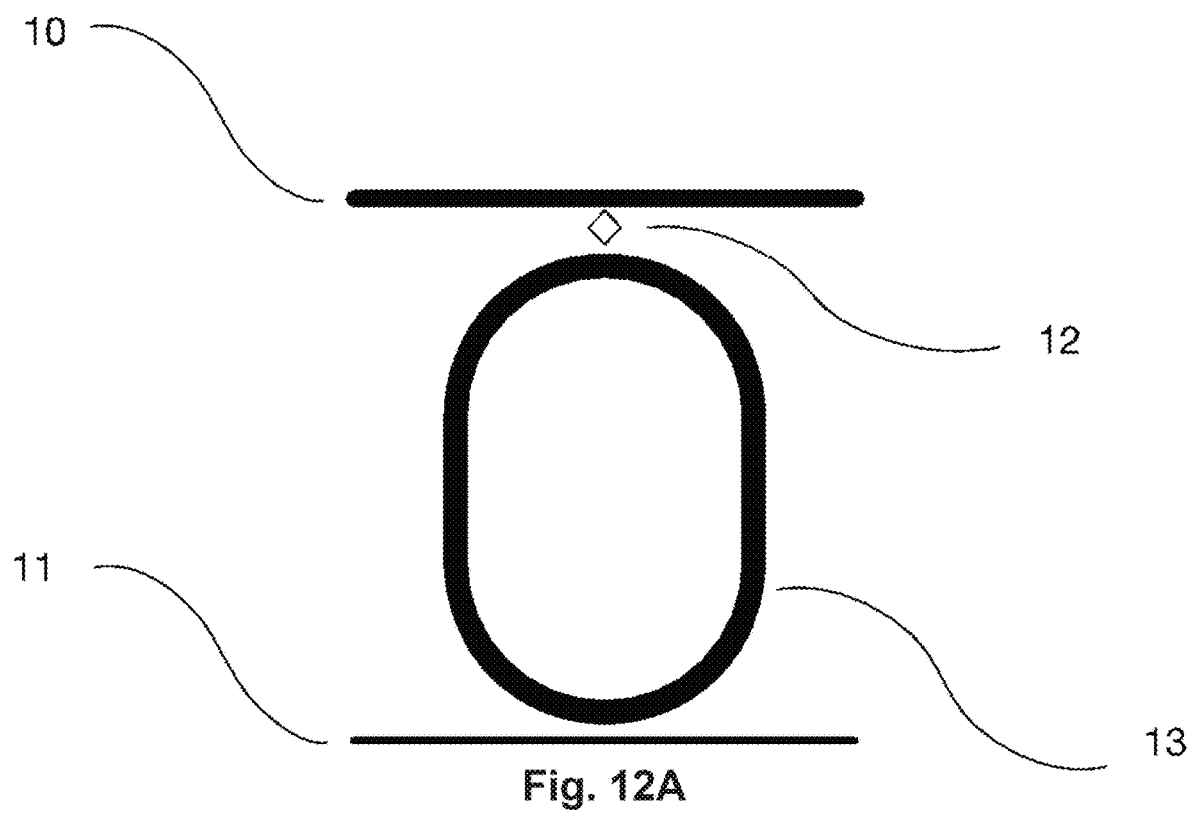
FIG. 12A schematically illustrates an example of a photonic circuit according to some embodiments of the present disclosure relating to a photonic circuit with a racetrack resonator and two waveguides.
Figure 12B:
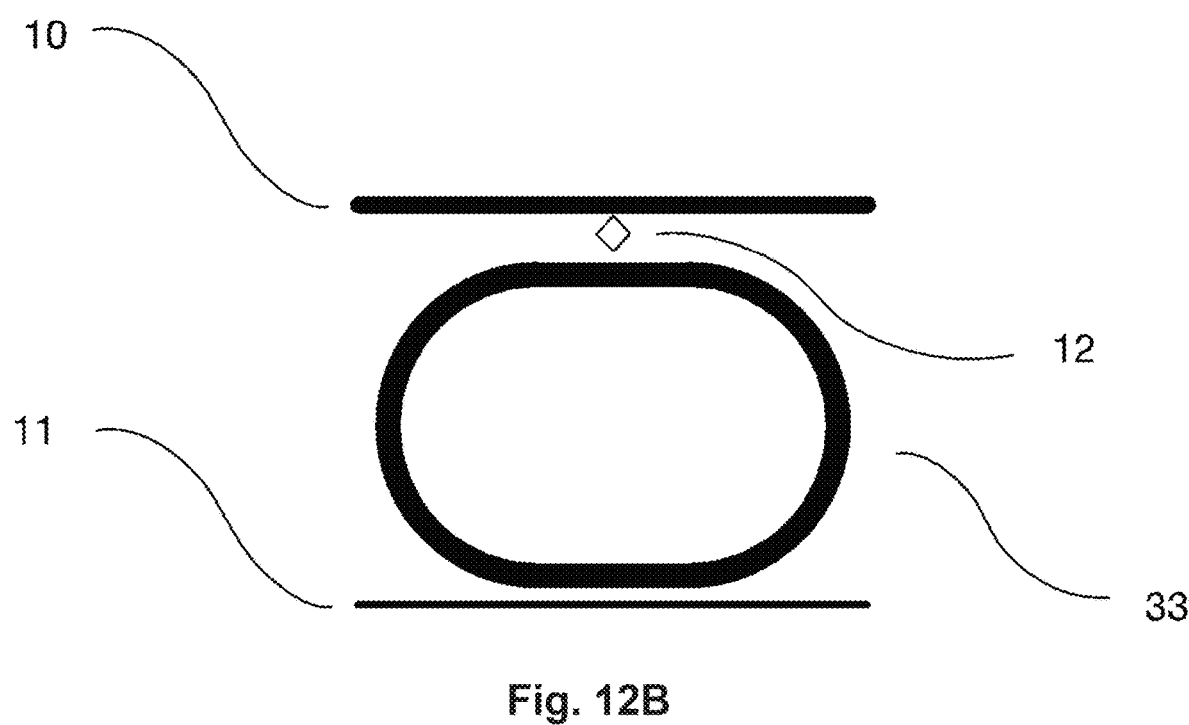
FIG. 12B schematically illustrates an example of a photonic circuit according to some embodiments of the present disclosure relating to a photonic circuit with a racetrack resonator and two waveguides, the resonator being in a different orientation from the resonator shown in FIG. 12A.
Figure 12C:
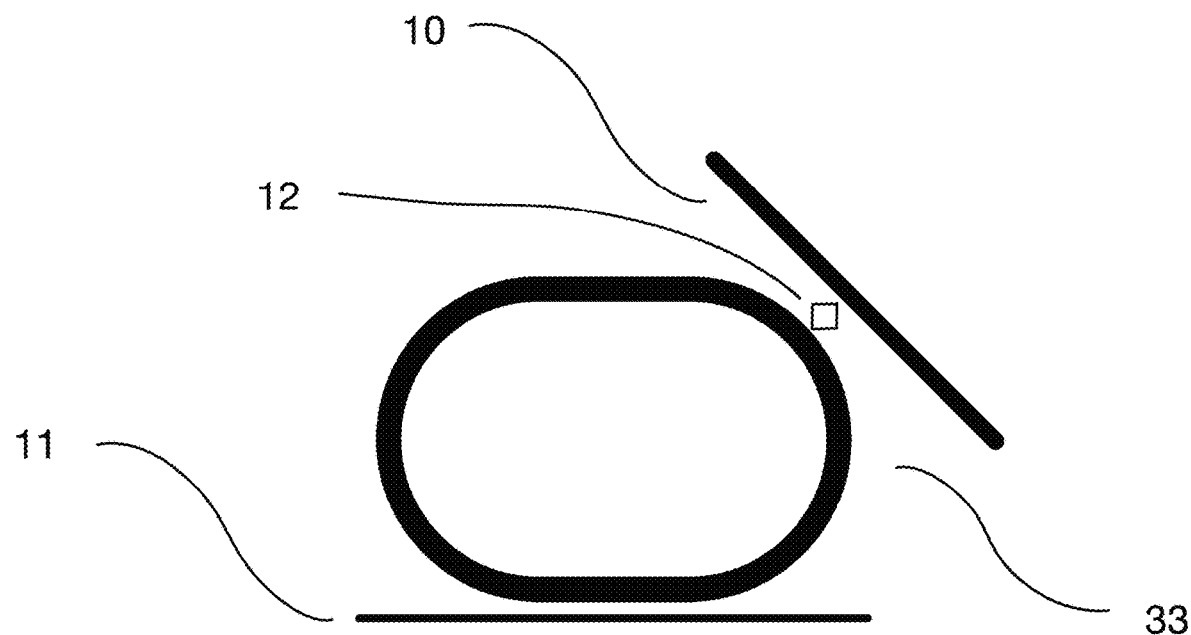
FIG. 12C schematically illustrates an example of a photonic circuit according to some embodiments of the present disclosure relating to a photonic circuit with a racetrack resonator and two waveguides, a waveguide and a trap for an atom being in different positions from the example shown in FIG. 12B.
Figure 12D:
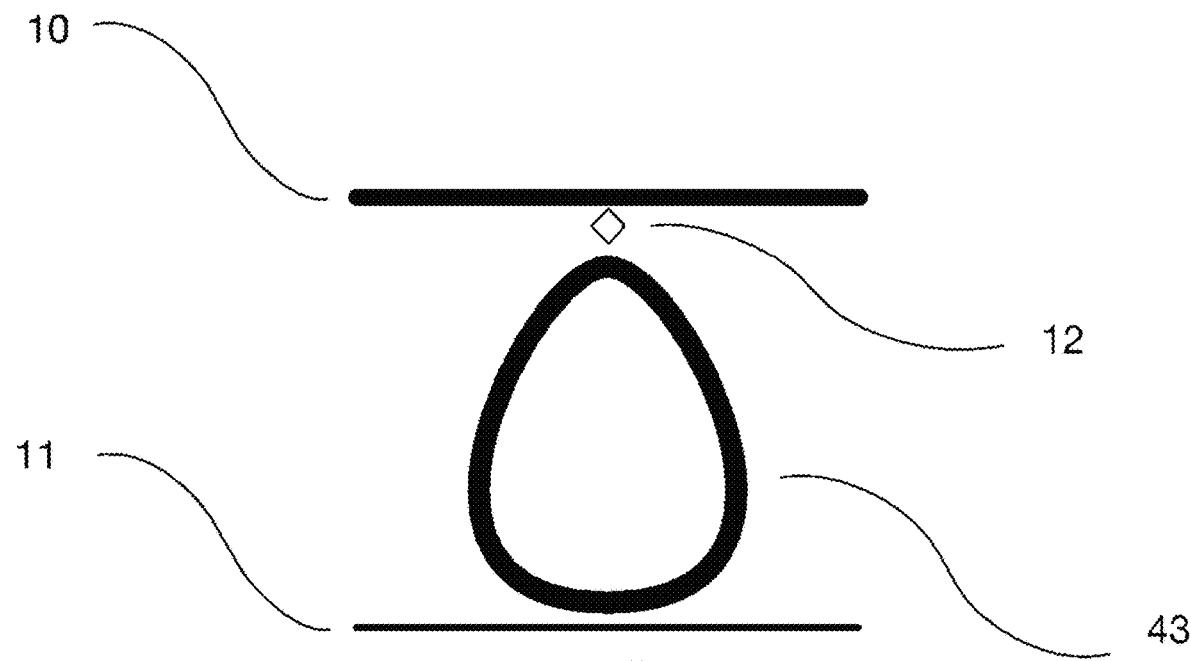
FIG. 12D schematically illustrates an example of a photonic circuit according to some embodiments of the present disclosure relating to a photonic circuit with an oval resonator and two waveguides.

FIG. 12A to FIG. 12D illustrate other examples of a resonator arrangement intended to adjust or optimize the resonator quality factor and interaction between the photon and the atom (or quantum emitter or particle), and the resonator. FIG. 12A to FIG. 12C illustrate arrangements using "racetrack" (or an elliptic) implementations and FIG. 12D illustrates an arrangement using an "egg" shaped resonator. For example, FIG. 12A schematically illustrates an example of a photonic circuit according to some embodiments of the present disclosure relating to a photonic circuit with an elliptic resonator 13 and two waveguides 10, 11. An elliptic resonator refers to a resonator having an elliptic shape in a plane, similar to a racetrack or a stadium shape. FIG. 12B schematically illustrates an example of a photonic circuit according to some embodiments of the present disclosure relating to a photonic circuit with an elliptic resonator 33 and two waveguides 10, 11, the resonator 33 being in a different orientation from the resonator 13 shown in FIG. 12A. FIG. 12C schematically illustrates an example of a photonic circuit according to some embodiments of the present disclosure relating to photonic circuit including an elliptic resonator 33 and two waveguides 10, 11, showing an alternative positioning of a waveguide 10 and a trap 12 for an atom to those shown in FIG. 12B. The positioning of the waveguides shown in FIG. 12C is such that they are not parallel, nor are they positioned on the opposite sides of the resonator, with a trap position adjusted accordingly so that the trap 12 is positioned between the resonator 33 and a waveguide 10. FIG. 12D schematically illustrates an example of a photonic circuit according to some embodiments of the present disclosure relating to a photonic circuit with an oval resonator 43 and two waveguides 10, 11. The oval resonator refers to a resonator having an oval shape in a plane, and may also be referred to as an "egg shaped" resonator.

Figure 13:
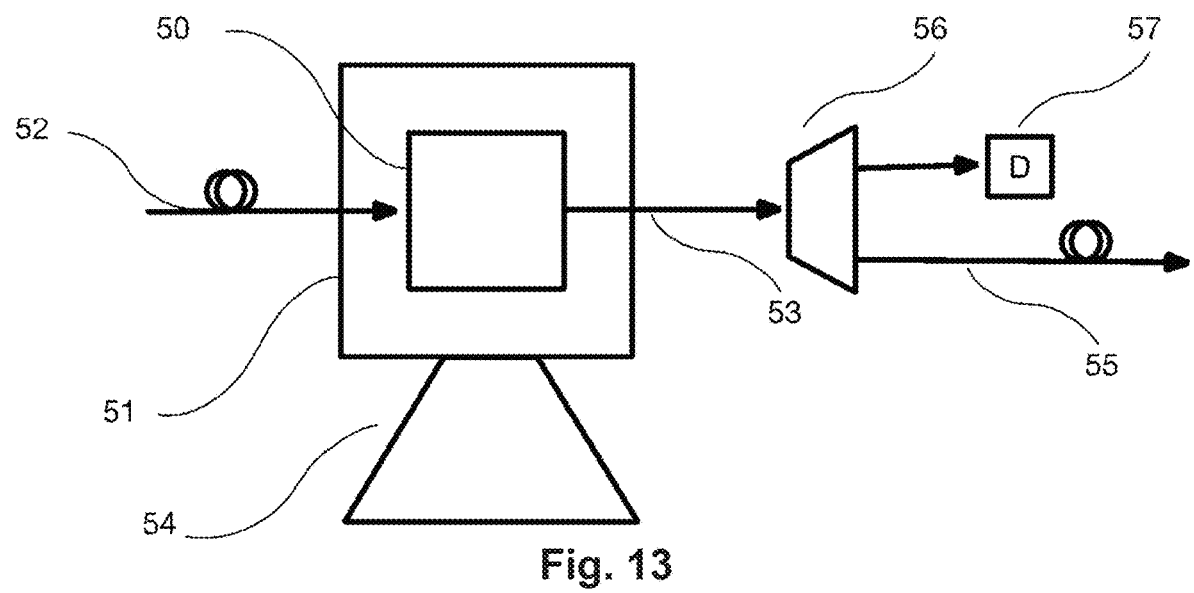
FIG. 13 schematically illustrates an example of a photonic chip inside a vacuum chamber according to some embodiments of the present disclosure.

FIG. 13 illustrates a photonic chip 50 in a vacuum chamber 51 with a cold particle delivery system 54. The photonic chip embodies a photonic circuit which may include one or a few of the resonator and waveguides circuit as described earlier (e.g., the arrangements described with reference to FIG. 8 to FIG. 9C and FIG. 11A to FIG. 12D).

Figure 14:
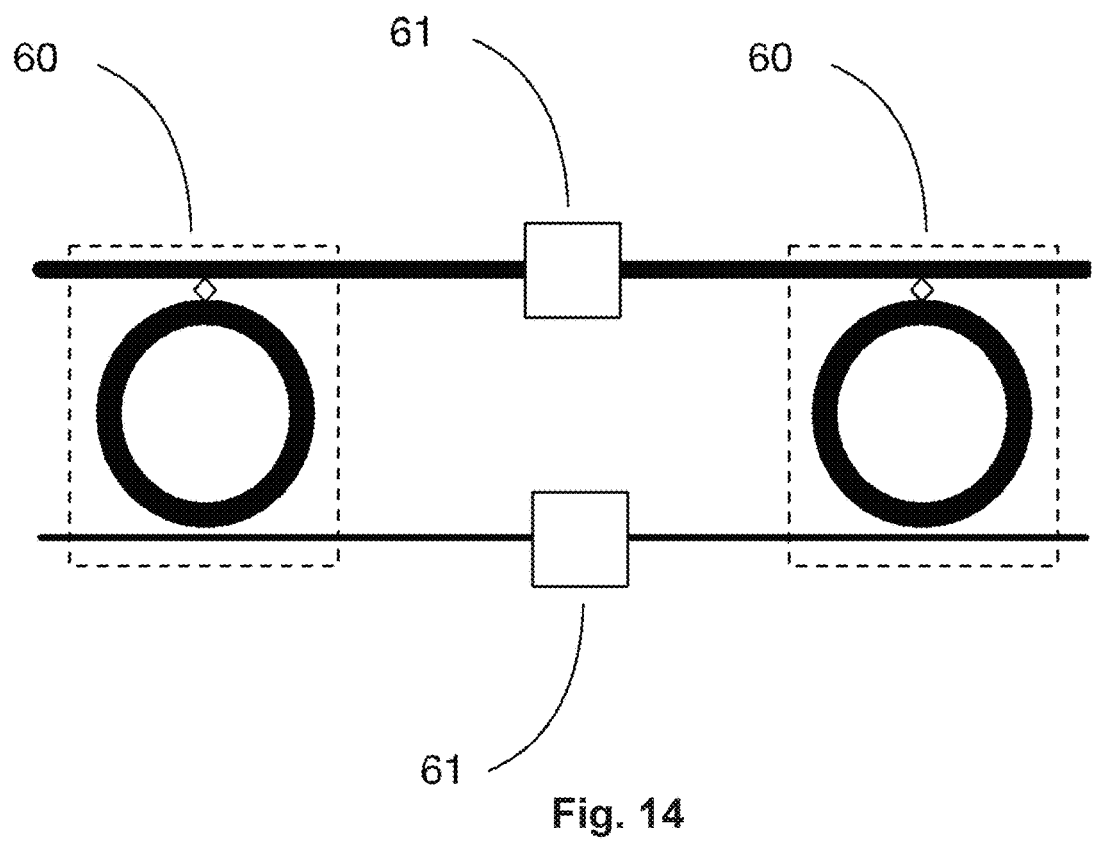
FIG. 14 schematically illustrates/an example of a plurality of connected Cavity-QED circuits according to some embodiments of the present disclosure.

FIG. 14 describes an example arrangement in which one Cavity-QED circuit may be used to generate single photons, with the output of the first circuit (i.e., this single photon generating Cavity-QED circuit) serving as the input of a second Cavity-QED circuit 60. The second Cavity-QED circuit may then be used for achieving entanglement between two or more of the generated single photons. Some additional optical circuits 61, like switches may be inserted between the Cavity-QED circuits. Additional concatenated circuits may be switched to generate more complex entanglement structures.

A chip comprising the arrangement of FIG. 14 may be placed inside a vacuum chamber as shown in FIG. 13. A delivery system 54 may be used to supply cooled Atoms or quantum emitters or other particles to the chip. The delivery system 54 may include an embodiment of a Magneto-optical trap (MOT). The supplied atoms, quantum emitters or particles are trapped near the chip to create a Cavity-QED interaction. The different lasers 52 that are used to trap, cool, interact with and prepare the atom or quantum emitter or particle may be assembled on the chip itself or, as in this example, may come from external sources, outside of the vacuum chamber 51. In some implementations the lasers can come from a combination of sources, some assembled on the chip and some coming from an external source. The generated photons are output from the photonic chip to a coupled fiber optics cable 53 which can be switched 56 towards a single photon detector 57 or outside the system as part of a photonic cluster state 55.

Figure 16A:
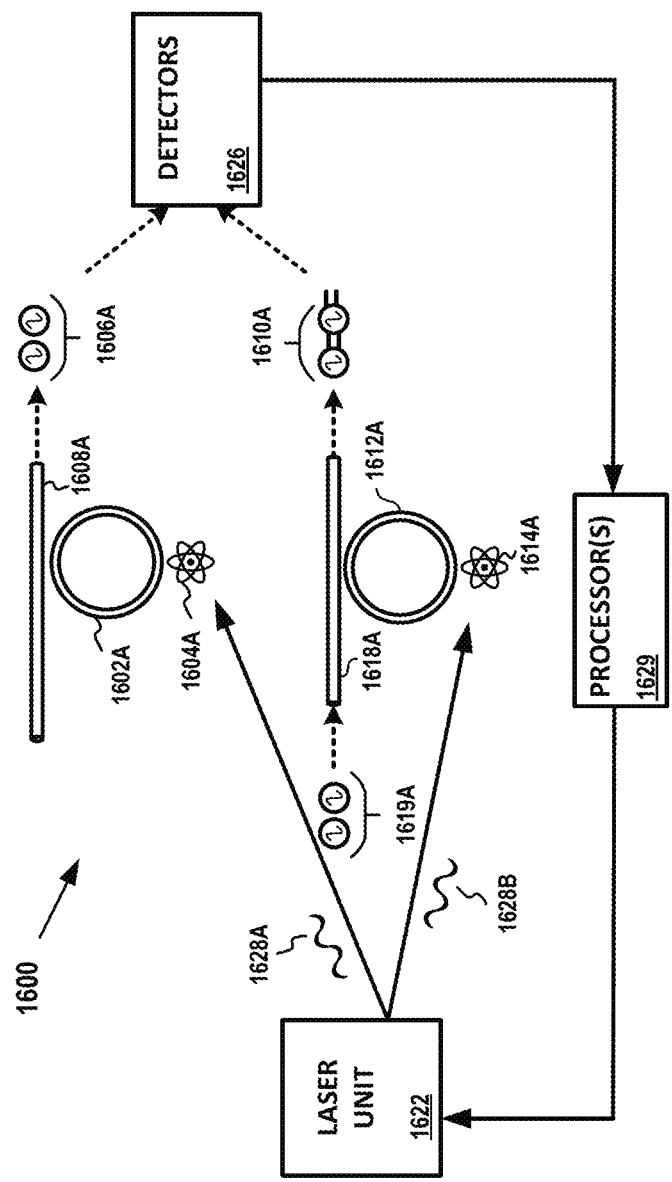
FIG. 16A schematically illustrates a quantum computing system according to some embodiments of the present disclosure relating to silicon nitride resonators for use in qubit generation and/or entanglement.

FIG. 16A illustrates an exemplary implementation of quantum computing system 1600 including: first silicon nitride resonator 1602A couplable to first alkali atom 1604A and configured to generate a plurality of photonic qubits 1606A; waveguide 1608A configured to carry and/or output the generated plurality of photonic qubits 1606A; second silicon nitride resonator 1612A couplable to second alkali atom 1614A and configured to cause entanglement between at least two photonic qubits 1619A; waveguide 1618A configured to carry the at least two photonic qubits 1619A which are to be entangled (e.g., to cause the at least two photonic qubits 1619A to be entangled), and to output at least two entangled photonic qubits 1610A; laser unit 1622 configured to provide a plurality of lasers (e.g., laser beams 1628A, 1628B) to arrangements including silicon nitride resonator 1602A, 1612A couplable to alkali atom 1604A, 1614A; a plurality of detectors 1626 configured to detect a presence of trapped first alkali atom 1604A and/or trapped second alkali atom 1614A; and processor(s) 1629 configured to receive at least one input signal from at least one of the plurality of detectors 1626, and to control laser unit 1622. The plurality of lasers may be configured to trap, cool and manipulate first alkali atom 1604A and second alkali atom 1614A. The plurality of detectors 1626 may output at least one signal indicating a presence of trapped first alkali atom 1604A and/or trapped second alkali atom 1614A after detecting or sensing the presence, and processor(s) 1629 may then receive at least one input or at least one input signal indicating a presence of trapped first alkali atom 1604A and/or trapped second alkali atom 1614A, which are either the output at least one signal from the plurality of detectors 1626 or separate at least one input signal generated based on the output at least one signal from the plurality of detectors 1626. Processor(s) 1629 may be configured to, based on received at least one input or at least one input signal from detectors 1626, control at least some of the plurality of lasers (e.g., laser beams 1628A, 1628B) provided by laser unit 1622 (e.g., by controlling parameters and/or settings of laser unit 1622).

Processor(s) 1629 may be configured to control laser beams or laser pulses including beam 1628A provided by laser unit 1622 to manipulate trapped first alkali atom 1604A to thereby generate photonic qubits 1606A using trapped first alkali atom 1604A. Processor(s) 1629 may be configured to control laser beams or laser pulses including beam 1628B provided by laser unit 1622 to manipulate trapped second alkali atom 1614A to thereby generate entanglement between photonic qubits 1619A transmitted to trapped second alkali atom 1614A. Processor(s) 1629 may be also configured to control laser beams or laser pulses including beam 1628A to manipulate trapped first alkali atom 1604A so that photonic qubits 1606A generated using trapped first alkali atom 1604A may be used as input photonic qubits 1619A for trapped second alkali atom 1614A, wherein the input photonic qubits 1619A may be arranged to be entangled using trapped second alkali atom 1614A.

The plurality of detectors 1626 may also include at least one detector for measuring photonic qubits such as generated photonic qubits 1606A and/or output entangled photonic qubits 1610A. One or more detectors may also be configured to generate a signal based on the measurement(s) so that the signal includes information relating to the measurement(s). The generated signal from the detectors can then be communicated to processor(s) 1629 so that the generated signal may serve as an input signal for processor(s) 1629 and/or the information relating to the measurement(s) may serve as an input for processor(s) 1629 as described herein. For example, some of detectors 1626 are positioned downstream of waveguide 1608A carrying generated photonic qubits 1606A and downstream of waveguide 1618A outputting entangled photonic qubits 1610A. Those detectors may measure one or more of generated photonic qubits 1606A and/or one or more of entangled photonic qubits 1610A, and provide an indication of the measurement(s) to processors 1629. It is to be understood that those detectors may measure one or more of generated photonic qubits 1606A and/or one or more of entangled photonic qubits 1610A by inferring/determining state(s) and/or propert(ies) of those photonic qubits 1606A, 1610A from measuring other associated photonic qubits (e.g., using a switch and a waveguide branch-off arrangement as described with reference to FIG. 9A, and/or by positioning one or more detectors at an end of a waveguide carrying the photonic qubits to be measured) or from measuring trapped alkali atom entangled with entangled photonic qubits 1610A (e.g., by mapping a state of the trapped alkali atom to a photon and using detectors 1626 to detect that photon as described herein with reference to mapping a quantum emitter qubit to a photonic qubit).

Processor(s) 1629 may manipulate measurement bases of subsequent photonic qubits using results of measurements of prior photonic qubits. For example, manipulating the measurement bases may include changing states of at least one of: a plurality of switches; a plurality of phase shifters; and/or a plurality of birefringent elements. Processor(s) 1629 may also select measurement bases (e.g., a basis of possible directions of travel, and/or possible polarities) of a photonic qubit involved in detectors 1626 measuring photonic qubits, thereby enabling quantum computing system 1600 to perform a logic operation with the measurements.

Figure 16B:
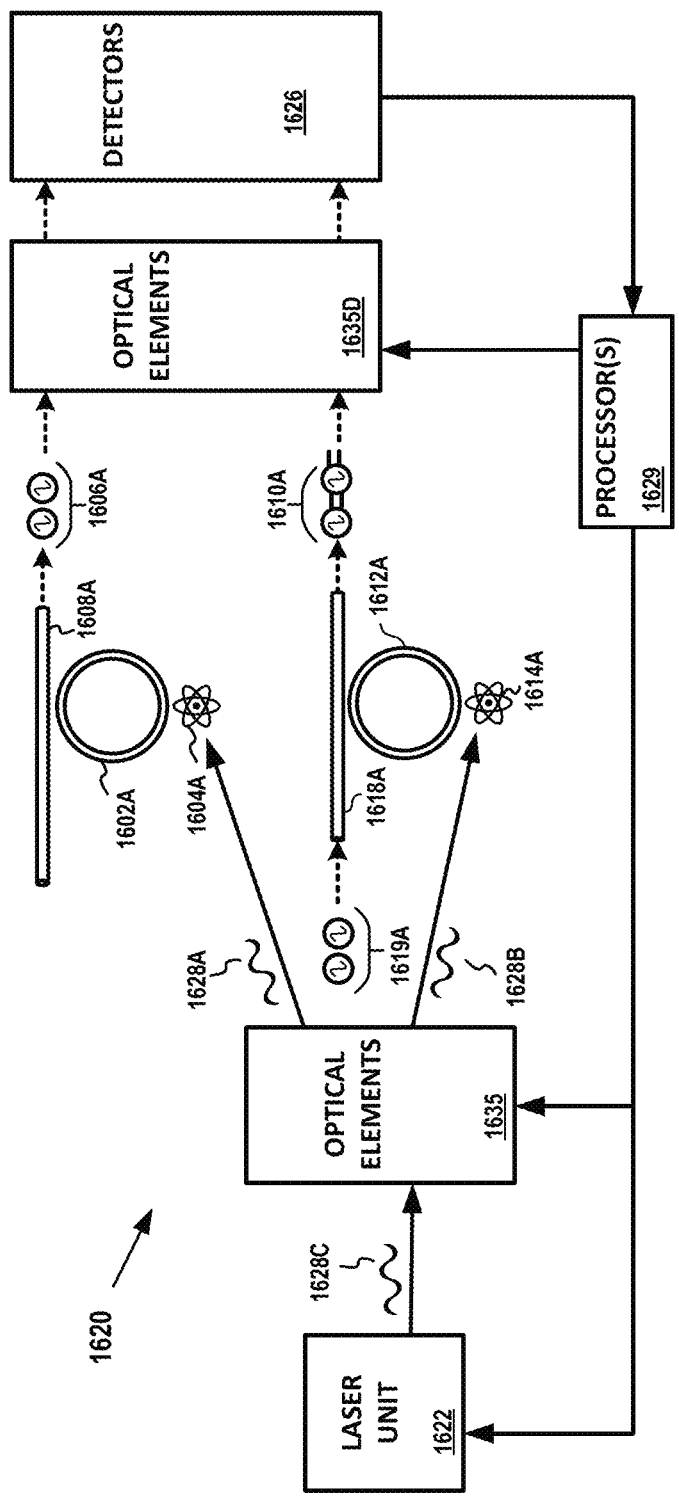
FIG. 16B schematically illustrates another quantum computing system according to some embodiments of the present disclosure for use in qubit generation and/or entanglement.

FIG. 16B illustrates an exemplary implementation of quantum computing system 1620 which includes components of quantum computing system 1600 of FIG. 16A described herein and optical elements 1635, 1635D for controlling or adjusting a laser beam or a pulse of photons (or a pulse of photonic qubits). For example, any laser unit or laser described herein may have optical elements 1635 associated therewith, which are configured to control or channel a laser beam from the laser unit to provide one or more laser beams or pulses of photons to different arrangements for generating photonic qubits and/or generating entanglement between photonic qubits. Such optical elements 1635 may be positioned between the laser unit and the different arrangements as shown in FIG. 16B. In some examples, any detector described herein may have optical elements 1635D associated therewith, which are configured to set, adjust, change, and/or manipulate measurement bases for a subsequent measurement by one or more detector(s). Such optical elements 1635D may be positioned between a waveguide carrying or outputting a laser beam or a pulse of photons (or a pulse of photonic qubits) and its associated detector as shown in FIG. 16B. In FIG. 16B, laser unit 1622 of quantum computing system 1620 is configured to provide laser beam 1628C to optical elements 1635, which are arranged to control or channel laser beam 1628C to provide laser beams or laser pulses (e.g., including laser beams 1628A, 1628B) to arrangements including silicon nitride resonator 1602A, 1612A couplable to alkali atom 1604A, 1614A. For example, optical elements 1635 may include one or more lenses, mirrors, filters, polarizers, prisms, wave plates, transmissive elements, reflective elements, optical switches, birefringent elements (e.g., beam splitters), and/or phase shifters configured to control properties, direction of travel and/or channeling of light emitted by laser unit 1622 so that the arrangements including silicon nitride resonator 1602A, 1612A couplable to alkali atom 1604A, 1614A are provided with the laser beams or laser pulses of the appropriate property (e.g., including laser beams 1628A, 1628B). Quantum computing system 1620 also includes optical elements 1635D associated with detectors 1626, which are arranged to set, adjust, change, and/or manipulate measurement bases for a subsequent measurement by detectors 1626. For example, optical elements 1635D may include optical switches, birefringent elements (e.g., beam splitters), and/or phase shifters configured to set, adjust or manipulate properties, direction of travel and/or channeling of entangled photonic qubits 1610A so that the subsequent measurement by detectors 1626 can be performed using appropriate measurement bases. As a non-limiting example, when an associated quantum computation, or a detection of a presence of a trapped alkali atom, relies on measuring a polarization of a photon or photonic qubit (e.g., horizontal and vertical polarizations, or clockwise circular and counter-clockwise circular polarization), measurement bases useable in measuring the polanzation of a subsequent photon may be defined by controlling optical elements 1635D such as birefringent elements.

Processor(s) 1629 may be configured to, based on received at least one input or at least one input signal from detectors 1626, control at least some of a plurality of lasers (e.g., laser beams or laser pulses including laser beam 1628A) to manipulate trapped first alkali atom 1604A to thereby generate photonic qubits 1606A using trapped first alkali atom 1604A. For example, processor(s) 1629 may be configured to control at least one of; one or more lasers (e.g., laser beam 1628C) provided by laser unit 1622 (e.g., by controlling parameters and/or settings of laser unit 1622); and/or optical elements 1635. Alternatively or additionally, processor(s) 1629 may be configured to, based on received at least one input or at least one input signal from detectors 1626, control at least one of optical elements 1635D to set, adjust, change, and/or manipulate measurement bases for use in a subsequent measurement by at least one of detectors 1626.

Optical elements 1635 may also be arranged (e.g., appropriately located to be nearby, or at an input end of, relevant waveguide 1608A, 1618A) to control or channel input laser beam 1628A, 1628B or an input pulse of photons so that photonic qubits 1606A may be generated and/or entangled photonic qubits 1610A may be output. Processor(s) 1629 may be configured to, based on received at least one input or at least one input signal from detectors 1626, control optical elements 1635 and/or at least some of a plurality of lasers (e.g., laser beam 1628C) provided by laser unit 1622 (e.g., by controlling parameters and/or settings of laser unit 1622) to manipulate trapped second alkali atom 1614A to thereby generate entanglement between photonic qubits 1619A transmitted to trapped second alkali atom 1614A. For example, processor(s) 1629 may be also configured to, based on received at least one input or at least one input signal from detectors 1626, control optical elements 1635 and/or at least some of a plurality of lasers (e.g., laser beam 1628C) to manipulate trapped first alkali atom 1604A to generate photonic qubits 1606A so that photonic qubits 1606A generated using trapped first alkali atom 1604A may be used as input photonic qubits 1619A for trapped second alkali atom 1614A. Optical elements 1635D may also be arranged (e.g., appropriately located to be nearby, or at an output end of, relevant waveguide 1608A, 1618A) to control one or more propert(ies) of, and/or to channel, generated photonic qubits 1606A and/or output entangled photonic qubits 1610A as they are transmitted to and/or received by detectors 1626.

Processor(s) 1629 may transmit one or more signals for controlling settings of optical elements 1635, 1635D (e.g., transmit controlling signal(s) to one or more optical switch(es)) to change a state of at least one optical switch included in optical elements 1635, 1635D. For example, processor(s) 1629 may cause an optical switch included in optical elements 1635, 1635D (which is also associated with a specific laser pump or a specific detector) to be turned on, thereby allowing photons emitted by the specific laser pump to propagate towards trapped alkali atom 1604A, 1614A, or from trapped alkali atom 1604A, 1614A to a specific detector measuring photons in a specific measurement basis. Detection results from the propagating photons may then cause measurement bases for subsequently generated photonic qubits 1606A or subsequently output entangled photonic qubits 1610A to be manipulated by being used in controlling optical elements 1635D.

Processor(s) 1629 may transmit one or more signals for controlling settings of optical elements 1635, 1635D to change a state of at least one phase shifter included in optical elements 1635, 1635D. For example, processor(s) 1629 may cause a phase of one or more photons propagating towards trapped alkali atom 1604A. 1614A, or from trapped alkali atom 1604A, 1614A to a specific detector, to be altered by changing the state of a phase shifter included in optical elements 1635, 1635D (which is also associated with a specific laser pump or the specific detector). Detection results from the propagating photons may then cause measurement bases for subsequently generated photonic qubits 1606A or subsequently output entangled photonic qubits 1610A to be manipulated by being used in controlling optical elements 1635D.

Processor(s) 1629 may transmit one or more signals for controlling settings of optical elements 1635, 1635D to change a state of at least one birefringent element (e.g., at least one beam splitter or at least one wave plate) included in optical elements 1635, 1635D. For example, processor(s) 1629 may cause a polarization of one or more photons propagating towards trapped alkali atom 1604A, 1614A, or from trapped alkali atom 1604A. 1614A to a specific detector, to be modified by changing the state of a birefringent element included in optical elements 1635, 1635D (which is also associated with a specific laser pump or the specific detector). Detection results from propagating photons and trapped alkali atom 1604A, 1614A may then cause measurement bases for subsequently generated photonic qubits 1606A or subsequently output entangled photonic qubits 1610A to be manipulated by being used in controlling optical elements 1635D.

Quantum computing system 1600, 1620 shown in FIG. 16A and FIG. 16B may also include additional first alkali atom(s)(which are trappable and then useable in a qubit generator) and/or second alkali atom(s) (which are trappable and then useable in an entangling gate), with the plurality of detectors 1626 configured to detect a presence of trapped additional first alkali atom(s) and/or additional second alkali atom(s) and/or measure photonic qubits, and the at least one processor 1629 configured to receive at least one input or at least one input signal from at least one of the plurality of detectors 1626 in a similar manner described above.

Figure 16C:
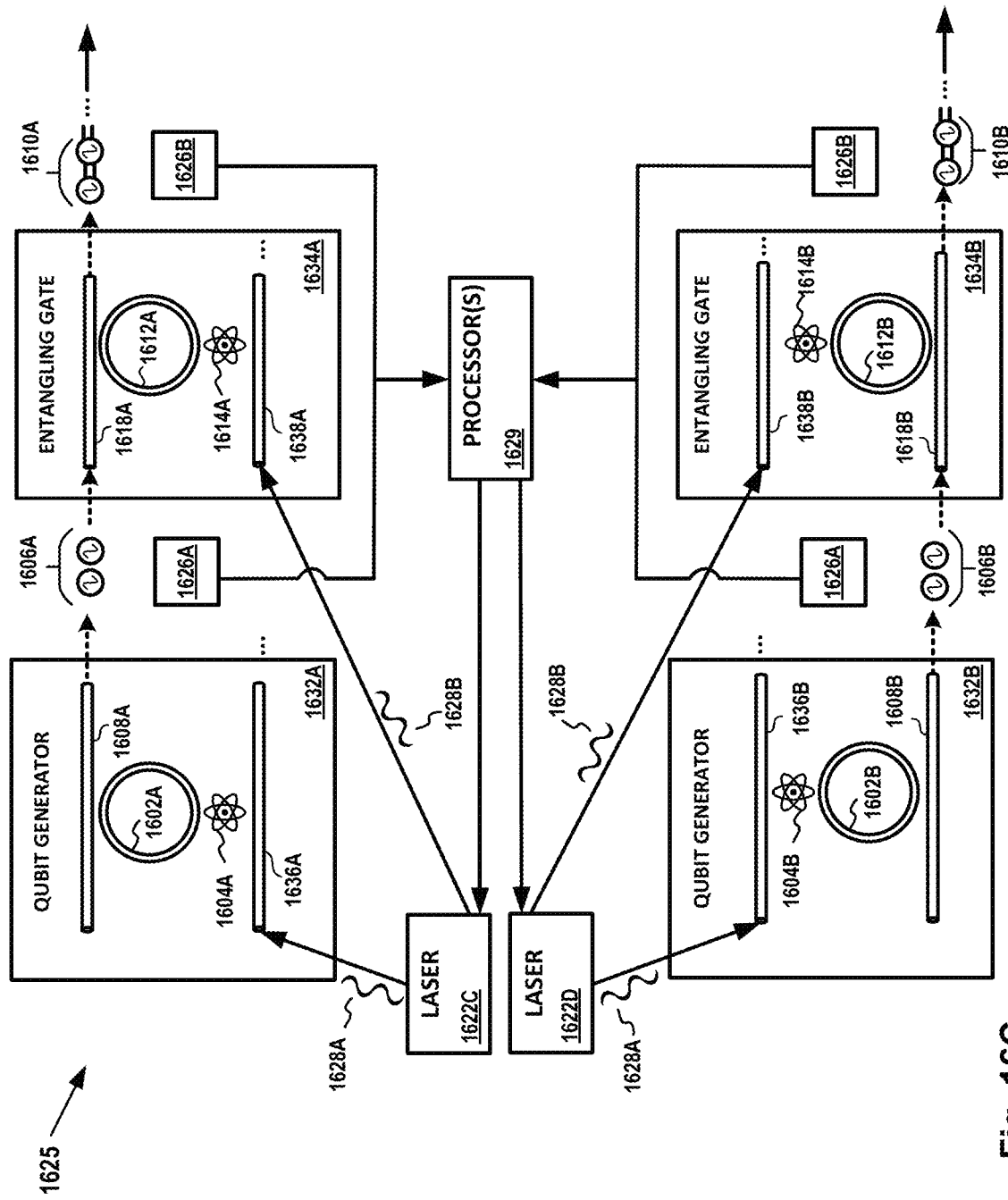
FIG. 16C and FIG. 16D schematically illustrate examples of quantum computing systems according to some embodiments of the present disclosure, which includes components of the quantum computing system for use in qubit generation and/or entanglement shown in FIG. 16A or FIG. 16B.

FIG. 16C illustrates an exemplary implementation of quantum computing system 1625 which includes components of quantum computing system 1600 of FIG. 16A and/or quantum computing system 1620 of FIG. 16B described herein, and further includes: another first silicon nitride resonator 1602B couplable to another first alkali atom 1604B and configured to generate a plurality of photonic qubits 1606B, and another second silicon nitride resonator 1612B couplable to another second alkali atom 1614B and configured to cause entanglement between at least two photonic qubits 1606B; another waveguide 1618B configured to carry the at least two photonic qubits 1606B to be entangled, and to output at least two entangled photonic qubits 1610B. In FIG. 16C, detectors 1626 of quantum computing system 1600 of FIG. 16A and/or quantum computing system 1620 of FIG. 16B are grouped into two groups based on their functionalities or capabilities, first detectors 1626A for detecting generated photonic qubits 1606A, 1606B (e.g., generated by qubit generator 1632A, 1632B) and second detectors 1626B for detecting entangled photonic qubits 1610A, 1610B (e.g., output from entangling gate 1634A, 1634B). Depending on the actual arrangement and position of the physical detectors used, a same physical detector may serve functionalities of both groups, e.g., serving as both first detectors 1626A and second detectors 1626B of FIG. 16C. It is also to be understood that optical elements similar to optical elements 1635D shown in FIG. 16B may also be provided (e.g., appropriately located to be nearby, or at an output end of, relevant waveguide 1608A, 1618A, 1608B, 1618B) to control one or more propert(ies) of, and/or to channel, generated photonic qubits 1606A, 1606B and/or output entangled photonic qubits 1610A, 1610B as they are transmitted to and/or received by first detectors 1626A and/or second detectors 1626B.

Quantum computing system 1625 includes: qubit generators 1632A, 1632B, each qubit generator including first silicon nitride resonator 1602A, 1602B couplable to first alkali atom 1604A, 1604B; and entangling gates 1634A, 1634B, each entangling gate including second silicon nitride resonator 1612A, 1612B couplable to second alkali atom 1614A, 1614B, wherein when second silicon nitride resonator 1612A, 1612B is coupled to second alkali atom 1614A, 1614B they can be used to facilitate two or more photonic qubits to interact with second alkali atom 1614A, 1614B via second silicon nitride resonator 1612A, 1612B and become entangled with second alkali atom 1614A, 1614B, and thus the two or more photonic qubits becoming entangled with one another (e.g., at least two entangled photonic qubits 1610A, 1610B with their entanglement represented by a double line therebetween). Entangling gate 1634A, 1634B is located downstream from qubit generator 1632A, 1632B, and each entangling gate 1634A, 1634B may be optically coupled to qubit generator 1632A, 1632B via waveguide 1608A, 1618A, 1608B, 1618B so that photonic qubits 1606A, 1606B generated by qubit generator 1632A, 1632B can be received via waveguide 1608A, 1618A, 1608B, 1618B. In entangling gate 1634A, 1634B, second silicon nitride resonator 1612A, 1612B coupled to second alkali atom 1614A, 1614B is configured to cause photonic qubits 1606A, 1606B to become entangled with second alkali atom 1614A, 1614B, and thus with each other (e.g., as illustrated by a double line between entangled photonic qubits 1610A, 1610B). In other exemplary implementations, photonic qubits 1606A, 1606B to be entangled by entangling gate 1634A, 1634B may be provided by other source(s) of photonic qubits.

Quantum computing system 1625 includes a plurality of detectors (e.g., first detectors 1626A and/or second detectors 1626B) configured to detect a presence of trapped first alkali atom 1604A, 1604B and/or trapped second alkali atom 1614A. 1614B, and processor(s) 1629 configured to receive at least one input or at least one input signal from at least one of the plurality of detectors 1626A, 1626B. For example, the one or more detectors (e.g, at least one of first detectors 1626A) may be configured to detect a presence of trapped first alkali atom 1604A, 1604B using detection or sensing of at least one of: a laser beam for trapping first alkali atom 1604A, 1604B carried in waveguide 1636A, 1636B nearby first alkali atom 1604A, 1604B or a state of laser beam 1628A; input photons provided toward trapped first alkali atom 1604A, 1604B or a state of input photons; and/or photonic qubits 1606A, 1606B output from waveguide 1608A, 1608B or a state of photonic qubits 1606A, 1606B. Additionally or alternatively, the one or more detector (e.g., at least one of second detectors 1626B) may be configured to detect a presence of trapped second alkali atom 1614A, 1614B using detection or sensing of at least one of: a laser beam for trapping second alkali atom 1614A, 1614B carried in waveguide 1638A, 1638B nearby second alkali atom 1614A, 1614B or a state of laser beam 1628B; input photons provided toward trapped second alkali atom 1614A, 1614B or a state of input photons; and/or entangled photonic qubits 1610A, 1610B output from waveguide 1618A, 1618B or a state of entangled photonic qubits 1610A, 1610B. At least one of the plurality of detectors (e.g., at least one of first detectors 1626A and second detectors 1626B) may output at least one signal indicating a presence of trapped first alkali atoms 1604A, 1604B and trapped second alkali atoms 1614A, 1614B after detecting or sensing the presence, and the at least one processor 1629 may then receive at least one input signal indicating a presence of trapped first alkali atoms 1604A, 1604B and trapped second alkali atoms 1614A, 1614B, which are either the output at least one signal from the plurality of detectors (e.g., first detectors 1626A and/or second detectors 1626B) or separate at least one input signal generated based on the output at least one signal from the plurality of detectors (e.g., first detectors 1626A and/or second detectors 1626B).

Processor(s) 1629 may be configured to, based on received at least one input or at least one input signal indicating a presence of trapped first alkali atom 1604A. 1604B (and optionally a presence of trapped second alkali atom 1614A, 1614B) from first detectors 1626A (and optionally from second detectors, 1626B), control at least some of the plurality of lasers (e.g., laser beams or laser pulses including laser beam 1628A) to manipulate trapped first alkali atom 1604A, 1604B to thereby generate photonic qubits 1606A, 1606B using trapped first alkali atom 1604A, 1604B. In some examples, the processor(s) 1629 may be configured to control the at least some of the plurality of lasers in a similar manner to processor(s) 1629 of FIG. 16A or FIG. 16B described herein. In some examples, quantum computing system 1625 may also include optical elements similar to optical elements 1635, 1635D of FIG. 16B, and processor(s) 1629 of quantum computing system 1625 may be configured to control the optical elements as well, e.g., in a similar manner to processor(s) 1629 of FIG. 16B described herein.

The plurality of detectors may also include at least one detector (e.g., at least one of first detectors 1626A and/or second detectors 1626B) configured to measure photonic qubits such as generated photonic qubits 1606A, 1606B and/or output entangled photonic qubits 1610A, 1610B. In some examples, a presence of trapped first alkali atoms 1604A, 1604B or/and trapped second alkali atoms 1614A, 1614B is detected by this measuring of photonic qubits such as generated photonic qubits 1606A, 1606B and/or output entangled photonic qubits 1610A, 1610B. At least one detector may also be configured to generate a signal based on the measurement(s) so that the signal includes information relating to the measurement(s). The generated signal from the detectors can then be communicated to processor(s) 1629 so that the generated signal may serve as an input signal for processor(s) 1629 and/or the information relating to the measurement(s) may serve as an input for processor(s) 1629 as described herein. For example, some of detectors (e.g., some of first detectors 1626A and/or second detectors 1626B) are positioned downstream of waveguide 1608A, 1608B carrying generated photonic qubits 1606A, 1606B and downstream of waveguide 1618A, 1618B outputting entangled photonic qubits 1610A, 1610B. Those detectors may measure one or more of generated photonic qubits 1606A, 1606B and/or one or more of entangled photonic qubits 1610A, 1610B, and provide an indication of the measurement(s) to processors 1629. Those detectors may measure one or more of generated photonic qubits 1606A, 1606B and/or one or more of entangled photonic qubits 1610A, 1610B by inferring/determining state(s) and/or propert(ies) of those photonic qubits 1606A, 1606B, 1606B from measuring other associated photonic qubits (e.g., using a switch and a waveguide branch-off arrangement as described with reference to FIG. 9A, and/or by positioning at least one of those detectors at an end of a waveguide carrying the photonic qubits to be measured) or from measuring trapped alkali atom entangled with entangled photonic qubits 1610A, 1610B (e.g., by mapping a state of the trapped alkali atom to a photon and using detectors 1626 to detect that photon as described herein with reference to mapping a quantum emitter qubit to a photonic qubit).

Processor(s) 1629 may be configured to, based on received at least one input or at least one input signal indicating a presence of trapped second alkali atom 1614A, 1614B from second detectors 1626B, control at least some of the plurality of lasers (e.g., laser beams or laser pulses including laser beam 1628B from laser 1622C, 1622D) to manipulate trapped second alkali atom 1614A, 1614B to thereby generate entanglement between photonic qubits 1606A, 1606B transmitted to trapped second alkali atom 1614A, 1614B and output entangled photonic qubits 1610A, 1610B. In some examples, processor(s) 1629 may be also configured to, based on received at least one input or at least one input signal indicating a presence of trapped first alkali atom 1604A, 1604B from first detectors 1626A, control at least some of a plurality of lasers (e.g., laser beams or laser pulses including laser beam 1628A from laser 1622C, 1622D) to manipulate trapped first alkali atom 1604A, 1604B so that photonic qubits 1606A, 1606B generated using trapped first alkali atom 1604A, 1604B may be used as input photonic qubits 1606A, 1606B for trapped second alkali atom 1614A, 1614B. In some examples, the processor(s) 1629 may be configured to control the at least some of the plurality of lasers in a similar manner to processor(s) 1629 of FIG. 16A or FIG. 16B described herein.

Processor(s) 1629 may manipulate measurement bases of subsequent photonic qubits using results of measurements of prior photonic qubits. For example, manipulating the measurement bases may include changing states of at least one of: optical elements; a plurality of switches; a plurality of phase shifters; and/or a plurality of birefringent elements. Processor(s) 1629 may also select measurement bases (e.g., bases of possible directions of travel, and/or possible polarization) of a photonic qubit involved in detectors measuring photonic qubits, thereby enabling quantum computing system 1625 to perform a logic operation with the measurements.

For example, quantum computing system 1625 includes optical elements similar to optical elements 1635D and the plurality of detectors includes at least one detector (e.g., at least one of second detectors 1626B) associated with the optical elements (e.g., optical elements 1635D) so that measurement bases for a subsequent measurement by the at least one detector (e.g., at least one of second detectors 16263) may be set, adjusted, changed, and/or manipulated as described herein. Such optical elements 1635D may be positioned between a waveguide carrying or outputting a laser beam or a pulse of photons (or a pulse of photonic qubits such as entangled photonic qubits 1610A, 1610B) and its associated detector (e.g., second detectors 1626B) as shown in FIG. 16B.

In FIG. 16C, quantum computing system 1625 includes a plurality of lasers, each laser 1622C, 1622D being configured to provide laser beam(s) or laser pulse(s) (e.g., including laser beams 1628A, 1628B) to one qubit generator (each qubit generator 1632A, 1632B including silicon nitride resonator 1602A, 1602B couplable to alkali atom 1604A, 1604B) and one entangling gate (each entangling gate 1634A, 1634B including silicon nitride resonator 1612A, 1612B couplable to alkali atom 1614A, 1614B). This arrangement of lasers is similar to those described with reference to FIG. 16A and FIG. 16B. For example, quantum computing system 1625 includes one or more laser units configured to provide at least two lasers 1622C, 1622D. A first set of laser units of quantum computing system 1625 may be configured to provide laser 1622C, and a second set of laser units of quantum computing system 1625 may be configured to provide laser 1622D, in a similar manner to laser unit 1622 of FIG. 16A or laser unit 1622 of FIG. 16B. This particular arrangement of lasers shown in FIG. 16C can enable a more efficient controlling of lasers when the lasers need to be controlled in a synchronized manner so that operations of at least one qubit generator and at least one entangling gate associated with a particular laser unit can be synchronized.

Figure 16D:
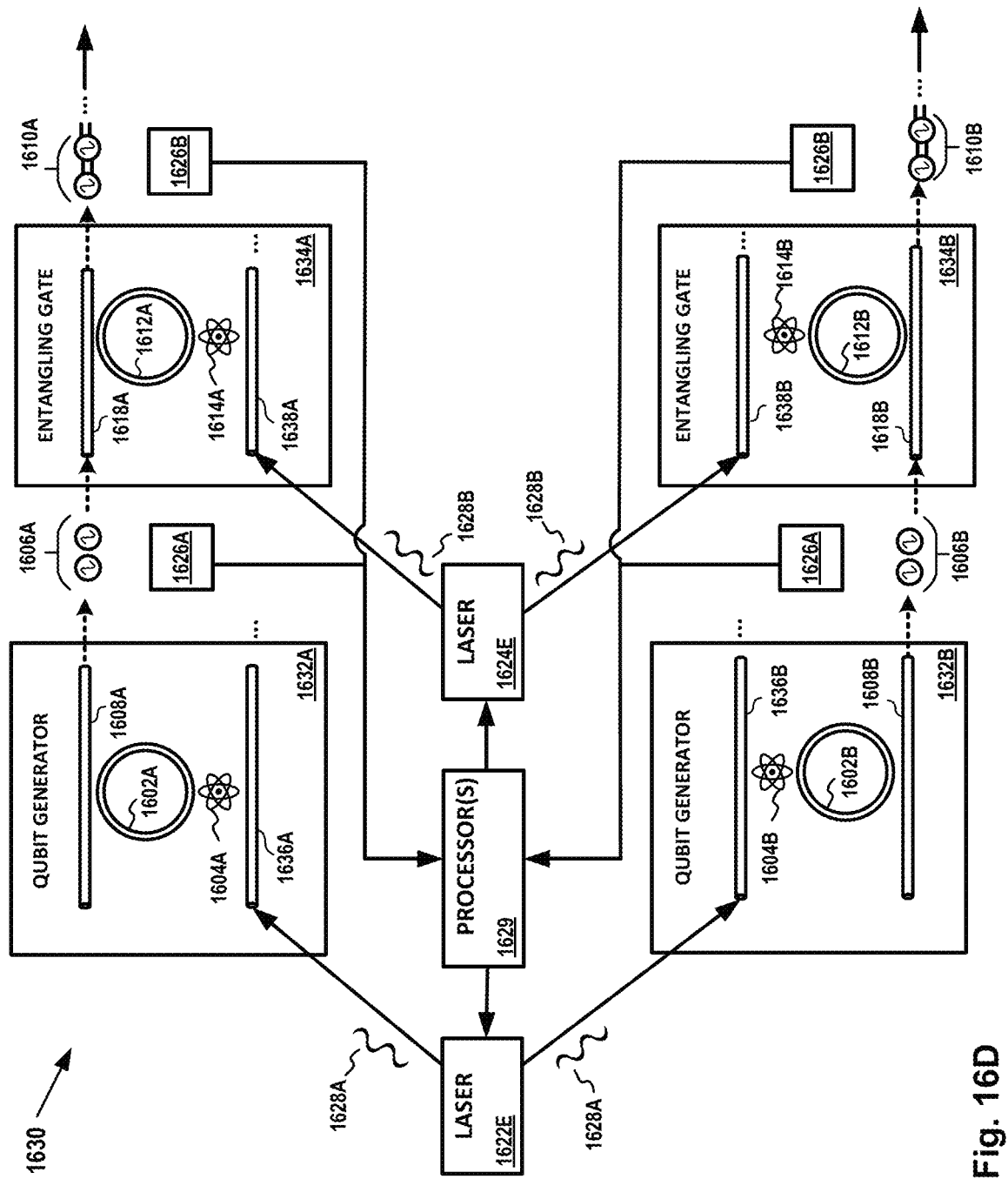

FIG. 16D illustrates an exemplary implementation of quantum computing system 1630 which shares many components with quantum computing system 1625 of FIG. 16C described above. Differences between quantum computing system 1630 and quantum computing system 1625 lie in the arrangement of the plurality of lasers. Quantum computing system 1630 includes one or more laser units configured to provide first laser 1622E and second laser 1624E, wherein first laser 1622E is configured to provide laser beams or laser pulses (e.g., including laser beam 1628A) to two or more qubit generators 1632A, 1632B (each qubit generator 1632A, 1632B including silicon nitride resonator 1602A, 1602B couplable to alkali atom 1604A, 1604B), and second laser 1624E is configured to provide laser beams or laser pulses (e.g., including laser beam 1628B) to two or more entangling gates 1634A. 1634B (each entangling gate 1634A, 1634B including silicon nitride resonator 1612A, 1612B couplable to alkali atom 1614A, 1614B). For example, a first set of laser units of quantum computing system 1630 may be configured to provide first laser 1622E, and a second set of laser units of quantum computing system 1630 may be configured to provide second laser 1624E. In quantum computing system 1630 shown in FIG. 16D, first laser 1622E provides laser light via waveguide 1636A, 1636B to qubit generator 1632A, 1632B, and second laser 1624E provides laser light via waveguide 1638A, 1638B to entangling gate 1634A, 1634B. This particular arrangement of lasers shown in FIG. 16D can enable a more efficient controlling of lasers when the lasers need to be controlled in a synchronized manner so that operations of the two or more qubit generators associated with a particular laser unit can be synchronized and operations of the two or more entangling gates associated with a particular laser unit can be synchronized.

Figure 16E:
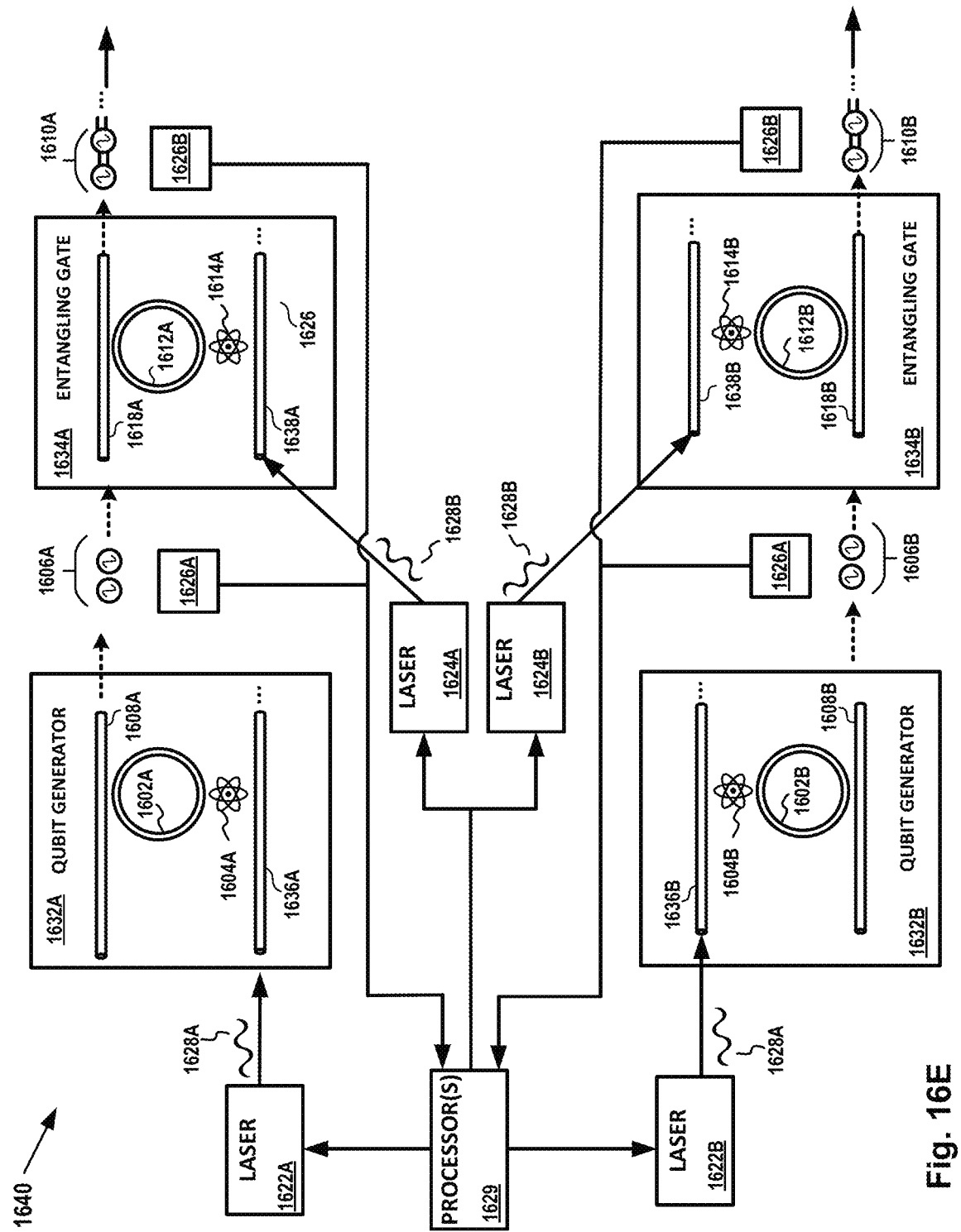
FIG. 16E and FIG. 16F schematically illustrate examples of quantum computing system according to some embodiments of the present disclosure, which includes components of the quantum computing system for use in qubit generation and/or entanglement shown in FIG. 16A or FIG. 16B.

FIG. 16E illustrates an exemplary implementation of quantum computing system 1640 which shares many components with quantum computing system 1625 of FIG. 16C and quantum computing system 1630 of FIG. 16D described herein. Differences lie in the arrangement of the plurality of lasers. Quantum computing system 1640 includes a plurality of lasers, each laser 1622A, 1622B, 1624A, 1624B being configured to provide a laser beam or a laser pulse (e.g., including laser beams 1628A, 1628B) to one qubit generator (each qubit generator 1632A, 1632B including silicon nitride resonator 1602A, 1602B couplable to alkali atom 1604A, 1604B) or one entangling gate (each entangling gate 1634A, 1634B including silicon nitride resonator 1612A, 1612B couplable to alkali atom 1614A, 1614B). For example, quantum computing system 1640 includes one or more laser units configured to provide at least four lasers 1622A, 1622B, 1624A, 1624B. In some examples, a first set of laser units of quantum computing system 1640 may be configured to provide laser 1622A and laser 1624A, and a second set of laser units of quantum computing system 1640 may be configured to provide laser 1622B and laser 1624B, in a similar manner to laser unit 1622 of FIG. 16A, laser unit 1622 of FIG. 16B, or a set of laser units (for providing laser 1622C or laser 1622D) of FIG. 16C. In some examples, a first set of laser units of quantum computing system 1640 may be configured to provide laser 1622A and laser 1622B, and a second set of laser units of quantum computing system 1640 may be configured to provide laser 1624A and laser 1624B, in a similar manner to a set of laser units (for providing laser 1622E or laser 1624E) of FIG. 16D. This particular arrangement of lasers shown in FIG. 16E can enable a more flexible controlling of lasers so that operations of qubit generators and entangling gates associated with the laser units can be controlled in an easily configurable manner.

Figure 16F:
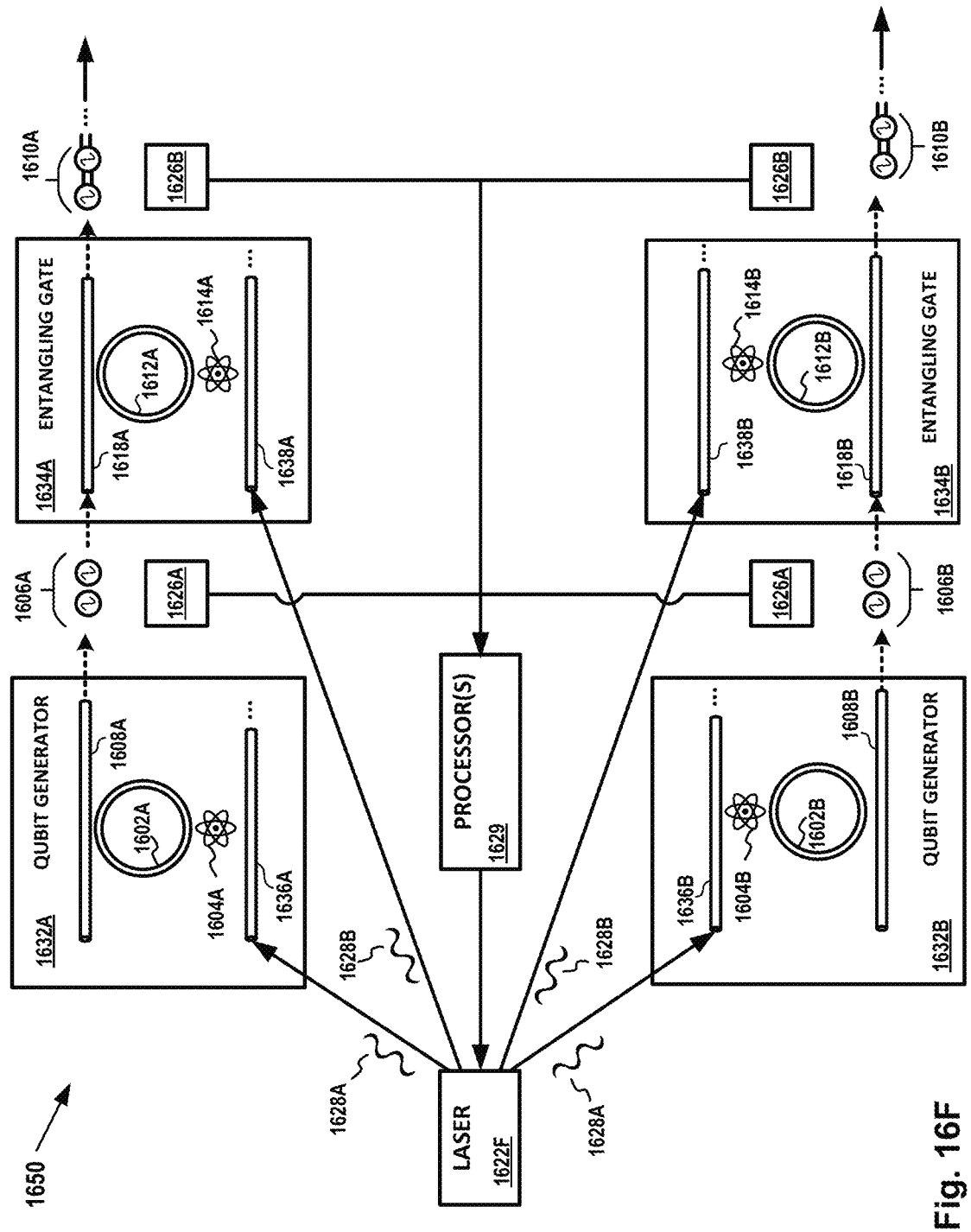

FIG. 16F illustrates an exemplary implementation of quantum computing system 1650 which shares many components with quantum computing system 1625 of FIG. 16C, quantum computing system 1630 of FIG. 16D, and quantum computing system 1640 of FIG. 16E described herein. Differences lie in the arrangement of the lasers. Quantum computing system 1650 includes a single laser, laser 1622F configured to provide laser beams or laser pulses (e.g., including laser beams 1628A, 1628B) to a plurality of qubit generators (each qubit generator 1632A, 1632B including silicon nitride resonator 1602A, 1602B couplable to alkali atom 1604A, 1604B) and a plurality of entangling gates (each entangling gate 1634A, 1634B including silicon nitride resonator 1612A, 1612B couplable to alkali atom 1614A, 1614B). For example, quantum computing system 1650 includes a laser unit configured to provide laser 1622F. Processor(s) 1629 may be configured to, based on received at least one input or at least one input signal indicating a presence of trapped second alkali atom 1614A, 1614B from second detectors 1626B, control at least some portions of laser 1622F (e.g., laser beams or laser pulses including laser beam 1628B) to manipulate trapped second alkali atom 1614A, 1614B to thereby generate entanglement between photonic qubits 1606A, 1606B transmitted to trapped second alkali atom 1614A, 1614B and output entangled photonic qubits 1610A, 1610B. In some examples, processor(s) 1629 may be also configured to, based on received at least one input or at least one input signal indicating a presence of trapped first alkali atom 1604A, 1604B from detectors 1626A, control at least some portions of laser 1622F (e.g., laser beams or laser pulses including laser beam 1628A) to manipulate trapped first alkali atom 1604A, 1604B so that photonic qubits 1606A, 1606B generated using trapped first alkali atom 1604A, 1604B may be used as input photonic qubits 1606A, 1606B for trapped second alkali atom 1614A, 1614B.

Similar optical elements to optical elements 1635, 1635D described with reference to FIG. 16B may also be included in quantum computing system 1625, 1630, 1640, 1650 shown in FIG. 16C or FIG. 16D or FIG. 16E or FIG. 16F described herein, with the rest of the quantum computing system modified accordingly to work with those optical elements in a similar manner to those described with reference to FIG. 16B.

Figure 10:
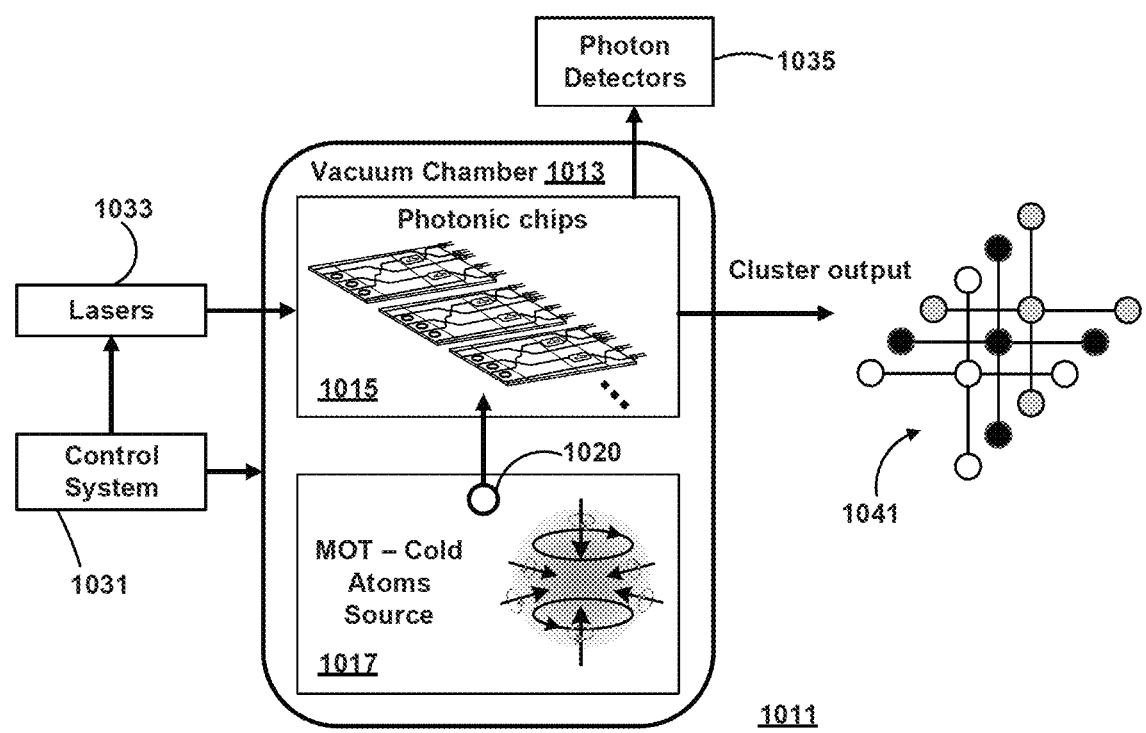
FIG. 10 schematically illustrates a system including a vacuum chamber usable with atoms and photonic chips according to some embodiments of the present disclosure.

Differing combinations of the one or more laser units described herein with reference to exemplary implementations of quantum computing system. e.g. the one or more laser units of quantum computing systems 1600, 1620, 1625, 1630, 1640, 1650, may be used in an example quantum computing system, depending on operational requirements of silicon nitride resonators 1602A, 1602B, 1612A, 1612B couplable to alkali atoms 1604A, 1604B, 1614A, 1614B employed. For example, the one or more laser units of quantum computing system 1625 shown in FIG. 16C may include any of laser unit 1622 of FIG. 16A or FIG. 16B, the one or more laser units of quantum computing system 1630 shown in FIG. 16D or of quantum computing system 1640 shown in FIG. 16E, or the laser unit of quantum computing system 1650 shown in FIG. 16F. In another example, the one or more laser units of quantum computing system 1630 shown in FIG. 16D may include any of laser unit 1622 of FIG. 16A or FIG. 16B, the one or more laser units of quantum computing system 1625 shown in FIG. 16C or of quantum computing system 1640 shown in FIG. 16E, or the laser unit of quantum computing system 1650 shown in FIG. 16F. Lasers provided by the one or more laser units of these quantum computing systems 1600, 1620, 1625, 1630, 1640, 1650 may be provided via a waveguide, aimed at a coupling site through free space, or provided via another medium capable of carrying a laser. For example, one or more lasers for trapping an alkali atom may be carried in waveguide 1636A, 1636B, 1638A, 1638B, and one or more lasers for cooling or manipulating may be carried in free space or in a vacuum, aimed at a trapped alkali atom (e.g, as shown in FIG. 10). Alternatively, the one or more lasers for cooling or/and manipulating may also be carried in a waveguide nearby the trapped alkali atom.

The term "free space" as used herein refers to the space between objects or particles that is significantly devoid of matter and radiation. For example, a free space may be synonymous with a vacuum or a partial vacuum (as a complete vacuum is practically difficult to achieve and is unnecessary in the context of this disclosure). A free space, as used herein, need not be completely devoid of all matter or radiation. For example, a free space may be a medium (or a channel) for electromagnetic wave propagation that is not spatially confined by a material, e.g., a fiber or a waveguide, and an electromagnetic wave propagating in a vacuum or in a partial vacuum or in air may be said to be propagating in free space. In another example, a free space may be a medium (or a channel) for electromagnetic wave propagation that does not significantly impede the propagation in at least one direction, e.g., a space provided in a waveguide or a fiber for carrying electromagnetic waves.

It is also to be understood that quantum computing system 1625, 1630, 1640, 1650 shown in FIG. 16C, FIG. 16D, FIG. 16E, and FIG. 16F may also include additional qubit generator(s) and/or entangling gate(s). For example, quantum computing system 1625, 1630, 1640, 1650 may include additional first alkali atom(s) (which are trappable and then useable in a qubit generator) and/or second alkali atom(s) (which are trappable and then useable in an entangling gate), with the plurality of detectors (e.g., first detectors 1626A and/or second detectors 1626B) configured to detect a presence of trapped additional first alkali atom(s) and/or additional second alkali atom(s), at least one of the detectors (e.g., at least one of second detector 1626B) associated with optical elements (e.g., optical elements 1635D) configured to manipulate measurement bases, and the at least one processor 1629 configured to receive at least one input signal from at least one of the plurality of detectors (e.g., first detectors 1626A and/or second detectors 1626B) in a similar manner described herein.

Figure 17A:
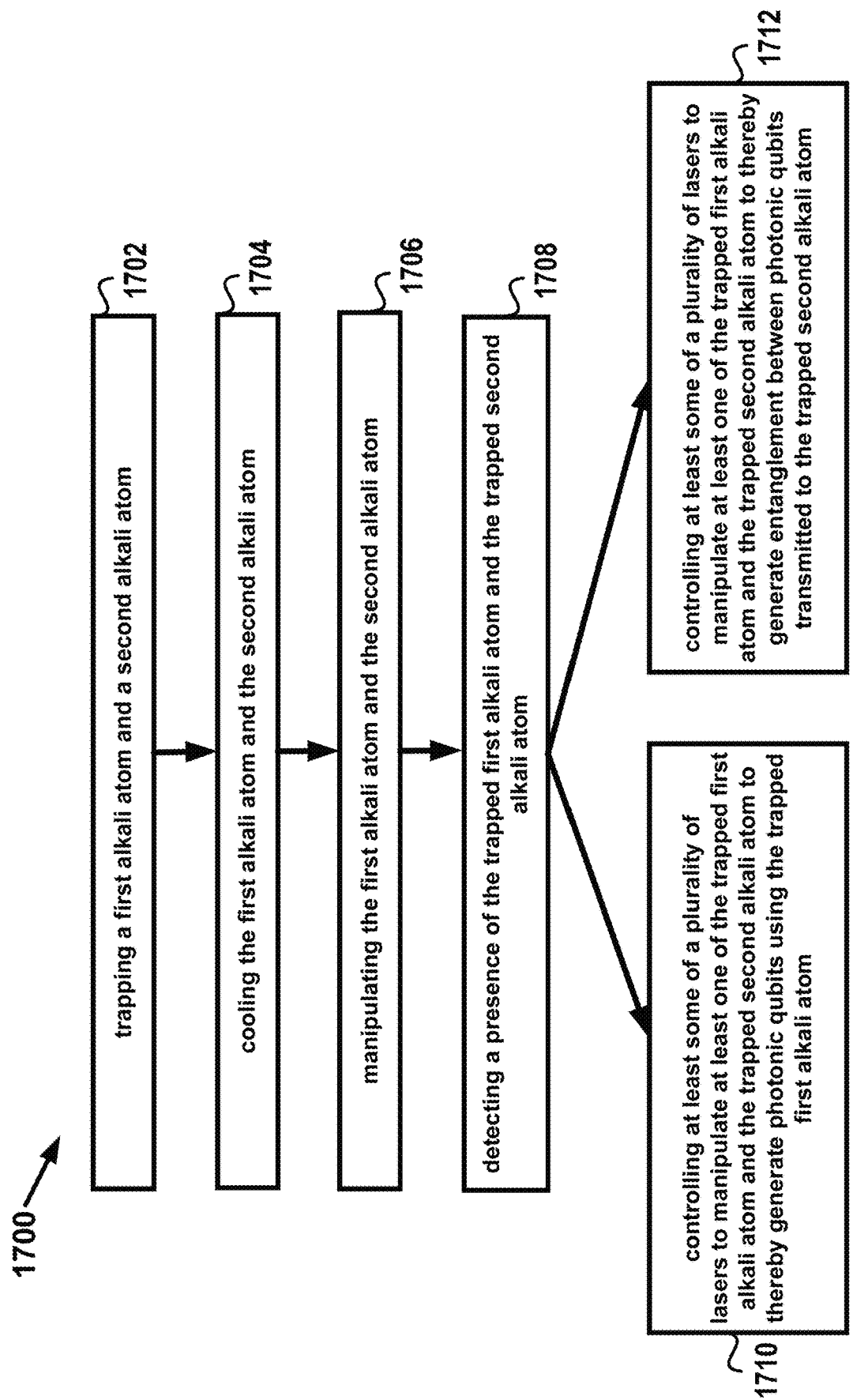
FIG. 17A is a flowchart of a quantum computing method according to some embodiments of the present disclosure for use in qubit generation and/or entanglement.

FIG. 17A illustrates an example process of a quantum computing method, quantum computing method 1700. Quantum computing method 1700 shown in FIG. 17A includes: step 1702 of trapping a first alkali atom and a second alkali atom; step 1704 of cooling the first alkali atom and the second alkali atom; step 1706 of manipulating the first alkali atom and the second alkali atom; step 1708 of detecting a presence of the trapped first alkali atom and the trapped second alkali atom; and either or both of step 1710 of controlling at least some of a plurality of lasers to manipulate at least one of the trapped first alkali atom and the trapped second alkali atom to thereby generate photonic qubits using the trapped first alkali atom, or/and step 1712 of controlling at least some of a plurality of lasers to manipulate at least one of the trapped first alkali atom and the trapped second alkali atom to thereby generate entanglement between photonic qubits transmitted to the trapped second alkali atom. These steps may occur using the structures and operations described earlier. For example, as described herein, one or more laser unit may be controlled to provide a plurality of lasers for performing step 1702, step 1704, and/or step 1706. As described herein, one or more detectors may be controlled to perform step 1708, and controlling at least some of the plurality of lasers in step 1710 and/or step 1712 may be performed based on at least one input or at least one input signal indicating a presence of the trapped first alkali atom and/or the trapped second alkali atom. The at least one input or at least one input signal may be generated by the one or more detectors that performed the detecting step 1708. As described herein, in some examples, at least one processor may receive and process the at least one input or the at least one input signal and transmit instructions or at least one control signal for controlling the one or more lasers (or the plurality of lasers) and/or the one or more detectors. As described herein, optical elements may also be used, with the at least one processor configured to control the optical elements.

FIG. 17B illustrates a further step that may also be included in quantum computing method 1700 of FIG. 17A. After either or both of step 1710 or/and step 1712, step 1721 of measuring photonic qubits using a plurality of detectors may also be performed. For example, the photonic qubits generated using trapped first alkali atom in step 1710 may be measured using at least some of the plurality of detectors. Alternatively or additionally, the entangled photonic qubits after generating entanglement therebetween in step 1712 may be measured using at least some of the plurality of detectors.

FIG. 17C illustrates yet another further step that may also be included in quantum computing method 1700 of FIG. 17A and further step of FIG. 17B. After step 1721, step 1723 of manipulating measurement bases of subsequent photonic qubits using results of measurements of prior photonic qubits may be performed. As described herein, manipulating measurement bases in step 1723 may involve setting and/or adjusting parameters associated with one or more optical elements such as switches, phase shifters and/or birefringent elements which are associated with one or more detectors.

Quantum computing system 1600, 1620 shown in FIG. 16A or FIG. 16B, or quantum computing system 1625, 1630, 1640, 1650 shown in FIG. 16C, FIG. 16D, FIG. 16E, or FIG. 16F may be related to quantum computing method 1700 shown in FIG. 17A, FIG. 17B, or FIG. 17C. For example, any of quantum computing system 1600, 1620 shown in FIG. 16A or FIG. 16B, or quantum computing system 1625, 1630, 1640, 1650 shown in FIG. 16C, FIG. 16D, FIG. 16E, or FIG. 16F may be configured to perform quantum computing method 1700 shown in FIG. 17A, FIG. 17B, or FIG. 17C. With any of the quantum computing systems mentioned, at least one alkali atom (e.g., first alkali atom and/or second alkali atom) may be an ion, a neutral atom, a rubidium atom, a cesium atom, or a francium atom.

It is to be understood that at least one alkali atom (e.g., first alkali atom and/or second alkali atom) in quantum computing system 1600, 1620, 1625, 1630, 1640, 1650 shown in FIG. 16A or FIG. 16B or FIG. 16C, FIG. 16D, FIG. 16E, or FIG. 16F, or quantum computing method 1700 shown in FIG. 17A, FIG. 17B, or FIG. 17C, may be replaced with any other type of quantum emitter described herein, and at least one silicon nitride resonator (e.g., first silicon nitride resonator and/or second silicon nitride resonator) in any of the foregoing may be replaced with any other type of resonator or cavity, as long as this replacement pairing of the other type of quantum emitter and resonator/cavity is able to generate photonic qubits using trapped quantum emitter and/or generate entanglement between photonic qubits transmitted to trapped quantum emitter.

Some embodiments involve anon-transitory computer-readable medium (or a computer-readable medium or a computer program) including instructions that, when executed by at least one processor (or an apparatus), cause the at least one processor (or the apparatus) to carry out a quantum computing method described herein. For example, in some embodiments, the instructions may cause the at least one processor (or the apparatus) to carry out quantum computing method 1700 shown in FIG. 17A, FIG. 17B, or FIG. 17C.

Figure 18A:
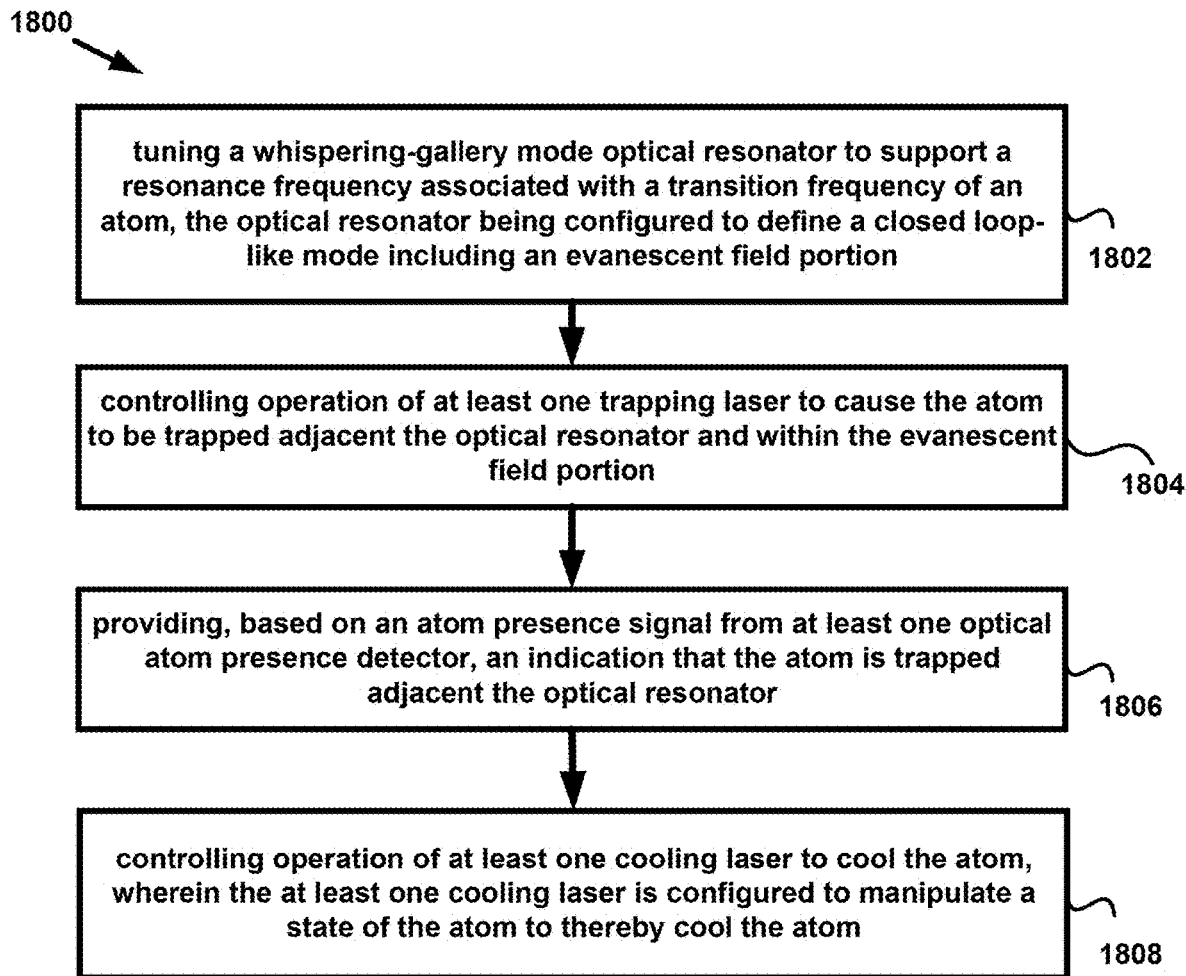
FIG. 18A is a flowchart of a quantum computing method according to some embodiments of the present disclosure, employing a whispering-gallery mode optical resonator.

FIG. 18A illustrates an example process of a quantum computing method 1800. Quantum computing method 1800 includes step 1802 of tuning a whispering-gallery mode optical resonator to support a resonance frequency associated with a transition frequency of an atom. At step 1804 operation of at least one trapping laser is controlled to cause the atom to be trapped adjacent the optical resonator and within the evanescent field portion. Based on an atom presence signal from at least one optical atom presence detector, an indication that the atom is trapped adjacent the optical resonator is provided at step 1806. In step 1808, operation of at least one cooling laser is controlled to cool the atom. The optical resonator in step 1802 may be configured to define a closed loop-like mode including an evanescent field portion. The at least one trapping laser in step 1804 may be configured to couple light into the whispering gallery mode resonator. Additionally or alternatively, the at least one cooling laser in step 1808 may be configured to manipulate a state of the atom to thereby cool the atom.

These steps may occur using the structures and operations described herein. For example, a cavity or a resonator (e.g., silicon nitride resonator) described herein may be configured to define a closed loop-like mode including an evanescent field portion so that it may function as the whispering-gallery mode optical resonator used in step 1802. One or more laser source or one or more laser units described herein may be controlled to provide a plurality of lasers including the at least one trapping laser for performing step 1804 and the at least one cooling laser for performing step 1808. One or more detectors described herein may include the at least one optical atom presence detector for providing the atom presence signal atom presence signal used in step 1806. In some examples, the atom may be an alkali atom described herein. Alternatively, the atom may be replaced with a quantum emitter described herein, provided the quantum emitter is capable of being trapped and cooled in a similar manner, and is capable of interacting with a whispering-gallery mode optical resonator in a similar manner.

Figure 18B:
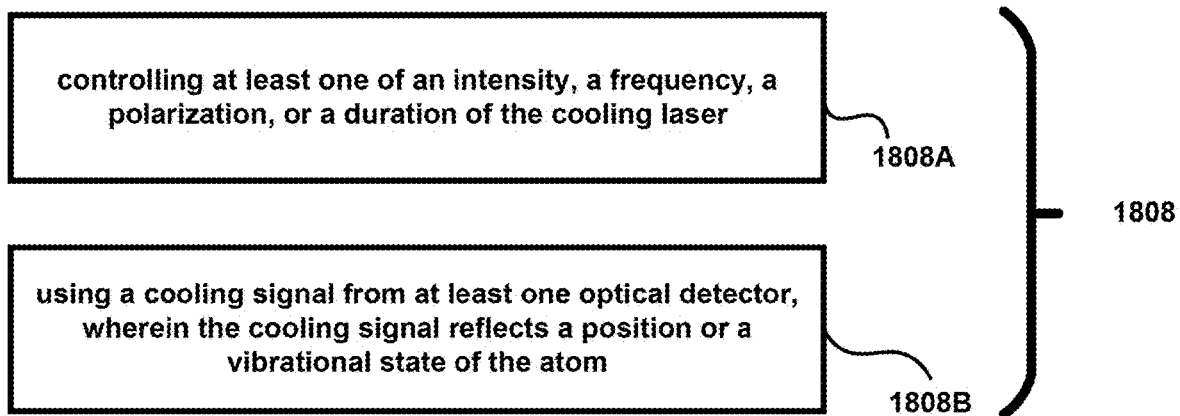
FIG. 18B illustrates examples of step 1808 of the quantum computing method shown in FIG. 18A.

FIG. 18B illustrates examples of step 1808 that may also be included in quantum computing method 1800 of FIG. 18A. Step 1808 of controlling operation of the at least one cooling laser may include at least one of: controlling (e.g., setting and/or adjusting) at least one of an intensity, a frequency, a polarization, or a duration of the at least one cooling laser in step 1808A, and/or using a cooling signal from at least one optical detector in step 1808B, wherein the cooling signal reflects a position or a vibrational state of the atom.

Figure 18C:
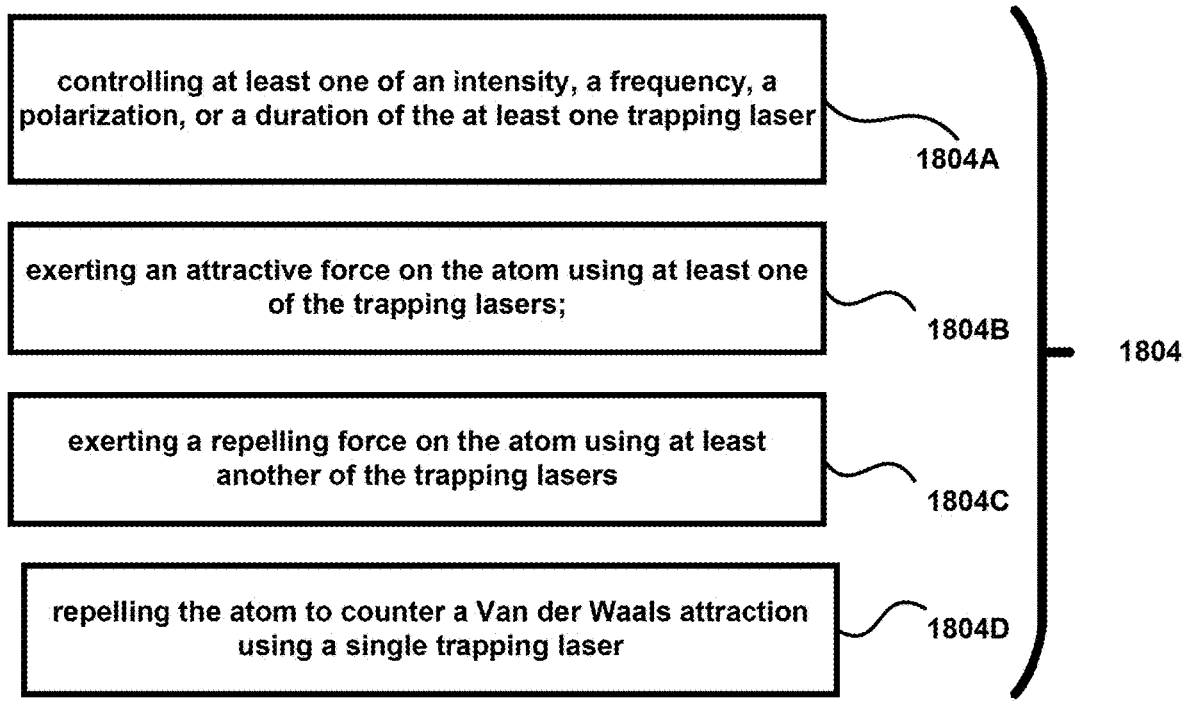
FIG. 18C illustrates examples of step 1804 of the quantum computing method shown in FIG. 18A.

FIG. 18C illustrates examples of step 1804 that may also be included in quantum computing method 1800 of FIG. 18A. Step 1804 of controlling operation of at least one trapping laser may include at least one of: controlling (e.g., setting and/or adjusting) at least one of an intensity, a frequency, a polarization, or a duration of the at least one trapping laser in step 1804A; exerting an attractive force on the atom using at least one of the trapping lasers in step 1804B; exerting a repelling force on the atom using at least another of the trapping lasers in step 1804C; and/or repelling the atom to counter a Van der Waals attraction using a single trapping laser in step 1804D. For example, the at least one trapping laser may include at least two trapping lasers, at least one of which has a lower frequency than another of the trapping lasers so that one may be used to exert an attractive force and the other may be used to exert a repelling force on the atom.

Figure 19:
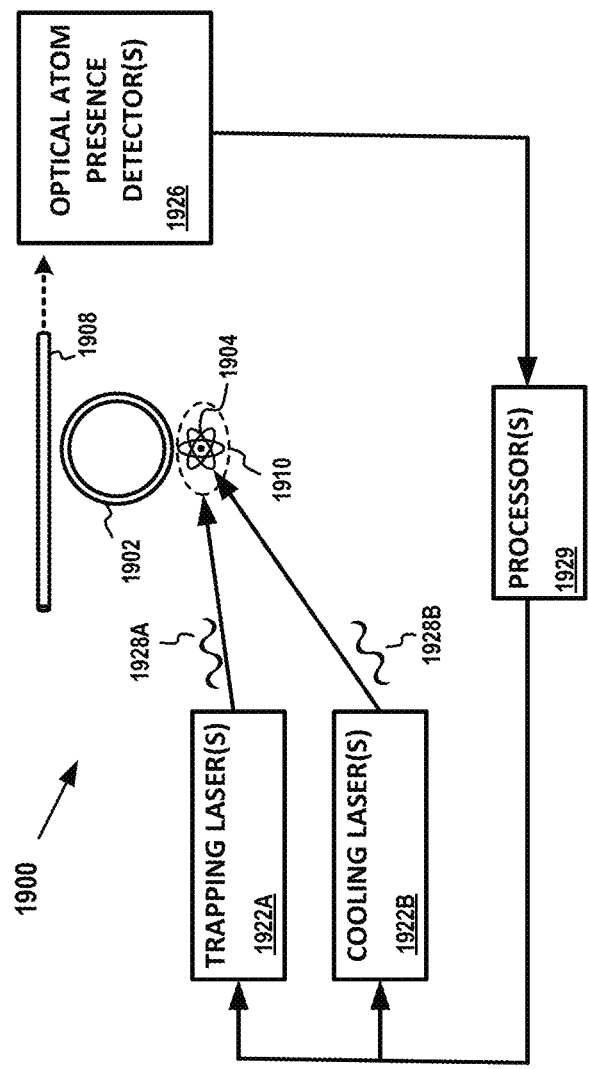
FIG. 19 schematically illustrates a quantum computing system according to some embodiments of the present disclosure relating to a whispering-gallery mode optical resonator.

FIG. 19 illustrates an exemplary implementation of quantum computing system 1900 including: a whispering-gallery mode optical resonator 1902 configured to define a closed loop-like mode including an evanescent field portion 1910: at least one trapping laser 1922A configured to cause an atom 1904 to be trapped adjacent the whispering-gallery mode optical resonator 1902; at least one cooling laser 1922B configured to manipulate a state of the atom 1904 to thereby cool the atom 1904: at least one optical atom presence detector 1926 for outputting an atom presence signal; and at least one processor 1929 configured to control operation of the at least one trapping laser 1922A and control operation of the at least one cooling laser 1922B. The at least one processor 1929 may be configured to: control operation of the at least one trapping laser 1922A to cause the atom 1904 to be trapped adjacent the optical resonator 1902 and within the evanescent field portion 1910: provide, based on the atom presence signal, an indication that the atom 1904 is trapped adjacent the optical resonator 1902; or/and control operation of the at least one cooling laser 1922B and thereby cool the atom 1904. The optical resonator 1902 may be configured to be tuned to support a resonance frequency associated with a transition frequency of the atom 1904.

Quantum computing system 1900 may further include at least one optical detector for outputting a cooling signal reflecting a position or a vibrational state of the atom 1904, and the at least one processor 1929 may be configured to use the cooling signal to control operation of the at least one cooling laser. For example, at least one of the optical atom presence detector(s) 1926 may be controlled to also function as at least one optical detector. Alternatively, separate optical detector(s) may be included in addition to the at least one of the optical atom presence detector(s) 1926.

Controlling operation of the at least one cooling laser 1922B may include controlling (e.g., setting and/or adjusting) at least one of an intensity, a frequency, a polarization, or a duration of the at least one cooling laser 1922B. Controlling operation of the at least one trapping laser 1922A may include controlling (e.g., setting and/or adjusting) at least one of an intensity, a frequency, a polarization, or a duration of the at least one trapping laser 1922A. The at least one trapping laser 1922A may include at least two trapping lasers, and at least one of the trapping lasers may have a lower frequency than another trapping laser. For example, as described herein, at least one trapping laser may be red detuned (to a wavelength of around 850 nm or 980 nm—a relatively lower frequency range) and another trapping laser may be blue detuned (to a wavelength of around 690 nm or 720 nm—a relatively higher frequency range). The at least one trapping laser 1922A may include a plurality of trapping lasers, and at least one of the plurality of trapping lasers may be configured to exert an attractive force on the atom 1904 and at least another of the plurality of trapping lasers may be configured to exert a repelling force on the atom 1904. For example, the at least one trapping laser 1922A may include a single trapping laser configured to repel the atom 1904 to counter a Van der Waals attraction.

The atom 1904 may be a neutral atom. Alternatively, the atom 1904 may be an ion. The atom 1904 may be one of a rubidium atom, a cesium atom, or a francium atom. Alternatively, the atom 1904 may be one of a Strontium. Erbium, Ytterbium, Calcium, Barium, Beryllium, or Magnesium atom.

Any part of quantum computing system 1900 may be replaced or modified with functionally equivalent structures and arrangements, as, for example, described herein. For example, a cavity or a resonator described herein (e.g., silicon nitride resonator shown in FIG. 16A to FIG. 16F) may be configured to define a closed loop-like mode including an evanescent field portion 1910 so that it may function as the whispering-gallery mode optical resonator 1902. One or more laser sources or one or more laser units described herein (e.g., laser unit shown in FIG. 16A or FIG. 16B, or laser(s) shown in FIG. 16C to FIG. 16F) may be controlled to provide a plurality of lasers including the at least one trapping laser 1922A and the at least one cooling laser 1922B. One or more detectors described herein (e.g., detectors shown in FIG. 16A to FIG. 16F) may include the at least one optical atom presence detector 1926 for providing the atom presence signal atom presence signal and/or optical detector for outputting a cooling signal. In some examples, the atom 1904 may be an alkali atom described herein (e.g., alkali atom shown in FIG. 16A to FIG. 16F). Alternatively, the atom 1904 may be replaced with a quantum emitter described herein, provided the quantum emitter is capable of being trapped and cooled in the same manner, and is capable of interacting with a whispering-gallery mode optical resonator 1926 in the same manner. Quantum computing system 1900 may form a part of quantum computing system 1600, 1620 in FIG. 16A or FIG. 16B, or any of qubit generator(s) 1632A, 1632B or entangling gate(s) 1634A, 1634B in FIG. 16C to FIG. 16F.

Quantum computing system 1900 may be configured to perform the quantum computing method 1800 of FIG. 18A to FIG. 18C.

Some embodiments involve anon-transitory computer-readable medium (or a computer-readable medium or a computer program) including instructions that, when executed by at least one processor (or an apparatus), cause the at least one processor (or the apparatus) to carry out a quantum computing method described herein. For example, in some embodiments, the instructions may cause the at least one processor (or the apparatus) to carry out quantum computing method 1800 shown in FIG. 18A, FIG. 18B, or FIG. 18C.

Figure 20A:
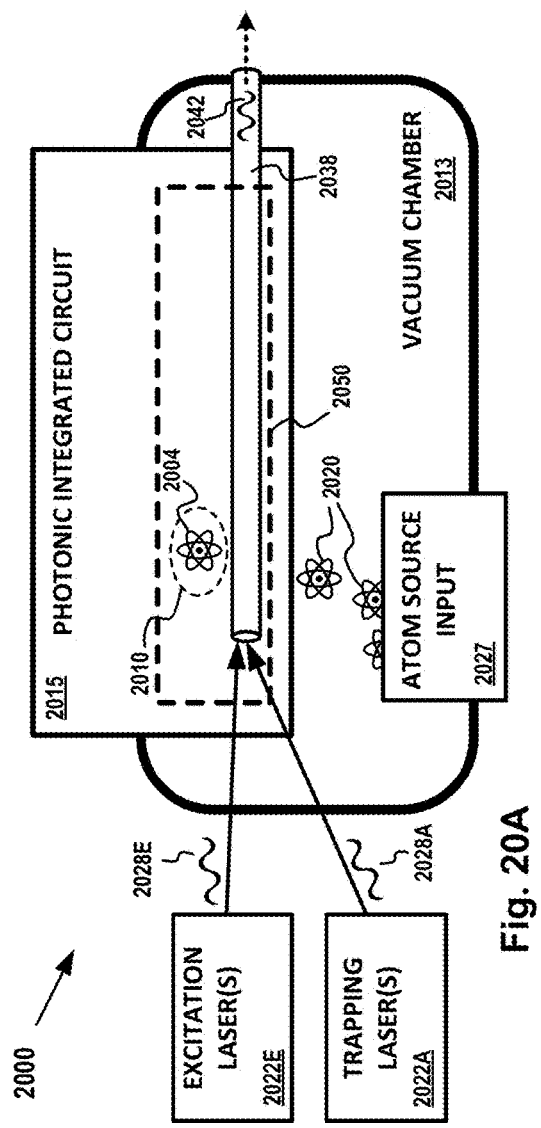
FIG. 20A and FIG. 20B schematically illustrate quantum computing systems for generating quantum light as a resource for quantum computing according to some embodiments of the present disclosure.

FIG. 20A illustrates an exemplary implementation of quantum computing system 2000 including: vacuum chamber 2013: atom source input 2027 associated with vacuum chamber 2013: Photonic Integrated Circuit (PIC) 2015 having interaction region 2050 configured to interact with atom 2004 from atom source input 2027; coupling location 2010, associated with PIC 2015, for atom positioning; trapping laser(s) 2022A for trapping atom 2004 in coupling location 2010; excitation laser(s) 2022E for manipulating an electronic state or a nuclear state of atom 2004: waveguide 2038 for guiding input light (e.g., laser beam 2028A) to coupling location 2010; and at least one output channel for directing quantum light (e.g., light beam 2042) generated at coupling location 2010, out of vacuum chamber 2013. The directed quantum light may then be used as a resource for quantum computing. As shown in FIG. 20A, one end portion of waveguide 2038 may be configured to receive input light (e.g., laser beam 2028A) and laser beam 2028E from excitation laser(s) 2022E, and another end portion of waveguide 2038 may be configured to function as an output channel included in the at least one output channel. As long as laser beam 2028E is able to interact with atom 2004, laser beam 2028E from excitation laser(s) 2022E may be carried in free space in the vacuum or/and laser beam 2028E may be configured to be carried in another waveguide.

Interaction region 2050 may be arranged for at least partial exposure to the vacuum. In some examples, interaction region 2050 constitutes a portion of Photonic Integrated Circuit 2015 exposed to the vacuum to facilitate an interaction with atom 2004 in vacuum chamber 2013. Various arrangements for at least partial exposing of interaction region 2050 may be employed. For example, vacuum chamber 2013 may include a wall having a perforation therethrough and, when in use, PIC 2015 may be fixed on an exterior wall of vacuum chamber 2013 with interaction region 2050 at least partially overlying the perforation so that interaction region 2050 is at least partially exposed to the vacuum through the perforation. PIC 2015 may then act as a seal for that perforation, maintaining vacuum within vacuum chamber 2013. Alternatively, PIC 2015 may be fixed on an interior wall of vacuum chamber 2013, or on a holder or a platform in vacuum chamber 2013, with interaction region 2050 at least partially exposed to the vacuum. Alternatively. PIC 2015 may form a part of a wall of vacuum chamber 2013 while having interaction region 2050 at least partially exposed to the vacuum.

Atom source input 2027 is arranged to facilitate an atom source (not shown) to provide or introduce its atoms (e.g., atoms 2020) into vacuum chamber 2013. For example, atom source input 2027 may include a perforation through which the atom source introduces its atoms 2020. In some examples, atom source input 2027 and the atom source (or an atom dispenser functioning as atom source) may work together to encourage atoms 2020 to move toward interaction region 2050 in vacuum chamber 2013, e.g., using a pressure difference to direct a jet of atoms 2020 toward interaction region 2050. In some examples, directing a jet of atoms 2020 may include using a laser beam for pushing/pulling the atoms or guiding the atoms towards the interaction region 2050.

Vacuum chamber 2013 may be configurable to sustain a vacuum below $10^{-3}$ millibar. Vacuum chamber 2013 may also be coupled to a vacuum source, the vacuum source configured to generate and/or sustain vacuum inside vacuum chamber 2013. For example, the vacuum source may include a vacuum pump configured to change the pressure in vacuum chamber 2013 to create and/or sustain a vacuum either mechanically or chemically.

Figure 20B:
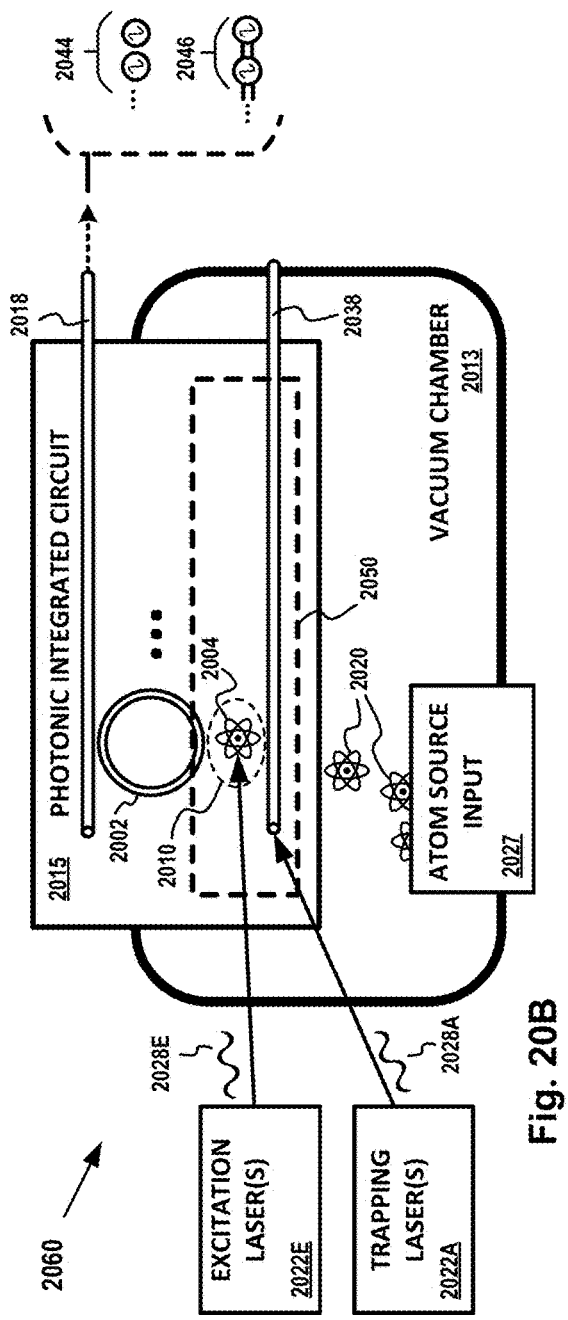

Laser beam 2028E from excitation laser(s) 2022E may be configured to be carried in a waveguide, e.g., waveguide 2038. Alternative or additionally, laser beam 2028E may be configured to be carried in free space in the vacuum. One or more laser unit(s) for providing excitation laser(s) 2022E or/and trapping laser(s) 2022A may be physically located outside vacuum chamber 2013 as depicted in FIG. 20A and FIG. 20B, or alternatively physically located inside vacuum chamber 2013. When the one or more laser unit(s) is physically located outside, vacuum chamber 2013 may include one or more laser input(s) to facilitate providing or introducing laser beam 2028E and laser beam 2028A into vacuum chamber 2013. When the one or more laser unit(s) is physically located inside, vacuum chamber 2013 may include a holder or a platform for fixing and/or aiming the one or more laser unit(s). Alternatively, the one or more laser unit(s) may be fixed on an interior wall of vacuum chamber 2013.

Waveguide 2038 may be configured for coupling to atom 2004 in an absence of an intermediate resonator. This coupling may then enable a laser, a pulse or at least one photon (e.g., laser beam 2028E) carried in waveguide 2038 to interact with atom 2004, e.g., thereby facilitating a manipulation of an electronic state or a nuclear state of atom 2004. For example, in order to couple to atom 2004, waveguide 2038 may use an overlap between dipole field of atom 2004 and an electromagnetic field of a photon or a beam carried in waveguide 2038 as described herein, and/or an evanescent coupling described herein. Waveguide 2038 may also carry laser beam 2028A from trapping laser(s) 2022A, which may include red detuned and blue detuned laser beams for exerting attractive and repelling forces on atom 2004, thereby trapping atom 2004 in coupling location 2010. Waveguide 2038 and trapping laser(s) 2022A may be configured to generate and/or contain an evanescent field around waveguide 2038 so that that evanescent field trapping can be used to keep atom 2004 at, or within, the coupling location 2010, as described herein. In some examples, waveguide 2038 associated with coupling location 2010 may be configured to guide light at a wavelength in a range of 750 to 930 nm. In some examples, waveguide 2038 may be configured to guide light at a wavelength in a range of 750 to 820 nm. In some examples, at least one output channel includes an optical fiber or/and a free space channel for carrying the quantum light (e.g., light beam 2042).

Atom 2004 may be a neutral atom. Alternatively, atom 2004 may be an ion. Atom 2004 may be one of a Rubidium atom, a Cesium atom, or a Francium atom. Alternatively, atom 2004 may be one of a Strontium, Erbium, Ytterbium, Calcium, Barium, Beryllium, or Magnesium atom. In some examples, one or more atoms usable with quantum computing system 2000 (e.g., atoms 2004, 2020) include at least one of Lithium, Sodium, Potassium, Rubidium, Cesium, Francium, Strontium. Erbium, Ytterbium, Calcium, Barium, Beryllium, or Magnesium atom, either as a neutral atom or as an ion.

FIG. 20B illustrates an exemplary implementation of quantum computing system 2060 which includes components of quantum computing system 2000 of FIG. 20A described herein, and at least one output channel 2018 for directing quantum light (e.g., a stream of single photons 2044 or/and entangled photons 2046 generated at coupling location 2010) out of vacuum chamber 2013, and resonator 2002 associated with coupling location 2010. Photonic Integrated Circuit (PIC) 2015 may include resonator 2002, and coupling location 2010 may be associated with resonator 2002. Instead of one end portion of waveguide 2038 being configured to receive laser beam 2028E from excitation laser(s) 2022E and another end portion of waveguide 2038 being configured to function as an output channel as shown in FIG. 20A, separate at least one output channel 2018 is provided in FIG. 20B. Resonator 2002 enables light in the at least one output channel 2018 to interact with atom 2004. For example, resonator 2002 functions as a medium through which the quantum light generated at coupling location 2010 (e.g., a stream of single photons 2044 or/and entangled photons 2046) is transferred into the at least one output channel 2018.

Excitation laser(s) 2022E may be configured for use in generating a stream of single photons. For example, when quantum computing system 2060 is in use, laser beam 2028E from excitation laser(s) 2022E may be used to manipulate an electronic state or a nuclear state of atom 2004 (e.g., excite it) trapped in coupling location 2010, thereby generating a stream of single photons 2044 output via resonator 2002 into output channel 2018 (e.g., through their evanescent coupling as described herein) and directed out of vacuum chamber 2013. Alternatively or additionally, excitation laser(s) 2022E may be configured for use in generating entangled photons. For example, when quantum computing system 2000 is in use, laser beam 2028E from excitation laser(s) 2022E may be used to manipulate an electronic state or a nuclear state of atom 2004 trapped in coupling location 2010 so that when two or more photons being carried in waveguide 2018 interacts with trapped atom 2004 via resonator 2002 (e.g., through their evanescent coupling as described herein), the two or more photons become entangled with trapped atom 2004 and hence with each other. This then results in entangled photons 2046 being directed out of vacuum chamber 2013 via output channel 2018 as described herein. As described above, output channel 2018 may include an optical fiber or/and a free space channel for carrying the quantum light (e.g., light beam 2042, a stream of single photons 2044 or/and entangled photons 2046). For example, output channel 2018 may be a waveguide. As long as laser beam 2028E is able to interact with atom 2004, laser beam 2028E from excitation laser(s) 2022E may be carried in free space in the vacuum or/and laser beam 2028E may be configured to be carried in a waveguide, e.g., waveguide 2038 as shown in FIG. 20A.

Quantum computing system 2000, 2060 in FIG. 20A or FIG. 20B share a number of functionally equivalent components with example arrangement 1011 shown in FIG. 10, e.g., vacuum chamber 2013 and PIC 2015 corresponding to photonic chips 1015 and vacuum chamber 1013, and one or more of the functionally equivalent components described with reference to FIG. 10 may also be used in quantum computing system 2000, 2060 in FIG. 20A or FIG. 20B, and vice versa.

Any part of quantum computing system 2000, 2060 may be replaced or modified with functionally equivalent structures and arrangements described herein. For example, one or more laser source or one or more laser unit described herein (e.g., laser unit shown in FIG. 16A or FIG. 16B, or laser(s) shown in FIG. 16C to FIG. 16F) may be controlled to provide trapping laser(s) 2022A and/or excitation laser(s) 2022E. Trapping laser(s) 2022A may include at least one trapping laser 1922A. Quantum computing system 2000, 2060 may further include at least one cooling laser 1922B. Quantum computing system 2000, 2060 may further include one or more detectors described herein (e.g., detectors shown in FIG. 16A to FIG. 16F or FIG. 19), the one or more detectors configured to detect light beam 2042, a stream of single photons 2044 or/and entangled photons 2046.

In some examples, any cavity or resonator described herein (e.g., silicon nitride resonator shown in FIG. 16A to FIG. 16F or whispering-gallery mode optical resonator in FIG. 19) may be used as resonator 2002. Quantum computing system 1600, 1620 in FIG. 16A or FIG. 16B, or any of qubit generator(s) 1632A, 1632B or entangling gate(s) 1634A, 1634B in FIG. 16C to FIG. 16F, may be used with vacuum chamber 2013 and Photonic Integrated Circuit (PIC) 2015 of quantum computing system 2000, 2060. For example, Photonic Integrated Circuit (PIC) 2015 may include: silicon nitride resonator(s) in FIG. 16A to FIG. 16B; qubit generator(s) 1632A, 1632B or entangling gate(s) 1634A, 1634B in FIG. 16C to FIG. 16F; whispering-gallery mode optical resonator in FIG. 19; or/and any optical element(s), waveguide(s), detector(s), or processor(s) in FIG. 16A to FIG. 16F or FIG. 19.

In some examples, atom 2004 may be an alkali atom described herein (e.g., alkali atom shown in FIG. 16A to FIG. 16F). Alternatively, atom 2004 may be replaced with a quantum emitter described herein, provided the quantum emitter is capable of being trapped in the same manner, and its electronic state or nuclear state manipulated in the same manner.

Figure 21A:
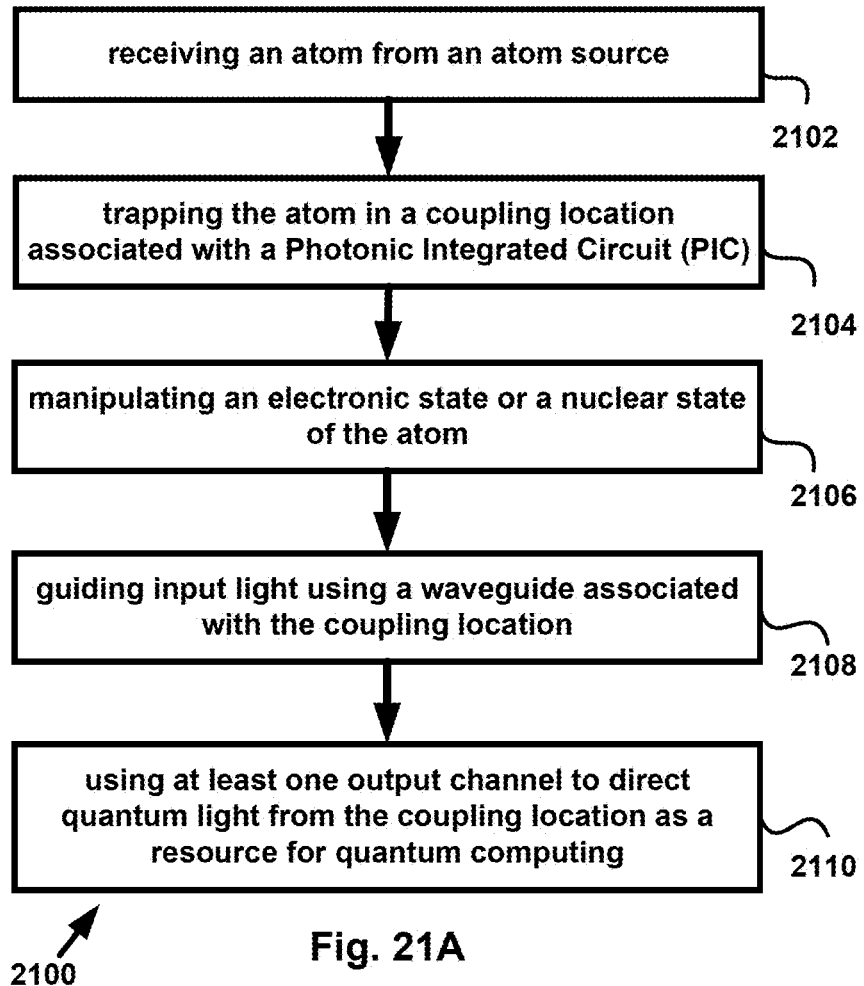
FIG. 21A is a flowchart of a quantum computing method for generating quantum light as a resource for quantum computing according to some embodiments of the present disclosure.

FIG. 21A illustrates an example process of a quantum computing method 2100. Quantum computing method 2100 includes: receiving an atom from an atom source in step 2102: trapping the atom in a coupling location associated with a Photonic Integrated Circuit (PIC) in step 2104: manipulating an electronic state or a nuclear state of the atom in step 2106; guiding input light using a waveguide associated with the coupling location in step 2108; and using at least one output channel to direct quantum light from the coupling location as a resource for quantum computing in step 2110. The waveguide associated with the coupling location may be configured for guiding light at a wavelength in a range of 750 to 930 nm, and step 2108 may include guiding input light of a wavelength in a range of 750 to 930 nm. In some examples, the waveguide may be configured for guiding light at a wavelength in a range of 750 to 820 nm, and step 2108 may include guiding input light of a wavelength in a range of 750 to 820 nm.

Figure 21B:
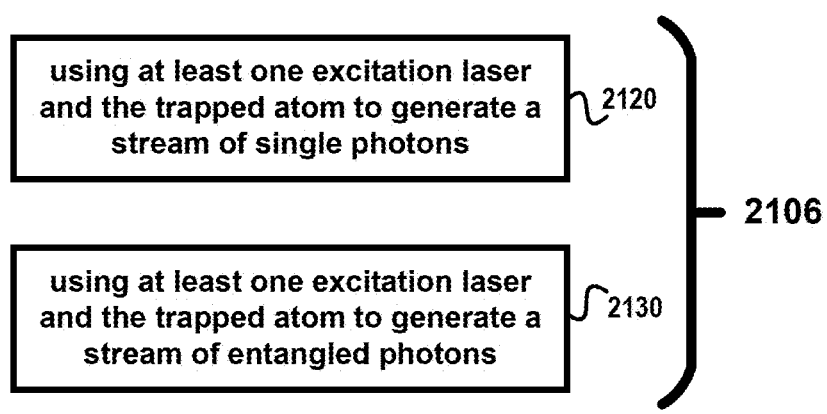
FIG. 21B illustrates examples of step 2106 of the quantum computing method shown in FIG. 21A.

FIG. 21B illustrates examples of steps that may also be included in quantum computing method 2100. Step 2106 of manipulating an electronic state or a nuclear state of the atom may include using at least one excitation laser and the trapped atom to generate a stream of single photons, or/and to generate a stream of entangled photons.

Quantum computing system 2000, 2060 described with reference to FIG. 20A and FIG. 20B may be configured to perform the quantum computing method 2100 of FIG. 21A and FIG. 21B.

Some embodiments involve anon-transitory computer-readable medium (or a computer-readable medium or a computer program) including instructions that, when executed by at least one processor (or an apparatus), cause the at least one processor (or the apparatus) to carry out a quantum computing method described herein. For example, in some embodiments, the instructions may cause the at least one processor (or the apparatus) to carry out quantum computing method 2100 shown in FIG. 21A and FIG. 21B.

Figure 22A:
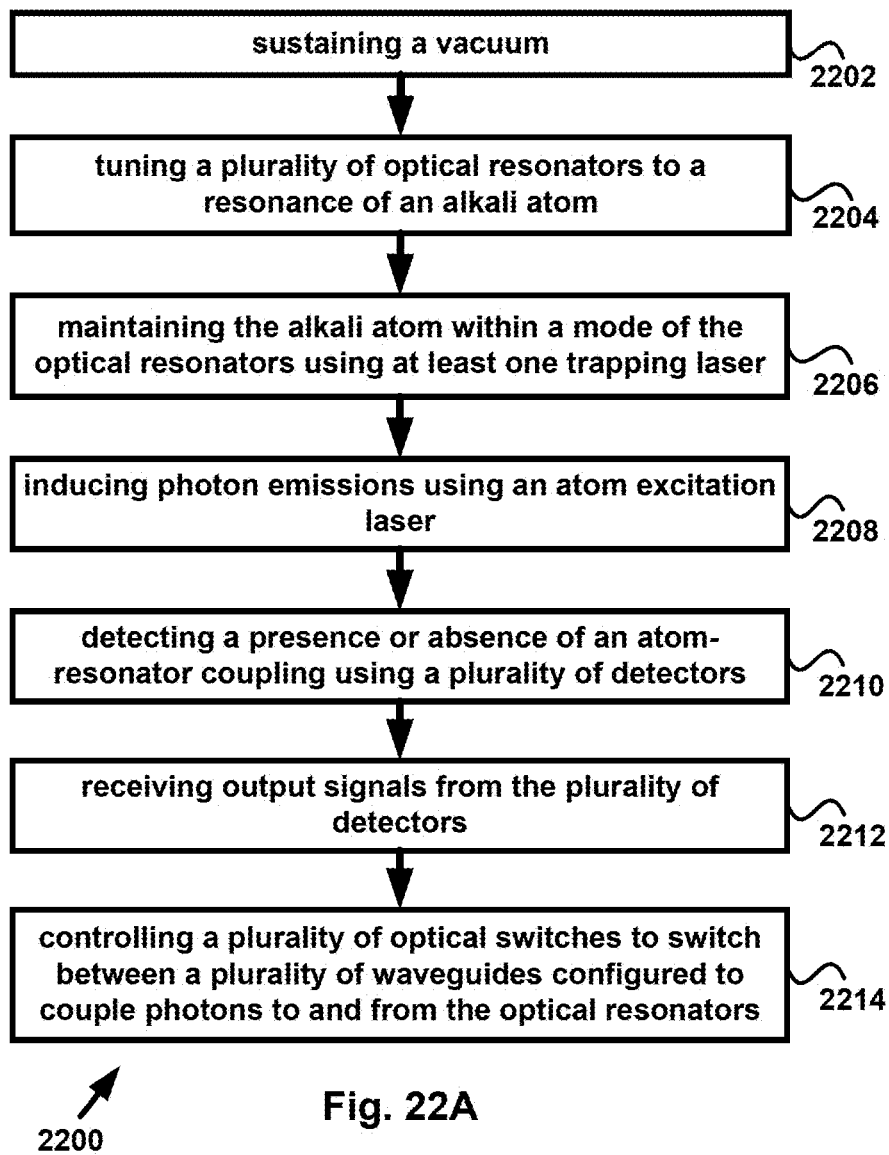
FIG. 22A is a flowchart of a quantum computing method according to some embodiments of the present disclosure.

FIG. 22A illustrates an example process of a quantum computing method 2200. Quantum computing method 2200 includes, sustaining a vacuum in step 2202: tuning a plurality of optical resonators to a resonance of an alkali atom in step 2204; maintaining the alkali atom within a mode of the optical resonators using at least one trapping laser in step 2206; inducing photon emissions using an atom excitation laser in step 2208; detecting a presence or absence of an atom-resonator coupling using a plurality of detectors in step 2210: receiving output signals from the plurality of detectors in step 2212; and controlling a plurality of optical switches to switch between a plurality of waveguides configured to couple photons to and from the optical resonators in step 2214. The vacuum may be sustained in step 2202 by achieving and/or maintaining a pressure below $10^{-3}$ millibar. In some examples, the plurality of optical resonators include at least three optical resonators. In some examples, the plurality of optical resonators are provided on a Photonic Integrated Circuit (PIC). In some examples, the plurality of waveguides are implemented with Silicon Nitride (SiN). The plurality of waveguides may include a free space or/and an optical fiber. The alkali atom may be an ion. Alternatively, the alkali atom may be a neutral atom. The alkali atom may be a Rubidium atom. Alternatively, the alkali atom may be a Cesium atom. Alternatively, the alkali atom may be a Francium atom. Alternatively, the alkali atom may be one of a Strontium, Erbium, Ytterbium, Calcium, Barium. Beryllium, Lithium, Sodium, Potassium, or Magnesium atom.

Figure 22B:
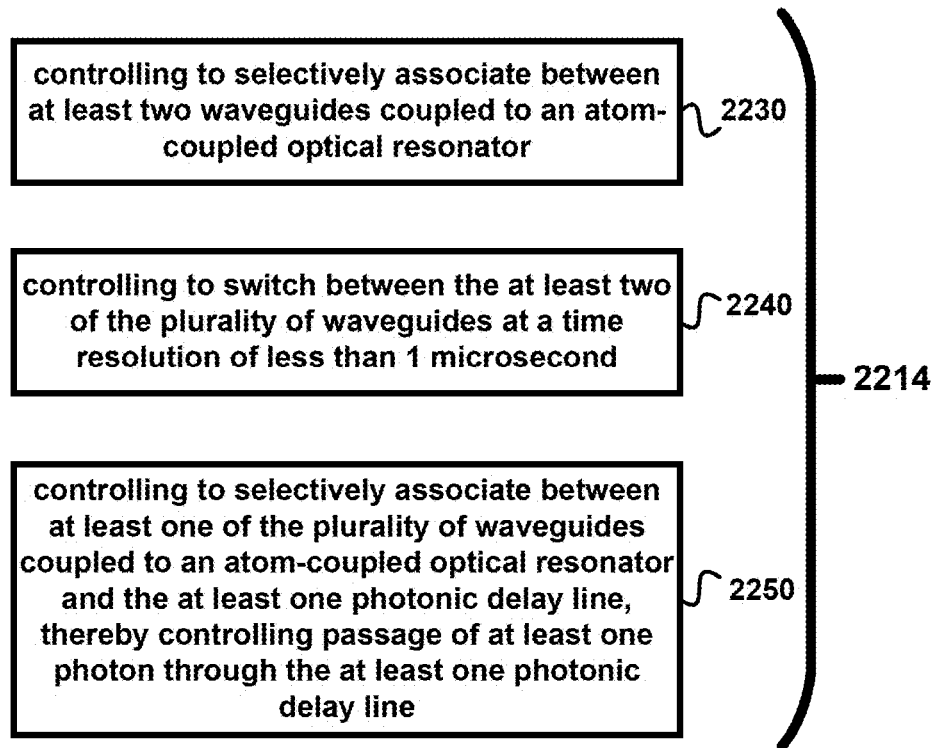
FIG. 22B illustrates examples of step 2214 of the quantum computing method shown in FIG. 22A.

FIG. 22B illustrates examples of steps that may be included in quantum computing method 2200. Step 2214 of controlling a plurality of optical switches to switch between a plurality of waveguides configured to couple photons to and from the optical resonators may include at least one of: a step 2230 of controlling to selectively associate between at least two waveguides coupled to an atom-coupled optical resonator; a step 2240 of controlling to switch between the at least two of the plurality of waveguides at a time resolution of less than 1 microsecond; or/and a step 2250 of controlling to selectively associate between at least one of the plurality of waveguides coupled to an atom-coupled optical resonator and the at least one photonic delay line, thereby controlling passage of at least one photon through the at least one photonic delay line.

Figure 22C:
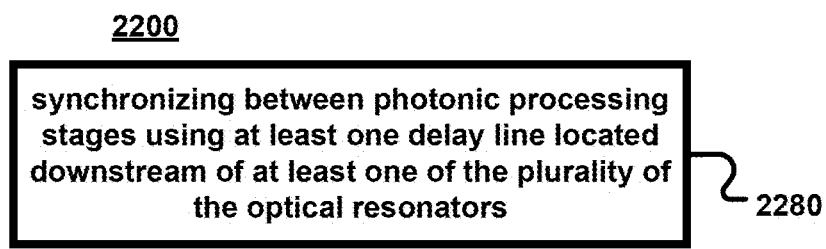
FIG. 22C illustrates an additional step of the quantum computing method shown in FIG. 22A or FIG. 22B.

FIG. 22C illustrates an example of an additional step that may be included in quantum computing method 2200. Quantum computing method 2200 may include a step 2280 of synchronizing between photonic processing stages using at least one delay line located downstream of at least one of the plurality of the optical resonators. Performing a quantum computation may involve managing a timing of interactions between one or more photons (or a laser beam or a pulse), which have interacted with the at least one of the plurality of the optical resonators, and components of a quantum computing system downstream of these optical resonators. Using at least one delay line downstream of the at least one of the plurality of the optical resonators, processing timings between different photonic processing stages may be synchronized.

Figure 23A:
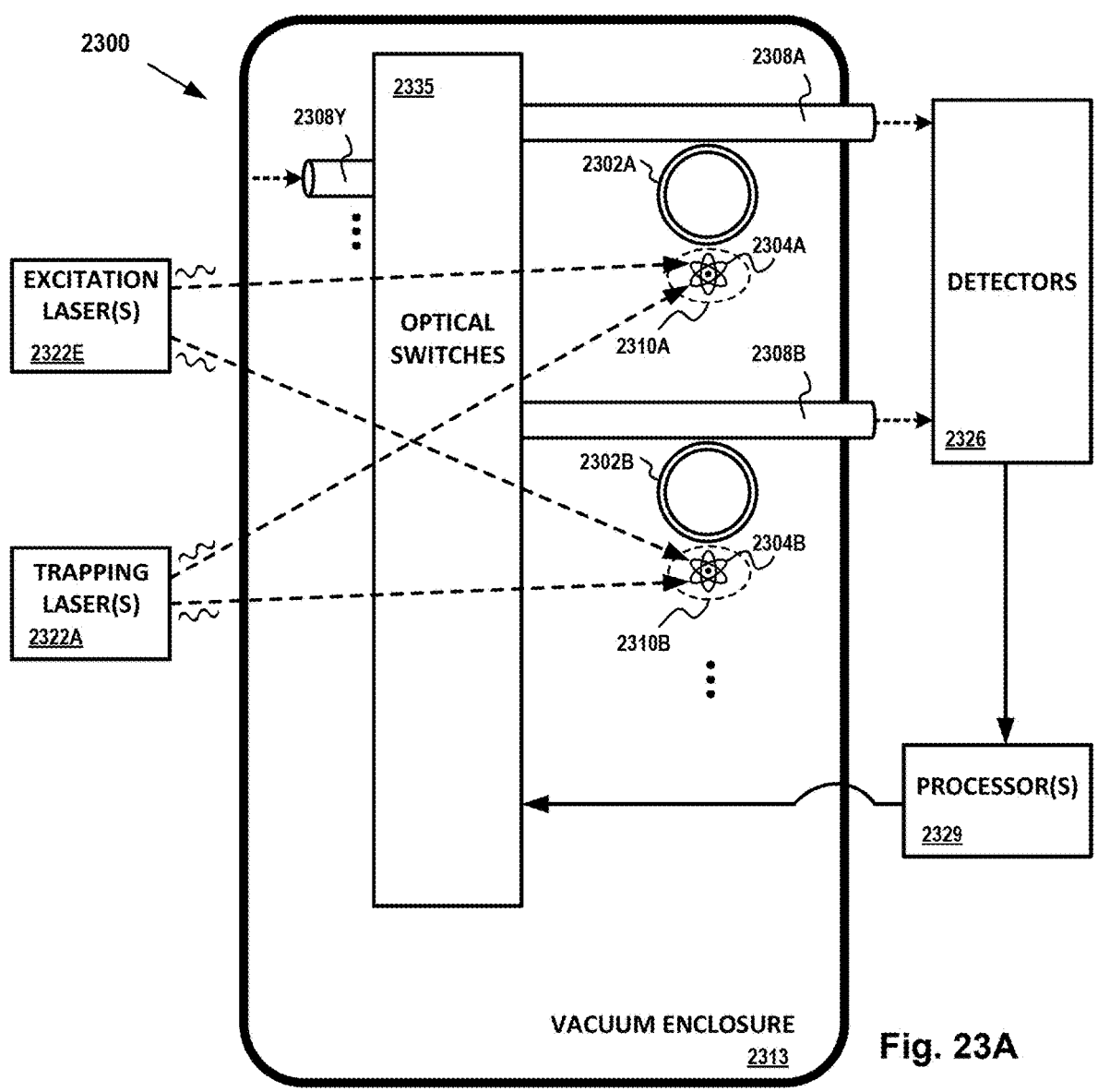
FIG. 23A schematically illustrates a quantum computing system according to some embodiments of the present disclosure.

FIG. 23A illustrates an exemplary implementation of quantum computing system 2300 including: a vacuum enclosure 2313 configured to establish or/and sustain a vacuum; a plurality of optical resonators 2302A, 2302B tunable to a resonance of an alkali atom 2304A, 2304B; at least one trapping laser 2322A for maintaining alkali atom 2304A, 2304B within a mode of optical resonators 2302A, 2302B; at least one atom excitation laser 2322E for inducing photon emissions; a plurality of waveguides 2308A, 2308B, 2308Y configured to couple photons to and from optical resonators 2302A, 2302B; a plurality of detectors 2326 configured to detect a presence or absence of an atom-resonator coupling; a plurality of optical switches 2335 for switching between at least two of the plurality of waveguides 2308A, 2308B; and at least one processor 2329 configured to receive output signals from the plurality of detectors 2326 and control the plurality of optical switches 2335. In some examples, the vacuum enclosure 2313 may be configured to sustain a vacuum below $10^{-3}$ millibar, for example by achieving and/or maintaining a pressure below $10^{-3}$ millibar.

FIG. 23A shows two alkali atoms 2304A, 2304B and their corresponding (optical) resonators 2302A, 2302B and waveguides 2308A, 2308B, each arrangement including an alkali atom, an (optical) resonator couplable to the alkali atom, and at least one waveguide couplable to the (optical) resonator. More than two such arrangements may be provided. For example, a plurality of those arrangements may be provided on either side, or both sides, of the plurality of optical switches 2335 so that the plurality of optical switches 2335 can switch connections between the waveguides of those arrangements. This way, a flow of photons (a pulse or a light) between those arrangement can be controlled, whereby the photons (or pulse or light) may interact with the alkali atom of the arrangement via the coupling between the waveguide and the (optical) resonator and via the coupling between the (optical) resonator and the alkali atom. Each arrangement may also include at least one additional waveguide configured to facilitate an interaction between at least one photon (a pulse or a laser beam) carried therein and the alkali atom, e.g., the alkali atom's interaction with a laser beam from a trapping laser (e.g., the at least one trapping laser 2322A) for trapping the alkali atom in a coupling location as described herein. In some examples, the alkali atom may be an ion. Alternatively, the alkali atom may be a neutral atom. The alkali atom may be a Rubidium atom. Alternatively, the alkali atom may be a Cesium atom. Alternatively, the alkali atom may be a Francium atom. Alternatively, the alkali atom may be one of a Strontium, Erbium. Ytterbium, Calcium, Barium, Beryllium, Lithium, Sodium, Potassium, or Magnesium atom.

When quantum computing system 2300 is in use, the plurality of optical resonators 2302A, 2302B may be tuned to the resonance of respective alkali atom 2304A, 2304B and alkali atom 2304A, 2304B may be maintained within a mode of respective optical resonator 2302A, 2302B using the at least one trapping laser 2322A. The plurality of detectors 2326 may then be used to detect a presence or absence of an atom-resonator coupling, the at least one atom excitation laser 2322E may be used to induce photon emissions, and the plurality of optical switches 2335 may be controlled to switch between a plurality of waveguides 2308A, 2308B.

In some examples, the at least one processor 2329 may be configured to control the plurality of optical switches 2335 to selectively associate between at least two of the plurality of waveguides 2308A, 2308B coupled to an atom-coupled optical resonator 2302A, 2302B. In some examples, the plurality of optical switches 2335 may be controlled to switch between the at least two of the plurality of waveguides 2308A, 2308B at a time resolution of less than 1 microsecond.

In some examples, the plurality of waveguides are implemented with Silicon Nitride (SiN). The plurality of waveguides may include a free space. Alternatively or additionally, the plurality of waveguides may include an optical fiber.

Figure 23B:
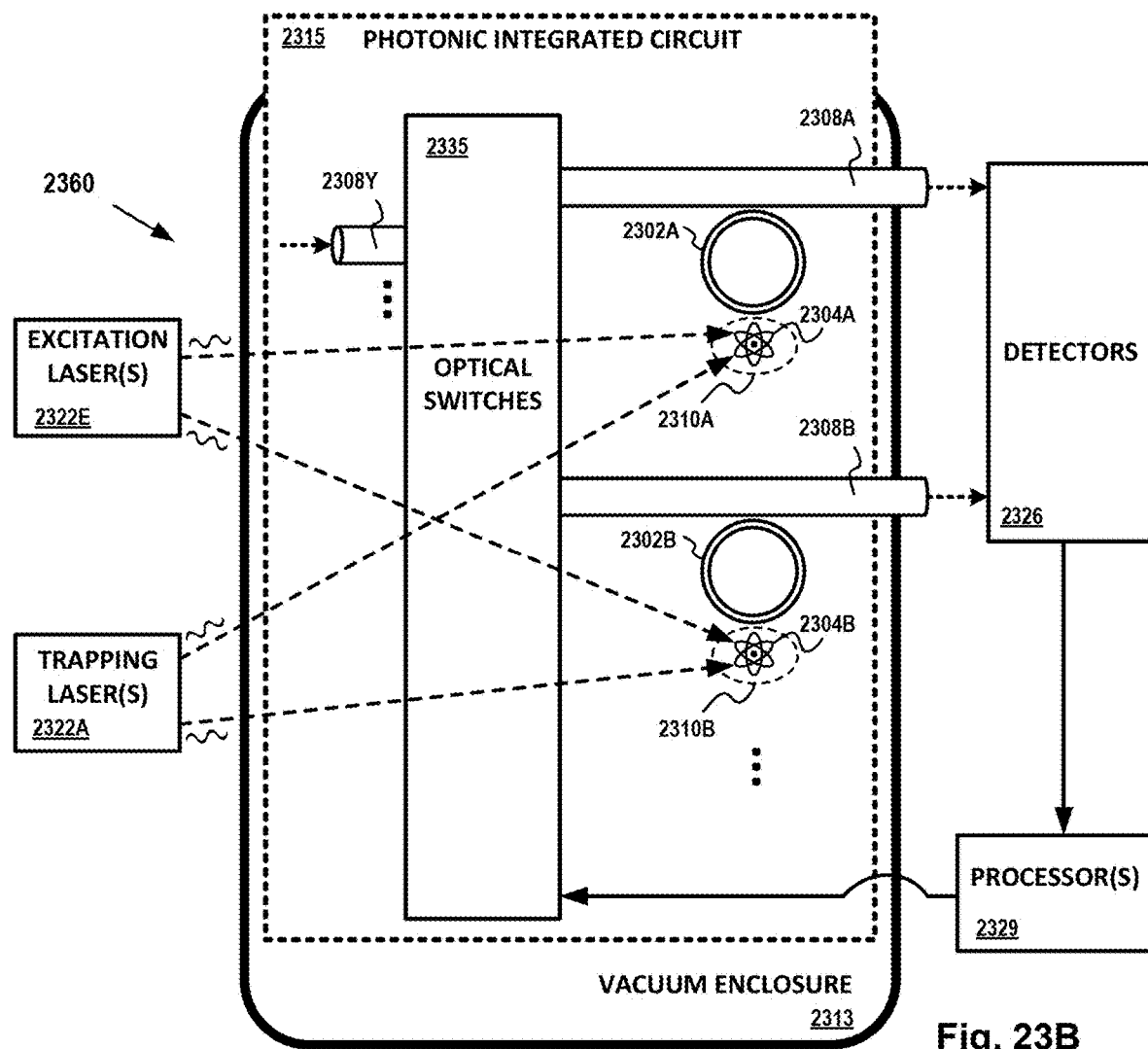
FIG. 23B and FIG. 23C schematically illustrate examples of a quantum computing system according to some embodiments of the present disclosure, which includes components of the quantum computing system shown in FIG. 23A.

FIG. 23B illustrates an exemplary implementation of quantum computing system 2360, which includes some or all of the components of quantum computing system 2300 shown in FIG. 23A, and a Photonic Integrated Circuit (PIC) 2315. At least some of the components of quantum computing system 2300 are implemented using the Photonic Integrated Circuit (PIC) 2315. For example, the plurality of optical resonators 2302A, 2302B may be implemented with, or provided on, the PIC 2315. In some examples, one or more of the following may be implemented with, or provided on, the PIC 2315: at least one or all of the plurality of waveguides 2308A, 2308B, 2308Y; at least one or all of the plurality of optical switches 2335; at least one or all of the plurality of detectors 2326: or/and at least one or all components of the at least one processor 2329. In some examples, the Photonic Integrated Circuit (PIC) 2315 includes an interaction region configured to interact with alkali atom 2304A, 2304B, the interaction region being arranged for at least partial exposure to the vacuum. In some examples, the at least one processor 2329 may be configured to receive information from the plurality of detectors 2326 and to control the plurality of switches 2335 to switch the waveguides 2308A, 2308B, 2308Y at a time resolution of less than 1 microsecond.

Figure 23C:
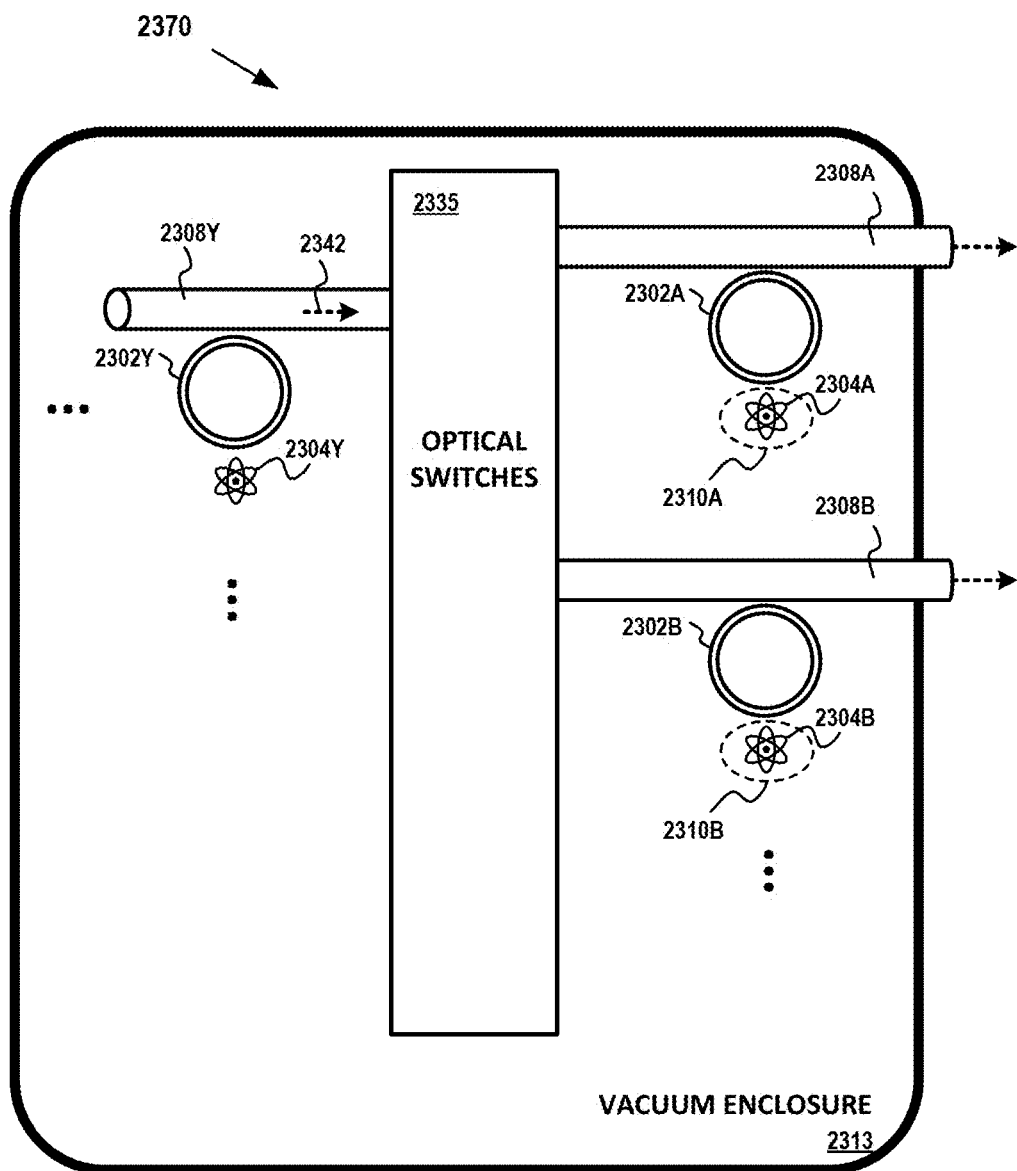

FIG. 23C illustrates an exemplary implementation of quantum computing system 2370 which includes some or all of the components of quantum computing system 2300 shown in FIG. 23A and/or quantum computing system 2360 shown in FIG. 23B, wherein the plurality of optical resonators includes at least three optical resonators 2302A, 2302B, 2302Y. For example, although omitted in FIG. 23C, quantum computing system 2370 may also include one or more of: the at least one trapping laser 2322A; the at least one atom excitation laser 2322E; the plurality of detectors 2326; or/and the at least one processor 2329 described herein with reference to FIG. 23A or FIG. 23B. In some examples, at least some of the components of quantum computing system 2370 are implemented using a Photonic Integrated Circuit (PIC) 2315 as described herein with reference to FIG. 23B.

As described earlier in relation to FIG. 23A, more than two arrangements (of an alkali atom and its corresponding (optical) resonator and waveguide) may be provided in a quantum computing system. The exemplary implementation shown in FIG. 23C includes three alkali atoms 2304A, 2304B, 2304Y and their corresponding (optical) resonators 2302A, 2302B, 2302Y and waveguides 2308A, 2308B, 2308Y, each arrangement including an alkali atom, an (optical) resonator couplable to the alkali atom, and at least one waveguide couplable to the (optical) resonator. One of these arrangements is provided on one side (e.g., upstream) of optical switches 2335, and the other two are provided on the other side (e.g., downstream from optical switches 2335). In some examples, some or all of the arrangements of quantum computing system 2300, 2360, 2370, 2380 may be configured to function as a photon generator, a qubit generator or/and an entangling gate described herein (e.g., function as qubit generator 1632A, 1632B or entangling gate 1634A, 1634B in FIG. 16C to FIG. 16F). Optical switches 2335 can switch connections between the waveguides of those arrangements so that, e.g., light (or pulse or photons 2342) that has interacted with one arrangement (e.g., alkali atom 2304Y and its corresponding (optical) resonator 2302Y and waveguide 2308Y) can be directed toward another component of quantum computing system 2370. For example, optical switches 2335 may switch connections (e.g., via optical coupling or optical de-coupling) between waveguide 2308Y and waveguides 2308A, 2308B. Based on this controlled switching, the light (or pulse or photons 2342) may then be directed toward one or both of the other two arrangements (alkali atom 2304A, 2304B and its corresponding (optical) resonator 2302A, 2302B and waveguide 2308A, 2308B). This way a flow of photons (a pulse or a light) between these arrangements or/and any components of the system can be controlled, whereby the photons (or pulse or light) may interact with the appropriate alkali atom of the arrangement via the coupling between the waveguide and the (optical resonator) and via the coupling between the (optical resonator) and the alkali atom. More than three such arrangements may be provided with the connections therebetween controlled in a similar manner. For example, a plurality of those arrangements may be provided on either side, or both sides, of the plurality of optical switches 2335.

Figure 23D:
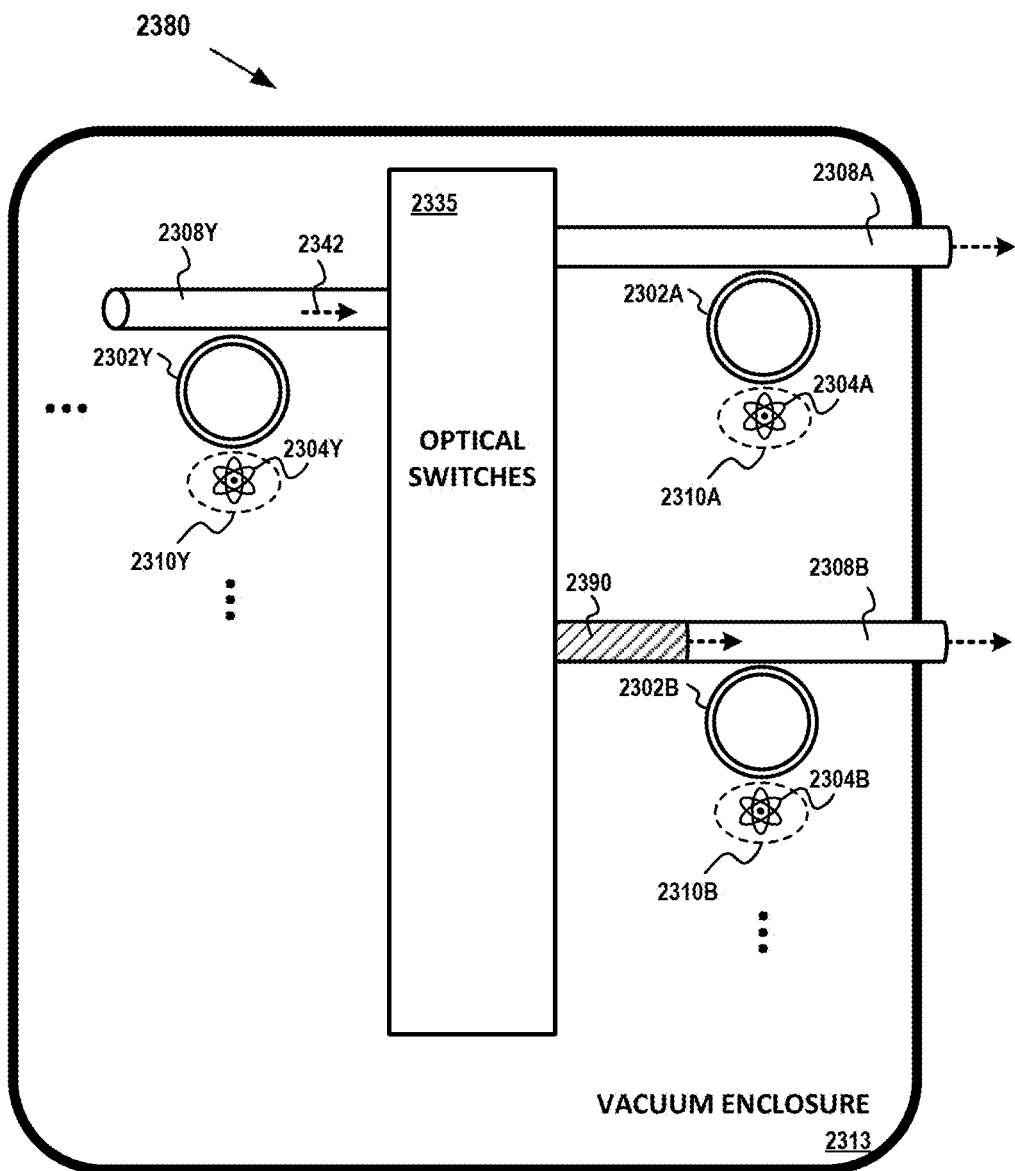
FIG. 23D schematically illustrates examples of a quantum computing system according to some embodiments of the present disclosure, which includes some or all of the components of the quantum computing systems shown in FIG. 23A, FIG. 23B or FIG. 23C.

FIG. 23D illustrates an exemplary implementation of quantum computing system 2380 which includes some or all of the components of the quantum computing systems 2300, 2360, 2370 shown in FIG. 23A, FIG. 23B and/or FIG. 23C, wherein at least one of the plurality of waveguides includes at least one photonic delay line 2390 configured to synchronize between photonic processing stages. The at least one photonic delay line may be located downstream of at least one of the plurality of optical resonators. For example, waveguide 2308B may include photonic delay line 2390, and photonic delay line 2390 may be located downstream of optical resonator 2302Y. A photonic delay line may be included in any one or more of the plurality of waveguides 2308A, 2308B, 2308Y. In some examples, the at least one processor 2329 may be configured to control at least one of the plurality of optical switches 2335 to selectively associate between at least one of the plurality of waveguides 2308A, 2308Y coupled to an atom-coupled optical resonator 2302A, 2302Y and the at least one photonic delay line 2390, thereby controlling passage of at least one photon through the at least one photonic delay line 2390.

A photonic delay line may include any medium through which at least one photon may travel which is capable of introducing a period of time between receiving the at least one photon and outputting the at least one photon. For example, a photonic delay line may include any one or more of: a length of waveguide for carrying at least one photon; a free space through which at least one photon is enabled to travel; or/and a length of fiber for carrying at least one photon. Thus a portion of each of the plurality of waveguides 2308A, 2308B, 2308Y may function as a photonic delay line, and the at least one photonic delay line 2390 may be additionally provided therewith to introduce further time delay, thereby synchronizing between photonic processing stages. Performing a quantum computation may involve managing a timing of interactions between one or more photons (or a laser beam or a pulse), which have already interacted with one or more optical resonator(s) (and its associated alkali atom), and components of a quantum computing system downstream of the optical resonator(s). Using at least one delay line downstream of the optical resonators, the interaction timings for different photonic processing stages may be synchronized.

When quantum computing system 2300, 2360, 2370, 2380 is in use, the plurality of optical switches 2335 may be controlled to switch between a plurality of waveguides 2308A. 2308B, 2308Y configured to couple photons to and from the optical resonators 2302A, 2302B, 2302Y or/and between at least one of the plurality of waveguide 2308A, 2308B, 2308Y and at least one photonic delay line 2390. This controlling may include at least one of: controlling to selectively associate between at least two waveguides coupled to an atom-coupled optical resonator; controlling to switch between the at least two of the plurality of waveguides at a time resolution of less than 1 microsecond; or/and controlling to selectively associate between at least one of the plurality of waveguides coupled to an atom-coupled optical resonator and the at least one photonic delay line, thereby controlling passage of at least one photon through the at least one photonic delay line.

Quantum computing system 2300, 2360, 2370, 2380 shown in FIG. 23A, FIG. 23B, FIG. 23C, or FIG. 23D share a number of functionally equivalent components with quantum computing system 2000, 2060 in FIG. 20A or FIG. 20B, or/and an example arrangement 1011 shown in FIG. 10, e.g., vacuum enclosure 2313 and PIC 2315 corresponding to vacuum chamber 2013 and PIC 2015 in quantum computing system 2000, 2060, or photonic chips 1015 and vacuum chamber 1013 in the example arrangement 1011, and one or more of the functionally equivalent components described with reference to FIG. 20A or FIG. 20B or FIG. 10 may also be used in quantum computing system 2300, 2360, 2370, 2380, and vice versa.

Any part of quantum computing system 2300, 2360, 2370, 2380 may be replaced or modified with functionally equivalent structures and arrangements described herein. For example, one or more laser source or one or more laser unit described herein (e.g., laser unit shown in FIG. 16A or FIG. 16B, or laser(s) shown in FIG. 16C to FIG. 16F) may be controlled to provide trapping laser(s) 2322A and/or excitation laser(s) 2322E. Trapping laser(s) 2322A may include trapping laser(s) 1922A described with reference to quantum computing system 1900 or/and trapping laser(s) 2022A described with reference to quantum computing system 2000, 2060. Excitation laser(s) 2322E may include excitation laser(s) 2022E described with reference to quantum computing system 2000, 2060. Quantum computing system 2300, 2360, 2370, 2380 may further include at least one cooling laser 1922B described with reference to quantum computing system 1900. The plurality of detectors 2326 may include one or more detectors described herein (e.g., detectors shown in FIG. 16A to FIG. 16F or FIG. 19), the one or more detectors configured to detect a light beam, a stream of single photons or/and entangled photons.

It is to be understood that at least one alkali atom in quantum computing system 2300, 2360, 2370, 2380 shown in FIG. 23A, FIG. 23B, FIG. 23C, or FIG. 23D, or quantum computing method 2200 of FIG. 22A to FIG. 22C, may be replaced with any other type of quantum emitter described herein. For example, an alkali atom 2304A, 2304B, 2304Y may be an atom or alkali atom described herein (e.g., alkali atom shown in FIG. 16A to FIG. 16F). Alternatively, alkali atom 2304A, 2304B, 2304Y may be replaced with a quantum emitter described herein, provided that the quantum emitter is capable of being maintained within a mode of its corresponding optical resonator in the same manner, and the corresponding optical resonator is capable of being tuned to a resonance of the quantum emitter in the same manner.

It is also to be understood that optical resonators 2302A, 2302B, 2302Y in quantum computing system 2300, 2360, 2370, 2380 shown in FIG. 23A, FIG. 23B, FIG. 23C, or FIG. 23D, or quantum computing method 2200 of FIG. 22A to FIG. 22C may be replaced with any other type of resonator or cavity described herein, as long as the resonator or cavity is capable of being tuned to a resonance of its associated quantum emitter (or atom or alkali atom) in the same manner and the associated quantum emitter (or atom or alkali atom) is capable of being maintained within a mode of the resonator or cavity in the same manner. For example, a cavity or resonator described herein (e.g., silicon nitride resonator shown in FIG. 16A to FIG. 16F or whispering-gallery mode optical resonator in FIG. 19) may be used as an (optical) resonator 2302A, 2302B, 2302Y.

It is to be understood that quantum computing system 1600, 1620 in FIG. 16A or FIG. 16B, or any of qubit generator(s) 1632A, 1632B or entangling gate(s) 1634A, 1634B in FIG. 16C to FIG. 16F, may be used with vacuum enclosure 2313 or/and Photonic Integrated Circuit (PIC) 2315 of quantum computing system 2300, 2360, 2370, 2380. For example, PIC 2315 may include: silicon nitride resonator(s) in FIG. 16A to FIG. 16B; qubit generator(s) 1632A, 1632B or entangling gate(s) 1634A, 1634B in FIG. 16C to FIG. 16F; whispering-gallery mode optical resonator in FIG. 19; or/and any optical element(s), waveguide(s), detector(s), or processor(s) in FIG. 16A to FIG. 16F or FIG. 19.

It is to be understood that one or more of the optical elements described with reference to FIG. 16B to FIG. 16F (e.g., optical elements 1635, 1635D) and/or any of the foregoing may be provided in quantum computing system 2300, 2360, 2370, 2380 shown in FIG. 23A, FIG. 23B, FIG. 23C, or FIG. 23D. For example, the optical elements may be arranged with the optical switches 2335, or appropriately located to be nearby, or at an input or an output end of, a relevant waveguide to control or channel laser beam/pulse/photon so that they may be directed toward an intended target or destination.

Quantum computing system 2300, 2360, 2370, 2380 described with reference to FIG. 23A, FIG. 23B, FIG. 23C, or FIG. 23D may be configured to perform the quantum computing method 2200 of FIG. 22A to FIG. 22C.

Some embodiments involve a non-transitory computer-readable medium (or a computer-readable medium or a computer program) including instructions that, when executed by at least one processor (or an apparatus), cause the at least one processor (or the apparatus) to carry out a quantum computing method described herein. For example, in some embodiments, the instructions may cause the at least one processor (or the apparatus) to carry out quantum computing method 2200 of FIG. 22A to FIG. 22C.

Figure 9A:
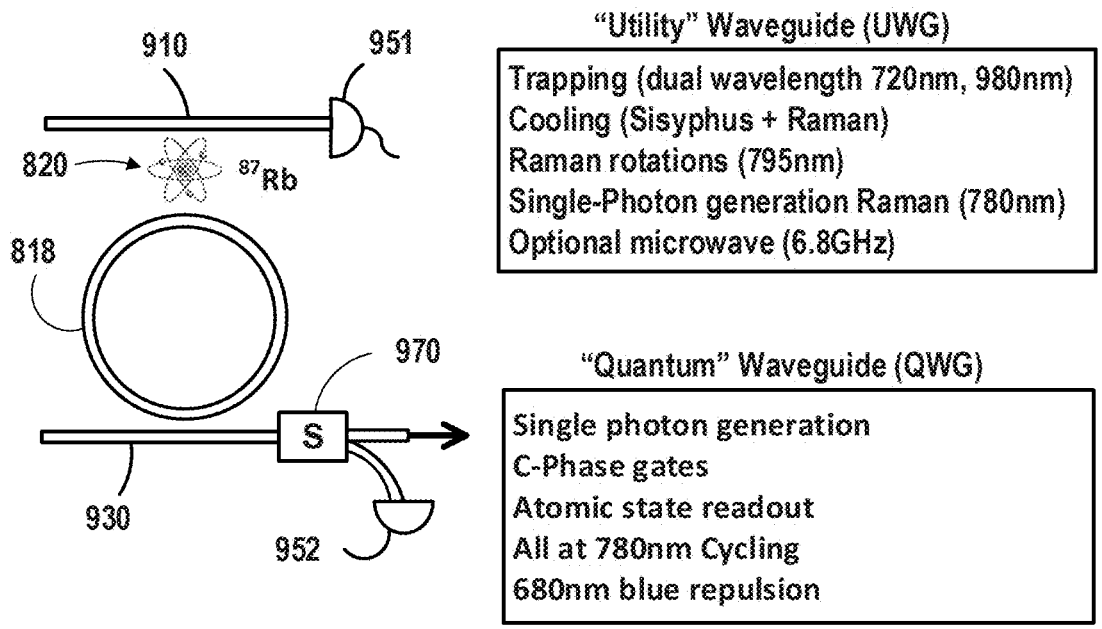
FIG. 9A schematically illustrates waveguides usable with an atom coupled to a cavity according to some embodiments of the present disclosure.

According to some disclosed embodiments, there is provided a layout of an integrated circuit device or circuitry, comprising layout portions, each layout portion defined to pattern a feature from the combination of features of: any photonic chip, any Photonic Integrated Circuit (PIC), any laser unit, any detector, any processor, any photon generator, any qubit generator, and/or any entangling gate described herein; the device for use in quantum computing in FIG. 1: the single-photon source unit in FIG. 4A; the entanglement unit in FIG. 5A; the apparatus for sourcing a multi-dimensional cluster state in FIG. 7; the arrangements shown in FIG. 9A to FIG. 9C; lasers 1033, control system 1031, photonic chips 1015, and/or photon detectors 1035 of the system 1011 shown in FIG. 10; the example photonic circuit in FIG. 11A; the examples of photonic circuit in FIG. 12A to FIG. 12D and FIG. 13; Cavity-QED circuits in FIG. 14; at least some or all components of quantum computing system 1600, 1620, 1625, 1630, 1640, 1650 in FIG. 16A to FIG. 16F; at least some or all components of quantum computing system 1900 in FIG. 19; at least some or all components of quantum computing systems 2000, 2060 in FIG. 20A to FIG. 20B, e.g., those implemented with PIC 2015; and/or at least some or all components of quantum computing system 2300, 2360, 2370, 2380 in FIG. 23A, FIG. 23B, FIG. 23C, or FIG. 23D, e.g., those implemented with PIC 2315.

For example, in some disclosed embodiments, a layout of an integrated circuit device or a circuitry includes a photon generator layout portion defined to pattern a photon generator described herein (or a qubit generator layout portion defined to pattern a qubit generator described herein) and/or a channel or a waveguide for carrying light, a beam, or a photon supplied by a photon generator (or for carrying a photonic qubit supplied by a qubit generator) toward a resonator (or a cavity) or toward a quantum emitter (e.g., an atom or an alkali atom). In some examples, a qubit generator layout portion may be defined to pattern another resonator and another coupling site (or coupling location) for positioning or trapping another quantum emitter (e.g., another atom or another alkali atom) nearby the other resonator. In some examples, circuitry layout portion may be defined to pattern one or more of: a waveguide or an input/output channel for carrying light, one or more photons, lasers, or beams; a (photonic) delay line, and one or more optical elements (e.g., linear optics elements or optical switches) for performing various functions involved in directing or transporting one or more photons, controlling a flow of one or more photons, manipulating states of the one or more photons, and/or performing quantum computations. In some examples, a controller layout portion is defined to pattern a controller (e.g., processor(s)) for controlling (e.g., directing or switching between different waveguides) flow of input and output photons between photon generator(s) and entangling gate(s) or SWAP gate(s)(or flow of input and output photonic qubits between qubit (generator(s) and entangling gate(s) or SWAP gate(s)), wherein the controller may comprise one or more processor and a memory, a circuit component, or circuitry for performing the controlling.

The following paragraphs provide definitions of, and examples associated with, terminology employed in this disclosure. It is to be understood that where a feature is described functionally using these terms, that feature may be replaced with another feature sharing equivalent functionality. Embodiments and examples described herein may refer to following.

Some embodiments involve a graph state. A graph refers to a graph state. A graph state represents a relationship between a group of qubits, a qubit being a basic unit of quantum information. The group of qubits, for example, may be entangled. The relationship between a group of qubits may be entanglement relationship. For example, a qubit can be stored in (or belong to) a two-state quantum mechanical system, such as photons, atoms, and quantum emitters. For example, a graph state may include a representation of a composite quantum system. The composite quantum system may include multiple quantum subsystems. Each such subsystem may be represented by a node or a vertex of a graph, and an entanglement or interaction between a pair of subsystems can be represented by an edge connecting the pair of corresponding vertices. Graph state examples include: a photonic graph state; a cluster state, whose graph is a connected subset of a d-dimensional lattice; or a Greenberger-Home-Zeilinger state (GHZ state), whose graph is a multitude of vertices exclusively connected to a central vertex.

By way of non-limiting example, FIG. 6 and FIG. 7 illustrate a method and an apparatus for sourcing a photonic graph state (e.g. n photons shown in step 609).

Some embodiments involve a photonic state. A photonic state refers to a condition or a configuration of one or more photons. For example, a photonic state may include a quantum state associated with degrees of freedom of one or more photons. Examples of a photonic state include a single photon state, wherein the state corresponds to the presence of exactly one photon within a specified mode. By way of non-limiting example, FIG. 4B and FIG. 5B illustrate a time sequential series 412 of single photonic states.

Some embodiments involve a photonic graph state. A photonic graph state refers to a graph state, as described earlier, applied to photons. For example, a photonic graph state includes a photonic condition where vertices are representative of photonic states. Photonic graph state examples include: a graph state where each vertex corresponds to a single-photon qubit, wherein the qubit describes the path of a single photon, the polarization of the single photon, the time-bin of the single photon, or the frequency of the single photon; or a graph state where each vertex corresponds to a continuous-variable photonic qubit, wherein the qubit is representative of a pair of orthogonal superposition states of photon-number states.

The graph state of FIG. 6 and FIG. 7 as described herein, is one non-limiting example of a photonic graph state.

Some embodiments involve a photonic qubit. A photonic qubit refers to a basic unit of quantum information stored in (or belonging to) one or more photons or electromagnetic field. For example, a photonic qubit includes a quantum bit encoded in a degree of freedom associated with a propagating or stationary mode of the electromagnetic field. Examples of a photonic qubit include a qubit encoded in the polarization, number of photons, phase, time bin, frequency, or position of an electromagnetic field. The electromagnetic field can be a propagating mode in a photonic waveguide, in vacuum, or a mode confined to an electromagnetic resonator.

Some embodiments involve a quantum emitter. A quantum emitter refers to a component configured to couple to electromagnetic modes. For example, a quantum emitter includes a stationary quantum system with an an harmonic spectrum, configured to couple to electromagnetic modes. In other words, a quantum emitter may be a stationary qubit capable of interacting with photons. A stationary qubit may refer to a material quantum system usable in storing and processing quantum information. For example, a stationary qubit may refer to a qubit operable to (or satisfies the conditions of). (i) store quantum information reliably on a nanosecond or greater timescale, (ii) reliably perform calculations and/or operations, including operations that may move or convert the information to a flying qubit (e.g., a non-stationary qubit, or a photon), (iii) be reliably measured or read out, and/or (iv) be highly entangled. Examples of stationary qubits may include a qubit stored in, or belonging to, a quantum emitter. For example, qubits stored in, or belonging to, a rubidium or cesium atom may serve as a source of a stationary qubit. For example, qubits stored in, or belonging to, a francium atom may serve as a source of a stationary qubit. A Rydberg atom, for example, may also serve as a source of a stationary qubit. Use of a Rydberg atom may lead properties which are beneficial to quantum computing applications, for example, (i) strong response to electric and magnetic fields, (ii) long decay periods, and (iii) large electric dipole moments. A Rydberg atom may refer to an excited atom with one or more electrons that have a high principal quantum number, n. Examples of a quantum emitter include a quantum system having one or more of: an electronic or nuclear configuration of an ion or a neutral atom; an electronic or nuclear configuration of a defect or a quantum dot in a material substrate; or a configuration of a superconducting circuit containing one or more Josephson Junctions. A quantum emitter may be a superconducting qubit, a quantum dot, an atom, a neutral atom, an ion, a rubidium atom, a cesium atom, a lithium, sodium, potassium atom, a francium atom, Strontium, Erbium, Ytterbium, Calcium, Barium, Beryllium, or Magnesium atom. The atom or the ion may be sourced from a Rydberg atom. A superconducting qubit may refer to a solid-state qubit sourced from a superconducting material, such as aluminum or a niobium-titanium alloy. Superconducting qubits may contain or be coupled to at least one Josephson junction. Examples of a superconducting qubit may include a charge qubit, a flux qubit, a phase qubit, and/or a hybrid thereof (e.g., a transmon). A quantum dot may refer to a quantum emitter having a substrate (e.g., a solid-state substrate such as a semiconductor particle) having optical and/or electronic properties exhibiting quantum mechanics principles, as described earlier. For example, a quantum dot may be a nanoparticle having optical and electronic properties that differ from its bulk constituent. In the presence of high energy photons (e.g., UV light), an electron in the quantum dot may excited to a high energy state and emit one or more photons when transitioning to a ground state. For example, quantum dots may be manufactured from one or more binary compounds such as lead sulfide, lead selenide, cadmium selenide, cadmium sulfide, cadmium telluride, indium arsenide, or indium phosphide. For example, quantum dots may be self-assembled from Indium Arsenide in a Gallium Arsenide substrate. For example, quantum dots may refer to atomic defects in a solid state substrate such as the nitrogen vacancy center in diamond. The atom 102 shown in FIG. 1 and FIG. 3, the atom 402 in FIG. 4A and FIG. 4B, the atom 502 in FIG. 5A and FIG. 5B, the Rubidium ($^{87}$Rb) atom 820 in FIG. 8 through FIG. 9C, and the one or more atoms 1020 in FIG. 10 are non-limiting examples of a quantum emitter.

Some embodiments involve a fluctuating quantum emitter. A fluctuating emitter refers to a quantum emitter whose physical situation or property fluctuates over time (at least temporally). For example, a quantum emitter may be fluctuating because its resonance frequency changes over time due to stray magnetic or electric fields. For example, a fluctuating emitter includes a quantum emitter whose transition frequencies may fluctuate in time (temporally) due to environmental noise. Examples of a fluctuating quantum emitter include: an atom whose transition frequencies fluctuate due to a time-varying magnetic field, electric field, or photonic trapping field, or a quantum dot whose transition frequencies fluctuate due to stochastic charges or spins in the surrounding solid-state lattice.

Some embodiments involve a state of a quantum emitter qubit. A state of a quantum emitter qubit refers to a condition or a configuration of the quantum emitter. For example, a state of a quantum emitter includes a configuration of a quantum emitter corresponding to a superposition of eigenstates of the Hamiltonian describing the quantum emitter. Examples of a state of a quantum emitter qubit include a ground state of a quantum emitter, corresponding to a lowest-energy eigenstate.

Figure 8:
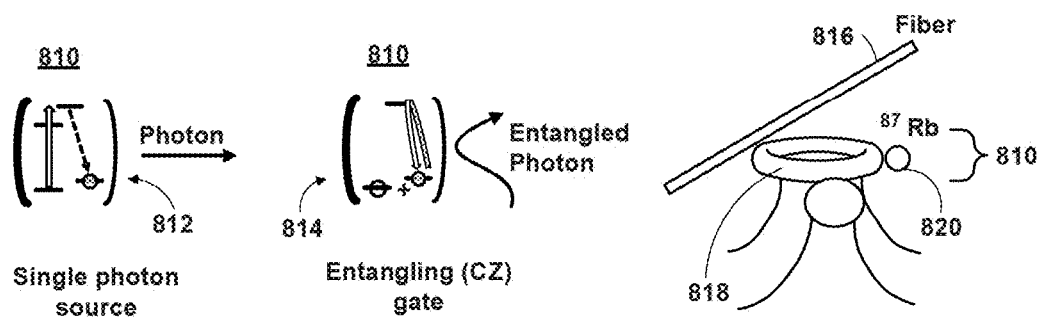
FIG. 8 schematically illustrates an atom coupled to a cavity consistent with some embodiments of the present disclosure.

Some embodiments involve a cavity or a resonator. A cavity may function as a resonator, and a resonator refers to a component that establishes or supports oscillations and/or normal modes. The oscillations, for example, may be resonant oscillations of a discrete set of normal modes at an associated discrete set of resonant frequencies. For example, a resonator may be capable of confining electromagnetic fields in electromagnetic modes having particular frequencies of oscillation. For example, a cavity or a resonator includes an electromagnetic resonator configured to confine an electromagnetic field in space and time. The cavity or the resonator may support a discrete set of electromagnetic modes, each associated with a specific resonance frequency and lifetime of the confined field. Examples of a cavity or a resonator include: a photonic cavity; an optical cavity; a whispering gallery mode cavity; a Fabry-Perot cavity; or a ring cavity. A typical cavity can be an optical cavity or a microwave cavity. The optical cavity 103 in FIG. 1 and FIG. 3, and the cavity 818 in FIG. 8 through FIG. 9C are non-limiting examples of a resonator.

Some embodiments involve a quantum emitter coupled to a resonator (or a resonator-coupled quantum emitter). A quantum emitter coupled to a resonator (or a resonator-coupled quantum emitter) refers to a quantum emitter that is enabled to interact with a resonator. For example, a quantum emitter coupled to a resonator (or a resonator-coupled quantum emitter) may include a quantum emitter arranged to interact with an electromagnetic field confined by a resonator, which may be a component or group of components configured to confine electromagnetic field in space and time. The component or group of components may support a discrete set of electromagnetic modes, each associated with a specific resonance frequency and lifetime of the confined field. Such a quantum emitter coupled to a resonator (or a resonator-coupled quantum emitter) may also be referred to as a quantum emitter coupled to a cavity, a quantum emitter coupled to a photonic cavity, or a quantum emitter coupled to an optical cavity, depending on which component functions as a resonator. So a quantum emitter coupled to a resonator (or a resonator-coupled quantum emitter) may include a quantum emitter whose dipole field overlaps with an electromagnetic mode of a resonator (e.g, a cavity, a photonic cavity, or an optical cavity).

For example, a quantum emitter (or an atom) disposed within an intra-cavity field of a cavity (or a photonic cavity or a resonator or an optical cavity) is a quantum emitter coupled to a cavity, (or a quantum emitter coupled to a photonic cavity, or a quantum emitter coupled to a resonator, or a quantum emitter coupled to an optical cavity). The atom 102 contained within an optical cavity 103 in FIG. 1, the Rubidium ($^{87}$Rb) atom 820 coupled to a cavity 818 in configuration 810 in FIG. 8, and the Rubidium ($^{87}$Rb) atom 820 coupled to a cavity 818 in FIG. 9A through FIG. 9C are non-limiting examples of a quantum emitter coupled to a resonator (or a resonator-coupled quantum emitter).

Some embodiments involve a coupling location or a coupling site. A coupling location or a couple site includes an area (e.g., a volume or a region) configured to enable coupling between a quantum emitter and a resonator (or a cavity or a photonic cavity or an optical cavity). For example, it may include an area that positions a quantum emitter within an intra-cavity field of a resonator (or a cavity or a photonic cavity or an optical cavity), or which enables a quantum emitter's dipole field to overlap with an electromagnetic mode of a resonator (or a cavity or a photonic cavity or an optical cavity).

Some embodiments involve quantum emitter positioning. Quantum emitter positioning refers to arranging or locating a quantum emitter to enable interaction between the quantum emitter and a body (e.g., a structure or a component such as a resonator or a cavity or photonic cavity or an optical cavity or an optical resonator or a waveguide). Examples of such quantum emitter positioning include one or more of: arranging a quantum emitter to be located at a coupling location or at a coupling site (e.g. positioning or locating a quantum emitter at a coupling location or at a coupling site); coupling a quantum emitter to a resonator (or a cavity or photonic cavity or an optical cavity or an optical resonator or a waveguide); disposing a quantum emitter within an intra-cavity field of a resonator (or a cavity or photonic cavity or an optical cavity or an optical resonator or a waveguide); trapping a quantum emitter in proximity of a resonator (or a cavity or photonic cavity or an optical cavity or an optical resonator or a waveguide); lithographically locating a quantum dot in proximity to a resonator (or a cavity or photonic cavity or an optical cavity or an optical resonator or a waveguide); or lithographically locating a resonator (or a cavity or photonic cavity or an optical cavity or an optical resonator or a waveguide) in proximity to a self-assembled quantum dot.

Some embodiments involve trapping a quantum emitter (e.g., an atom or an alkali atom). Trapping a quantum emitter refers to generating a trap which keeps the quantum emitter within a coupling location. For example, trapping a quantum emitter may involve confining the spatial degree of freedom of the quantum emitter (or the atom or the alkali atom) using a configuration of electromagnetic fields. Examples of trapping a quantum emitter (or an atom or an alkali atom) include: trapping an ion using electrical fields and radio frequency (or microwave) fields; trapping an atom using a magneto-optical trap (MOT) configuration; or trapping an atom using off-resonant laser beams (atomic tweezers). By way of non-limiting example, FIG. 9A illustrates a utility waveguide 910 for carrying a pulse or a field for generating a trap, and FIG. 10 illustrates a Magneto-optical trap (MOT) for trapping one or more atoms 1020. The pulse or the field in FIG. 9A is configured to trap the Rb atom 820 at a coupling location, e.g. next to the cavity 818 (or the resonator or the ring shape in the figure). This pulse or field may be configured to generate and/or contain an evanescent field around the waveguide 910 so that evanescent field trapping can be used to keep the Rb atom 820 at, or within, the coupling location. The Magneto-optical trap in FIG. 10 is configured to trap the one or more atoms 1020 at, or within, a coupling location.

Some embodiments involve being in proximity to a photonic cavity (or a cavity or a resonator or an optical cavity or an optical resonator). Being in proximity to a photonic cavity (or a cavity or a resonator or an optical cavity or an optical resonator) refers to being within an electromagnetic mode of a photonic cavity (or a cavity or a resonator or an optical cavity or an optical resonator). Examples of being in proximity to a photonic cavity (or a cavity or a resonator or an optical cavity or an optical resonator) include being: between two reflective surfaces of a Fabry-Perot cavity; within, or at, a coupling location or coupling site as described earlier; within an intra-cavity field of a resonator (or a cavity or a photonic cavity or an optical cavity or an optical resonator) as described earlier; within, or at, a coupling location or coupling site, enabling a quantum emitter's dipole field to overlap with an electromagnetic mode of a resonator (or a cavity or a photonic cavity or an optical cavity or an optical resonator) as described earlier; and/or within the evanescent field of a whispering gallery cavity or a whispering-gallery mode (optical) resonator as described herein.

Some embodiments involve coupling a photonic qubit to a quantum emitter, or coupling a qubit to an atomic qubit. Coupling a (photonic) qubit to a quantum emitter (an atomic qubit) refers to enabling interaction between the qubit (the qubit of one or more photons) and qubit of the quantum emitter (the atomic qubit, i.e., qubit of the atom when the atom is functioning as the quantum emitter). For example, coupling a (photonic) qubit to a quantum emitter (an atomic qubit) may include enabling an interaction between a qubit (or a photonic qubit) and a quantum emitter (or an atomic qubit) by creating an overlap between the dipole field of the quantum emitter (or the atom) and the electromagnetic field of the qubit (or the photonic qubit) as described earlier.

Some embodiments involve a superconducting qubit, e.g., provided in place of a qubit of a quantum emitter described herein. A superconducting qubit refers to a qubit stored in or belonging to a superconducting electronic circuit (e.g., a network of electrical elements using superconductors). For example, a superconducting qubit may include an electrical circuit from superconducting material containing or coupled to one or more Josephson Junctions. Examples of a superconducting qubit include: a superconducting transmon qubit; a superconducting fluxonium qubit; or a superconducting bosonic qubit.

Some embodiments involve a quantum emitter including a quantum dot. A quantum emitter including a quantum dot may refer to a quantum emitter having a substrate (e.g., a solid state substrate such as a semiconductor particle) having optical and/or electronic properties exhibiting quantum mechanics principles. For example, a quantum dot may be formed from nanoscale semiconductor materials arranged to tightly confine either electrons or electron holes. For example, a quantum emitter including a quantum dot may include a stationary quantum system with an anharmonic spectrum, configured to couple to an electromagnetic degree of freedom, w % herein the quantum system includes a spatially defined region within a solid-state substrate for confining charge carriers within that substrate in all three dimensions. Examples of a quantum emitter including a quantum dot include: a gate-defined quantum dot, wherein the spatial region is defined by electric fields controlled by electrodes; or a self-assembled quantum dot, wherein the spatial region consists of a material with a smaller band-gap than the surrounding region. For example, quantum dots may be self-assembled from Indium Arsenide in a Gallium Arsenide substrate. Quantum dots, for example, may refer to atomic defects in a solid state substrate such as the nitrogen vacancy center in diamond.

Some embodiments involve photon-quantum emitter entanglement. Photon-quantum emitter entanglement refers to a condition where state(s) of one or more photons are linked with state(s) of one or more quantum emitters. For example, the states(s) of the one or more photons may be related to the state(s) of the one or more quantum emitters in such a way that those state(s) cannot be described independently of each other. This entanglement produces, for example, a correlation between measurements of those states, correlating a measurement of the state(s) of the one or more photons to a measurement of the state(s) of the one or more quantum emitters, whereby mutual information may be stored or processed using this correlation. For example, photon-quantum emitter entanglement may include an inseparate (non-separable) state of a composite quantum system composed of at least one photon and at least one quantum emitter, wherein the at least one quantum emitter is entangled with the photonic state (e.g. the photonic state of the at least one photon). By way of a non-limiting examples, FIG. 3 illustrates an entanglement between the atom 102 and photon 302 with a double line 310.

Some embodiments involve an entangling gate. As used herein, the term "entangling gate" refers to any component, group of components, control sequence, or operations (reversible or irreversible) that cause any degree of entanglement between quantum elements (e.g., any quantum particles, group of quantum particles, or qubits). For example, an entangling gate may include a quantum circuit configured to entangle qubits. For example, a quantum emitter coupled to a resonator (or a cavity, a photonic cavity, or an optical cavity) described earlier may be capable of functioning as an entangling gate. An entangling gate or operation may involve sending a single photon through a beam-splitter to two resonator-coupled quantum emitters. Further mapping the two quantum emitters qubits into photonic qubits may generate a three-photon entangled state (i.e., a Greenberger-Home-Zeilinger state). Examples of an entangling gate include: a controlled-Z entangling gate (CZ gate); a controlled NOT entangling gate (CNOT gate); a square root of a SWAP entangling gate; or an imaginary SWAP entangling gate (iSWAP gate).

By way of non-limiting examples. FIG. 8 and FIG. 9C illustrate the Rubidium ($^{87}$Rb) atom 820 coupled to a cavity 818 in configuration 810 in FIG. 8 and the Rubidium ($^{87}$Rb) atom 820 coupled to a cavity 818 in FIG. 9C being implemented as an entangling (CZ) gate, and FIG. 5A through FIG. 5B illustrate entanglement unit 501 (including an entanglement unit atom 502) being implemented as an entangling gate.

A controlled-Z gate (CZ gate) refers to a quantum gate operable on two qubits, such that their combined quantum state acquires a conditional phase shift (e.g., a phase shift of pi). For example, the combined quantum state of the two qubits may acquire the phase shift of pi when both qubits are in a state associated with the logical 1, and no phase shift otherwise. By way of non-limiting examples, FIG. 3 illustrates a controlled-Z gate implementation, and FIG. 8 and FIG. 9C illustrate the Rubidium ($^{87}$Rb) atom 820 coupled to a cavity 818 in configuration 810 being implemented as an entangling (CZ) gate.

A SWAP gate refers to a quantum gate operable on two qubits, such that a quantum state of a first qubit is transferred to a second qubit, and a quantum state of the second qubit is transferred to the first qubit. For example, when the two qubits are represented by quantum systems A and B, such that the quantum state of A is transferred to B, and the quantum state of B is transferred to A. By way of a non-limiting example, FIG. 2E illustrates a SWAP gate 201 performing "read" and "write" operations of a qubit on an atom 102. A SWAP gate operation may be based on a single-photon Raman interaction (SPRINT) mechanism described in Bechler O. et, al. "A passive photon-atom qubit swap operation" *Nature Physics* 14, 996-1000 (2018), Rosenblum S. et, al. "Extraction of a single photon from an optical pulse" *Nature Photonics* 10, 19-22 (2016) and Shomroni, I. et al. "All-optical routing of single photons by a one-atom switch controlled by a single photon" *Science* 345.6199, 903-906 (2014), the entire content and single photon extraction and SPRINT mechanism related contents of which are incorporated herein by reference.

Figure 15A:
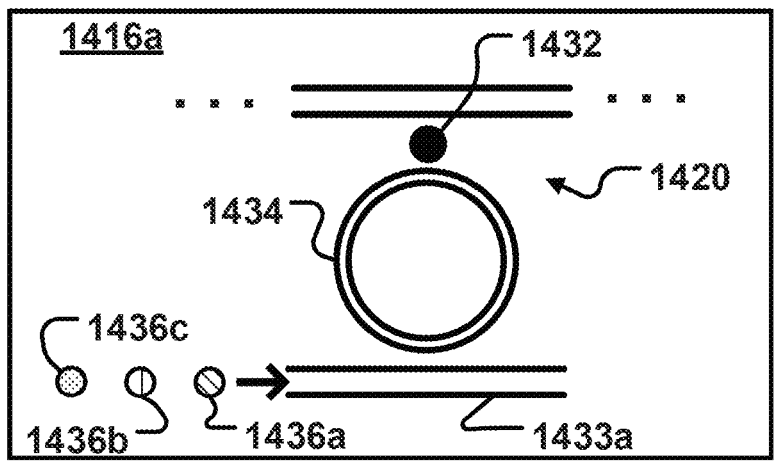
FIG. 15(A) to FIG. 15(C) schematically illustrates a single-photon Raman interaction (SPRINT) mechanism using a quantum emitter coupled to a resonator (or a cavity) according to some embodiments of the present disclosure.
Figure 15B:
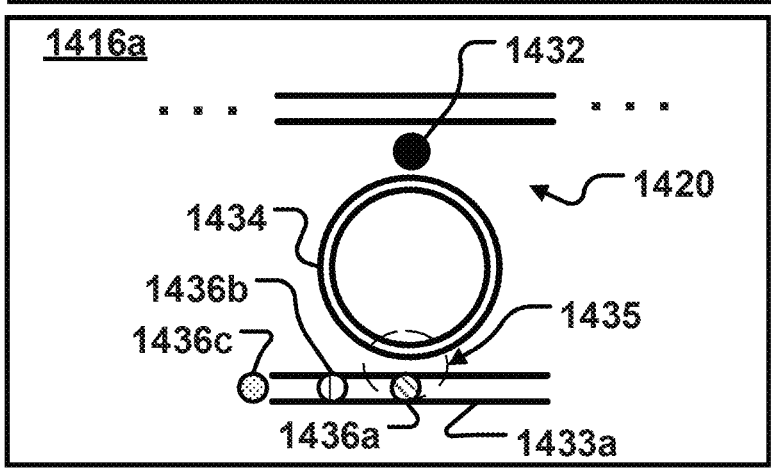
Figure 15C:
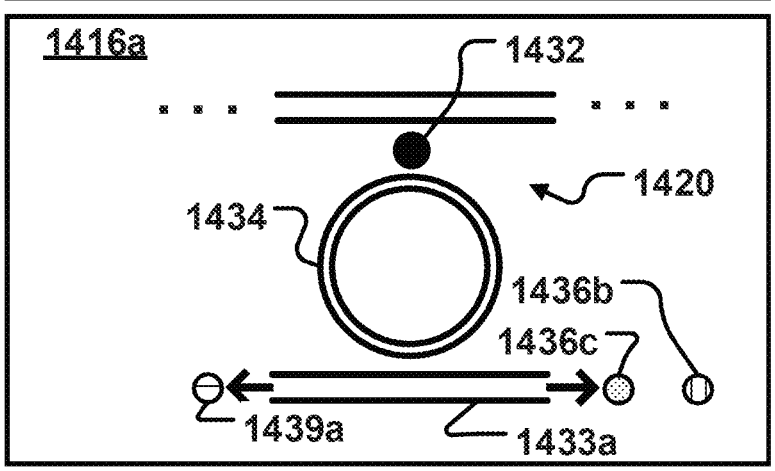

For example, quantum emitter 1432 is coupled to cavity 1434 at a coupling location (or coupling site) 1420 as shown in FIG. 15 (A). Two transitions in a multi-level quantum emitter (quantum emitter 1432 or e.g., a single atom such as Rb atom having at least two ground states and at least one exited state) are coupled via cavity 1434 (e.g., a resonator or a micro-resonator) to different directions of waveguide 1433a. The arrangement of quantum emitter 1432, cavity 1434, and waveguide 1433a is such that light or a photon being carried in waveguide 1433a is evanescently coupled into cavity 1434 by waveguide 1433a. Here, being evanescently coupled refers to being able to interact or transfer through an evanescent field around a waveguide. When a pulse including a plurality of photons (e.g, a coherent laser pulse including a plurality of photons 1436a, 1436b, 1436c as shown in FIG. 15 (A)) is introduced into waveguide 1443a, the first photon of the pulse in the waveguide coming from one direction then interacts with the quantum emitter via its coupled cavity through its evanescent coupling, for example first photon 1436a of the coherent laser pulse in waveguide 1433a interacts with quantum emitter 1432 via cavity 1434 through its evanescent coupling 1435 as shown in FIG. 15 (B). This interaction causes the first photon of the pulse coming from this direction to be deterministically reflected due to destructive interference in the transmission, for example first photon 1436a of the coherent laser pulse is deterministically reflected as illustrated by reflected photon 1439a shown in FIG. 15 (C). This interaction between first photon 1436a and quantum emitter 1432 is analogous to mapping a quantum emitter qubit to a photonic qubit as described herein in relation to the disclosed embodiments, e.g. with reference to a SWAP gate 201 from FIG. 2E. This interaction results in Raman transfer of quantum emitter 1432 from a ground state to another ground state, and quantum emitter 1432 becomes transparent to subsequent photons from that direction (e.g., second photon 1436b and third photon 1436c from the coherent laser pulse). In other words, as shown in FIG. 15 (C), the subsequent photons (e.g., second photon 1436b and third photon 1436c from the coherent laser pulse) are just transmitted to the other end of waveguide 1433a. As the subsequent photons of the coherent laser pulse are just transmitted, the first photon of the coherent laser pulse to interact with the cavity-coupled quantum emitter is extracted as a reflected photon, while the rest of the photons of the coherent laser pulse carries on as if unaffected. Thus, the mapped photon from this SPRINT mechanism is the first photon of an input pulse that interacted with the cavity-coupled quantum emitter for the first time, and hence reflected to be output in the direction it first came from. FIG. 15(A) to FIG. 15(C) illustrate this SPRINT mechanism.

By way of a non-limiting example, this SPRINT mechanism may be used in a qubit generator or a photon generator according to some disclosed embodiments. For example, when the plurality of photons 1436a, 1436b, 1436c are included in a coherent laser pulse introduced into waveguide 1433a, the mapped photon from this SPRINT mechanism is first photon 1436a of the coherent laser pulse that interacted with the resonator-coupled quantum emitter for the first time, and this first photon 1436a is extracted as reflected photon 1439a, which is then output as a single photon. This enables the qubit generator or the photon generator to function as a single photon source configured to provide single photons. By way of another non-limiting example, reflected photon 1439a may then serve as a photonic qubit to which a state of the quantum emitter qubit of quantum emitter 1432 coupled to resonator 1434 can be mapped. Therefore, a SPRINT mechanism-based resonator-coupled quantum emitter can be used to in a SWAP gate. By way of another non-limiting example, reflected photon 1439a may serve as a dirty photon which is generated by extraction from the coherent laser pulse using quantum emitter 1432 coupled to cavity 1434. Therefore, a SPRINT mechanism-based cavity-coupled quantum emitter can be used to extract a dirty photon from a coherent laser pulse.

Some disclosed embodiments involve generating entangled photonic qubits or photonic graph states using one or more interactions of photonic qubits with quantum emitters, each quantum emitter being coupled to a cavity (or a resonator). Such embodiments may involve using resonators for entanglement or a quantum computing method for generating photonic graph states. In such resonators or a quantum computing method, a plurality of quantum emitters may be positioned at a plurality of coupling sites associated with a plurality of different cavities (e.g., cavities functioning as a resonator such as photonic cavities or optical cavities, whispering gallery mode cavities, Fabry-Perot cavities, or ring-shaped cavities). By way of a non-limiting example, a state of a quantum emitter qubit associated with each of the plurality of quantum emitters may be initialized so that the quantum emitter is configured to perform a specific function when entangling the photonic qubits or when generating photonic graph states. This initializing refers to setting a baseline condition for the quantum emitter coupled to a cavity (also referred to as a cavity-coupled quantum emitter). For example, initializing may include establishing an inceptive tuned state system for the cavity-coupled quantum emitter. The inceptive tuned state system, for example, may refer to the cavity-coupled quantum emitter being in a particular state or a superposition state of states. For example, such initializing may involve using a laser or applying a magnetic field on the quantum emitter. Photonic qubits may then be transmitted toward the plurality of the quantum emitters in at least a first instance, to generate an entangling gate (e.g., a controlled-Z-quantum gate or CZ gate) between the photonic qubits and the quantum emitter qubit. By way of a non-limiting example, the entangling gate may be implemented according to the techniques described herein with respect to FIG. 3, FIG. 5A-FIG. 5B, and FIG. 9C. Following the at least one of the first instance transmissions, photonic qubits may be transmitted toward the plurality of quantum emitters in at least one second instance transmission for generating a SWAP gate between the photonic qubits and the quantum emitter qubits, and which may serve to map the quantum emitter qubits to photonic qubits. By way of a non-limiting example, the SWAP gate may be implemented according to the techniques described herein with respect to FIG. 2E. For example, the entangling gate of FIG. 3 may be performed multiple times (e.g., n times to entangle n photonic qubits to a quantum emitter qubit as described with reference to FIG. 6), followed by the SWAP gate of FIG. 2E (e.g., to disentangle the quantum emitter qubit from the entangled photonic qubits), to generate a photonic graph state (e.g., of the entangled photonic qubits, wherein the quantum emitter qubit is no longer entangled with those entangled photonic qubits).

By way of a non-limiting example, multiple configurations, each including at least a quantum emitter coupled to a cavity (or a resonator) at a coupling site, may be provided. Each configuration may be initialized to operate in one of multiple operation modes of use. e.g., an entanglement mode whereby one or more photonic qubits may be entangled with a quantum emitter qubit associated with the quantum emitter, and a SWAP mode whereby a state of the quantum emitter qubit is swapped with a state of a photonic qubit, thereby disentangling the quantum emitter qubit from the entangled photonic qubits. In an example, as the SWAP mode involves swapping qubit states, an initializing pulse of one or more photons (which have a particular desired state) may be used on a cavity-coupled quantum emitter (or a resonator-coupled quantum emitter) operating in the SWAP mode to initialize the cavity-coupled quantum emitter (or a resonator-coupled quantum emitter). By combining these configurations of different operation modes into a particular sequence, a quantum computing method is able to generate a plurality of entangled photonic qubits or a photonic graph state as an output. For example, a cavity-coupled quantum emitter (or a resonator-coupled quantum emitter) may be initialized by operating it in a SWAP mode and interacting it with an initializing pulse. Then a plurality of photons may be introduced to interact with the initialized cavity-coupled quantum emitter (or the initialized resonator-coupled quantum emitter) operating in the entanglement mode to entangle the photons with the cavity-coupled quantum emitter (or the resonator-coupled quantum emitter). This cavity coupled quantum emitter (or this resonator coupled quantum emitter) may then be operated in a SWAP mode again with a photon from another pulse swapping its state with the cavity-coupled quantum emitter (or the resonator-coupled quantum emitter), thereby disentangling the cavity-coupled quantum emitter (or the resonator-coupled quantum emitter) from the entangled photons. This then results in a plurality of entangled photonic qubits or a photonic graph state of entangled photons. By way of non-limiting example, FIG. 6 illustrates such a process.

Some embodiments involve mapping a quantum emitter qubit to a photonic qubit. Mapping a quantum emitter qubit to a photonic qubit refers to transferring a quantum emitter qubit to a photonic qubit. For example, such mapping may include transferring quantum information stored in a qubit of a quantum emitter to a qubit of one or more photons. In one example, mapping a quantum emitter qubit to a photonic qubit may be a consequence of performing a SWAP gate operation on a quantum emitter qubit and a photonic qubit as described earlier. For example, feeding a photon at a frequency corresponding to a frequency of a particular transition of a resonator-coupled quantum emitter may map a state of a resonator-coupled quantum emitter onto a photon. By way of a non-limiting example, FIG. 2E illustrates mapping using a SWAP gate 201 so that the atom 102's (which is a non-limiting example of a quantum emitter) initial superposition state of the first and second ground states 111, 113 with probability amplitudes γ and δ is transferred to outgoing photon 204 (as shown with its superposition state of modes 1 and 2 with probability amplitudes δ and γ), and the incoming photon 202's superposition of photonic modes 1 and 2 with probability amplitudes α and β is transferred to the atom 102 (as shown with the atom 102 being left in a superposition state of the first and second ground states 111, 113 with probability amplitudes β and α).

Some embodiments involve a photonic chip or a photonic integrated circuit. A photonic chip or a photonic integrated circuit refers to a device integrating elements or components that operate at optical or infrared wavelengths. For example, such a device may be microfabricated. The microfabrication process may involve a lithography as described earlier. Examples of a photonic chip include a chip incorporating one or more of the following: integrated lasers; channels or waveguides for carrying lasers, pulse of photons and/or one or more single photons; waveguides; switches; phase modulators; resonators; interferometers; beam splitters; photonic amplifiers; nonlinear waveguides; nonlinear resonators; amplitude modulators; integrated magnetic field generator such as a solenoid; detectors; and one or more controllers (or circuitry) configured to control or receive output from any one or more of the above elements or components of the chip.

Some embodiments involve an atomic dispenser or an atom source. An atomic dispenser or an atom source refers to component or group of components arranged to provide one or more atoms. An atomic dispenser is a non-limiting example of a quantum emitter dispenser arranged to dispense (or provide) one or more quantum emitters. For example, an atomic dispenser may include a source of atoms for creating an atomic vapor within a chamber. The chamber may typically include a vacuum chamber. Examples of an atomic dispenser include a source configured to be resistively heated to dispense or provide atoms. The dispensed atoms can be one or more of, among others, Cesium, Potassium, Sodium, Rubidium, Francium, and Lithium, for example.

Some embodiments involve a jet of atoms. A jet of atoms refers to a stream or beam of atomic vapor. The stream or beam of atomic vapor may be provided by, or dispensed by, an atomic dispenser described earlier. For example, a jet of atoms may include a directional beam including hot atomic vapor emerging from an atomic dispenser.

Some embodiments involve cooling a jet of atoms. Cooling a jet of atoms refers to cooling (or reducing) motion and/or speed of motion of atoms in the jet. For example, cooling a jet of atoms may include cooling the motional degrees of freedom of atoms in the jet.

Some embodiments involve a cavity (or a resonator) formed within the silicon nitride layer. For example, a cavity (or a resonator), as defined herein, formed within the silicon nitride layer may involve a planar layer incorporating a connected region including silicon nitride. The connected region may be embedded in a different material whose index of refraction is lower than that of silicon nitride. A cavity (or a resonator) formed within the silicon nitride layer may be formed in a silicon nitride region surrounded by silica, wherein the silicon-nitride region may include a straight or curvilinear line, or the silicon-nitride region may include a ring. By way of non-limiting examples, the optical cavity 103 in FIG. 1 and FIG. 3, the cavity 818 in FIG. 8 through FIG. 9C, and silicon nitride resonators 1602A, 1602B, 1612A, 1612B in FIG. 16A through FIG. 16F may be formed in a silicon nitride region.

Some embodiments involve a dirty photon. A dirty photon refers to a photon that is distinguishable from another photon, for example when performing quantum computation. A dirty photon may include, for example, a propagating (itinerant) photon in a mixed state of multiple spatio-temporal modes, e.g. of multiple temporal profiles. Entangling photons through a cavity-enhanced atom-photon interaction (e.g., using a quantum emitter coupled to a resonator or a resonator-coupled quantum emitter described earlier) enables use of such dirty photons in quantum computation operations. This is because entangling photons through a cavity-enhanced atom-photon interaction (e.g., using a quantum emitter coupled to a resonator or a resonator-coupled quantum emitter described earlier) does not require use of indistinguishable photons (clean photons), which would otherwise have been the case for probabilistic entanglement with linear optics. For example, this means an input photon pulse (e.g., the pulse 404 in FIG. 4A) does not have to be precisely timed and shaped. Single photons produced according to some disclosed embodiments described herein (e.g., produced by a photon generator or a qubit generator described herein) are perfectly suitable for qubit entanglement using a quantum emitter coupled to a resonator or a resonator-coupled quantum emitter described herein even when the photons exhibit irregularities that make them readily distinguishable.

Some embodiments involve a temporal profile. A temporal profile refers to a temporal envelope of a field of a propagating photon. Examples of a temporal profile include: an exponentially decreasing or increasing profile with a certain decay time and initial time; a constant profile with a certain initial time and final time; or a gaussian profile with specific average time and temporal variance.

Some embodiments involve a photonic delay line. A photonic delay line refers to a component or group of components arranged to introduce a time delay for a pulse of one or more photons or a light beam. For example, a photonic delay line may include a photonic setup incorporating a photonic waveguide serving to delay the arrival time of an incoming pulse with respect to a pulse not entering the photonic waveguide. An optical delay line, which may make use of the visible segment of the electromagnetic spectrum, is an example of a photonic delay line. An optical delay line can have a fixed or tunable delay. The (photonic or optical) delay line can be controlled by a (optical) switch determining whether an optical pulse passes through the delay line or not. For example, the (photonic or optical) delay line may be implemented in free space, in fibers, or in on-chip waveguides.

Some embodiments involve manipulating an alkali atom or an atom (or manipulating a quantum emitter). Manipulating an alkali atom or an atom (or manipulating a quantum emitter) refers to controlling an external or internal state (e.g., a condition or a configuration) of the alkali atom or the atom (or the quantum emitter). For example, the internal state may correspond to an electronic configuration, nuclear configuration or a combination thereof. The external state, for example, may correspond to the motion of an alkali atom or an atom in a coupling location.

Some embodiments involve cooling an alkali atom or an atom (or cooling a quantum emitter). Cooling in this context refers to reducing motion and/or speed of an alkali atom or an atom (or a quantum emitter). For example, cooling an alkali atom or an atom (or cooling a quantum emitter) may impact the motional degrees of freedom of the alkali atom or the atom (or the quantum emitter).

The embodiments, clauses, claims, or examples, described herein relate to use of one or more cavities (e.g, a resonator or an optical resonator described herein) coupled with a quantum emitter (e.g, an ion, an atom, an alkali atom, or a quantum dot) for use in quantum computation, and their related system, device, apparatus, method, (non-transitory) computer readable media, or computer readable media. Such uses may be compatible with another embodiment described herein.

By way of non-limiting example, the coupled cavity and quantum emitter (or the cavity coupled quantum emitter or the coupled (optical) resonator and quantum emitter) described herein may be used in one of the example configuration of an atom and an optical cavity (or an (optical) resonator or a cavity QED) used in a device for a deterministic photonic graph state generator described herein, wherein the optical cavity (or the (optical) resonator) and the atom (or the quantum emitter) are arranged so that the coupling therebetween occurs at an atom trap or other particle trap (also referred to as a coupling location or a coupling site, or the location (the site) where an intra-cavity field of a source-optical cavity or an entanglement-optical cavity is present) of the example configuration. In an example of the configuration in the deterministic photonic graph state generator of the present disclosure, a cavity corresponds to an optical cavity 103 and a quantum emitter corresponds to an atom 102 shown in FIG. 1 and FIG. 3, an atom 402 in FIG. 4A and FIG. 4B, an atom 502 in FIG. 5A and FIG. 5B. In other non-limiting examples, a cavity corresponds to a cavity 818 in FIG. 8 through FIG. 9C, and a quantum emitter corresponds to a Rubidium ($^{87}$Rb) atom 820 in FIG. 8 through FIG. 9C, or one or more atoms 1020 in FIG. 10.

For example, the coupled cavity and quantum emitter (or the cavity coupled quantum emitter or the coupled (optical) resonator and quantum emitter) described herein may be used in one of the example configurations of a photonic cavity-coupled quantum emitter (or an (optical) resonator-coupled quantum emitter), e.g. in embodiments related to silicon nitride resonators used for qubit generation or entanglement, or in examples described in relation to any of FIG. 16A to FIG. 17C, FIG. 18A to FIG. 19, FIG. 20A to FIG. 21B, or FIG. 22A to FIG. 23D. In non-limiting examples, a cavity or a resonator corresponds to silicon nitride resonator 1602A, 1602B, 1612A, 1612B in FIG. 16A through FIG. 16F, whispering-gallery mode optical resonator 1902 in FIG. 19, resonator 2002 in FIG. 20B, or/and optical resonator 2302A, 2302B, 2302Y in FIG. 23A through FIG. 23D.

For example, the coupled cavity and quantum emitter (or the cavity coupled quantum emitter or an (optical) resonator-coupled quantum emitter) described herein may be used in one of the example configurations of a cavity-coupled quantum emitter, e.g. in embodiments shown in FIG. 15(A) to FIG. 15(C) (e.g, an example resonator 1434 and an example quantum emitter 1432 shown in FIG. 15(A) to FIG. 15(C)).

Use of micron-scale optical cavities (or resonators) in at least some of these non-limiting examples enables coupling a single photon (or alternatively, two or more photons) with a single atom, whereby that optical cavity (or resonator) coupled atom can be used as a qubit generator or a photon generator as shown in FIG. 8 to FIG. 9B or in FIG. 16C to FIG. 16F, or as the atom with which an input photon can establish an entangled state as shown in FIG. 8, FIG. 9A and FIG. 9C or in FIG. 16C to FIG. 16F.

For example, a Rubidium ($^{87}$Rb) atom coupled to a cavity 810 shown in FIG. 8 can be used with waveguides (e.g. formed using a fiber 816 or a nanofiber or an on-chip waveguide) to generate a photon ("single photon source" 812 or a "photon generator"), or to entangle a photon passing by ("entangling gate" 814, e.g, a controlled-Z gate (CZ gate)).

As illustrated by the example shown in FIG. 9A, the waveguide may include a utility waveguide 910 for carrying a pulse for generating a trap, which traps the Rb atom 820 at a coupling location. e.g., next to the cavity 818 (or the resonator or the ring shape in the figure). The pulse may be configured to generate an evanescent field around the waveguide 910 so that evanescent field trapping can be used to trap the Rb atom 820 at the coupling location. The parameters of the pulse for generating an evanescent field may be determined based on the particular arrangement of the Rb atom 820 (or any other quantum emitter used in its place), cavity 818, coupling location, and/or waveguides 816, 910, 930. The pulse may be configured so that it is capable of trapping cold atoms (Rb atoms 820 or quantum emitters) in the vicinity of an optical nanofiber (a waveguide 816). By way of non-limiting example, with an optical nanofiber having a diameter of around 400 nm, a large fraction of the fiber-guided light propagates in an evanescent field in the surrounding vacuum. An optical dipole trap can then be generated in this evanescent field when pulses having two wavelengths are injected in the guided mode of the nanofiber; The first pulse may be red detuned, being configured to pull atoms towards the nanofiber where its evanescent field is more intense. The second pulse may be blue detuned, being configured to provide a repulsive potential that prevents (or discourages) the atoms from crashing onto the surface of the nanofiber. The combination of the two contributions may lead to a potential minimum at the coupling location, for example located around 200 nm away from the surface of the nanofiber. In one embodiment, the red detuned pulse may have a wavelength of 850 nm (or for example, 980 nm) and the blue detuned pulse may have a wavelength of 690 nm (or for example, 720 nm). A detector 951 may be located at an end of the utility waveguide 910 for carrying the pulse for generating a trap so that the pulse may be detected at the detector 951 and an appropriate controlling of the pulse may be performed based on the measurements from the detector 951.

As illustrated by the example shown in FIG. 9A, the waveguides may also include a quantum waveguide 930 for outputting a photon. This output photon could be a photon generated by the Rb atom 820 (when the cavity QED is used as a photon source 812), or it could be an entangled photon which is in an entangled state with the Rb atom 820 (when the cavity QED is used as an entangling (CZ) gate 814 and a photon is input through, and carried by, the quantum waveguide 930). This facilitates a single photon generation, a CZ gate or an atomic state readout. A switch/router 970 may be positioned at an output channel side of the quantum waveguide 930 so that, when a measurement (or a detection) of an output photon is required, the output photon is directed to a detector 952 located at a branch of the quantum waveguide 930 that branches off from the quantum waveguide 930.

As illustrated by the atom 820 coupled to a cavity 818 configuration example shown in FIG. 9B, when the configuration is used for photon generation 812, a utility waveguide 910 may be connected to a pump laser input, carrying blue and red lasers for trapping the atom 820 at a coupling location between the waveguide 910 and the cavity 818 (resonator). Another waveguide (e.g., a quantum waveguide 930) may be provided within an interacting distance of the cavity 818 (resonator) so that the generated photon may be carried by the other waveguide.

As illustrated by the atom 820 coupled to a cavity 818 configuration example shown in FIG. 9C, when the configuration is used for an entangling (CZ) gate 814, a utility waveguide 910 may carry blue and red lasers for trapping the atom 820 at a coupling location between the waveguide 910 and the cavity 818 (resonator). Another waveguide (e.g., a quantum waveguide 930) may be provided within an interacting distance of the cavity 818 (resonator) so that one or more single photons may be carried therein, facilitating an interaction between the carried photon and the trapped atom 820 via the cavity 818 (resonator), whereby the interaction leads to the carried photon becoming entangled with the atom 820 and is then output as an entangled photon.

According to an embodiment of the present disclosure, a perforated vacuum chamber 1013 may be used in the example arrangement 1011 shown in FIG. 10, which includes a combination of one or more photonic chips 1015 with a cold atom source 1017 based Resource state generator (RSG), the combination forming part of a hybrid system 1011, wherein one or more lasers 1033 and a controller (or a control system 1031) provide input to the photonic chip 1015 for controlling its operations or a Magneto-optical trap (MOT) for trapping one or more atoms 1020 from the cold atom source 1017, and wherein photon detectors 1035 connected to the photonic chips 1015 detect photons in, or from, the photonic chips 1015, so that the photonic chips 1015 can be controlled to output a cluster state of photonic states 1041. For example, either or both of the controller (or the control system 1031) or/and the photonic chip 1015 may include circuitry, and/or at least one processor and at least one memory, wherein the circuitry and/or the at least one processor is configured to carry out some or all steps of a quantum computing method described herein according to some disclosed embodiment.

Some embodiments involve multiple photonic cavities, each photonic cavity being associated with a coupling location and a quantum emitter. A cavity refers to a structure, enclosure or container that may function as a resonator, which is a component for establishing or supporting oscillations, as described earlier. A photonic cavity may thus refer to a resonator (or a component) for establishing or supporting electromagnetic modes associated with photons. For example, the photonic cavity may correspond to a cavity in a cavity QED setup, an optical cavity, a whispering gallery mode cavity, or a Fabry-Perot cavity. A coupling location includes an area (e.g., a volume or a region) configured to enable coupling between a quantum emitter and a photonic cavity. For example, it may include an area that positions a quantum emitter within an intra-cavity field of a photonic cavity, or which enables a quantum emitter's dipole field to overlap with an electromagnetic mode of a photonic cavity, as described earlier. For example, when a quantum emitter is in a coupling location, this enables the quantum emitter to couple with a photonic cavity, whereby the quantum emitter interacts with the established or supported electromagnetic modes of the photonic cavity. A quantum emitter refers to a component configured to couple to electromagnetic modes, as described earlier. For example, a quantum emitter includes a stationary quantum system with an anharmonic spectrum, configured to couple to electromagnetic modes. In other words, a quantum emitter may be a stationary qubit capable of interacting with photons.

When a quantum emitter is coupled to a photonic cavity (also referred to as a photonic cavity-coupled quantum emitter) in its associated coupling location, the quantum emitter is coupled to electromagnetic modes of the photonic cavity. Thus the quantum emitter has its dipole field overlapping with an electromagnetic mode of the photonic cavity, and the photonic cavity-coupled quantum emitter may be configured to release or emit a photon when excited (e.g., functioning as a photon generator) or interact with a photon passing by the photonic cavity (e.g., functioning as an entangling gate for entangling photons). Therefore, by providing or having multiple photonic cavities, each photonic cavity being associated with a coupling location and a quantum emitter, it is possible to release or emit multiple photons, interact with multiple photons, or interact with a photon multiple times.

For example, multiple photonic cavity-coupled quantum emitters may be used as multiple photon generators. These photon generators may provide multiple single photons concurrently (e.g., in parallel). Multiple photonic cavity-coupled quantum emitters may be used as multiple entangling gates. These entangling gates may operate to entangle multiple photons concurrently (e.g., in parallel). Or multiple photonic cavity-coupled quantum emitters may be used as a combination of a photon generator and an entangling gate (e.g., as group of components comprising at least one photon generator and at least one entangling gate) to generate a photon and then interact with it. As described earlier, a photon generator refers to a source of individual photons, and an entangling gate refers to a component or group of components or a control sequence configured to entangle qubits, which in this case are qubits belonging to photons or photonic qubits. For example, an entangling gate may include a quantum circuit configured to entangle photonic qubits.

By way of non-limiting example, FIG. 4A and FIG. 4B illustrate source unit 401 (including a source unit atom 402 as quantum emitter) being implemented as a photon generator, FIG. 8 to FIG. 9B illustrate a Rubidium ($^{87}$Rb) atom 820 as a quantum emitter being coupled to a cavity 818 to function as a photon generator, FIG. 5A and FIG. 5B illustrate entanglement unit 501 (including an entanglement unit atom 502 as quantum emitter) being implemented as an entangling gate, and FIG. 8 and FIG. 9C illustrate a Rubidium ($^{87}$Rb) atom 820 as a quantum emitter being coupled to a cavity 818 to function as an entangling gate. By way of another non-limiting example, in embodiments related to silicon nitride resonators used for qubit generation, or those described in relation to any of FIG. 16A to FIG. 17C, one or more alkali atoms 1604A, 1604B are used as quantum emitters that are coupled to one or more silicon nitride resonators 1602A, 1602B so that they can function as qubit generator 1632A, 1632B. In examples described in relation to any of FIG. 18A to FIG. 19, FIG. 20A to FIG. 21B, or FIG. 22A to FIG. 23D, pairings of a (alkali) atom 1904, 2004, 2304A, 2304B, 2304Y and a (optical) resonator 1902, 2002, 2302A, 2302B, 2302Y are configurable to generate one or more photonic qubits, whereby it can function as a qubit generator.

In some embodiments, a quantum emitter may be configured to mediate interactions between consecutive incoming photonic qubits to facilitate entanglement of multiple photonic qubits and/or to generate a graph state. Mediating refers to facilitating, enabling, or otherwise promoting interactions. The interactions may transfer, communicate, associate, and/or establish a correlation between the incoming photonic qubits. For example, a resonator-coupled quantum emitter may facilitate an entanglement (e.g., an interaction) between incoming photons, the resonator-coupled quantum emitter being a means through which these interactions between incoming photons are achieved. Consecutive refers to being successive, or sequential, such as one coming after another in a time-sequence. A photonic qubit refers to a basic unit of quantum information stored in (or belonging to) one or more photons or electromagnetic field as described earlier. For example, a photonic qubit includes a quantum bit encoded in a degree of freedom associated with a propagating or stationary mode of the electromagnetic field. A photonic qubit may exhibit characteristics particular to quantum mechanical systems, such as superposition with respect to a degree of freedom (e.g., of one or both vertical and horizontal polarization states) and/or entanglement (e.g., between multiple photonic qubits or with quantum emitter qubits). Thus, the resonator-coupled quantum emitter facilitates interactions (e.g., entanglement) between incoming sequential photonic qubits through the quantum emitter to facilitate entanglement of multiple photonic qubits and/or generate the graph state.

For example, when used for an entangling gate, each quantum emitter (e.g., associated with one of the coupling locations and photonic cavities) mediates interactions between consecutive incoming photonic qubits, for example to facilitate entanglement and/or to generate a graph state (or multiple graph states) as an output. As described earlier, a graph state represents a relation between a group of qubits, a qubit being a basic unit of quantum information. The relation may, for example, refer to being entangled with each other. Thus, the generated graph state (or multiple graph states) from the consecutive incoming photonic qubits represents a relation between qubits that are stored in (or belonging to) output photons. A photon generator may be provided to supply photons toward each of the multiple photonic cavities, e.g., to enable the interactions between consecutive incoming photonic qubits via the quantum emitter. In some disclosed embodiments, the photon generator may include one or more photonic cavity-coupled quantum emitters configured to provide photons. Each of the multiple photonic cavities may facilitate the interaction between the photonic qubits and the associated quantum emitter. Multiple output channels may also be positioned downstream of the multiple photonic cavities to output a graph state after the interaction between the phonic qubits and the associated quantum emitter. For example, each photonic cavity may have an associated output channel for outputting a graph state. Alternatively, some or all of the multiple photonic cavities may share an output channel for outputting the graph state.

By way of another non-limiting example, in embodiments related to silicon nitride resonators used for entanglement, or those described in relation to any of FIG. 16A to FIG. 17C, one or more alkali atoms 1614A, 1614B are used as quantum emitters that are coupled to one or more silicon nitride resonators 1612A, 1612B so that they can function as entangling gate 1634A, 1634B. In examples described in relation to any of FIG. 18A to FIG. 19, FIG. 20A to FIG. 21B, or FIG. 22A to FIG. 23D, pairings of a (alkali) atom 1904, 2004, 2304A, 2304B, 2304Y and a (optical) resonator 1902, 2002, 2302A, 2302B, 2302Y are configurable to generate entanglement between input photons, whereby it can function as a entangling gate.

Quantum computation can involve exploiting entanglement between entangled states to perform certain quantum computation operations and/or algorithms. For example, in a photonic quantum computing system, an output from a source of entangled states, which are sometimes referred to as a Resource State Generator (RSG), is obtained via probabilistic schemes. This means performing quantum computation with, or production of, this type of output involves taking feedforward measurements (also referred to as "heralding") into account due to unpredictable or inconsistent input. Some embodiments described herein uses such heralding. Alternatively, some embodiments described herein are capable of outputting entangled states (e.g., a photonic graph state or a plurality of entangled photons) in a deterministic manner, i.e., of outputting predictable or consistent entangled states via deterministic schemes. This then removes the need for account for the feedforward (heralding) when performing quantum computation, for example when performing computation which involves generating photonic graphs. For example, some disclosed embodiments relate to use of heralding-free connections and a Resource State Generator that is capable of generating or outputting entangled states in a deterministic manner.

For example, in some embodiments, photonic quantum computation relies on linear optics to generate a graph, which requires one photon of a pair of photons to be "heralded" or measured to determine the state of the other photon. In such photonic quantum computation, heralding connections, such as optical delay lines or photonic delay lines are utilized because a source of entangled states used therein is probabilistic. Alternatively, some embodiments are capable of photonic quantum computation using heralding-free (non-heralding) connections because they are capable of generating photons in a way such that whether generated photons are entangled with each other or not is determinable or known (e.g., the photons are generated deterministically). A heralding free connection refers to a connection, or a link, which does not use heralding (or a feedforward). A heralding (or a feedforward) may be achieved by detecting one photon from a pair of single photons generated in highly correlated states and using a photonic or optical delay line to "herald" the other photon from the pair, w % hereby the state of the other photon is known prior to its detection (the feedforward). A heralding-free connection therefore refers to a connection, or a link, which does not require, and does not involve, such heralding (or feedforward).

Some disclosed embodiments involve a non-transitory computer-readable medium (or a computer-readable medium or a computer program) including instructions that, when executed by at least one processor (or an apparatus or circuitry), case the at least processor (or the apparatus or circuitry) to carry out a method or a process according to a disclosed embodiment. For example, the non-transitory computer-readable medium (or a computer-readable medium or a computer program) may include instructions that, when executed by at least one processor (or an apparatus or circuitry), cause the at least one processor (or the apparatus or circuitry) to carry out a process or a quantum computing method described herein.

Some disclosed embodiments involve an apparatus, a device, a system, an integrated circuitry device, or circuitry, including at least one processor (and a memory) configured to carry out a process or a quantum computing method described herein.

Some disclosed embodiments involve providing a layout of an integrated circuit device or circuitry, which comprises layout portions, each layout portion defined to pattern features from a quantum computing apparatus or a quantum computing system according to a disclosed embodiment. By way of non-limiting example, a layout of an integrated circuit device or a circuitry, includes: a photonic processing stage layout portion defined to pattern at least two of an optical switch, a beam splitter, a waveguide, or a photon generator; a connection layout portion defined to pattern a plurality of connections, each connection being located between adjacent photonic processing stages; and a circuitry layout portion defined to pattern circuitry or at least one processor configured to regulate photon flow between adjacent stages.

In some disclosed embodiments, the photonic processing stage layout portion is defined to pattern a photon generator, a qubit generator, an entangling gate, or a channel for carrying a photon supplied by a photon generator (or a qubit generator) toward a resonator or a quantum emitter. In some disclosed embodiments, the patterning may include patterning another resonator and another coupling location for coupling another quantum emitter to the other resonator. In some disclosed embodiments, circuitry layout portion may be defined to pattern one or more of: a waveguide for carrying one or more photons or lasers; and one or more linear optics elements for performing various functions involved in directing or transporting one or more photons, controlling a flow of one or more photons, manipulating states of the one or more photons, and/or performing quantum computations.

In some disclosed embodiments, the circuitry layout portion is defined to pattern a controller for controlling (e.g., directing or switching between different waveguides) flow of input and output photons between photon generator(s) or qubit generator(s) and entangling gate(s) or SWAP gate(s), wherein the controller may include one or more processors and a memory, a circuit component, or circuitry for performing the controlling.

Silicon Nitride Resonators for Qubit Generation and Entanglement

As described herein one or more quantum emitters (e.g., alkali atoms such as Rb atom) may be coupled to one or more resonators (e.g., silicon nitride (SiN) resonators) to facilitate a measurement based quantum computation, for example a quantum computation using cluster states composed of photonic qubits. This may be used to perform one or more computations, such as an error correction. The following description relates to a system or a method for performing such a computation by using or manipulating trapped alkali atom(s) to generate photonic qubits and/or generate entanglement between photonic qubits transmitted to, or toward, one or more of the trapped alkali atom(s), or an interaction region nearby thereof. The system may also be configured to perform a computation by manipulating measurement bases of subsequent photonic qubits using results of measurements of prior photonic qubits.

In some instances, the description that follows refers to FIG. 16A to FIG. 17C, which taken together, illustrate exemplary implementations of resonators for qubit generation and/or entanglement consistent with some disclosed embodiments. For example, such resonators may include dual resonator arrangement(s) such as dual silicon nitride resonators. FIG. 16A to FIG. 17C are intended merely to facilitate the conceptualizing of an exemplary implementation of such dual resonators for qubit generation and/or entanglement and do not limit the disclosure to any particular implementation example. For example, more than two silicon nitride resonators may be used for qubit generation and/or entanglement.

Some embodiments involve a quantum computing system or a quantum computing method. Quantum computing refers to a computation that is performed through the utilization, manipulation or application of one or more quantum state properties, such as superposition, entanglement and interference. A quantum computing system may include a component or group of components configured to facilitate performing a calculation or an operation using such computation. A quantum computing method may include one or more steps for performing such a calculation or an operation. A component or groups of components of the quantum computing system may be configured to perform one or more steps of such a quantum computing method. For example, a quantum computing method may be for generating a photonic qubit or a plurality of entailed photonic qubits, or both. A quantum computing system may be configured to generate a photonic qubit or a plurality of entangled photonic qubits, or both. In some examples, the quantum computing system may be configured to generate a graph state, which includes a plurality of time-sequential series of entangled photons arranged for use as entangled qubits when performing a quantum computation.

Some embodiments involve a first silicon nitride resonator couplable to a first alkali atom and configured to generate a plurality of photonic qubits. A resonator refers to a component that establishes or supports oscillations and/or normal modes. Silicon nitride refers to a chemical compound including the elements silicon and nitrogen. For example, silicon nitride may form an insulating, non-oxide structural ceramic material. Silicon nitride resonator refers to a resonator at least a portion of which is formed from silicon nitride. In some examples, a silicon nitride resonator may refer to a resonator formed from silicon nitride. In some examples, silicon nitride resonator may refer to a resonator formed within a silicon layer. By way of a non-limiting example, silicon nitride resonators may be manufactured using a lithographic or photolithographic process in a silicon fabrication facility, e.g., by printing a waveguide loop in a layer of silicon nitride or by growing, depositing, etching, and/or using photolithographic techniques on a substrate. It is to be understood that other ways of manufacturing, forming, or growing silicon nitride structure may be used to form the silicon nitride resonators.

Being coupled refers to being in a state or configuration capable of facilitating interactions. For example, a first silicon nitride resonator that is couplable to a first alkali atom refers to a first silicon nitride resonator being arrangeable or configurable to be in a state or configuration so as to be capable of facilitating interactions between the first alkali atom and one or more photonic qubits, which are associated with the first silicon nitride resonator (for example, the one or more photonic qubits related to one or more photons in the first silicon nitride resonator and/or being carried in a waveguide that is nearby, or in physical contact with, the first silicon nitride resonator), or facilitating interactions between the one or more photonic qubits via their interactions with the first alkali atom. For example, the interactions may be facilitated in an absence of physical contact between the first silicon nitride resonator (or the one or more associated photonic qubits) and the first alkali atom and may cause a statistical correlation or correspondence between the physical behaviors of the one or more photonic qubits and the first alkali atom, e.g., via the first silicon nitride resonator.

An alkali atom refers to an atom of a chemical element belonging to an alkali metal group, e.g., a metal element in the first column (Group 1) of the periodic table and having an outer electron in an s-orbital. Examples of an alkali atom include an atom of Lithium. Sodium. Potassium, Rubidium, Cesium, or Francium. By way of a non-limiting example, a component of a quantum computing system, e.g., an arrangement for use in a qubit generator or a photon generator and/or an entangling gate, may include a Rubidium atom coupled to a resonator formed from silicon nitride. By way of a non-limiting example, the first alkali atom is a Rubidium atom. By way of another non-limiting example, the first alkali atom is a Cesium atom. By way of another non-limiting example, the first alkali atom is a Francium atom. In some examples, the first alkali atom may be a neutral atom. Alternatively, the first alkali atom may be an ion.

Generating a plurality of photonic qubits refers to producing, creating, outputting, or otherwise providing a plurality of photonic qubits. For example, an arrangement (e.g., an arrangement of a first silicon nitride resonator and a first alkali atom) for use in a qubit generator may provide (e.g., produce, create, or output) one or more single photons, which are suitable for storing or possessing the plurality of photonic qubits. A photonic qubit refers to a basic unit of quantum information stored in (or belonging to) one or more photons or electromagnetic field, as described earlier.

For example, the first silicon nitride resonator coupled to the first alkali atom may function as a photon generator, or a qubit generator when the generated one or more photon(s) store or possess one or more photonic qubits. The first silicon nitride resonator coupled to the first alkali atom may facilitate the first alkali atom to interact with input photons to generate a plurality of single photons or a plurality of photonic qubits as output. In some examples, the photon generator or the qubit generator is implemented according to the SPRINT mechanism described herein with respect to FIG. 15(A) to FIG. 15(C), or techniques described herein with respect to FIG. 4A-FIG. 4B, FIG. 8, and FIG. 9B.

Some embodiments may involve multiple photon generators or multiple qubit generators, with each photon generator or qubit generator including an alkali atom coupled to an associated silicon nitride resonator. Each photon generator or qubit generator may facilitate each alkali atom to interact with input photons to generate a plurality of single photons or a plurality of photonic qubits as output. The input photons may be generated by (or received from) the same (e.g., common) photon source or from multiple, separate photon sources.

By way of non-limiting examples, reference is made to FIG. 16A which illustrates an exemplary implementation of quantum computing system 1600 including first silicon nitride resonator 1602A couplable to first alkali atom 1604A, and FIG. 16B which illustrates an exemplary implementation of quantum computing system 1620 including first silicon nitride resonator 1602A couplable to first alkali atom 1604A. By way of non-limiting examples, reference is made to FIG. 16C, FIG. 16D, FIG. 16E, and FIG. 16F which illustrate exemplary implementations of quantum computing system 1625, 1630, 1640, 1650 including qubit generators 1632A, 1632B, each qubit generator including first silicon nitride resonator 1602A, 1602B couplable to first alkali atom 1604A, 1604B. In these exemplary implementations, when first silicon nitride resonator 1602A, 1602B is coupled to first alkali atom 1604A, 1604B the combination can be used to generate one or more photons, which can store a plurality of photonic qubits 1606A, 1606B and can be output via waveguide 1608A, 1608B.

Some embodiments involve a second silicon nitride resonator couplable to a second alkali atom and configured to cause entanglement between at least two of the plurality of photonic qubits. Entanglement between at least two of the plurality of photonic qubits refers to a condition where states of the at least two photonic qubits being linked with each other, as described earlier. For example, the state of one photonic qubit may be related to the state of another photonic qubit in such a way that those states cannot be described independently of each other. This entanglement produces, for example, a correlation between measurements of those states, correlating a measurement of the states of the at least two photonic qubits, whereby mutual information may be stored or processed using this correlation. By way of a non-limiting example, the second alkali atom includes a rubidium atom. By way of another non-limiting example, the second alkali atom includes a cesium atom. By way of another non-limiting example, the second alkali atom includes a francium atom. In some examples, the second alkali atom may be a neutral atom. Alternatively, the second alkali atom may be an ion.

For example, the second alkali atom coupled to the second silicon nitride resonator may function as an entangling gate for entangling photonic qubits. The entangling gate formed by the second alkali atom coupled to the second silicon nitride resonator may receive two or more of the photonic qubits (e.g., generated by the first alkali atom coupled to the first silicon nitride resonator functioning as a qubit generator and/or by a different photonic qubit source or photon source) and cause the two or more photonic qubits to interact with the second alkali atom and become entangled with the second alkali atom, and thereby with each other. In some examples, the entangling gate is implemented according to the techniques described herein with respect to FIG. 3, FIG. 5A-FIG. 5B, FIG. 8, and FIG. 9C.

Some embodiments may involve multiple entangling gates, e.g., each entangling gate including an alkali atom couplable to an associated silicon nitride resonator and configured to receive photonic qubits as an input and produce entangled photonic qubits as an output. The multiple entangling gates may receive input photonic qubits from the same (e.g., common) photon source or from multiple photon sources. In some examples, each photon source may include one or more qubit generators. In some embodiments, the entangled photonic qubits may be representable by a graph state.

By way of non-limiting examples, reference is made to FIG. 16A which illustrates an exemplary implementation of quantum computing system 1600 including second silicon nitride resonator 1612A couplable to second alkali atom 1614A, and FIG. 16B which illustrates an exemplary implementation of quantum computing system 1620 including second silicon nitride resonator 1612A couplable to second alkali atom 1614A. By way of non-limiting examples, reference is made to FIG. 16C, FIG. 16D, FIG. 16E, and FIG. 16F which illustrate exemplary implementations of quantum computing system 1625, 1630, 1640, 1650 including entangling gates 1634A, 1634B, each entangling gate including second silicon nitride resonator 1612A, 1612B couplable to second alkali atom 1614A, 1614B. In these exemplary implementations described with reference to FIG. 16A, FIG. 16B, FIG. 16C, FIG. 16D, FIG. 16E, and FIG. 16F, when second silicon nitride resonator 1612A, 1612B is coupled to second alkali atom 1614A, 1614B they can be used to facilitate interaction of two or more photonic qubits with second alkali atom 1614A, 1614B via second silicon nitride resonator 1612A. 1612B, to thereby become entangled with second alkali atom 1614A, 1614B. Thus, the two or more photonic qubits become entangled with one other. This entanglement between at least two photonic qubits 1610A, 1610B is illustrated in FIG. 16A to FIG. 16F with a double line therebetween.

In the exemplary implementations shown in FIG. 16C, FIG. 16D, FIG. 16E, and FIG. 16F, entangling gate 1634A, 1634B is located downstream from qubit generator 1632A, 1632B, and each entangling gate 1634A, 1634B may be optically coupled to qubit generator 1632A, 1632B via waveguide 1608A, 1618A, 1608B, 1618B so that photonic qubits 1606A, 1606B generated by qubit generator 1632A, 1632B can be received via waveguide 1608A, 1618A, 1608B, 1618B. In entangling gate 1634A, 1634B, second silicon nitride resonator 1612A, 1612B coupled to second alkali atom 1614A. 1614B is configured to cause photonic qubits 1606A, 1606B to become entangled with second alkali atom 1614A, 1614B, and thus with each other (e.g., as illustrated by a double line between entangled photonic qubits 1610A, 1610B). In other exemplary implementations, photonic qubits 1606A, 1606B entangled by entangling gate 1634A, 1634B may be provided by other source(s) of photonic qubits.

In some examples, an arrangement for use in an entangling gate is also configurable to provide (e.g., generate, produce, or create) one or more photons, which are suitable for storing or possessing entangled photonic qubits, from a series of input photons or photonic qubits. In other words, the same arrangement of a silicon nitride resonator couplable to an alkali atom may be configured to function as either an entangling gate or as a qubit generator, e.g., by initializing states of the alkali atom accordingly.

Some embodiments involve one or more lasers, or a plurality of lasers. A laser may refer to a laser pump or a laser source from which a laser beam is output. A laser, as used herein may also refer to the laser beam itself. A laser pump or a laser source refers to a device configured to output a laser beam, e.g., a monochromatic light or one or more electromagnetic waves at one or more particular wavelengths. For example, a laser may refer to a device for stimulating atoms or molecules to emit electromagnetic radiation at particular wavelength(s), e.g., as coherent light, and amplify the emitted light to produce a laser beam. In some examples, a laser pump or a laser source may be a source of monochromatic light from which a laser beam is output, whereas a laser beam may include only monochromatic light, or may include light of different wavelengths, e.g., by combining monochromatic lights from multiple laser pumps or laser sources to form a single laser beam. For example, a laser unit may include one or more laser pumps or laser sources, each configured to emit one or more monochromatic lights of different wavelength(s) associated with different functionalities and/or quantum computing components such as one or more qubit generator(s), or one or more entangling gate(s) described herein. The emitted laser beam or laser pulse may be focused (e.g., combined) into a single laser beam or single laser pulse for conveying to a specific quantum computing component such as a qubit generator or an entangling gate. In some examples, a laser may be configured to be controlled, adjusted, or directed, with one or more optical elements such as optical switches and/or beam splitters, to channel or to provide the emitted laser light to one or more intended target(s). In some examples, a laser may be configured to be controlled, adjusted, or directed, with one or more optical elements such as lenses, mirrors, filters, polarizers, prisms, wave plates, transmissive elements, reflective elements, optical switches, birefringent elements (e.g., beam splitters), and/or phase shifters configured to control properties of the emitted laser light, direction of travel of the emitted laser light, and/or channeling of the emitted laser light to one or more intended target(s). For example, a processor may control an optical switch to synchronize the propagation of photons of red detuned pulse and blue detuned pulse for trapping an alkali atom with a flow of input photons directed to a qubit generator (via the optical switch) to generate photonic qubits. The processor may transmit one or more control signals (e.g., an optical and/or electronic signal) to change one or more states of one or more optical switches involved in the proposition of the photons of red detuned pulse and blue detuned pulse, whereby the flow of the photons is controlled.

A specific laser may be associated with a single function, or with multiple different functions. Examples of functions that can be associated with a laser include trapping an atom (e.g., an alkali atom), cooling an atom, manipulating an atom, providing input photons or input light for interacting with a qubit generator to produce single photons for establishing or storing photonic qubits (e.g., the output photonic qubits may then interact with an entangling gate to produce entangled photonic qubits), initializing a state of an atom, facilitating a coupling between an atom and a resonator, and any other functions requiring use of coherent light (e.g., one or more laser beams) in a quantum computing system. For example, a single laser pump may be configured to emit red (and/or blue) laser light (or pulse) for trapping one or more alkali atoms so that an evanescent field may be established nearby a waveguide carrying the laser light (or pulse), thereby trapping the alkali atoms (e.g. in or nearby coupling sites). In some examples, a separate laser pump may be provided to emit light for cooling (or manipulating) one or more alkali atoms in the qubit generator(s) and/or the entangling gate(s). In some examples, yet another laser pump may also be provided as a photon source for providing one or more input photons for use by one or more qubit generators or one or more entangling gate.

In some examples, each qubit generator or each entangling gate has a dedicated laser pump for each function. Alternatively, a laser pump may be configured to emit light for serving more than one function. In some examples, one laser pump is configured to provide its associated function or functions to a plurality of qubit generators, a plurality of entangling gates, or at least one qubit generator and at least one entangling gate. In other words, the laser pump may be configured to serve its associated function or functions to more than one component. For instance, optical elements such as one or more optical switches and/or beam splitters may be provided and configured with such a laser pump to channel light emitted by the laser pump to different qubit generator(s) and/or entangling gate(s) so that the function(s) associated with the laser pump may be provided by the channeled light.

In some examples, a laser unit for a quantum computing system includes multiple laser pumps (e.g., monochromatic laser pumps). For example, a first laser pump may be configured to produce red laser light and a second laser pump may be configured to produce blue laser light. The red and blue lights may be combined into a single laser beam to be input into a waveguide, producing an evanescent field around the waveguide carrying the blue and red laser light, the evanescent field trapping an alkali atom, e.g., at a coupling site in a qubit generator and/or an entangling gate. In some examples, the laser unit may also include a third laser pump for emitting laser light for cooling one or more alkali atoms, e.g., a jet of alkali atoms. In some examples, the laser unit may also include a fourth laser pump for emitting laser light for manipulating alkali atoms. In an example, laser light from first, second, third, and fourth laser pumps may be combined as a single laser beam conveyed via one or more waveguide(s) (e.g., toward one or more coupling sites within a qubit generator and/or an entangling gate). In some examples, the laser unit may also include a fifth laser pump as a source of input photons conveyed to one or more qubit generators for generating photonic qubits as an output.

Some embodiments involve controlling one or more lasers, or a plurality of lasers. For example, a laser unit may be provided to provide a laser, controlling the laser unit may involve controlling one or more of a timing for turning the laser on/off, a power level, a wavelength, a frequency, a phase, a polarization, a spin, an intensity, synchronization, a duty cycle, and/or variation of light, e.g., of the laser light emitted from the laser unit. In some examples, a single laser may be used to provide a plurality of laser pulses (e.g., using optical elements such as a beam splitter). Alternatively, a separate laser (or a laser pump) may be dedicated to providing each of the plurality of laser pulses required to perform one or more function(s).

Some embodiments involve trapping a first alkali atom and a second alkali atom. Trapping an alkali atom refers to generating, operating, implementing, or activating a trap (e.g., using a Magneto-optical trap, or MOT described with reference to FIG. 10, or an optical dipole trap generated in an evanescent field as described with reference to FIG. 9A) to keep the alkali atom within a coupling site as described earlier. In some embodiments involving one or more lasers, or a plurality of lasers, the one or more lasers, or the plurality of lasers are configured to trap the first alkali atom and the second alkali atom. For example, the one or more lasers may be configured to produce a configuration of electromagnetic fields for confining degrees of freedom of one or more alkali atoms carrying a charge (e.g., an ion) to thereby allow trapping the one or more alkali atoms. As an example, one or more lasers may emit red and blue pulses that may be combined and caused to propagate in an evanescent field via a waveguide. An optical dipole trap is then generated in the evanescent field, with the red pulse configured to pull the alkali atom and the blue pulse configured to repulse (e.g., push) the alkali atom, thereby suspending (e.g., trapping) the alkali atom between opposing forces exerted by the red and blue light at a coupling site. For example, the red pulse may have a wavelength within an inclusive range of 850 nm to 980 nm and the blue pulse may have a wavelength within an inclusive range of 690 nm to 720 nm. For example, when the alkali atom includes either or both Rubidium or/and Cesium, the red pulse may have a wavelength of, or around or above, 980 nm, and the blue pulse may have a wavelength of, or around or below, 700 nm. In some examples, a single laser unit is configured trap a first alkali atom inside a qubit generator and trap a second alkali atom inside an entanglement gate. In some examples, a first laser unit is dedicated to trapping one or more alkali atoms in one or more qubit generators, and a second laser unit is dedicated to trapping one or more alkali atoms in one or more entanglement gates. In some examples, each qubit generator and entanglement gate has a dedicated laser unit configured to trap an alkali atom associated therewith.

Some embodiments involve cooling a first alkali atom and a second alkali atom. As described herein, cooling in this context refers to reducing motion and/or speed of an alkali atom. In some embodiments involving one or more lasers, or a plurality of lasers, the one or more lasers, or the plurality of lasers may be configured to cool the first alkali atom and the second alkali atom. For example, cooling an alkali atom may involve producing, generating, emitting, or otherwise providing light for reducing motion and/or speed of the alkali atom. The light may then impact the motional degrees of freedom of the alkali atom to thereby cool the alkali atom. In some examples, cooling an alkali atom may reduce a variance in the velocity of the alkali atom to produce a more homogeneous velocity. For instance, the alkali atom may absorb and re-emit one or more photons of the light causing the momentum of the alkali atom to change. The interactions between the alkali atom and the light (e.g., from a laser) may be controlled to produce a more homogeneous velocity, thereby cooling the alkali atom. Exemplary techniques for cooling atoms using lasers may include Doppler cooling, Sisyphus cooling, resolved side-band cooling, Raman sideband cooling, Velocity selective coherent population trapping, Gray molasses, Cavity mediated cooling, use of a Zeeman slower. Electromagnetically induced transparency (EIT) cooling, Anti-Stokes cooling in solids, and Polarization gradient cooling. For example, when the alkali atom is Rubidium, Doppler cooling may be achieved using a laser having a wavelength of, or around, 780 nm. When the alkali atom is Cesium. Doppler cooling may be achieved using a laser having a wavelength of, or around, 852 nm.

Some embodiments involve manipulating a first alkali atom and a second alkali atom. As described herein, manipulating in this context refers to controlling an external or internal state (e.g., a condition or a configuration) of the alkali atom. For example, the internal state may correspond to an electronic configuration, nuclear configuration or a combination thereof. The external state, for example, may correspond to the motion of the alkali atom in a coupling site. For example, manipulating an alkali atom may involve producing, generating, emitting, or otherwise providing light for controlling an external or internal state of the alkali atom. In some examples, manipulating an alkali atom may involve modifying or controlling one or more atomic attributes of the alkali atom, such as a position, velocity, momentum, or energy state, and a laser may be used for this modifying or controlling. In some embodiments involving one or more lasers, or a plurality of lasers, the one or more lasers, or the plurality of lasers may be configured to manipulate the first alkali atom and the second alkali atom. For example, a laser may be used to emit light to excite the alkali atom to a higher energy state, to cause the alkali atom to decay to another low-energy state, or to control the position and/or velocity of the alkali atom. For example, an electronic state of a Rubidium atom may be manipulated using a laser having a wavelength of, or around, 795 nm. An electronic state of Cesium may be manipulated using a laser having a wavelength of, or around, 895 nm. In some examples, the laser may be part of a laser unit and controlling the laser unit enables manipulating of one or more alkali atoms. Controlling the laser unit may involve changing one or more of: laser on/off timing, power level, wavelength, frequency, phase, polarization, spin, laser intensity, synchronization, duty cycle, and/or light variation, e.g., of the laser light emitted from the laser unit. In some examples, a single laser may be used to manipulate multiple trapped alkali atoms (e.g., using optical elements such as a beam splitter). For example, a single laser (or a single laser pump) may be used to manipulate the first alkali atom (e.g., associated with a qubit generator) and the second alkali atom (e.g., associated with an entangling gate). Alternatively, a separate laser (or a laser pump) may be dedicated to manipulating each trapped alkali atom individually.

By way of non-limiting examples, reference is made to FIG. 16A illustrating an exemplary implementation of quantum computing system 1600 including a laser unit 1622 configured to provide laser beams or laser pulses (e.g., including laser beams 1628A, 1628B). One or more photon(s) of the laser beams or pulses interact with the alkali atom 1604A, 1614A or with the silicon nitride resonator 1602A, 1612A couplable to alkali atom 1604A, 1614A. FIG. 16B illustrates an exemplary implementation of quantum computing system 1620 including a laser unit 1622 configured to provide a laser beam or a pulse (e.g., including laser beam 1628C) to optical elements 1635. The optical elements 1635 are arranged to control or channel the laser beam or the pulse to provide laser beams or pulses (e.g., including laser beams 1628A, 1628B) to alkali atom 1604A, 1614A, or with the silicon nitride resonator 1602A, 1612A couplable to alkali atom 1604A, 1614A. In some examples, optical elements 1635 may include one or more lenses, mirrors, filters, polarizers, prisms, wave plates, transmissive elements, reflective elements, optical switches, birefringent elements (e.g., beam splitters), and/or phase shifters configured to control properties, direction of travel and/or channeling of light emitted by laser unit 1622. Such control enables silicon nitride resonator 1602A, 1612A and associated alkali atom 1604A, 1614A to be provided with laser beams or pulses (e.g., including laser beams 1628A, 1628B) of an appropriate property.

In some examples, laser unit 1622 may include one or more laser pump(s) configured to serve a specific functionality such as to trap, cool, and/or manipulate one or more alkali atoms 1604A, 1614A. For example, laser unit 1622 may include one or more laser pumps for producing red and blue detuned light beam(s) or pulse(s) so that an evanescent field for trapping one or more alkali atoms 1604A, 1614A at a coupling site associated with a waveguide carrying the red and blue detuned light beam(s) or pulse(s) can be established. In this manner, alkali atom 1604A, 1614A can be trapped near the waveguide. As examples, a red detuned pulse having a wavelength of 850 nm or 980 nm (or a range or a value therebetween) and a blue detuned pulse having a wavelength of 690 nm or 720 nm (or a range or a value therebetween) may be produced by the one or more laser pumps of laser unit 1622. In some examples, laser unit 1622 may include one or more laser pumps for producing light beam(s) or pulse(s) for cooling one or more alkali atoms 1604A, 1614A, and/or one or more laser pumps for producing light beam(s) or pulse(s) for manipulating the one or more alkali atoms 1604A, 1614A. For example, laser unit 1622 may include one or more laser pumps configured to produce light beam(s) or pulse(s) for providing Sisyphus and Raman cooling. In some examples, laser unit 1622 includes one or more laser pump(s) for providing input photons to an arrangement including silicon nitride resonator 1602A couplable to alkali atom 1604A, e.g., to cause photonic qubits 1606A to be generated (or emitted) and output via waveguide 1608A.

By way of non-liming example, reference is made to FIG. 16C which illustrates an exemplary implementation of quantum computing system 1625 including a plurality of lasers, each laser 1622C, 1622D being configured to provide laser beam(s) or pulse(s) (e.g., including laser beams 1628A, 1628B) to one qubit generator (each qubit generator 1632A, 1632B including silicon nitride resonator 1602A, 1602B couplable to alkali atom 1604A, 1604B) and one entangling gate (each entangling gate 1634A, 1634B including silicon nitride resonator 1612A, 1612B couplable to alkali atom 1614A, 1614B). For example, the exemplary implementation shown in FIG. 16C includes one or more laser units configured to provide at least two lasers 1622C, 1622D. In some examples, a first set of laser units of quantum computing system 1625 may be configured to provide laser 1622C, and a second set of laser units of quantum computing system 1625 may be configured to provide laser 1622D, in a similar manner to laser unit 1622 of FIG. 16A or laser unit 1622 of FIG. 16B. In some examples, quantum computing system 1625 may include optical elements similar to optical elements 1635 of FIG. 16B and the one or more laser units of quantum computing system 1625 may be arranged to provide one or more laser beam(s) or pulse(s) to the optical elements in a similar manner to laser unit 1622 of FIG. 16B.

By way of another non-liming example, reference is made to FIG. 16D which illustrates an exemplary implementation of quantum computing system 1630 including a plurality of lasers. For example, the exemplary implementation shown in FIG. 16D includes one or more laser units configured to provide laser 1622E and laser 1624E. Laser 1622E is configured to provide laser beams or pulses (e.g., including laser beams 1628A) to two or more qubit generators 1632A, 1632B (each qubit generator 1632A, 1632B including silicon nitride resonator 1602A, 1602B couplable to alkali atom 1604A, 1604B), and laser 1624E is configured to provide laser beams or laser pulses (e.g., including laser beam 1628B) to two or more entangling gates 1634A, 1634B (each entangling gate 1634A, 1634B including silicon nitride resonator 1612A, 1612B couplable to alkali atom 1614A, 1614B). In some examples, a first set of laser units may be configured to provide laser 1622E, and a second set of laser units may be configured to provide laser 1624E. In quantum computing system 1630 shown in FIG. 16D, laser 1622E provides laser light via waveguide 1636A, 1636B to qubit generator 1632A, 1632B, and laser 1624E provides laser light via waveguide 1638A, 1638B to entangling gate 1634A, 1634B. In some examples, quantum computing system 1630 may include optical elements similar to optical elements 1635 of FIG. 16B and the one or more laser units of quantum computing system 1630 may be arranged to provide one or more laser beam(s) or pulse(s) to the optical elements in a similar manner to laser unit 1622 of FIG. 16B.

By way of non-liming example, reference is made to FIG. 16E which illustrates an exemplary implementation of quantum computing system 1640 including a plurality of lasers, each laser 1622A, 1622B, 1624A, 1624B configured to provide a laser beam or a laser pulse (e.g., including laser beams 1628A, 1628B) to one qubit generator (each qubit generator 1632A, 1632B including silicon nitride resonator 1602A, 1602B couplable to alkali atom 1604A, 1604B) or one entangling gate (each entangling gate 1634A, 1634B including silicon nitride resonator 1612A, 1612B couplable to alkali atom 1614A, 1614B). For example, one or more laser units may be configured to provide at least four lasers 1622A. 1622B, 1624A, 1624B. In some examples, a first set of laser units may be configured to provide laser 1622A and laser 1624A, and a second set of laser units may be configured to provide laser 1622B and laser 1624B, in a similar manner to laser unit 1622 of FIG. 16A, laser unit 1622 of FIG. 16B, or a set of laser units (for providing laser 1622C or laser 1622D) of FIG. 16C. In some examples, a first set of laser units may be configured to provide laser 1622A and laser 1622B, and a second set of laser units may be configured to provide laser 1624A and laser 1624B, in a similar manner to a set of laser units (for providing laser 1622E or laser 1624E) of FIG. 16D. In some examples, quantum computing system 1640 may include optical elements similar to optical elements 1635 of FIG. 16B and the one or more laser units may be arranged to provide one or more laser beam(s) or pulse(s) to the optical elements in a similar manner to laser unit 1622 of FIG. 16B.

By way of another non-liming example, reference is made to FIG. 16F which illustrates an exemplary implementation of quantum computing system 1650 including a single laser, laser 1622F configured to provide laser beams or pulses (e.g., including laser beams 1628A, 1628B) to a plurality of qubit generators (each qubit generator 1632A, 1632B including silicon nitride resonator 1602A, 1602B couplable to alkali atom 1604A, 1604B) and a plurality of entangling gates (each entangling gate 1634A, 1634B including silicon nitride resonator 1612A, 1612B couplable to alkali atom 1614A, 1614B). For example, the exemplary implementation shown in FIG. 16F includes a laser unit configured to provide laser 1622F. In some examples, quantum computing system 1650 includes optical elements similar to optical elements 1635 of FIG. 16B with the laser unit arranged to provide laser 1622F in a similar manner to laser unit 1622 of FIG. 16B.

Differing combinations of the one or more laser units described herein with reference to exemplary implementations of quantum computing systems, e.g., the one or more laser units of quantum computing systems 1600, 1620, 1625, 1630, 1640, 1650, may be employed, depending on operational requirements of silicon nitride resonators 1602A, 1602B, 1612A, 1612B and their associated alkali atoms 1604A, 1604B, 1614A, 1614B. For example, the one or more laser units of quantum computing system 1625 shown in FIG. 16C may include any of laser units described in connection with FIG. 16A, FIG. 16B, FIG. 16D, FIG. 16E, or FIG. 16F. In another example, the one or more laser units of quantum computing system 1630 shown in FIG. 16D may include any of laser units described in connection with FIG. 16A, FIG. 16B, FIG. 16C, FIG. 16E, or FIG. 16F. It is also to be understood that lasers provided by the one or more laser units of these quantum computing systems 1600, 1620, 1625, 1630, 1640, 1650 may be provided via a waveguide, aimed at a coupling site through free space, or provided via another medium capable of carrying a laser. For example, one or more lasers for trapping an alkali atom may be carried in waveguide 1636A, 1636B, 1638A, 1638B, and one or more lasers for cooling or manipulating may be carried in free space or in a vacuum, aimed at a trapped alkali atom (e.g. as shown in FIG. 10). Alternatively, the one or more lasers for trapping an alkali atom may be carried in free space or in a vacuum, aimed at a designated location or region (e.g., a coupling site or coupling region or coupling location). The one or more lasers for cooling or/and manipulating may be carried in a waveguide nearby the trapped alkali atom.

Some embodiments involve detecting a presence of a trapped alkali atom. A trapped alkali atom is one that is restricted to a position or area. For example, the alkali atom may be trapped (e.g., restricted to an area) within a threshold distance of a coupling site. Detecting a presence of a trapped alkali atom refers to sensing the existence of an alkali atom that is restricted to the desired position or desired area. For example, detecting a position may involve determining that the alkali atom is within a threshold distance of a designated location or region (e.g., restricted to be at a coupling site or coupling region or coupling location). In examples described herein, trapping an alkali atom may involve generating a trap (e.g., an evanescent field trap established around a waveguide by a red detuned pulse and a blue detuned pulse being carried in the waveguide as described earlier) for keeping the alkali atom within a coupling site. This trapping may be achieved by confining a spatial degree of freedom of the alkali atom using a configuration of electromagnetic fields including the evanescent field. In some embodiments, one or more detectors are configured to detect a presence of the trapped alkali atom. A detector refers to a device or an instrument designed to sense the presence, property, and/or state, or change in property and/or state, of an object. For example, a detector may be configured to sense a signal emitted by, or interacted with, an object and determine a property and/or state of the object based on that signal. A detector may be controlled so that it is capable of sensing the existence of the alkali atom restricted to be at its corresponding coupling site. The detector may then also output a notification signal such as an electrical signal or an optical signal to indicate the result of this sensing. For example, a detector may include one or more of an optical detector, a photon detector, a detector for sensing an electric, magnetic, and/or electromagnetic field, a voltage detector, a current detector, or any other type of detector whose output is capable of providing an indication of a presence of a trapped atom. For example, a photon detector may include one or more component(s) for receiving one or more photons (e.g., emitted by an alkali atom or belonging to a laser beam or pulse being carried in a waveguide) and for producing an electrical or optical signal in response.

Some embodiments involve detecting a presence of a trapped first alkali atom and a trapped second alkali atom. Detecting a trapped first alkali atom and detecting a trapped second alkali atom may occur in any of the ways and with any of the structures described in prior paragraphs with reference to detecting a presence of a trapped alkali atom. Detecting a presence of a trapped first alkali atom and a trapped second alkali atom refers to sensing existence of a first alkali atom and a second alkali atom restricted at their corresponding coupling sites. In some embodiments, a plurality of detectors are configured to detect a presence of the trapped first alkali atom and the trapped second alkali atom. As described herein, the plurality of detectors may be controlled to sense the existence of the first alkali atom and the second alkali atom at their corresponding coupling site. The plurality of detectors may then also output one or more notification signal(s) such as electrical signal(s) or an optical signal(s) to indicate the result of this sensing.

In some examples, the plurality of detectors include one or more detectors located in proximity to a waveguide carrying output photonic qubits. By way of a non-limiting example, as described herein, FIG. 9A includes detector 952 located at a branch of quantum waveguide 930 that branches off from quantum waveguide 930, with switch/router 970 positioned at an output channel side of quantum waveguide 930 so that, when a measurement (or a detection) of an output photon is required, the output photon is directed to detector 952. In some examples, the plurality of detectors include one or more detectors located in proximity to a waveguide carrying a pulse for trapping an alkali atom or input photons provided toward a trapped alkali atom. By way of a non-limiting example, as described herein. FIG. 9A includes detector 951 located at an end of utility waveguide 910 for carrying the pulse for generating a trap. In some examples, the one or more detectors may perform the detection using the techniques described herein with respect to the measurement or the SWAP gate of FIG. 2E, FIG. 5A-FIG. 5B, and FIG. 6. In some examples, the plurality of detectors include one or more detectors positioned at an end of a waveguide carrying the photonic qubits or entangled photonic qubits to be measured.

For example, the plurality of detectors may include a photon detector positioned at a waveguide (e.g., at an end of the waveguide) carrying a pulse for detecting a presence of an alkali atom (e.g., the first alkali atom and/or the second alkali atom). The photon detector may be configured to sense photons of the pulse being carried in, or output from, the waveguide, whereby the photon detector is capable of sensing a state of the pulse and/or a change in the state of the pulse and outputting a signal accordingly. This output signal may differ depending on whether the pulse has interacted, or is interacting, with an alkali atom at a coupling site associated with the waveguide, i.e., whether the alkali atom is trapped at the coupling site, and thus the photon detector is capable of sensing the existence of a trapped alkali atom and an output signal of the photon detector indicates an outcome of this sensing. For example, the photon detector may sense the pulse or a state of the pulse based on a timing, wavelength, phase, polarization, intensity, synchronization, duty cycle, and/or variation of one or more photons received at the photon detector. For example, the photon detector may be a photomultiplier tube, PMT, a superconductive photon detector, or charged coupled device (CCD). It is to be understood that in some examples, a different detector may be associated with each coupling site of a quantum computing system so that one or more trapped alkali atoms at each coupling site can be detected by that detector. Alternatively, a single detector may be associated with multiple coupling sites of a quantum computing system so that the single detector can detect the trapped alkali atoms at the multiple coupling sites. In some examples, multiple detectors may be collectively associated with multiple coupling sites of a quantum computing system so that, collectively, the multiple detectors are able to detect the trapped alkali atoms at the multiple coupling sites.

In some examples, the plurality of detectors may involve a laser configured to emit light having a wavelength associated with a particular electronic or nuclear state for an alkali atom such that when the alkali atom is in a particular state, the laser is able to excite the alkali atom, causing the alkali atom to release a corresponding photon upon subsequently decaying from the excited state. A photon detector (e.g., the photon detector described above or a photomultiplier tube, PMT, or charged coupled device, CCD, or a superconductive photon detector) may detect the released photon and emit an electrical signal or an optical signal in response. However, if the alkali atom is in a different electronic or nuclear state other than the particular state, or if the atom is not trapped, the alkali atom may be prevented from interacting with laser light associated with the particular state and may not release a photon. In this manner, the photon detector is able to detect the particular state of the alkali atom, e.g., the state of being trapped, or the electronic and nuclear state of the atom, by detecting a photon released by the alkali atom after being excited with the laser light tuned to the particular state.

By way of non-limiting examples, reference is made to FIG. 16A and FIG. 16B, illustrating exemplary implementations of a quantum computing system. Quantum computing systems 1600, 1620 shown in FIG. 16A and FIG. 16B include one or more detectors 1626 configured to detect a presence of trapped first alkali atom 1604A and/or trapped second alkali atom 1614A. For example, the one or more detectors 1626 may be configured to detect a presence of trapped first alkali atom 1604A using detection or sensing of at least one of: a pulse for trapping first alkali atom 1604A carried in a waveguide (not shown) nearby first alkali atom 1604A or a state of laser beam 1628A; input photons provided toward trapped first alkali atom 1604A or a state of input photons; and/or photonic qubits 1606A output from waveguide 1608A or a state of photonic qubits 1606A. Additionally or alternatively, the one or more detector 1626 may be configured to detect a presence of trapped second alkali atom 1614A using detection or sensing of at least one of: a pulse for trapping second alkali atom 1614A carried in a waveguide (not shown) nearby second alkali atom 1614A or a state of laser beam 1628B; input photons provided toward trapped second alkali atom 1614A or a state of input photons; a plurality of photonic qubits 1619A carried in waveguide 1618A or a state of the plurality of photonic qubits 1619A; and/or entangled photonic qubits 1610A output from waveguide 1618A or a state of entangled photonic qubits 1610A.

By way of non-limiting examples, reference is made to FIG. 16C, FIG. 16D, FIG. 16E, and FIG. 16F which illustrate exemplary implementations of quantum computing systems 1625, 1630, 1640, 1650 including a plurality of detectors (e.g., first detectors 1626A and/or second detectors 1626B) configured to detect a presence of trapped first alkali atom 1604A, 1604B and/or trapped second alkali atom 1614A, 1614B. For example, one or more detectors (e.g., first detectors 1626A) may be configured to detect a presence of trapped first alkali atom 1604A, 1604B by detecting or sensing at least one of: a laser beam for trapping first alkali atom 1604A, 1604B carried in waveguide 1636A, 1636B near first alkali atom 1604A, 1604B or a state of laser beam 1628A; input photons provided toward trapped first alkali atom 1604A, 1604B or a state of input photons; and/or photonic qubits 1606A, 1606B output from waveguide 1608A, 1608B or a state of photonic qubits 1606A, 1606B. Additionally or alternatively, one or more detector (e.g., second detectors 1626B) may be configured to detect a presence of trapped second alkali atoms 1614A, 1614B using detection or sensing of at least one of: a laser beam for trapping second alkali atom 1614A. 1614B carried in waveguide 1638A, 1638B nearby second alkali atom 1614A, 1614B or a state of laser beam 1628B; input photons provided toward trapped second alkali atom 1614A, 1614B or a state of input photons; and/or entangled photonic qubits 1610A, 1610B output from waveguide 1618A, 1618B or a state of entangled photonic qubits 1610A, 1610B.

Some embodiments involve receiving at least one signal from at least one of a plurality of detectors, the at least one signal indicating a presence of a trapped alkali atom. Receiving refers to acquiring, retrieving, obtaining, sensing, detecting, or otherwise gaining access to information or data. Such receipt may occur via a communications channel, such as a wired channel (e.g., a cable, fiber) and/or a wireless channel (e.g., radio, cellular, optical, IR). A signal refers to a representation of information that conveys a message or instruction through a medium, such as sound, light, or electrical energy. The information carried in the signal indicates at least one of a presence or absence of a trapped alkali atom. For example, a signal may convey information or data indicating entrapment of an alkali atom at a coupling site associated with a silicon nitride resonator. The signal may be communicated (e.g., transmitted and/or received) via a physical medium that uses one or more predefined ranges of an electromagnetic spectrum (e.g., radio, IR, or optic signal), as an electric current or voltage, as a magnetic and/or electric field, or via any other physical medium. In some examples, a signal may be a stimulus triggering another signal or action in response. The signal may carry information indicating the presence of a trapped alkali atom, as that presence and indication thereof is described earlier. Thus, at least one signal indicating a presence of a trapped alkali atom refers to conveyed information indicating an existence of an alkali atom restricted in a coupling site or coupling region or coupling location. For example, this indication may be based on an output expected to be generated by the alkali atom if it is trapped nearby a resonator. e.g., at an associated coupling site. For example, this indication may be from an electrical or optical signal produced by one or more detectors for detecting a presence of a trapped alkali atom as described herein. In some examples, the signal may be based on, or the same as, the electrical or optical signal produced by the one or more detectors.

Some embodiments involve at least one processor configured to receive at least one input signal from at least one of the plurality of detectors, the at least one input signal indicating a presence of the trapped first alkali atom and the trapped second alkali atom. Such a processor or group of processors, as described earlier, may receive (e.g., acquire, retrieve, obtain, sense, detect, or otherwise gain access to) information or data via a communications channel, over which the indication of atom entrapment or position is conveyed. For example, a signal may convey information or data indicating entrapment of a first alkali atom at a coupling site associated with its corresponding silicon nitride resonator, and entrapment of a second alkali atom at a coupling site associated with its corresponding silicon nitride resonator. At least one input signal refers to the fact that more than one signal may convey the atom location/presence information. Such signals may indicate the presence of one or more atoms in a desired location or area as described earlier. For example, such indications may be obtained from one or more electrical or optical signal(s) produced by one or more detectors for detecting a presence of a trapped alkali atom as described earlier. In some examples, the input signal may be based on, or may be the same as, the electrical or optical signal(s) produced by the one or more detectors.

In some examples, a signal or an input signal indicating a presence of a trapped first alkali atom, which is couplable to a first silicon nitride resonator configured to generate a plurality of photonic qubits, may be produced based on detecting the generated plurality of photonic qubits. In some examples, a signal or an input signal indicating a presence of a trapped second alkali atom, which is couplable to a second silicon nitride resonator configured to cause entanglement between at least two photonic qubits, may be produced based on detecting a plurality of entangled photonic qubits. In some examples, an input signal indicating a presence of one or more trapped alkali atom(s) includes an indication relating to a detection of an intensity, time, wavelength, or polarization of light transmitted through a waveguide after the light has interacted with an alkali atom. In some examples, an input signal indicating a presence of one or more trapped alkali atom(s) includes an indication relating to a physical condition configured to trap the one or more alkali atom(s), such as those relating to establishing an evanescent field trap around a waveguide using a red detuned pulse and a blue detuned pulse. For example, an input signal indicating a presence of a trapped alkali atom may be based on a detection of an intensity, time, wavelength, or polarization of light transmitted through a waveguide after the light has interacted with an alkali atom, e.g., to trap the alkali atom at a coupling site. In some examples, the detected intensity of the transmitted light may be equal to, or very similar to, the input light's intensity when the alkali atom is trapped in an evanescent region, whereas if the alkali atom is not trapped in the evanescent region, the detected intensity of the transmitted light could be zero (or lower than the input light's intensity or close to zero). For example, a processor may receive an input signal from one or more detectors as one or more optical and/or electrical signals indicating entrapment of one or more alkali atoms at one or more corresponding coupling sites, e.g., coupling sites associated with qubit generators and/or entangling gates. As described earlier, the one or more optical and/or electrical signals from the one or more detectors may be produced based on detection of at least one of: a pulse for trapping an alkali atom carried in a waveguide nearby the alkali atom or a state of photons of the pulse; input photons provided toward a trapped alkali atom or a state of input photons; a plurality of photonic qubits carried in a waveguide nearby a trapped alkali atom or a state of the plurality of photonic qubits; photonic qubits output from a waveguide or a state of photonic qubits; and/or entangled photonic qubits output from a waveguide or a state of entangled photonic qubits.

In some examples, when the at least one input signal is received by the at least one processor, the at least one processor is configured to perform one or more actions or operations, such as storing, caching, analyzing, and/or processing information carried in the at least one input signal. For example, the at least one processor may be configured to coordinate and/or synchronize operational aspects of a quantum computing system based on the at least one input signal.

By way of non-limiting examples, reference is made to FIG. 16A and FIG. 16B, which illustrate exemplary implementations of quantum computing systems. Quantum computing systems 1600, 1620 shown in FIG. 16A and FIG. 16B include a plurality of detectors 1626 configured to detect a presence of trapped first alkali atom 1604A and/or trapped second alkali atom 1614A, and at least one processor 1629 is configured to receive at least one input signal from at least one of the plurality of detectors 1626. For example, the plurality of detectors 1626 may output at least one signal indicating a presence of trapped first alkali atom 1604A and trapped second alkali atom 1614A after detecting or sensing their presence, and the at least one processor 1629 may then receive at least one input signal indicating a presence of trapped first alkali atom 1604A and trapped second alkali atom 1614A. Such an input signal may be the output of at least one of detectors 1626 (as described earlier) or may be based on the output of at least one of detectors 1626. It is to be understood that quantum computing system 1600, 1620 shown in FIG. 16A and FIG. 16B may also include additional first alkali atom(s) (which are trappable and then useable in a qubit generator) and/or second alkali atom(s) (which are trappable and then useable in an entangling gate), with the plurality of detectors 1626 configured to detect a presence of trapped additional first alkali atom(s) and/or additional second alkali atom(s), and the at least one processor 1629 configured to receive at least one input signal from at least one of the plurality of detectors 1626 in a similar manner described above.

By way of non-limiting examples, reference is made to FIG. 16C, FIG. 16D, FIG. 16E, and FIG. 16F which illustrate exemplary implementations of quantum computing systems 1625, 1630, 1640, 1650 including a plurality of detectors (e.g., first detectors 1626A and/or second detectors 1626B) configured to detect a presence of trapped first alkali atoms 1604A, 1604B and/or trapped second alkali atoms 1614A, 1614B, and at least one processor 1629 configured to receive at least one input signal from at least one of the plurality of detectors (e.g., first detectors 1626A and/or second detectors 1626B). For example, the plurality of detectors (e.g., first detectors 1626A and second detectors 1626B) may output at least one signal indicating a presence of trapped first alkali atoms 1604A, 1604B and trapped second alkali atoms 1614A, 1614B. After detecting or sensing the presence, the at least one processor may then receive at least one input signal indicating a presence of trapped first alkali atoms 1604A, 1604B and trapped second alkali atoms 1614A, 1614B, which are either the output at least one signal from the plurality of detectors (e.g., first detectors 1626A and/or second detectors 1626B) or separate at least one input signal generated based on the output at least one signal from the plurality of detectors (e.g., first detectors 1626A and/or second detectors 1626B). The presence of trapped first alkali atoms 1604A, 1604B may be detected from detection or sensing of at least one of, a laser beam for trapping first alkali atom 1604A, 1604B carried in waveguide 1636A, 1636B nearby first alkali atom 1604A, 1604B or a state of laser beam 1628A; input photons provided toward trapped first alkali atom 1604A, 1604B or a state of input photons; and/or photonic qubits 1606A, 1606B output from waveguide 1608A, 1608B or a state of photonic qubits 1606A, 1606B. Additionally or alternatively, at least some of the plurality of detector (e.g., second detectors 1626B) may be configured to detect a presence of trapped second alkali atom 1614A, 1614B using detection or sensing of at least one of: a laser beam for trapping second alkali atom 1614A, 1614B carried in waveguide 1638A, 1638B nearby second alkali atom 1614A, 1614B or a state of laser beam 1628B; input photons provided toward trapped second alkali atom 1614A, 1614B or a state of input photons; and/or entangled photonic qubits 1610A, 1610B output from waveguide 1618A, 1618B or a state of entangled photonic qubits 1610A, 1610B. Quantum computing system 1625, 1630, 1640, 1650 shown in FIG. 16C, FIG. 16D, FIG. 16E, and FIG. 16F may also include additional qubit generator(s) and/or entangling gate(s). For example, quantum computing system 1625, 1630, 1640, 1650 may include additional first alkali atom(s) (which are trappable and then useable in a qubit generator) and/or second alkali atom(s)(which are trappable and then useable in an entangling gate), with the plurality of detectors (e.g., first detectors 1626A and/or second detectors 1626B) configured to detect a presence of trapped additional first alkali atom(s) and/or additional second alkali atom(s), and the at least one processor 1629 configured to receive at least one input signal from at least one of the plurality of detectors (e.g., first detectors 1626A and/or second detectors 1626B) in a similar manner described herein.

Some embodiments involve controlling at least some of a plurality of lasers based on at least one received input or input signal indicating a presence of a trapped first alkali atom and a trapped second alkali atom. As described herein, in some examples, controlling at least some of a plurality of lasers includes controlling a single laser, a subset of the plurality of lasers, controlling all of the lasers, and/or controlling one or more optical elements associated with the at least some lasers. Controlling a laser refers to determining, setting and/or adjusting at least one parameter associated with a laser. For example, controlling a laser may include determining, selecting, and/or sending one or more electronic signals (e.g., instructions) to regulate, monitor, adjust, synchronize, turn on/off, and/or calibrate an operation or a timing of one or more laser pumps of a laser unit configured to generate the laser. In some examples, one or more controller may be provided to instruct each laser unit about at least one parameter for generating a laser, e.g., at least one parameter relating to how the laser unit operates (e.g., which laser pump to activate and/or deactivate and for how long) to thereby control the type of light emitted by the laser unit (e.g., the timing for on/off, power level, wavelength, frequency, phase, polarization, spin, intensity, synchronization, duty cycle, and/or variation of light emitted by the laser unit). In some embodiments at least one processor may be configured to control at least some of a plurality of lasers based on at least one received input. As described earlier, a processor performs a logic operation on one or more inputs, and the at least one processor is configured to control at least some of a plurality of lasers based on the at least one input. For example, based on information from an input signal, the at least one processor can determine at least one input for its logic operation, and may then instruct a controller to activate one or more selected laser pumps of a laser unit to emit a light of a specific wavelength or range of wavelengths at selected times, phase, and/or durations to serve a desired function, e.g., trapping, cooling, and/or manipulating one or more alkali atoms as described herein.

The at least one processor may use the input signal to control one or more lasers, controlling each laser to emit a light of a specific type and/or to control one or more optical elements (e.g., an optical switch and/or beam splitter) to channel a light to a destination required for an operation. e.g., from a laser pump to a waveguide of a qubit generator and/or an entanglement gate so that the light can serve a specific functionality (e.g., trapping an alkali atom at a coupling site, cooling, and/or manipulating one or more alkali atoms as described above). For example, the at least one processor may control one or more optical elements (e.g., optical switches, phase shifters, polarizers, filters, lenses, mirrors, and/or beam splitters) to channel light to one or more qubit generators and/or entanglement gates, thereby synchronizing the operations of the one or more qubit generators and/or entanglement gates.

In some examples, controlling a laser includes at least one of turning the laser on/off; setting and/or adjusting a timing of emitting or stop emitting a laser pulse; and/or setting and/or adjusting at least one of a duration, a power level, a wavelength, a frequency, a phase, a polarization, a spin, an intensity, a synchronization (e.g., with other components of a quantum computing system), a duty cycle, and/or a variation of a laser pulse.

In some examples, controlling at least some of a plurality of lasers includes controlling one or more optical components associated with the lasers, such as one or more optical switches, phase shifter, and/or beam splitters channeling light emitted by the lasers. In some examples, controlling at least some of a plurality of lasers includes synchronizing a first laser pump (e.g., associated with a first functionality) with a second laser pump (e.g., associated with a second functionality), e.g., to synchronize more than one functionalities (e.g., trapping, cooling, and/or manipulating) or to synchronize sequential quantum computing operations. In some examples, controlling at least some of a plurality of lasers includes synchronizing operations of one or more laser pumps to emit specific types of light. For example, the one or more laser pumps may be synchronized to emit a red detuned pulse and a blue detuned pulse concurrently so that they may be carried in a waveguide simultaneously to establish an evanescent trap for trapping an alkali atom. In some examples, a single processor may control multiple lasers. e.g., by controlling operations of multiple monochromatic laser pumps. In some examples, each laser pump may be controlled by a separate processor. In some examples, dedicated processors may be provided to control individual lasers, and one or more processors, which may be separate from the dedicated processors or alternatively a subset of the dedicated processors, may coordinate and synchronize operations of the dedicated processors.

By way of non-limiting example, reference is made to quantum computing system 1600 shown in FIG. 16A which includes laser unit 1622 configured to provide laser beams or pulses (e.g., including laser beams 1628A, 1628B) to arrangements including silicon nitride resonator 1602A, 1612A couplable to alkali atom 1604A. 1614A, and processor(s) 1629 configured to, based on received at least one input or at least one input signal from detectors 1626, control at least some of a plurality of lasers (e.g., laser beams or pulses including laser beams 1628A, 1628B) provided by laser unit 1622 (e.g., by controlling parameters and/or settings of laser unit 1622).

By way of non-limiting example, reference is made to quantum computing system 1620 shown in FIG. 16B which includes laser unit 1622 configured to provide a laser beam or a pulse (e.g., including laser beam 1628C) to optical elements 1635 which are arranged to control or channel the laser beam or the pulse to provide laser beams or pulses (e.g., including laser beams 1628A, 1628B) to arrangements including silicon nitride resonator 1602A, 1612A couplable to alkali atom 1604A, 1614A, and processor(s) 1629 configured to, based on received at least one input or at least one input signal from detectors 1626, control at least some of a plurality of lasers (e.g., laser beams or laser pulses including laser beams 1628A, 1628B) by controlling at least one of: one or more lasers (e.g., laser beam 1628C) provided by laser unit 1622 (e.g., by controlling parameters and/or settings of laser unit 1622); and/or optical elements 1635.

Some embodiments involve controlling at least some of a plurality of lasers to manipulate at least one of the trapped first alkali atom and the trapped second alkali atom to thereby generate photonic qubits using the trapped first alkali atom. As described herein, a photonic qubit refers to a basic unit of quantum information stored in (or belonging to) one or more photons or electromagnetic field. As described herein, generating photonic qubits using a trapped first alkali atom refers to producing, creating, outputting, or otherwise providing the photonic qubits from a qubit generator or a photon generator containing the trapped first alkali atom (e.g., as described herein with reference to FIG. 9B, or alkali atom 1604A, 1604B shown in FIG. 16A to FIG. 16F). As described herein, manipulating in this context refers to controlling an external or internal state (e.g., a condition or a configuration) of the alkali atom. Manipulating at least one of the trapped first alkali atom and the trapped second alkali atom refers to controlling external or internal state(s) of the trapped first alkali atom, the trapped second alkali atom, or both. In some examples, manipulating a trapped alkali atom may include at least one of setting, adjusting and/or modifying an external or internal state (e.g., an atomic property, an energy level, and/or a motion) of the trapped alkali atom, and the set, adjusted and/or modified state of the trapped alkali atom enables the trapped alkali atom to serve an associated specific functionality. For example, different types of light provided by at least some of the plurality of lasers may manipulate the trapped alkali atom differently, and the at least some of the plurality of laser may be controlled so that the light provided thereby cause the internal and/or external state of the trapped alkali atom to be initialized for performing a desired specific functionality, e.g., generating photonic qubits. For example, as described herein, the trapped alkali atom may then interact with input photons to generate a plurality of photonic qubits as output. In some examples, the at least some lasers may be controlled based on received at least one input or input signal indicating a presence of a trapped first alkali atom and a trapped second alkali atom. For example, depending on an input signal received, the at least one processor may select a specific type of light pulse (or range of light pulses) to cause a desired manipulation of the trapped alkali atom, e.g., to invoke a specific functionality such as generating photonic qubits. In some examples, the at least one processor (e.g., operating in a distributed manner) are configured to receive input signals from multiple detectors associated with multiple coupling sites entrapping alkali atoms to coordinate and/or synchronize one or more operations of a quantum computing system based thereon (e.g., by controlling one or more lasers and/or optical components). In some examples, each detector is configured transmit an input signal to a different processor (or processors), each dedicated to a specific coupling site associated with the detector.

By way of non-limiting example, reference is made to quantum computing system 1600 shown in FIG. 16A which includes, as described herein, laser unit 1622 and processor(s) 1629 configured to, based on received at least one input or at least one input signal from detectors 1626, control at least some of a plurality of lasers (e.g., laser beams or pulses including laser beam 1628A) provided by laser unit 1622 (e.g., by controlling parameters and/or settings of laser unit 1622) to manipulate trapped first alkali atom 1604A to thereby generate photonic qubits 1606A using trapped first alkali atom 1604A.

By way of non-limiting example, reference is made to quantum computing system 1620 shown in FIG. 16B which includes, as described herein, laser unit 1622, optical elements 1635, and processor(s) 1629 configured to, based on received at least one input or at least one input signal from detectors 1626, control at least some of a plurality of lasers (e.g., laser beams or pulses including laser beam 1628A) to manipulate trapped first alkali atom 1604A to thereby generate photonic qubits 1606A using trapped first alkali atom 1604A. For example, processor(s) 1629 may be configured to control at least one of: one or more lasers (e.g., laser beam 1628C) provided by laser unit 1622 (e.g., by controlling parameters and/or settings of laser unit 1622); and/or optical elements 1635.

By way of non-liming example, reference is made to quantum computing system 1625 shown in FIG. 16C which includes a plurality of lasers, each laser 1622C, 1622D being configured to provide laser beam(s) or pulse(s) (e.g., including laser beam 1628A) to one qubit generator (each qubit generator 1632A, 1632B including first silicon nitride resonator 1602A, 1602B couplable to first alkali atom 1604A, 1604B) and one entangling gate (each entangling gate 1634A, 1634B including second silicon nitride resonator 1612A, 1612B couplable to second alkali atom 1614A, 1614B), and processor(s) 1629 configured to, based on received at least one input or at least one input signal indicating a presence of trapped first alkali atom 1604A, 1604B (and optionally a presence of trapped second alkali atom 1614A, 1614B) from detectors (e.g., first detectors 1626A and optionally from second detectors 1626B), control at least some of the plurality of lasers (e.g., laser beams or pulses including laser beam 1628A) to manipulate trapped first alkali atom 1604A, 1604B to thereby generate photonic qubits 1606A, 1606B using trapped first alkali atom 1604A, 1604B. In some examples, the processor(s) 1629 may be configured to control the at least some of the plurality of lasers in a similar manner to processor(s) 1629 of FIG. 16A or FIG. 16B described herein. In some examples, quantum computing system 1625 may also include optical elements similar to optical elements 1635 of FIG. 16B, and processor(s) 1629 of quantum computing system 1625 may be configured to control the optical elements as well, e.g., in a similar manner to processor(s) 1629 of FIG. 16B described herein.

By way of another non-liming example, reference is made to quantum computing system 1630 shown in FIG. 16D which includes a plurality of lasers (e.g., laser 1622E and laser 1624E), wherein first laser 1622E is configured to provide laser beams or laser pulses (e.g., including laser beam 1628A) to two or more qubit generators 1632A, 1632B (each qubit generator 1632A, 1632B including first silicon nitride resonator 1602A, 1602B couplable to first alkali atom 1604A, 1604B) and second laser 1624E is configured to provide laser beams or laser pulses (e.g., including laser beam 1628B) to two or more entangling gates 1634A, 1634B (each entangling gate 1634A, 1634B including second silicon nitride resonator 1612A, 1612B couplable to second alkali atom 1614A, 1614B), and processor(s) 1629 configured to, based on received at least one input or at least one input signal indicating a presence of trapped first alkali atom 1604A, 1604B (and optionally a presence of trapped second alkali atom 1614A, 1614B) from detectors (e.g., first detectors 1626A and optionally from second detectors 1626B), control at least some of the plurality of lasers (e.g., laser 1622E) to manipulate trapped first alkali atom 1604A, 1604B to thereby generate photonic qubits 1606A, 1606B using trapped first alkali atom 1604A, 1604B. In some examples, the processor(s) 1629 may be configured to control the at least some of the plurality of lasers (e.g., laser 1622E) in a similar manner to processor(s) 1629 of FIG. 16A or FIG. 16B or FIG. 16C described herein. In some examples, quantum computing system 1630 may also include optical elements similar to optical elements 1635 of FIG. 16B, and processor(s) 1629 of quantum computing system 1630 may be configured to control the optical elements as well, e.g., in a similar manner to processor(s) 1629 of FIG. 16B or FIG. 16C described herein.

By way of non-liming example, reference is made to quantum computing system 1640 shown in FIG. 16E which includes a plurality of lasers, each laser 1622A, 1622B, 1624A, 1624B being configured to provide a laser beam or a pulse (e.g., including laser beams 1628A, 1628B) to one qubit generator (each qubit generator 1632A, 1632B including first silicon nitride resonator 1602A, 1602B couplable to first alkali atom 1604A, 1604B) or one entangling gate (each entangling gate 1634A, 1634B including second silicon nitride resonator 1612A, 1612B couplable to second alkali atom 1614A, 1614B), and processor(s) 1629 configured to, based on received at least one input or at least one input signal indicating a presence of trapped first alkali atom 1604A, 1604B (and optionally a presence of trapped second alkali atom 1614A, 1614B) from detectors (e.g., first detectors 1626A and optionally second detectors 1626B), control at least some of the plurality of lasers (e.g., laser 1622A, 1622B) to manipulate trapped first alkali atom 1604A, 1604B to thereby generate photonic qubits 1606A, 1606B using trapped first alkali atom 1604A, 1604B. In some examples, the processor(s) 1629 may be configured to control the at least some of the plurality of lasers (e.g., laser 1622A, 1622B, 1624A, 1624B) in a similar manner to processor(s) 1629 of FIG. 16A or FIG. 16B or FIG. 16C or FIG. 16D described herein. In some examples, quantum computing system 1640 may also include optical elements similar to optical elements 1635 of FIG. 16B, and processor(s) 1629 of quantum computing system 1630 may be configured to control the optical elements as well, e.g., in a similar manner to processor(s) 1629 of FIG. 16B or FIG. 16C or FIG. 16D described herein.

By way of another non-liming example, reference is made to quantum computing system 1650 shown in FIG. 16F which includes a single laser, laser 1622F configured to provide laser beams or pulses (e.g., including laser beams 1628A, 1628B) to a plurality of qubit generators (each qubit generator 1632A, 1632B including first silicon nitride resonator 1602A, 1602B couplable to first alkali atom 1604A, 1604B) and a plurality of entangling gates (each entangling gate 1634A, 1634B including second silicon nitride resonator 1612A, 1612B couplable to second alkali atom 1614A, 1614B), and processor(s) 1629 configured to, based on received at least one input or at least one input signal indicating a presence of trapped first alkali atom 1604A, 1604B (and optionally a presence of trapped second alkali atom 1614A, 1614B) from detectors (e.g., first detectors 1626A and optionally second detectors 1626B), control at least some portions of laser 1622F (e.g., laser beams or laser pulses including laser beam 1628A) to manipulate trapped first alkali atom 1604A, 1604B to thereby generate photonic qubits 1606A, 1606B using trapped first alkali atom 1604A, 1604B. In some examples, the processor(s) 1629 may be configured to control the at least some portions of laser 1622F in a similar manner to processor(s) 1629 of FIG. 16A or FIG. 16B or FIG. 16C or FIG. 16D or FIG. 16E described herein. In some examples, quantum computing system 1650 may also include optical elements similar to optical elements 1635 of FIG. 16B, and processor(s) 1629 of quantum computing system 1630 may be configured to control the optical elements as well, e.g., in a similar manner to processor(s) 1629 of FIG. 16B or FIG. 16C or FIG. 16D or FIG. 16E described herein.

Some embodiments involve, based on received at least one input or input signal indicating a presence of a trapped first alkali atom and a trapped second alkali atom, controlling at least some of a plurality of lasers to manipulate at least one of the trapped first alkali atom and the trapped second alkali atom to thereby generate entanglement between photonic qubits transmitted to the trapped second alkali atom. Transmitting photonic qubits to a trapped second alkali atom may include conveying or propagating one or more photonic qubits (e.g., generated by a qubit generator or another photonic qubit source) to the trapped second alkali atom via one or more waveguides. For example, the trapped second alkali atom (e.g., associated with an entanglement gate) may be positioned downstream from the trapped first alkali atom (e.g., associated with a qubit generator) and may receive photonic qubits generated using the trapped first alkali atom via the one or more waveguides.

As described herein, entanglement between photonic qubits refers to a condition where states of at least two photonic qubits are linked with each other, for example to produce a correlation between measurements of the states of at least two photonic qubits to store mutual information. Generating entanglement between photonic qubits transmitted to a trapped alkali atom refers to causing a condition where states of the photonic qubits transmitted to the trapped alkali atom are linked with each other. For example, entanglement as described herein with reference to FIG. 9C, or entanglement as described herein with reference to photonic qubits 1619A, 1606A, 1606B transmitted to an entangling gate so that they can interact with a trapped second alkali atom 1614A, 1614B of entangling gate 1634A 1634B shown in FIG. 16A to FIG. 16F. For example, the state of one photonic qubit may be related to the state of another photonic qubit in such a way that those states cannot be described independently of each other. This entanglement produces, for example, a correlation between measurements of those states, correlating a measurement of the states of the at least two photonic qubits, whereby mutual information may be stored or processed using this correlation.

Manipulating at least one of the trapped first alkali atom and the trapped second alkali atom refers to controlling external or internal state(s) of the trapped first alkali atom, the trapped second alkali atom, or both. In some examples, manipulating a trapped alkali atom may include at least one of setting, adjusting and/or modifying an external or internal state (e.g., an atomic property, an energy level, and/or a motion) of the trapped alkali atom, and the set, adjusted and/or modified state of the trapped alkali atom enables the trapped alkali atom to serve an associated specific functionality. For example, different types of light provided by at least some of the plurality of lasers may manipulate the trapped second alkali atom differently, and the at least some of the plurality of laser may be controlled so that the light provided thereby cause the internal and/or external state of the trapped second alkali atom to be initialized for performing a desired specific functionality, e.g., generating entanglement between photonic qubits that are transmitted to, and travel nearby so as to interact with, the trapped second alkali atom. For example, as described herein, the trapped second alkali atom may then interact with the photonic qubits to cause entanglement between the photonic qubits.

Some embodiments involve controlling at least some of the plurality of lasers to manipulate at least one of the trapped first alkali atom and the trapped second alkali atom to thereby generate entanglement between photonic qubits transmitted to the trapped second alkali atom. In some examples, the at least some lasers may be controlled based on at least one input or input signal indicating a presence of a trapped first alkali atom and a trapped second alkali atom. For example, depending on an input signal received, at least one processor may select a specific type of light pulse (or range of light pulses) to cause a desired manipulation of the trapped second alkali atom, e.g., to invoke a specific functionality such as generating entanglement between photonic qubits arranged to be interact with the trapped second alkali atom. In some examples, the at least one processor (e.g., operating in a distributed manner) are configured to receive input signals from multiple detectors associated with multiple coupling sites entrapping alkali atoms to coordinate and/or synchronize one or more operations of a quantum computing system based thereon (e.g., by controlling one or more lasers and/or optical components). In some examples, each detector is configured transmit an input signal to a different processor (or processors), each dedicated to a specific coupling site associated with the detector.

By way of non-limiting example, reference is made to quantum computing system 1600 shown in FIG. 16A which, as described herein, includes laser unit 1622 and processor(s) 1629 configured to, based on received at least one input or at least one input signal from detectors 1626, control at least some of a plurality of lasers (e.g., laser beams or pulses including laser beam 1628B) provided by laser unit 1622 (e.g., by controlling parameters and/or settings of laser unit 1622) to manipulate trapped second alkali atom 1614A to thereby generate entanglement between photonic qubits 1619A transmitted to trapped second alkali atom 1614A. In some examples, processor(s) 1629 may be also configured to, based on received at least one input or at least one input signal from detectors 1626, control at least some of a plurality of lasers (e.g., laser beams or pulses including laser beam 1628A) to manipulate trapped first alkali atom 1604A so that photonic qubits 1606A generated using trapped first alkali atom 1604A may be used as input photonic qubits 1619A for trapped second alkali atom 1614A.

By way of non-limiting example, reference is made to quantum computing system 1620 shown in FIG. 16B which, as described herein, includes laser unit 1622, optical elements 1635, and processor(s) 1629 configured to, based on received at least one input or at least one input signal from detectors 1626, control optical elements 1635 and/or at least some of a plurality of lasers (e.g., laser beam 1628C) provided by laser unit 1622 (e.g., by controlling parameters and/or settings of laser unit 1622) to manipulate trapped second alkali atom 1614A to thereby generate entanglement between photonic qubits 1619A transmitted to trapped second alkali atom 1614A. In some examples, processor(s) 1629 may be also configured to, based on received at least one input or at least one input signal from detectors 1626, control optical elements 1635 and/or at least some of a plurality of lasers (e.g., laser beam 1628C) to manipulate trapped first alkali atom 1604A to generate photonic qubits 1606A so that photonic qubits 1606A generated using trapped first alkali atom 1604A may be used as input photonic qubits 1619A for trapped second alkali atom 1614A.

By way of non-liming example, reference is made to quantum computing system 1625 shown in FIG. 16C which, as described herein, includes a plurality of lasers, each laser 1622C, 1622D being configured to provide laser beam(s) or pulse(s)(e.g., laser beam 1628A) to one qubit generator (each qubit generator 1632A, 1632B including first silicon nitride resonator 1602A, 1602B couplable to first alkali atom 1604A, 1604B) and one entangling gate (each entangling gate 1634A, 1634B including second silicon nitride resonator 1612A, 1612B couplable to second alkali atom 1614A, 1614B), and processor(s) 1629 configured to, based on received at least one input or at least one input signal indicating a presence of trapped second alkali atom 1614A, 1614B from detectors (e.g., second detectors 1626B), control at least some of the plurality of lasers (e.g., laser beams or pulses including laser beam 1628B from laser 1622C, 1622D) to manipulate trapped second alkali atom 1614A, 1614B to thereby generate entanglement between photonic qubits 1606A, 1606B transmitted to trapped second alkali atom 1614A, 1614B and output entangled photonic qubits 1610A, 1610B. In some examples, processor(s) 1629 may be also configured to, based on received at least one input or at least one input signal indicating a presence of trapped first alkali atom 1604A, 1604B from detectors (e.g., first detectors 1626A), control at least some of a plurality of lasers (e.g., laser beams or pulses including laser beam 1628A from laser 1622C, 1622D) to manipulate trapped first alkali atom 1604A, 1604B so that photonic qubits 1606A, 1606B generated using trapped first alkali atom 1604A, 1604B may be used as input photonic qubits 1606A, 1606B for trapped second alkali atom 1614A, 1614B. In some examples, the processor(s) 1629 may be configured to control the at least some of the plurality of lasers in a similar manner to processor(s) 1629 of FIG. 16A or FIG. 16B described herein. In some examples, quantum computing system 1625 may also include optical elements similar to optical elements 1635 of FIG. 16B, and processor(s) 1629 of quantum computing system 1625 may be configured to control the optical elements as well, e.g., in a similar manner to processor(s) 1629 of FIG. 16B described herein.

By way of another non-liming example, reference is made to quantum computing system 1630 shown in FIG. 16D which, as described herein, includes a plurality of lasers (e.g., laser 1622E and laser 1624E), wherein first laser 1622E is configured to provide laser beams or pulses (e.g., laser beam 1628A) to two or more qubit generators 1632A, 1632B (each qubit generator 1632A, 1632B including first silicon nitride resonator 1602A, 1602B couplable to first alkali atom 1604A, 1604B) and second laser 1624E is configured to provide laser beams or pulses (e.g., laser beam 1628B) to two or more entangling gates 1634A, 1634B (each entangling gate 1634A, 1634B including second silicon nitride resonator 1612A, 1612B couplable to second alkali atom 1614A, 1614B), and processor(s) 1629 configured to, based on received at least one input or at least one input signal indicating a presence of trapped second alkali atom 1614A, 1614B from detectors (e.g., second detectors 1626B), control at least some of the plurality of lasers (e.g., laser beams or pulses including laser beam 1628B from second laser 1624E) to manipulate trapped second alkali atom 1614A, 1614B to thereby generate entanglement between photonic qubits 1606A, 1606B transmitted to trapped second alkali atom 1614A, 1614B and output entangled photonic qubits 1610A, 1610B. In some examples, processor(s) 1629 may be also configured to, based on received at least one input or at least one input signal indicating a presence of trapped first alkali atom 1604A, 1604B from detectors (e.g., first detectors 1626A), control at least some of a plurality of lasers (e.g., laser beams or pulses including laser beam 1628A from first laser 1622E) to manipulate trapped first alkali atom 1604A, 1604B so that photonic qubits 1606A, 1606B generated using trapped first alkali atom 1604A, 1604B may be used as input photonic qubits 1606A, 1606B for trapped second alkali atom 1614A, 1614B. In some examples, the processor(s) 1629 may be configured to control the at least some of the plurality of lasers (e.g., laser 1624E or laser 1622E) in a similar manner to processor(s) 1629 of FIG. 16A or FIG. 16B or FIG. 16C described herein. In some examples, quantum computing system 1630 may also include optical elements similar to optical elements 1635 of FIG. 16B, and processor(s) 1629 of quantum computing system 1630 may be configured to control the optical elements as well, e.g., in a similar manner to processor(s) 1629 of FIG. 16B or FIG. 16C described herein.

By way of non-liming example, reference is made to quantum computing system 1640 shown in FIG. 16E which, as described herein, includes a plurality of lasers, each laser 1622A, 1622B, 1624A, 1624B being configured to provide a laser beam or a pulse (e.g., laser beams 1628A, 1628B) to one qubit generator (each qubit generator 1632A, 1632B including first silicon nitride resonator 1602A, 1602B couplable to first alkali atom 1604A, 1604B) or one entangling gate (each entangling gate 1634A, 1634B including second silicon nitride resonator 1612A, 1612B couplable to second alkali atom 1614A, 1614B), and processor(s) 1629 configured to, based on received at least one input or at least one input signal indicating a presence of trapped second alkali atom 1614A, 1614B from detectors (e.g., second detectors 1626B), control at least some of the plurality of lasers (e.g., laser beams or pulses including laser beam 1628B from laser 1624A, 1624B) to manipulate trapped second alkali atom 1614A, 1614B to thereby generate entanglement between photonic qubits 1606A, 1606B transmitted to trapped second alkali atom 1614A, 1614B and output entangled photonic qubits 1610A, 1610B. In some examples, processor(s) 1629 may be also configured to, based on received at least one input or at least one input signal indicating a presence of trapped first alkali atom 1604A, 1604B from detectors (e.g., first detectors 1626A), control at least some of a plurality of lasers (e.g., laser beams or laser pulses including laser beam 1628A from laser 1622A, 1622B) to manipulate trapped first alkali atom 1604A, 1604B so that photonic qubits 1606A, 1606B generated using trapped first alkali atom 1604A, 1604B may be used as input photonic qubits 1606A, 1606B for trapped second alkali atom 1614A, 1614B. In some examples, the processor(s) 1629 may be configured to control the at least some of the plurality of lasers (e.g., laser 1622A, 1622B, 1624A, 1624B) in a similar manner to processor(s) 1629 of FIG. 16A or FIG. 16B or FIG. 16C or FIG. 16D described herein. In some examples, quantum computing system 1640 may also include optical elements similar to optical elements 1635 of FIG. 16B, and processor(s) 1629 of quantum computing system 1630 may be configured to control the optical elements as well, e.g., in a similar manner to processor(s) 1629 of FIG. 16B or FIG. 16C or FIG. 16D described herein.

By way of another non-liming example, reference is made to quantum computing system 1650 shown in FIG. 16F which, as described herein, includes a single laser, laser 1622F configured to provide laser beams or pulses (e.g., laser beams 1628A, 1628B) to a plurality of qubit generators (each qubit generator 1632A, 1632B including first silicon nitride resonator 1602A. 1602B couplable to first alkali atom 1604A, 1604B) and a plurality of entangling gates (each entangling gate 1634A, 1634B including second silicon nitride resonator 1612A, 1612B couplable to second alkali atom 1614A, 1614B), and processor(s) 1629 configured to, based on received at least one input or at least one input signal indicating a presence of trapped second alkali atom 1614A, 1614B from detectors (e.g., second detectors 1626B), control at least some portions of laser 1622F (e.g., laser beams or laser pulses including laser beam 1628B) to manipulate trapped second alkali atom 1614A, 1614B to thereby generate entanglement between photonic qubits 1606A. 1606B transmitted to trapped second alkali atom 1614A, 1614B and output entangled photonic qubits 1610A, 1610B. In some examples, processor(s) 1629 may be also configured to, based on received at least one input or at least one input signal indicating a presence of trapped first alkali atom 1604A, 1604B from detectors (e.g., first detectors 1626A), control at least some portions of laser 1622F (e.g., laser beams or pulses including laser beam 1628A) to manipulate trapped first alkali atom 1604A, 1604B so that photonic qubits 1606A, 1606B generated using trapped first alkali atom 1604A, 1604B may be used as input photonic qubits 1606A, 1606B for trapped second alkali atom 1614A, 1614B. In some examples, the processor(s) 1629 may be configured to control the at least some portions of laser 1622F in a similar manner to processor(s) 1629 of FIG. 16A or FIG. 16B or FIG. 16C or FIG. 16D or FIG. 16E described herein. In some examples, quantum computing system 1650 may also include optical elements similar to optical elements 1635 of FIG. 16B, and processor(s) 1629 of quantum computing system 1630 may be configured to control the optical elements as well, e.g., in a similar manner to processor(s) 1629 of FIG. 16B or FIG. 16C or FIG. 16D or FIG. 16E described herein.

Some embodiments involve measuring photonic qubits. Measuring refers to detecting, sensing, inferring and/or determining one or more states or properties. Measuring photonic qubits refers to detecting, sensing, inferring and/or determining one or more states or properties associated with the quantum information of (belonging to) the one or more photons or electromagnetic field. This quantum information may be stored in each photonic qubit or a group of photonic qubits (e.g., in relationship or correlation therebetween). For example, such detecting, inferring, sensing and/or determining may involve counting the one or more photons or measuring intensity or any other property of the electromagnetic field. In some examples, such detecting, sensing, inferring and/or determining may involve testing and/or manipulating a physical system including one or more photons or electromagnetic field to yield a numerical result, and this numerical result may be probabilistic in a quantum computing system, e.g., indicating a superposition of states, or a collapse of a superposition of states to a single state (e.g., corresponding to a classic bit of information). This probabilistic result itself may then serve as the measurable quantum information stored in that physical system. In some examples, the one or more states or properties associated with the quantum information stored in (belonging to) the one or more photons or electromagnetic field is inferred or determined from detecting, sensing and/or determining one or more states or properties of another object, such as other photons/photonic qubits or trapped alkali atom which are entangled with the photonic qubit we are trying to measure. For example, the measuring may be performed using one or more of the techniques described herein with respect to the qubit "read"/"write" operation, measurement or the SWAP gate shown in FIG. 2E, FIG. 5A-FIG. 5B, and FIG. 6.

In some embodiments involving a plurality of detectors, measuring photonic qubits may use the plurality of detectors, and/or the plurality of detectors may be configured to measure photonic qubits. As described herein, a detector refers to a device or an instrument designed to sense the presence, property, and/or state, or change in property and/or state, of an object, and a plurality of detectors described herein may be used to detect (e.g., by sensing and/or determining) one or more states or properties of each photonic qubit or a group of photonic qubits. For example, one or more detectors (e.g., photon detectors) may be located at a waveguide carrying photonic qubits or branching off a waveguide carrying photonic qubits to measure photonic qubits propagating through the waveguide. By way of non-limiting examples, FIG. 9A shows quantum waveguide 930 (e.g., carrying output photonic qubits) which includes an optical element (e.g., a switch 970) for routing at least some of the output photonic qubits to detector 952 to perform a measurement. When the output photonic qubits are entangled with each other, and hence have a correlation relationship, based on the measurement of these re-routed photonic qubits, it is possible to infer or determine one or more states or properties of photonic qubits that have been output before these re-routed photonic qubits reached detector 952. As another example, the state of a photonic qubit may be associated with a direction of travel within a resonator (e.g., rotating inside a silicon nitride resonator which may be a ring shaped resonator or a whispering gallery mode resonator) and may be measured by positioning a photon detector on either side of a quantum waveguide configured with the resonator. The state of the photonic qubit may be known based on the side of the quantum waveguide where the photonic qubit is detected. Alternatively, a detector may be positioned on only one side of a quantum wave guide for a quantum computing gate (e.g., the downstream side). If the photon is detected, the measurement may be associated with the downstream direction (e.g., the first of two possible quantum states), and if the photon is not detected, the lack of measurement may be associated with the upstream direction (e.g., the second of the two possible quantum states). As another example, the state of a photonic qubit may be associated with polarization (e.g., vertical or horizontal) and a photon detector may measure the value of the photonic qubit based on detected polarization. As another example, the state of a photonic qubit may be associated with its location in one of two separate waveguides (e.g., as in a dual rail encoding, wherein a qubit is encoded in the occupation of a single photon in either of two orthogonal modes).

By way of non-limiting examples, reference is made to FIG. 16A, FIG. 16B, FIG. 16C, FIG. 16D, FIG. 16E, and FIG. 16F which illustrate exemplary implementations of a quantum computing system including one or more detectors 1626, 1626A, 1626B. The one or more detectors 1626, 1626A, 1626B of quantum computing system 1600, 1620, 1625, 1630, 1640, 1650 shown in FIG. 16A, FIG. 16B, FIG. 16C, FIG. 16D, FIG. 16E, or FIG. 16F may also include a plurality of detectors configured to measure photonic qubits such as generated photonic qubits 1606A, 1606B and/or output entangled photonic qubits 1610A, 1610B. In some examples, at least some of the plurality of detectors may also be configured to generate a signal based on the measurement(s) so that the signal includes information relating to the measurement(s). In some examples, the generated signal from the detectors is communicated to processor(s) 1629 so that the generated signal may serve as an input signal for processor(s) 1629 and/or the information relating to the measurement(s) may serve as an input for processor(s) 1629 as described herein. For example, in FIG. 16A, FIG. 16B, FIG. 16C, FIG. 16D, FIG. 16E, and FIG. 16F, detectors 1626, 1626A, 1626B are positioned downstream of waveguide 1608A, 1608B carrying generated photonic qubits 1606A, 1606B and downstream of waveguide 1618A, 1618B outputting entangled photonic qubits 1610A, 1610B. Detectors 1626, 1626A, 1626B measure one or more of generated photonic qubits 1606A, 1606B and/or one or more of entangled photonic qubits 1610A, 1610B, and provide an indication of the measurement(s) to processors 1629. Detectors 1626, 1626A, 1626B may measure one or more of generated photonic qubits 1606A, 1606B and/or one or more of entangled photonic qubits 1610A, 1610B by inferring/determining state(s) and/or propert(ies) of those photonic qubits 1606A, 1606B, 1610A, 1610B from measuring other associated photonic qubits using a switch and a waveguide branch-off arrangement as described with reference to FIG. 9A, and/or by positioning at least one of those detectors at an end of a waveguide carrying the photonic qubits to be measured), or from measuring trapped alkali atom entangled with entangled photonic qubits 1610A, 1610B (e.g., by mapping a state of the trapped alkali atom to a photon and using detectors 1626, 1626A, 1626B to detect that photon as described herein with reference to mapping a quantum emitter qubit to a photonic qubit).

Some embodiments involve manipulating measurement bases of subsequent photonic qubits using results of measurements of prior photonic qubits. As described herein, a photonic qubit refers to a basic unit of quantum information stored in (or belonging to) one or more photons or electromagnetic field. Subsequent photonic qubits refer quantum information stored in a first group of one or more photons or electromagnetic field that are processed (e.g., generated, output and/or measured) later than, or following, processing (e.g., generation, outputting and/or measurement) of a second group of one or more photons or electromatic field that were processed earlier temporally. Prior photonic qubits refer to quantum information stored in the second group of one or more photons or electromatic field that were processed earlier than, or before, subsequent photonic qubits. For examples, prior photonic qubits may include quantum information belonging to one or more photons preceding, or processed or generated earlier than, subsequent photonic qubits from a series of photonic qubits which are processed in (e.g., generated, output, measured, and/or used for an operation of) a quantum computing system. For example, a trapped alkali atom (e.g., of a qubit generator) may produce a sequential time series of photonic qubits such that some photonic qubits are generated earlier (e.g., prior to) than later generated photonic qubits. Prior photonic qubits include preceding photonic qubits of this time series, which are generated earlier than subsequent photonic qubits that are generated later. In some examples, a trapped alkali atom (e.g., of an entangling gate) may cause or generate entanglement between at least two photonic qubits such that a series of entangled photonic qubits are output therefrom, producing a sequential time series of entangled photonic qubits, wherein some photonic qubits are generated earlier (e.g., prior to) than later generated photonic qubits. Prior photonic qubits include preceding entangled photonic qubits of this time series, which are generated or measured earlier than subsequent photonic qubits that are generated or measured later.

Measurements of prior photonic qubits refer to one or more detected, sensed, inferred and/or determined states or properties associated with quantum information of (belonging to) one or more photons or electromagnetic field that are processed (e.g., generated, output and/or measured) earlier than another group of one or more photons or electromagnetic field. In some examples, a detector located on a waveguide carrying output photonic qubits (e.g., downstream of the trapped alkali atom) may measure one or more of the photonic qubits generated by the alkali atom earlier in a time series. The detector may then provide results of these measurements to at least one processor. The at least one processor may then process, store (e.g., in memory) and/or use these measurement results as a baseline for determining types of manipulations to implement on later photonic qubits or for determining the measurement basis for later photonic qubits, e.g., the results of the measurements functioning as feedback. For example, the at least one processor may determine adjustments to optical elements upstream of a detector such that providing the adjusted optical elements implements a choice of measurement bases on any subsequently generated photonic qubits. Results of measurements of photonic qubits may include the measurement of a horizontal polarization or vertical polarization of a photon, the measurement of a location of a photon in one of two waveguides, and the measurement of the time of arrival of a photon in one of two time bins.

A measurement basis refers to a measurement configuration for determining whether a state of a qubit is one of two possible outcomes. For example, a measurement basis refers to a setting or condition or choice of two or more orthogonal states of a quantum system to be distinguished in a measurement. For example, a measurement basis may refer to a pair of possible orthogonal states for a qubit. A measurement basis may be a choice of basis in which a qubit is measured, and this choice of measurement bases may involve a modification of one or more optical elements configured to interact with qubits prior to their detection. For example, if a quantum qubit is implemented via electron spin, a basis for the qubit may be a pair of possible orthogonal states for electron spin that the qubit may collapse to, e.g., up or down. Similarly, a measurement bases for a quantum qubit implemented as a photonic qubit, may include possible directions of travel of the qubit (e.g., inside a resonator), and/or possible polarizations of the photonic qubit. For example, a measurement basis for measuring polarization may include a basis of vertical and horizontal polarizations or a basis of clockwise circular polarization and counterclockwise circular polarization. In some examples, computational basis refers to 0 and 1, and other measurement bases are 0+1 and 0−1, or $|0\rangle+i|1\rangle$ and $|0\rangle-i|1\rangle$. For example, measuring in the basis of horizontal (0) and vertical (1) polarization may involve the use of a polarizer prior to the detector. In other examples, measuring in the basis of circular polarizations (i.e., clockwise=$|0\rangle+i|1\rangle$ and counterclockwise $|0\rangle-i|1\rangle$) may involve introducing a quarter wave plate prior to the detector. In some examples, a Z measurement basis refers to a measurement configuration that determines whether a qubit is in $|0\rangle$ or in $|1\rangle$, whereas an X measurement basis refers to the measurement configuration that determines whether the qubit is in a positive superposition ($|0\rangle+|1\rangle$)/sqrt(2) or in a negative superposition ($|0\rangle-|1\rangle$)/sqrt(2). In some examples, the measurement basis includes a Bell basis. A Bell basis refers to a particular basis of a two qubit system, wherein the measurement bases of the two-qubit system can correspond to the Bell basis (i.e., a Bell state measurement). In some examples, the measurement basis includes other suitable basis of a qubit system. A measurement can only be performed in one measurement basis at a time. The outcome of a measurement in one basis can be used to determine a choice of basis for a subsequent measurement of a different photonic qubit. A measurement basis for a qubit may be described as opposing points on a Bloch sphere. A photonic qubit may have a measurement basis consisting of two possible states, whereas a system consisting of two or more photonic qubits can have measurement basis consisting of four or more possible states. Manipulating measurement bases refers to adjusting or setting a setting or condition of one or more properties for use in a measurement. For example, manipulating measurement bases for a photonic qubit may involve setting and/or adjusting parameters associated with one or more optical elements such as switches, phase shifters and/or birefringent elements. Manipulating measurement bases of subsequent photonic qubits using results of measurements of prior photonic qubits refers to adjusting or setting a setting or condition of one or more states or properties used in measuring later processed photonic qubits based on detected, sensed, inferred and/or determined one or more states or properties associated with quantum information stored in (belonging to) one or more photons that are processed (e.g., generated, output and/or measured) earlier.

In some embodiments involving at least one processor, the at least one processor may be configured to manipulate measurement bases of subsequent photonic qubits using results of measurements of prior photonic qubits. For example, the at least one processor may set and/or adjust; parameters associated with one or more optical elements such as switches, phase shifters and/or birefringent elements involved in measurement of subsequent photonic qubits; and/or set or adjust one or more of the timing for on/off, power level, wavelength, frequency, phase, polarization, spin, intensity, synchronization, duty cycle, and/or variation of light emitted by one or more laser pumps optically coupled to the trapped alkali atom, as described herein. The setting and/or adjustment of parameters associate with one or more optical elements may affect measurement of subsequent photonic qubits. The setting or adjustment of the light emitted by one or more laser pumps, which may also involve setting and/or adjusting parameters of one or more optical elements associated with the light emitted by one or more laser pumps, may affect interactions between the set/adjusted laser light and an alkali atom, such as the trapping, cooling, manipulating, and/or measuring the alkali atom. The set/adjusted laser light may additionally affect input photons conveyed to the trapped alkali atom and interactions therebetween. The setting and/or adjustments to the laser light may also cause a corresponding adjustment (e.g., manipulation) of the available measurement bases for photonic qubits subsequently generated by the trapped alkali atom.

Some embodiments involve one or more optical elements (e.g., switches, phase shifters, birefringent elements and other structures mentioned below). In some embodiments involving one or more lasers, a plurality of lasers and/or a plurality of detectors, the one or more lasers, the plurality of lasers and/or the plurality of detectors may be associated with the one or more optical elements. In some examples, the one or more optical elements include at least one of: lens(es); mirror(s); filter(s); polarizer(s); prism(s); wave plate(s); transmissive element(s); reflective element(s); optical switch(es); birefringent element(s) (e.g., beam splitter(s)); phase shifter(s); optical delay line(s); and/or any other optical element(s) configured to perform one or more optical functions. An optical function refers to one or more of reflecting, refracting, absorbing, focusing, scattering, manipulating (e.g., one or more optical properties), guiding, lengthening/shortening a travel path, directing, re-directing one or more photons, and/or changing a polarization of light. Manipulating an optical property includes shifting a phase of a laser pulse, splitting a laser pulse into multiple laser pulses, combining a laser pulse with another laser pulse, redirecting a path of a laser pulse, modifying an intensity of a laser pulse, or changing the frequency of a laser pulse. In some examples, one or more of the optical elements are formed using a fabrication method such as lithography, for example using lithographic processing on a silicon-based substrate to form those features on the silicon-based substrate. In some examples, the one or more optical elements may be associated with one or more states, such that adjusting the one or more states allows to control the type of light interacting with the first alkali atom coupled to the first silicon nitride resonator and/or the second alkali atom coupled to the second silicon nitride resonator. For example, adjusting a state of the one or more optical elements may affect interactions between the light and the first alkali atom and/or second alkali atom, thereby affecting an operation or an output of a quantum computing system comprising the first alkali atom and/or second alkali atom. In some examples, the optical elements are associated with a controller configured to set or adjust the one or more states, e.g., in response to receiving a control instruction from a processor. For example, the processor may measure (or receive a measurement or an indication thereof) of an output of a component of a quantum computing system and may use the measurement or indication as feedback to set or adjust one or more states of at least some of the optical elements to manipulate the light used in the quantum computing system, thereby affecting the state of, and thus operation in or output from, the quantum computing system.

By way of non-limiting examples, FIG. 9A shows an optical element (e.g., a switch 970) for routing at least some of output photonic qubits to detector 952 to perform a measurement. By way of non-liming examples, FIG. 16B shows optical elements 1635 for controlling or channeling a laser beam or a laser pulse to provide laser beams or pulses to different arrangements for generating photonic qubits and/or generating entanglement between photonic qubits, and optical elements 1635D for setting, adjusting, changing, and/or manipulating measurement bases for a subsequent measurement by one or more detector(s) associated with optical elements 1635D. Optical elements 1635D may also be arranged (e.g., appropriately located to be nearby relevant waveguide 1608A. 1618A) to control or channel generated photonic qubits 1606A, 1606B and/or output entangled photonic qubits 1610A, 1610B as they are transmitted to and/or received by detectors 1626. Similar optical elements may also be included in quantum computing system 1625, 1630, 1640, 1650 shown in FIG. 16C or FIG. 16D or FIG. 16E or FIG. 16F described herein.

Some embodiments involve manipulating the measurement bases by changing states of optical elements. As described herein, manipulating the measurement bases refers to adjusting or setting a setting or condition of one or more states or properties for use in a measurement, and changing states of optical elements refers to adjusting parameters relevant to functioning of the optical elements. For example, changing states of optical elements may involve setting and/or adjusting parameters associated with one or more optical elements such as such as switches, phase shifters and/or birefringent elements.

In some embodiments involving a plurality of optical switches, manipulating the measurement bases may include changing states of the plurality of switches. An optical switch refers to a component or a group of components including one or more optical and/or electronic components configured to direct propagating photons in a particular direction, e.g., by selecting one of multiple waveguides for carrying the photons, and/or by halting a propagation of photons. An optical switch may be manufactured using a lithographic or photolithographic process in a silicon fabrication facility, e.g., by printing an optical switch in a layer of silicon nitride or by growing, depositing, etching, and/or using photolithographic techniques on a substrate. A state of an optical switch refers to a parameter relevant to functioning of the one or more optical and/or electronic components. For example, a state of an optical switch may include multiple parameters or settings allowing to control the propagations of photons in a quantum computing system. For example, an optical switch may include on/off settings for one or more waveguides and/or quantum computing gates optically coupled there to, such that setting the on/off settings allows selecting one or more of the waveguides and/or quantum computing gates. As another example, an optical switch may include on/off settings for one or more laser pumps (e.g., monochromatic laser pump) coupled thereto, allowing to control the flow of monochromatic photons in a quantum computing system (e.g., the timing, duration, direction). As another example, an optical switch may include on/off settings for one or more laser units (e.g., including one or more laser pumps) to control propagation of photons emitted by laser units coupled thereto. For example, a processor may make a decision whether to set the optical switch in an "on" state or "off" state, e.g., to optically couple and/or decouple one or more waveguides of a quantum computing system. As a measurement of photonic qubits involves controlling propagation of photons, changing the one or more states of one or more optical switches this way can lead to manipulating one or more measurement bases for subsequently generated photonic qubits, e.g., in response to receiving measurements of prior photonic qubits. In some examples, an optical switch may include a phase shifter.

By way of a non-limiting example, in FIG. 16B, processor(s) 1629 may transmit one or more signals for controlling setting to optical elements 1635D to change a state of at least one optical switch included in optical elements 1635D. For example, processor(s) 1629 may cause an optical switch included in optical elements 1635D (which is also associated with a specific laser pump or a specific detector) to be turned on, thereby allowing photons emitted by the specific laser pump to propagate towards trapped alkali atom 1604A, 1614A, or from trapped alkali atom 1604A, 1614A to the specific detector, or to another optical element for further manipulation.

In some embodiments involving a plurality of phase shifters, manipulating the measurement bases may include changing states of the plurality of phase shifters. A phase shifter refers to a component or a group of components including one or more optical and/or electronic components configured to alter a phase angle of an electromagnetic signal (e.g., a signal or a pulse comprising one or more photons). A phase shifter may enable the incidence (e.g., timing) of peaks and troughs of an alternating signal propagating over time to be altered without affecting other properties, such as the frequency, amplitude, polarization, or direction of the signal. A phase shifter may allow synchronizing photons to produce a coherent light (e.g., by shifting the phase of photons to cause alignment) and/or to produce an incoherent light (e.g., by shifting the phase of photons to cause dealignment). A phase shifter may be manufactured using a lithographic or photolithographic process in a silicon fabrication facility, e.g., by printing a phase shifter in a layer of silicon nitride or by growing, depositing, etching, and/or using photolithographic techniques on a substrate. A phase shifter may include multiple states, each configured to implement a different alteration or set of alterations to the phase of a signal, such that changing (e.g., modifying, altering, or adjusting) a state of a phase shifter allows controlling the phase of the signal propagating through the phase shifter. In some examples, a phase shifter (e.g., arranged with an optical switch) may be used in modifying a temporal profile of a propagating photon. For example, in response to receiving measurements of prior photonic qubits, a processor may transmit a control signal to adjust a state of a phase shifter, causing the phase of photons propagating towards a trapped alkali atom to shift in a manner corresponding to the adjusted state. For example, a phase shifter may be used to set or adjust a measurement basis of an associated detector so that the measurement by the associated detector is based on polarizations of one or more photonic qubits, e.g., vertical and horizontal polarizations, or clockwise and counterclockwise circular polarizations.

By way of a non-limiting example, in FIG. 16B, processor(s) 1629 may transmit one or more signals for controlling setting to optical elements 1635D to change a state of at least one phase shifter included in optical elements 1635D. For example, processor(s) 1629 may cause a phase of one or more photons propagating towards trapped alkali atom 1604A, 1614A, or from trapped alkali atom 1604A, 1614A to a specific detector, to be altered by changing the state of a phase shifter included in optical elements 1635D (which is also associated with a specific laser pump or the specific detector).

In some embodiments involving a plurality of birefringent elements, manipulating the measurement bases may include changing states of the plurality of birefringent elements. A birefringent element refers to a component or a group of components including one or more materials (e.g., glass, silicon, or plastic) having a refractive index dependent on the polarization and propagation direction of light. A birefringent element may split light into different paths (e.g., as a beam splitter) based on polarization. A birefringent element may change the polarization of light, e.g., linearly polarized light may be changed to circularly polarized light, and the reverse. A state of a birefringent element may include the angle of a waveplate. In some examples, a birefringent element may be arranged with an optical switch to allow directing a propagating photon to a selected waveguide. For example, in response to receiving measurements of prior photonic qubits, a processor may send a control signal to change a state of a birefringent element. The changed state may cause changes in light propagating towards a trapped alkali atom, or from the trapped alkali atom to a detector. For example, a birefringent element may be used to set or adjust a measurement basis of an associated detector so that the measurement by the associated detector is based on polarizations of one or more photonic qubits, e.g., vertical and horizontal polarizations, or clockwise and counterclockwise circular polarizations.

By way of a non-limiting example, in FIG. 16B, processor(s) 1629 may transmit one or more signals for controlling setting to optical elements 1635D to change a state of at least one birefringent element (e.g., at least one polarizing beam splitter or at least one waveplate) included in optical elements 1635D. For example, processor(s) 1629 may cause a polarization of one or more photons propagating towards trapped alkali atom 1604A, 1614A, or from trapped alkali atom 1604A, 1614A to a specific detector, to be modified by changing the state of a birefringent element included in optical elements 1635D (which is also associated with a specific laser pump or the specific detector).

Some embodiments involve performing a logic operation by selecting bases for photonic qubit measurements to measure the photonic qubits. A logic operation refers to a quantum operation such as those expressible using one or more quantum logic gates (e.g., X gate, Y gate, Z gate, or CNOT gate) or a combination thereof, wherein the quantum operation may be performed on one or more inputs to produce an output, thereby implementing a logical computation. As described herein, a measurement basis refers to a setting or condition of one or more states or properties for use in a measurement. For example, a measurement basis may refer to a pair of orthogonal states for a qubit as described herein. Selecting bases for photonic qubit measurements refers to choosing or adjusting at least one setting or condition of one or more states or properties for use in measuring photonic qubits so that the measurements result in a specific quantum operation. For example, selecting bases may involve determining, choosing and/or electing to use one (or more) candidate measurement bases, and optionally determining, choosing or electing to ignore (e.g., not use) one or more other candidate measurement bases. For example, some measurement bases may facilitate implementing a logic operation (e.g., by allowing to measure photonic qubits as an input and/or output for the logic operation) whereas other measurement bases may not be suitable for an implementation of that logic operation. For example, a logic operation on a qubit may be effected by a series of measurements on entangled photonic qubits using particular measurement bases for each photonic qubit being measured. One way in which a change of measurement basis may be achieved may be by rotating a polarization of the photon and passing it through a polarizing beam splitter prior to its measurement. To perform a logic operation correctly, the series of measurements much be performed using measurement bases for photonic qubits which are based on an outcome of a prior photonic qubit measurement.

In some embodiments at least one processor may be configured to perform a logic operation by selecting the bases for the photonic qubit measurements to measure the photonic qubits. For example, upon electing to perform a specific logic operation using a quantum computing system, the at least one processor may select measurement bases to facilitate performing that specific logic operation, e.g., by enabling photonic qubits to be measured under the corresponding settings or conditions for that specific logic operation.

By way of non-limiting examples, in FIG. 16A, FIG. 16B, FIG. 16C, FIG. 16D, FIG. 16E, and FIG. 16F, processor(s) 1629 may use optical elements 1635D to select measurement bases (e.g., possible directions of travel, and/or possible polarizations) of photonic qubits involved in detectors (e.g. detectors 1626 or second detectors 1626B) measuring entangled photonic qubits, thereby enabling quantum computing system 1600, 1620, 1625, 1630, 1640, 1650 to perform a logic operation with the measurements.

Use of an Optical Resonator Such as a Whispering-Gallery Mode Optical Resonator

Some embodiments involve a whispering-gallery mode optical resonator configured to define a closed loop-like mode including an evanescent field portion. An evanescent field refers to an oscillating electric and/or magnetic field that does not propagate as an electromagnetic wave but whose energy is spatially concentrated in a vicinity of a source (e.g., oscillating charges and currents). For example, such an oscillating electric and/or magnetic field may be established by carrying a red detuned pulse and a blue detuned pulse in a waveguide simultaneously, as described herein. A field portion refers to some or all of the evanescent field. This established evanescent field portion can then be used to exert optical radiation pressure on particles (e.g., atoms) to trap them as described herein, or to cool them to very low temperatures. A mode refers to at least one of the orthogonal solutions of a wave equation, wherein the orthogonal solutions do not interfere, i.e., the energy or optical power of a linear superposition of the orthogonal solutions ("modes") is equal to the sum of the energy or the optical power of the individual orthogonal solutions ("modes"). For example, only light (i.e., photons) within one and the same mode is coherent and does not interfere for an identical polarization. The shape of modes may be changed by passive optical elements such as lenses, mirrors, or filters but the total number of photons per mode cannot be increased. A closed loop-like mode refers to a mode having a shape that has a path whose initial point is equal to its terminal point, e.g., it's the shape's beginning and ending portions meet. A resonator refers to a component that establishes or supports oscillations and/or normal modes as described herein. A whispering-gallery mode refers to a type of wave or mode that can travel around a concave surface. For example, light waves may almost perfectly be guided round by optical total internal reflection, forming a whispering-gallery mode. A whispering-gallery mode optical resonator refers to a component that is capable of establishing or supporting such whispering-gallery mode. A whispering-gallery mode optical resonator configured to define a closed loop-like mode including an evanescent field portion includes a component that is capable of establishing or supporting a whispering-gallery mode, and is configured to define a mode having a shape that has a path whose initial point is equal to its terminal point. Such a defined mode may include a portion of an oscillating electric and/or magnetic field that does not propagate as an electromagnetic wave but whose energy is spatially concentrated in a vicinity of a source (i.e., an evanescent field portion). By way of non-limiting examples, a resonator or a cavity described herein such as cavity shown in FIG. 8 or FIG. 9A to FIG. 9C, circular resonator shown in FIG. 11A, racetrack resonator shown in FIG. 12A to FIG. 12C, oval resonator shown in FIG. 12D, cavity shown in FIG. 14, resonator shown in FIG. 15(A) to FIG. 15(C), silicon nitride resonator shown in FIG. 16A to FIG. 16F, and others, may be configurable to be used as such a whispering-gallery mode optical resonator. Other examples of whispering-gallery mode optical resonator 1902 and an evanescent field portion 1910 are shown in FIG. 19.

Some embodiments involve, tuning an optical resonator to support a resonance frequency associated with a transition frequency of an atom. An optical resonator refers to a component that establishes or supports oscillations and/or normal modes of light wave(s) as described herein. The oscillations, for example, may be resonant oscillations of a discrete set of normal modes at an associated discrete set of resonant frequencies (i.e., resonances). For example, an optical resonator may be capable of confining electromagnetic fields in electromagnetic modes having particular frequencies of oscillation. The optical resonator may support a discrete set of electromagnetic modes, each associated with a specific resonance frequency and lifetime of the confined field. For example, the optical resonator may be the whispering-gallery mode optical resonator described above. Tuning an optical resonator to support a resonance frequency refers to adjusting a property of the optical resonator so that it supports an electromagnetic mode associated with a specific resonance frequency. For example, tuning an optical resonator to support a resonance frequency may involve one or more of; changing a shape or size of the optical resonator or a part thereof; exposing the optical resonator to a temperature change; exposing the optical resonator to a laser beam, e.g., to cause the optical resonator to heat up and thereby change the resonance frequency by thermal expansion; running a current through a resistive material in a vicinity of the optical resonator to cause the optical resonator to heat up; or/and mechanically actuating a part thereof to adjust its shape. A transition refers to a change in energy level, e.g., a change from one state to another state. A transition frequency of an atom refers to an energy difference between the energy levels of the two states of the atom. When one or more photons with a frequency corresponding to the transition frequency interacts with an atom, the transition may occur. Tuning an optical resonator to support a resonance frequency associated with a transition frequency of an atom refers to adjusting a property of the optical resonator so that it supports an electromagnetic mode associated with a specific resonance frequency, which in turn is associated with the transition frequency of an atom, so that establishing the electromagnetic mode with the optical resonator causes a transition associated with that transition frequency of the atom to occur. In some examples, the atom is a neutral atom. Alternatively, the atom may be an ion. The atom may be one of a rubidium atom, a cesium atom, or a francium atom. Alternatively, the atom may be one of a Strontium. Erbium, Ytterbium, Calcium, Barium, Beryllium, or Magnesium atom. By way of non-limiting example, an example atom 1904 is shown in FIG. 19.

Some embodiments also involve controlling operation of at least one laser. As described herein, a laser may refer to a laser beam itself or to a device or a component configured to output or generate a laser beam. For example, the laser beam may be a coherent single-frequency (or single-wavelength) optical beam or a monochromatic optical beam. A single beam having two or more different wavelengths (or different frequencies) may be defined as involving two or more different lasers. A device or a component outputting or generating an optical beam having two or more wavelengths, e.g., by combining a plurality of beams or by modulating a single beam, may be considered as including two or more lasers of each wavelength. As described herein, in some examples, controlling operation of the at least one laser includes setting, activating, and/or adjusting a single laser, a subset of the plurality of lasers, controlling all of the lasers, and/or controlling one or more optical elements associated with at least some lasers. Controlling operation of a laser refers to determining, setting and/or adjusting at least one parameter associated with laser operation, as described herein. For example, controlling operation of a laser may include determining, selecting, and/or sending one or more electronic signals (e.g., instructions) to regulate, monitor, adjust, synchronize, turn on/off, and/or calibrate an operation or a timing of one or more laser pumps of a laser unit configured to generate the laser. In some examples, one or more controller may be provided to instruct each laser unit about at least one parameter for generating a laser, e.g., at least one parameter relating to how the laser unit operates (e.g., which laser pump to activate and/or deactivate and for how long) to thereby control the type of light emitted by the laser unit (e.g., the timing for on/off, power level, wavelength, frequency, phase, polarization, spin, intensity, synchronization, duty cycle, and/or variation of light emitted by the laser unit). In some embodiments, controlling operation of the at least one laser includes controlling or adjusting at least one of an intensity, a frequency, a polarization, and/or a duration of the at least one laser. In some embodiments at least one processor may be configured to control one or more lasers. In some embodiments, the at least one laser includes at least one trapping laser or/and at least one cooling laser (e.g., trapping laser(s) 1922A or/and cooling laser(s) 1922B in FIG. 19). By way of non-limiting examples, the laser unit configured to generate the laser may be similar to, or the same as, laser unit 1622 shown in FIG. 16A or FIG. 16B.

Some embodiments involve at least one trapping laser configured to cause the atom to be trapped adjacent the whispering-gallery mode optical resonator. A laser (as described earlier) may be used to trap an atom by restricting the atom to a position or area. For example, the atom may be trapped (e.g., restricted to an area) within a threshold distance of a coupling site. In some examples, this trapping may involve generating, operating, implementing, or activating a trap (e.g., using a Magneto-optical trap, or MOT described with reference to FIG. 10, or an optical dipole trap generated in an evanescent field as described above or with reference to FIG. 9A) to keep the atom within a coupling site, e.g., a region adjacent a whispering-gallery mode optical resonator. The at least one trapping laser may be configured to cause the atom to be trapped adjacent the whispering-gallery mode optical resonator and within an evanescent field portion. At least one trapping laser configured to cause the atom to be trapped adjacent the whispering-gallery mode optical resonator refers to at least one laser beam configured to restricting the atom to a position or an area nearby the whispering-gallery mode optical resonator. Some of these embodiments involve controlling operation of at least one trapping laser to cause an atom to be trapped adjacent the optical resonator and within the evanescent field portion, which refers to restricting the atom to a position or an area nearby the optical resonator by determining, setting and/or adjusting at least one parameter associated with operation of at least one laser beam to generate, operate, implement, or activate a trap for keeping the atom nearby the optical resonator (e.g., by coupling with the optical resonator) as described herein. The optical resonator may be the whispering-gallery mode optical resonator. In some embodiments involving at least one processor, the at least one processor may be configured to control operation of the at least one trapping laser. By way of a non-limiting example, FIG. 19 shows trapping laser(s) 1922A. By way of non-limiting examples, laser(s) in FIG. 16C to FIG. 16F may include, or provide, the at least one trapping laser. By way of non-limiting examples, the at least one processor may be configured to control the operation in a similar manner to, or the same manner as, processor(s) 1629 shown in FIG. 16A to FIG. 16F or FIG. 19 controlling laser(s).

In some embodiments involving at least one trapping laser, the at least one trapping laser includes at least two trapping lasers, at least one of which has a lower frequency than another trapping laser. For example, as described herein, at least one trapping laser may be red detuned (to a wavelength of around 850 nm or 980 nm—a relatively lower frequency range) and another trapping laser may be blue detuned (to a wavelength of around 690 nm or 720 nm—a relatively higher frequency range). In some embodiments, the at least one trapping laser includes a plurality of trapping lasers, at least one of which is configured to exert an attractive force on the atom and at least another of which is configured to exert a repelling force on the atom. In some examples, the at least one trapping laser may include a single trapping laser configured to repel the atom to counter a Van der Waals attraction. Some of these embodiments may involve exerting an attractive force on the atom using at least one of the trapping lasers and/or exerting a repelling force on the atom using at least another of the trapping lasers. Some examples may also involve repelling the atom to counter a Van der Waals attraction using a single trapping laser. An attractive force refers to a force that pulls two or more objects together. For example, a red detuned laser or a red detuned pulse may be configured to pull the atom toward a particular location such as a coupling site as described herein. A repelling force refers to a force that pushes two or more objects further apart. For example, a blue detuned laser or a blue detuned pulse may be configured to push the atom away from a surface, e.g., from a surface of an optical resonator, to prevent (or discourage) the atom from crashing onto the surface as described herein.

Some embodiments involve at least one cooling laser configured to manipulate a state of the atom to thereby cool the atom. For example, a laser as previously defined, may manipulate a state of an atom by controlling an external or internal state (e.g., a condition or a configuration) of the atom. The internal state may correspond to an electronic configuration, nuclear configuration, or a combination thereof. The external state, for example, may correspond to the motion of an atom in a coupling site. As also described herein, cooling in this context may refer to reducing motion and/or speed of the atom. For example, cooling an atom may impact the motional degrees of freedom of the atom. At least one cooling laser configured to manipulate a state of the atom to thereby cool the atom refers to at least one laser beam or device configured to control an external or internal state of the atom, whereby the motion and/or speed of the atom is reduced. Some of these embodiments involve controlling operation of at least one cooling laser configured to manipulate a state of the atom to thereby cool the atom, which refers to reducing motion and/or speed of the atom by determining, setting and/or adjusting at least one parameter associated with working of at least one laser beam to control an external or internal state of the atom. In some embodiments involving at least one processor, the at least one processor may be configured to control operation of the at least one cooling laser. By way of a non-limiting example, FIG. 19 shows cooling laser(s) 1922B. By way of non-limiting examples, laser(s) in FIG. 16C to FIG. 16F may include, or provide, the at least one cooling laser. By way of non-limiting examples, the at least one processor may be configured to control the operation in a similar manner to, or the same manner as, processor(s) 1629 shown in FIG. 16A to FIG. 16F or FIG. 19 controlling laser(s).

Some embodiments involve at least one optical atom presence detector for outputting an atom presence signal. As described herein, a detector refers to a device or an instrument designed to sense the presence, property, and/or state, or change in presence, property and/or state, of an object. An optical detector refers to a device or an instrument designed to sense the presence, property, and/or state, or change in presence, property and/or state, of light (or photon(s)). Atom presence refers to existence of an atom restricted in a particular location, e.g., a coupling site or coupling region or coupling location as described herein. An optical atom presence detector refers to a device or an instrument designed to sense the presence, property, and/or state, or change in presence, property and/or state, of light (or photon(s)) to determine an existence of an atom restricted in a particular location. In some examples, the at least one optical presence detector may be located in proximity to a waveguide carrying output photons or photonic qubits. As described herein, a signal refers to a representation of information that conveys a message or instruction through a medium, such as sound, light, or electrical energy. An atom presence signal refers to conveyed information indicating an existence of an atom restricted in a particular location, such as a coupling site or coupling region or coupling location as described herein. At least one optical atom presence detector for outputting an atom presence signal refers to at least one device or instrument for generating, providing, and/or producing conveyed information indicating an existence of an atom restricted in a particular location based on sensing of presence, property, and/or state, or a change in presence, property and/or state, of light (or photon(s)). For example, an optical atom presence detector may be configured to sense a signal emitted by, or interacting with, an atom and to determine a property and/or state of the atom based on that signal. The optical atom presence detector may then also output a notification signal (e.g., an atom presence signal) such as an electrical signal or an optical signal to indicate the result of this sensing. For example, an optical atom presence detector may include one or more component(s) for receiving one or more photons (e.g., emitted by an atom or belonging to a laser beam or pulse being carried in a waveguide) and for producing an electrical or optical signal in response. Some exemplary embodiments involve providing, based on an atom presence signal, an indication that the atom is trapped adjacent the optical resonator. As described herein, an atom trapped adjacent an optical resonator refers to an atom that is restricted in a particular location nearby the optical resonator, e.g., a coupling site or coupling region or coupling location. Providing, based on an atom presence signal, an indication that the atom is trapped adjacent the optical resonator refers to generating, producing, outputting, and/or communicating a sign or piece of information that indicates that the atom is restricted in a particular location nearby the optical resonator using conveyed information indicating an existence of the atom restricted in that particular location, e.g, received from the at least one optical presence detector. In some embodiments involving at least one processor, the at least one processor may be configured to provide an indication that the atom is trapped adjacent the optical resonator based on an atom presence signal, e.g., received from the at least one optical presence detector. By way of a non-limiting example, FIG. 19 shows optical atom presence detectors 1926. By way of non-limiting examples, detectors 1626 in FIG. 16C to FIG. 16F may include the at least one optical atom presence detector. By way of non-limiting examples, first detectors 1626A or/and second detectors 1626B in FIG. 16C to FIG. 16F may include the at least one optical atom presence detector. By way of non-limiting examples, the at least one processor may be configured to control the operation in a similar manner to, or the same manner as, processor(s) 1629 shown in FIG. 16A to FIG. 16F or FIG. 19 receiving one or more inputs from detectors, e.g., detectors 1626, first detectors 1626A, second detectors 1626B, or optical atom presence detectors 1926.

Some embodiments involve at least one optical detector for outputting a cooling signal reflecting a position or a vibrational state of an atom, and wherein at least one processor is configured to use the cooling signal to control operation of the at least one cooling laser. As described herein, an optical detector refers to a device or an instrument designed to sense the presence, property, and/or state, or change in property and/or state, of light (or photon(s)), cooling in this context refers to reducing motion and/or speed of the atom, and a signal refers to a representation of information that conveys a message or instruction through a medium, such as sound, light, or electrical energy. A cooling signal reflecting a position or a vibrational state of an atom refers to conveyed information representing a position or a vibrational state of the atom. At least one optical detector for outputting a cooling signal reflecting a position or a vibrational state of an atom refers to at least one device or instrument for generating, producing, providing, and/or communicating conveyed information representing a position or a vibrational state of the atom using sensed property, and/or state, or a change in property and/or state, of light (or photon(s)) that has interacted with the atom, or that is emitted from the atom. As described herein, in some embodiments involving at least one processor, the at least one processor may be configured to control operation of the at least one cooling laser and this controlling may use the cooling signal, e.g., output from the at least one optical detector.

Resource for Quantum Computing

Some embodiments involve a vacuum chamber. A vacuum chamber refers to an enclosure configured to reach and/or sustain a pressure within the enclosure that is lower than a pressure outside the enclosure. This lower pressure may involve the volume of the enclosure reaching partial vacuum or (practically realizable) free space. In some examples, a vacuum chamber may be configurable to sustain a vacuum below $10^{-3}$ millibar. For example, the vacuum chamber may be coupled to a vacuum source, the vacuum source configured to generate and/or sustain a vacuum inside the vacuum chamber. For example, the vacuum source may include a vacuum pump configured to change the pressure inside the vacuum chamber to create and/or sustain a vacuum either mechanically or chemically. Some embodiments involve an atom source input associated with a vacuum chamber. An atom source refers to an entity, material, or functional element from which one or more atoms originate or are provided. An atom source input associated with the vacuum chamber refers to a structure via which one or more atoms are provided to the vacuum enclosure. For example, such a structure may be arranged to facilitate the provision or introduction of atoms into the enclosure. In some examples, the structure may include a perforation on a wall of the enclosure, through which the atoms may be introduced. Alternatively, the atoms may already be present inside the enclosure and the structure may be arranged to make the atoms available (e.g., available for an interaction) in the enclosure. In some examples, the structure may include an atom dispenser cooperating to encourage the atoms to move toward an interaction region in a vacuum chamber, e.g., using a pressure difference to shoot a jet of atoms toward the interaction region. By way of non-limiting examples, FIG. 10 shows vacuum chamber 1013, and FIG. 20A and FIG. 20B show vacuum chamber 2013 and atom source input 2027 associated with vacuum chamber 2013.

Some embodiments involve receiving an atom from an atom source. In some examples, the one or more atoms originating from the atom source (described earlier) include at least one of Rubidium, Cesium, Francium, Strontium, Erbium, Ytterbium, Calcium, Barium, Beryllium, Lithium, Sodium, Potassium, or Magnesium atom, either as a neutral atom or as an ion. Receiving an atom from an atom source refers to being provided with, or/and obtaining, an atom from the source from which one or more atoms originate. In some embodiments involving an atom source input associated with a vacuum chamber, receiving an atom from an atom source may involve obtaining the atom via a structure or a device that facilitates atom delivery to the vacuum chamber. In some examples, the atom is a neutral atom. Alternatively, the atom may be an ion. The atom may be one of a Rubidium atom, a Cesium atom, or a Francium atom. In some examples, the atom is a Rubidium atom. In other examples, the atom is a Cesium atom. In yet other examples, the atom is a Francium atom. Alternatively, the atom may be one of a Strontium, Erbium, Ytterbium, Calcium, Barium, Beryllium, or Magnesium atom. By way of non-limiting examples, FIG. 10 shows a cold atom source 1017 and one or more atoms 1020, and FIG. 20A and FIG. 20B show atom 2004 and atoms 2020, which may be obtained via an atom source input 2027. By way of a non-limiting example, FIG. 21A shows receiving an atom from an atom source in step 2102.

Some embodiments involve a coupling location associated with a Photonic Integrated Circuit (PIC). A Photonic Integrated Circuit or a photonic chip refers to a device integrating elements or components that operate at optical or infrared wavelengths as described herein. As described herein, coupling refers to enabling interaction between two or more bodies, and a coupling location (or a coupling site) refers to a location or a site including an area (e.g., a volume or a region) configured to enable coupling between two or more bodies (e.g., an atom and another body such as a resonator, a waveguide, or a photon). A coupling location associated with a Photonic Integrated Circuit (PIC) refers to an area (e.g., a volume or a region) configured to enable coupling between an atom and a component of the device integrating elements or components that operate at optical or infrared wavelengths (e.g., a resonator or a waveguide), or between an atom and another body associated with such device (e.g., a photon being carried in and/or used in the device). For example, this area (e.g., a volume or a region) may be on, or nearby, the component of the device, or a location where the body associated with the device may be present at least for a short period of time. In some embodiments, a coupling location, associated with the PIC, is for atom positioning. As described herein, atom positioning refers to arranging or locating an atom to enable interaction between the atom and a body (e.g., a resonator or a waveguide or a photon). In some embodiments, the PIC includes a resonator, and the coupling location is associated with the resonator. As described herein, a resonator refers to a component that establishes or supports oscillations and/or normal modes. The coupling location being associated with the resonator refers to the area (e.g., a volume or a region) being configured to enable coupling between an atom (positioned in the area) and the component that establishes or supports oscillations and/or normal modes. For example, such coupling enables interaction between the atom (positioned in the area) and the established or supported oscillations and/or normal modes of the component.

Some embodiments involve trapping an atom in a coupling location associated with a Photonic Integrated Circuit (PIC). Trapping an atom in a coupling location refers keeping the atom within this area which is configured to enable coupling between the atom and another body as described earlier. This keeping may involve one or more of generating, operating, implementing, or activating a trap (e.g., using a Magneto-optical trap, or MOT described with reference to FIG. 10, or an optical dipole trap generated in an evanescent field as described with reference to FIG. 9A) to keep the atom within the area as described earlier. By way of non-limiting examples, FIG. 10 shows photonic chips 1015 and atoms 1020 being trapped in a Magneto-optical trap (MOT), and FIG. 20A and FIG. 20B show PIC 2015 and atom 2004 being trapped in coupling location 2010. By way of a non-limiting example, FIG. 21A shows trapping an atom in a coupling location associated with a PIC in step 2104.

Some embodiments involve, at least one trapping laser for trapping the atom in the coupling location. As described herein, a laser may refer to a laser beam itself, or to a device or a component configured to output or generate a laser beam. A trapping laser for trapping the atom in the coupling location refers to a laser beam capable of facilitating keeping of the atom within an area which is configured to enable coupling between the atom and another body, or a device or a component configured to output or generate such a laser beam. For example, as described earlier, the laser beam may be usable in generating, operating, implementing, or activating a trap (e.g., using a Magneto-optical trap, or MOT described with reference to FIG. 10, or an optical dipole trap generated in an evanescent field as described with reference to FIG. 9A) to keep the atom within the area. By way of non-limiting examples, FIG. 10 shows lasers 1033 (at least one of which may be used to generate a Magneto-optical trap (MOT)), and FIG. 20A and FIG. 20B show trapping laser(s) 2022A for trapping atom 2004 in coupling location 2010. By way of a non-limiting example, FIG. 19 shows trapping laser(s) 1922A. By way of non-limiting examples, laser unit(s) in FIG. 16A to FIG. 16B, and laser(s) in FIG. 16C to FIG. 16F may include, or provide, the at least one trapping laser.

In some embodiments involving Photonic Integrated Circuit (PIC), the Photonic Integrated Circuit (PIC) may have an interaction region configured to interact with an atom. Interacting or an interaction refers to having an effect on each other. Having an interaction region configured to interact with an atom refers to having a region or a portion that is capable of having an effect on (and/or of experiencing an effect caused by) the atom. For example, the region may be capable of affecting an electronic or nuclear state of the atom, alternatively or additionally the electronic or nuclear state of the atom may be capable of affect a property or a condition of the region, or an electronic or nuclear state of another particle also interacting with the region (e.g., a photon). In some examples, the interaction region may be configured to interact with an atom from an atom source. In some examples, the interaction region may be arranged for at least partial exposure to a vacuum. At least partial exposure to a vacuum refers to at least some portion being exposed the vacuum. In some examples, the at least some portion may be less than the whole region. In other examples, the at least some portion may be the whole region. For example, an interaction region may constitute a portion of the Photonic Integrated Circuit (PIC) exposed to the vacuum to facilitate an interaction with an atom inside a vacuum chamber. Various arrangements for at least partial exposing of the interaction region may be employed. For example, the vacuum chamber may include a wall having a perforation therethrough and, when in use, the PIC may be fixed on an exterior wall of the vacuum chamber with the interaction region at least partially overlying the perforation so that the interaction region is at least partially exposed to the vacuum through the perforation. The PIC may then act as a seal for that perforation, maintaining vacuum within the vacuum chamber. Alternatively, the PIC may be fixed on an interior wall of the vacuum chamber, or on a holder or a platform in the vacuum chamber, with the interaction region at least partially exposed to the vacuum. Alternatively, the PIC may form a part of a wall of the vacuum chamber while having the interaction region at least partially exposed to the vacuum. By way of non-limiting examples, FIG. 20A and FIG. 20B show interaction region 2050, which constitutes a portion of Photonic Integrated Circuit 2015 exposed to the vacuum to facilitate an interaction with atom 2004 in vacuum chamber 2013.

Some embodiments involve manipulating an electronic state or a nuclear state of an atom. As described herein, manipulating an atom refers to controlling external or internal state(s) of the atom. An electronic state of an atom refers to a condition of an atom that can be represented by an electron configuration of a system (e.g., electrons of the atom) and quantum numbers of each electron contributing to that configuration. A nuclear state of an atom refers to a condition of an atom that can be represented by a nucleon configuration of a system (e.g., protons and/or neutrons of the atom) and quantum numbers of each nucleon contributing to that configuration. For example, each electronic state or each nuclear state may correspond to one of a plurality energy levels of the atom. Manipulating an electronic state or a nuclear state of an atom refers to controlling (e.g., setting, initializing, adjusting, and/or changing) such a condition of an atom that can be represented by: an electron configuration of a system (e.g., electrons of the atom) or a nucleon configuration of a system (e.g., protons and/or neutrons of the atom). By way of non-limiting examples, FIG. 21A shows manipulating an electronic state or a nuclear state of an atom in step 2106, and FIG. 21B shows examples which may be included in the step 2106.

Some embodiments involve at least one excitation laser for manipulating an electronic state or a nuclear state of the atom. As described herein, a laser may refer to a laser beam itself, or to a device or a component configured to output or generate a laser beam. Excitation refers to an increase in energy level above a chosen starting point, which usually is the ground state but sometimes can also be an already-excited state. An excitation laser for manipulating an electronic state or a nuclear state of the atom refers to a laser beam capable of controlling (e.g., setting, initializing, adjusting, and/or changing) a condition of an atom that can be represented by: an electron configuration of a system (e.g., electrons of the atom) or a nucleon configuration of a system (e.g., protons and/or neutrons of the atom), or a device or a component configured to output or generate such a laser beam, wherein the laser beam is also configurable to increase an energy level of the atom. In some examples, a laser beam from the at least one excitation laser may be configured to be carried in free space in a vacuum. Alternatively or additionally, the laser beam may be configured to be carried in a waveguide. By way of non-limiting examples, FIG. 10 shows lasers 1033 (at least one of which may be used to increase an energy level of an atom), and FIG. 20A and FIG. 20B show excitation laser(s) 2022E for manipulating an electronic state or a nuclear state of atom 2004. By way of other non-limiting examples, laser unit(s) in FIG. 16A to FIG. 16B, and laser(s) in FIG. 16C to FIG. 16F may include, or provide, the at least one excitation laser.

In some embodiments involving at least one excitation laser, the at least one excitation laser is configured for use in generating a stream of single photons. In some examples, the at least one excitation laser and a trapped atom may be used to generate a stream of single photons. For example, the at least one excitation laser may be configured to manipulate an electronic state or a nuclear state of the trapped atom so that the excited trapped atom emits a stream of single photons as described herein with reference to a photon generator or a qubit generator. In some embodiments involving at least one excitation laser, the at least one excitation laser is configured for use in generating entangled photons. In some examples, the at least one excitation laser and a trapped atom may be used to generate a stream of entangled photons. For example, the at least one excitation laser may be configured to manipulate an electronic state or a nuclear state of the trapped atom so that the excited trapped atom becomes entangled with two or more photons (or photonic qubits), whereby the two or more photons (or photonic qubits) become entangled with each other, as described herein with reference to an entangling gate. By way of non-limiting examples, FIG. 20A and FIG. 20B show a stream of single photons 2044 and a stream of entangled photons 2046 generated in this way. By way of other non-limiting examples, FIG. 16A to FIG. 16B show photonic qubits 1606A (belonging to single photons) and entangled photonic qubits 1610A (belonging to entangled photons) generated in a similar manner, and FIG. 16C to FIG. 16F show photonic qubits 1606A, 1606B (belonging to single photons) and entangled photonic qubits 1610A, 1610B (belonging to entangled photons) generated in a similar manner using qubit generators 1632A, 1632B, and entangling gates 1634A, 1634B. By way of further non-limiting examples, FIG. 4B shows a time-sequenced series 412 of single photons generated in a similar manner, FIG. 5B shows a time-sequential series 512 of entangled photons generated in a similar manner, FIG. 6 and FIG. 7 show a photonic graph state (e.g., n photons shown in step 609) including single photons and/or entangled photons generated in a similar manner, FIG. 9B shows single photons generated in a similar manner being output, and FIG. 9C shows entangled photons generated in a similar manner being output.

Some embodiments involve a waveguide for guiding input light to a coupling location. As described herein, a coupling location (or a coupling site) refers to a location or a site including an area (e.g., a volume or a region) configured to enable coupling between two or more bodies (e.g., an atom and another body such as a resonator, a waveguide, or a photon). A waveguide refers to a component or a structure configured to confine or/and convey electromagnetic waves. Input light refers to one or more laser beams, one or more pulses and/or one or more photons that has entered into, or obtained by, a body such as a component or a structure. A waveguide for guiding input light to a coupling location refers to a component or a structure suitable for conveying one or more laser beams, one or more pulses and/or one or more photons to a location including an area configured to enabling coupling between two or more bodies. For example, the guided input light may then interact with at least one of the two or more bodies. In some embodiments, the waveguide associated with the coupling location is configured for guiding light at a wavelength in a range of 750 to 930 nm. In some examples, the waveguide is configured for guiding light at a wavelength in a range of 750 to 820 nm. In some examples, the waveguide associated with the coupling location is configured for guiding light at a wavelength in a range of 750 to 930 nm, and the example involves guiding input light of a wavelength in a range of 750 to 930 nm. In some examples, the waveguide associated with the coupling location is configured for guiding light at a wavelength in a range of 750 to 820 nm, and the example involves guiding input light of a wavelength in a range of 750 to 820 nm. In some embodiments, the waveguide is configured for coupling to an atom in an absence of an intermediate resonator. As described earlier, coupling refers to enabling interaction between two or more bodies, and a resonator refers to a component that establishes or supports oscillations and/or normal modes. Coupling to an atom in an absence of an intermedia resonator refers to enabling interaction with the atom without having a component that establishes or supports oscillations and/or normal modes between the atom and itself, i.e., between the waveguide and the atom. For example, in order to couple to the atom, the waveguide may use an overlap between dipole field of the atom and an electromagnetic field of a photon or a beam carried in the waveguide, wherein this overlap enables an interaction with the atom as described herein. In some examples, the waveguide may establish and use an evanescent coupling with the atom as described herein. The waveguide may also carry one or more laser beams (e.g., trapping laser(s)), which may include red detuned and blue detuned laser beams for exerting attractive and repelling forces on the atom, thereby trapping the atom and coupling to it. The waveguide may be configured to work with one or more lasers (e.g., trapping laser(s) described herein) to generate and/or contain an evanescent field around the waveguide itself so that that an evanescent field trapping can be used to keep the atom at, or within, a coupling location, as described herein. By way of non-limiting examples, FIG. 20A and FIG. 20B show waveguide 2038 for guiding laser beam 2028A to coupling location 2010. By way of non-limiting examples, FIG. 16C to FIG. 16F show similarly configured waveguides 1636A, 1636B, 1638A, 1638B, and FIG. 9A to FIG. 9C show similarly configured waveguide 910.

Some embodiments involve generating quantum light as a resource for quantum computing. A resource refers to a stock or a supply that can be drawn on in order to function effectively. As described earlier, quantum computing refers to a computation that is performed through the utilization, manipulation or application of one or more quantum state properties, such as superposition, entanglement and interference. A resource for quantum computing refers to a stock or supply of one or more quantum state properties for use in a computation, e.g., properties of a stream of single photons (or single photonic qubits), a stream of entangled photons (or entangled photonic qubits), a photonic graph states, a cluster state of single photons or entangled photons (or entangled photonic states), or/and entangled states from a Resource State Generator as described herein.

Some embodiments involve at least one output channel for directing quantum light generated at a coupling location. As described herein, a coupling location (or a coupling site) refers to a location or a site including an area (e.g., a volume or a region) configured to enable coupling between two or more bodies (e.g., an atom and another body such as a resonator, a waveguide, or a photon). A channel refers to a component or a structure configured to act as a path. An output channel refers to a component or a structure configured to act as a path for leaving a body (e.g., an enclosure, a device, a component, or a structure). Quantum light refers to a quantity of light, e.g., one or more laser beams, pulses, or photons. Directing quantum light generated at a coupling location refers to controlling, setting, adjusting, or/and changing a course of a quantity of light generated at a location including an area configured to enable coupling between two or more bodies. In some embodiments involving a vacuum chamber, a coupling location, and at least one output channel for directing quantum light generated at the coupling location, the at least one output channel may be configured to direct quantum light out of the vacuum chamber as a resource for quantum computing. The at least one output channel configured to direct quantum light out of the vacuum chamber as a resource for quantum computing refers to a component or a structure configured to act as a path out of the enclosure for a discrete quantity of light so that the discrete quantity of light may be used as a stock or supply of one or more quantum state properties for use in a computation. In some embodiments involving at least one output channel, the at least one output channel may be used to direct quantum light from the coupling location as a resource for quantum computing. In some examples, the at least one output channel includes an optical fiber. In some examples, the at least one output channel includes a free space channel. In some examples, the at least one output channel includes one or more waveguides. In some examples, the optical fiber, the free space channel, or/and the one or more waveguides function as a (photonic) delay line. As described herein, a (photonic) delay line refers to a component or group of components arranged to introduce a time delay for a pulse of one or more photons or a light beam. By way of non-limiting examples, FIG. 20A and FIG. 20B show output channel for directing quantum light generated at coupling location 2010 (e.g., output channel 2038 or output channel 2018 directing laser beam 2042, photons 2044 or/and entangled photons 2046) out of vacuum chamber 2013. By way of non-limiting examples, FIG. 16A to FIG. 16F show waveguides 1608A, 1608B, 1618A, 1618B and FIG. 9A to FIG. 9C show waveguide 910, which may form a part of such output channel.

Some embodiments involve a vacuum enclosure. An enclosure refers to a structure capable of defining an area or volume separate from its surroundings, e.g., by surrounding an area or a volume with a barrier. A vacuum enclosure refers to a structure configured to reach and/or sustain a pressure within the structure that is lower than a pressure outside the enclosure, e.g., a vacuum chamber as described herein. This lower pressure may involve the volume of the enclosure reaching partial vacuum or (practically realizable) free space. In some examples, a vacuum enclosure is configurable to reach or/and sustain a vacuum, e.g., below $10^{-3}$ millibar. For example, the vacuum enclosure may be configured to be used with a vacuum source and/or a vacuum pump in the same way as the vacuum chamber described herein. Some embodiments involve reaching or/and sustaining a vacuum, e.g., below $10^{-3}$ millibar. For example, a vacuum enclosure or a vacuum chamber as described above may be used to reach or/and sustain the vacuum. By way of non-limiting examples, FIG. 10 shows vacuum chamber 1013, FIG. 20A and FIG. 20B show vacuum chamber 2013, and FIG. 23A to FIG. 23D show vacuum enclosure 2313.

Some embodiments involve a plurality of optical resonators tunable to a resonance of an alkali atom. As described herein, an optical resonator refers to a component that establishes or supports oscillations and/or normal modes of light wave(s), and the optical resonator being tunable to a resonance of an alkali atom refers to the component being configurable to support an electromagnetic mode associated with a specific resonance (e.g., a specific resonance frequency) of the alkali atom. In some examples, the plurality of optical resonators may be tuned to a resonance of an alkali atom. Some embodiments involve tuning a plurality of optical resonators to a resonance of an alkali atom. Tuning an optical resonator to a resonance of an alkali atom refers to adjusting a property of the optical resonator so that it supports an electromagnetic mode associated with a specific resonance (e.g., a specific resonance frequency) of the alkali atom. For example, as described herein, tuning an optical resonator may involve one or more of: changing a shape or size of the optical resonator or a part thereof; exposing the optical resonator to a temperature change; exposing the optical resonator to a laser beam, e.g., to cause the optical resonator to heat up and thereby change the resonance frequency by thermal expansion; running a current through a resistive material in a vicinity of the optical resonator to cause the optical resonator to heat up; or/and mechanically actuating a part thereof to adjust its shape. In some examples, the alkali atom may be an ion. Alternatively, the alkali atom may be a neutral atom. The alkali atom may be a Rubidium atom. Alternatively, the alkali atom may be a Cesium atom. Alternatively, the alkali atom may be a Francium atom. Alternatively, the alkali atom may be one of a Strontium, Erbium, Ytterbium, Calcium, Barium, Beryllium, Lithium, Sodium, Potassium, or Magnesium atom. In some examples, the plurality of optical resonators may include at least three optical resonators. For example, one of the at least three optical resonators may be provided on one side (e.g., upstream) of at least one optical element (e.g., at least one optical switch), and the other two may be provided on the other side (e.g., downstream from the at least one optical switch) so that a laser beam, pulse or one or more photons that interacted with the one optical resonator (e.g., upstream) may be directed toward at least one of the other two (e.g., downstream) for further interaction therewith. In some examples, the plurality of optical resonators is implemented with a Photonic Integrated Circuit (PIC). For example, the plurality of optical resonators may be implemented with, or provided on, the PIC. It is to be understood that one or more of the following may be implemented with, or provided on, the PIC: at least one waveguide; at least one optical switch; at least one detector; or/and at least one component of at least one processor. It is also to be understood that the Photonic Integrated Circuit (PIC) may include an interaction region configured to interact with an alkali atom, the interaction region being arranged for at least partial exposure to a vacuum. By way of non-limiting examples, FIG. 23A to FIG. 23D show optical resonator 2302A, 2302B, 2302Y tunable to a resonance of alkali atom 2304A, 2304B, 2304Y, and a Photonic Integrated Circuit (PIC) 2315. By way of non-limiting examples, FIG. 10 shows photonic chips 1015. FIG. 16A to FIG. 16F show silicon nitride resonator 1602A, 1602B, 1612A, 1612B and alkali atom 1604A, 1604B, 1614A, 1614B. FIG. 19 shows whispering-gallery mode optical resonator 1902, and FIG. 20A and FIG. 20B show resonator 2002 and a Photonic Integrated Circuit (PIC) 2015.

Some embodiments involve at least one trapping laser for maintaining an alkali atom within a mode of an optical resonator, or/and maintaining an alkali atom within a mode of an optical resonator using at least one trapping laser. As described herein, a mode refers to at least one of the orthogonal solutions of a wave equation, wherein the orthogonal solutions do not interfere. i.e., the energy or optical power of a linear superposition of the orthogonal solutions ("modes") is equal to the sum of the energy or the optical power of the individual orthogonal solutions ("modes"). An optical resonator refers to a component that establishes or supports oscillations and/or normal modes of light wave(s). A mode of an optical resonator refers to an oscillation and/or a normal mode corresponding to at least one of the orthogonal solutions of a wave equation that can be established or supported by a component which establishes or supports oscillations and/or normal modes of light wave(s). As described herein, a laser may be used to trap an (alkali) atom by restricting the atom to a position or area, and a trapping laser refers to a laser usable in restricting an atom to a position or area. For example, the atom may be trapped (e.g., restricted to an area) within a threshold distance of a coupling site. In some examples, this trapping may involve generating, operating, implementing, or activating a trap (e.g., using a Magneto-optical trap, or MOT described with reference to FIG. 10, or an optical dipole trap generated in an evanescent field as described above or with reference to FIG. 9A) to keep the atom within a coupling site, e.g., a region adjacent an optical resonator. Maintaining an alkali atom within a mode of an optical resonator refers to positioning, keeping, or/and suspending the alkali atom in a region associated with an oscillation and/or a normal mode corresponding to one of orthogonal solutions of the wave equation that can be established or supported by a component which establishes or supports oscillations and/or normal modes of light wave(s). By way of non-limiting examples, FIG. 23A and FIG. 23B show trapping laser(s) 2322A for maintaining an alkali atom 2304A, 2304B within a mode of an optical resonator 2302A, 2302B. By way of non-limiting examples, FIG. 10 shows lasers 1033 (at least one of which may be used to generate a Magneto-optical trap (MOT)), and FIG. 20A and FIG. 20B show trapping laser(s) 2022A for trapping atom 2004. By way of a non-limiting example, FIG. 19 shows trapping laser(s) 1922A. By way of non-limiting examples, laser unit(s) in FIG. 16A to FIG. 16B, and laser(s) in FIG. 16C to FIG. 16F may include, or provide, the at least one trapping laser.

Some embodiments involve an atom excitation laser for inducing photon emissions, or/and inducing photon emissions using an atom excitation laser. As described herein, excitation refers to an increase in energy level above starting point, which usually is the ground state but sometimes can also be an already-excited state. An atom excitation laser refers to a laser beam which is configurable to increase an energy level of an atom, or a device or a component configured to output or generate such a laser beam, wherein the laser beam is capable of controlling (e.g., setting, initializing, adjusting, and/or changing) a condition of the atom that can be represented by: an electron configuration of a system (e.g., electrons of the atom) or a nucleon or nucleus configuration of a system (e.g., consisting of the protons and/or neutrons of the atom). A photon emission refers to a production or discharge of one or more photons (or one or more photonic qubits). Inducing photon emissions refers to causing or initiating a production or discharge of one or more photons (or one or more photonic qubits). By way of non-limiting examples, FIG. 23A and FIG. 23B show excitation laser(s) 2322E for inducing photon emissions. By way of non-limiting examples, FIG. 10 shows lasers 1033 (at least one of which may be used to increase an energy level of an atom), and FIG. 20A and FIG. 20B show excitation laser(s) 2022E. By way of other non-limiting examples, laser unit(s) in FIG. 16A to FIG. 16B, and laser(s) in FIG. 16C to FIG. 16F may include, or provide, the at least one excitation laser.

Some embodiments involve a plurality of waveguides configured to couple photons to and from optical resonators. As described herein, coupling refers to enabling interaction between two or more bodies, and coupling photons to and from optical resonators refers to enabling interaction between photons and an optical resonator so that a photon propagating in a waveguide is able to excite a mode of the optical resonator. In some examples, the plurality of waveguides may be implemented with Silicon Nitride (SiN). In some examples, the plurality of waveguides may include a free space. Alternatively or additionally, the plurality of waveguides may include an optical fiber. By way of non-limiting examples, FIG. 23A to FIG. 23D show waveguide 2308A, 2308B, 2308Y. By way of non-limiting examples, FIG. 20A and FIG. 20B show waveguide 2038, FIG. 16A to FIG. 16F show waveguide 1608A, 1618A, 1608B, 1618B, 1636A, 1636B, 1638A, 1638B, FIG. 19 shows waveguide 1908, and FIG. 9A to FIG. 9C show waveguide 910, 930.

Some embodiments involve a plurality of detectors configured to detect a presence or absence of an atom-resonator coupling, or/and detecting a presence or absence of an atom-resonator coupling using a plurality of detectors. An atom-resonator coupling refers to an atom and a resonator being in a condition or a state wherein their interaction with each other is enabled. Detecting a presence or absence of an atom-resonator coupling refers to sensing the existence or non-existence (or lack) of this enabled condition (or this enabled state). For example, when the atom is trapped (e.g., restricted to an area using any trapping technique described herein) within a threshold distance of a coupling site (or a coupling location) associated with the resonator, the interaction between them may be enabled. As described herein, a detector refers to a device or an instrument designed to sense the presence, property, and/or state, or change in property and/or state, of an object. For example, a detector may be configured to sense a signal emitted by, or interacted with, an object and determine a property and/or state of the object based on that signal. In some examples, a detector may be configured to detect a presence or absence of an atom-resonator coupling using the same techniques as a detector for detecting a presence of a trapped alkali atom or an optical atom presence detector described herein. By way of non-limiting examples, FIG. 23A and FIG. 23B show detectors 2326. By way of a non-limiting examples, FIG. 19 shows optical atom presence detectors 1926, FIG. 16A and FIG. 16B show detectors 1626, and FIG. 16C to FIG. 16F show first detectors 1626A and second detectors 1626B.

Some embodiments involve a plurality of optical switches for switching between at least two of a plurality of waveguides. As described herein, an optical switch refers to a component or a group of components including one or more optical and/or electronic components configured to direct propagating photons in a particular direction, e.g., by selecting one of multiple waveguides for carrying the photons, and/or by halting a propagation of photons. Switching between at least two of a plurality of waveguides refers to selecting at least one of the plurality of waveguides for carrying photons and halting a propagation of photons into remaining waveguides from the plurality of waveguides. For example, a plurality of waveguides may be provided on either side, or both sides, of a plurality of optical switches so that the plurality of optical switches can switch connections between the waveguides. This way a flow of photons (a pulse or a light) between the waveguides can be controlled, whereby the photons (or pulse or light) may interact with an alkali atom associated with one or more specific waveguide(s) via a coupling between the specific waveguide and an (optical) resonator and via a coupling between the (optical) resonator and the alkali atom. By way of non-limiting examples, FIG. 23A to FIG. 23D show optical switches 2335 for switching between at least two waveguides 2308A, 2308B. By way of non-limiting examples, FIG. 16B shows optical elements 1635, 1635D which may include at least one optical switch, and FIG. 7 shows linear optics and phase control elements 703, 705 which may include at least one optical switch.

In some embodiments involving a plurality of detectors and a plurality of optical switches, at least one processor may be configured to receive output signals from the plurality of detectors and control the plurality of optical switches. Some embodiments involving a plurality of detectors, a plurality of optical switches, and a plurality of waveguides configured to couple photons to and from optical resonators, may also involve receiving output signals from the plurality of detectors and controlling the plurality of optical switches to switch between the plurality of waveguides. As described herein, a signal refers to a representation of information that conveys a message or instruction through a medium, such as sound, light, or electrical energy, and an output signal from the plurality of detectors refers to a representation of information produced or supplied by the plurality of detectors. For example, the produced or supplied information may relate to the detection results. At least one processor or group of processors, as described earlier, may receive (e.g., acquire, retrieve, obtain, sense, detect, or otherwise gain access to) information or data via a communications channel, over which this representation of information is conveyed. Controlling an optical switch refers to setting or/and adjusting a component or a group of components including one or more optical and/or electronic components to direct propagating photons in a particular direction, e.g., setting or/and adjusting the component or the group of components to select one of multiple waveguides for carrying the photons, and/or to halt a propagation of photons. As described earlier, for example, a processor may receive an output signal from one or more detectors, wherein the output signal includes one or more optical and/or electrical signals indicating a presence or absence of an atom-resonator coupling or/and indicating entrapment of one or more alkali atoms at one or more corresponding coupling sites, and then set or/and adjust one or more optical switch based on the received output signal. In some examples, the at least one processor may be configured to control the plurality of optical switches to selectively associate between at least two of the plurality of waveguides coupled to an atom-coupled optical resonator. In some examples, controlling a plurality of optical switches may include controlling to selectively associate between at least two waveguides coupled to an atom-coupled optical resonator. Selectively associating between at least two waveguides refers to selecting at least one of the at least two waveguides for carrying photons and halting a propagation of photons into remaining waveguide(s). As described herein, being coupled refers to interaction between two or more bodies being enabled. A waveguide coupled to an atom-coupled optical resonator refers to a waveguide that is configured to interact with an optical resonator, wherein the optical resonator is configured to interact with an atom. In some examples, the plurality of optical switches may be controlled to switch between the at least two of the plurality of waveguides at a time resolution of less than 1 microsecond. In some examples, controlling of the plurality of optical switches includes controlling to switch between at least two of the plurality of waveguides at a time resolution of less than 1 microsecond. Switching between the at least two of the plurality of waveguides at a time resolution of less than 1 microsecond refers to selecting at least one of the at least two waveguides and halting a propagation of photons into remaining waveguide(s) in every time period of less than 1 microsecond. By way of non-limiting examples, FIG. 23A and FIG. 23B show processor(s) 2329 configured to receive output signals from detectors 2326 and control optical switches 2335. By way of a non-limiting example, FIG. 16B shows processor(s) 1629 configured to receive an indication of measurement(s) from detectors 1626 and control optical elements 1635, 1635D which may include at least one optical switch.

Some embodiments involve a photonic delay line. A photonic delay line refers to a component or group of components arranged to introduce a time delay for a laser beam, a pulse, or one or more photons. For example, a photonic delay line may include a photonic setup incorporating a length of photonic waveguide serving to delay the arrival time of an incoming pulse with respect to a pulse not entering the photonic waveguide. An optical delay line, which may make use of the visible segment of the electromagnetic spectrum, is an example of a photonic delay line. An optical delay line can have a fixed or tunable delay. The (photonic or optical) delay line can be controlled by a (optical) switch determining whether an optical pulse passes through the delay line or not. For example, the (photonic or optical) delay line may be implemented in free space, in fibers, or in on-chip waveguides. In some examples, at least one of a plurality of waveguides includes at least one photonic delay line. In some examples, at least one photonic delay line is configured to synchronize between photonic processing stages or/and at least one delay line is used in synchronizing between photonic processing stages. A photonic processing stage refers to a group of components configured to receive one or more photons as input, perform one or more operations with, or on, the one or more photons, and output an outcome from the one or more operations. For example, the one or more operations may include a spatial or temporal operations causing emission, interaction with an atom-coupled resonator, transmission, amplification, detection, and/or modulation of a pulse including the one or more photons. Each photonic processing stage may include at least two optical elements (e.g., at least two linear optics elements). Each photonic processing stage may include at least two of an optical switch, a beam splitter, a waveguide, or a photon generator. In an example, the optical switch may include a phase shifter. In such an example, the decisions about stage settings may include decisions about settings of the phase shifter. Stage settings may refer to parameters for use by one or more components of the photonic processing stage. Synchronizing between photonic processing stages refers to coordinating between a first timing of an output from at least one photonic processing stage and a second timing of at least one other photonic processing stage receiving one or more photons (of the output) as input, e.g., by adjusting the first timing so that it comes immediately before the second timing, or/and adjusting the second timing so that it comes immediately after the first timing. For example, synchronizing between photonic processing stages may make use of at least one photonic delay line located downstream of at least one of the plurality of optical resonators. The at least one photonic delay line introduces a time delay for one or more photons output from the at least one optical resonator, whereby the timing of the one or more photons being output from the at least one photonic delay line, and becoming available as an input for one or more photonic processing stages further downstream, may be adjusted. Performing a quantum computation may involve managing a timing of interactions between one or more photons (or a laser beam or a pulse), which have interacted with the at least one of the plurality of the optical resonators, and components of a quantum computing system downstream of these optical resonators. Using the at least one photonic delay line downstream of the at least one of the plurality of the optical resonators, processing timings between different photonic processing stages may be synchronized. By way of a non-limiting example, FIG. 23D shows photonic delay line 2390 configured to synchronize between photonic processing stages.

In some embodiments involving at least one photonic delay line and at least one processor configured to control a plurality of optical switches, the at least one processor may be configured to control at least one of the plurality of optical switches to selectively associate between at least one of a plurality of waveguides coupled to an atom-coupled optical resonator and the at least one photonic delay line, thereby controlling passage of at least one photon through the at least one photonic delay line. In some embodiments involving at least one photonic delay line, controlling a plurality of optical switches may include controlling more than one switch to selectively associate between at least one of a plurality of waveguides coupled to an atom-coupled optical resonator and the at least one photonic delay line, thereby controlling passage of at least one photon through the at least one photonic delay line. Controlling a plurality of optical switches to selectively associate between at least one of a plurality of waveguides coupled to an atom-coupled optical resonator and the at least one photonic delay line refers to setting or/and adjusting a group of components including one or more optical and/or electronic components to direct propagating photons in a particular direction so that the propagating photons are directed towards either the at least one photonic delay line or the at least one waveguide, wherein the at least one waveguide is configured to interact with an optical resonator and the optical resonator is configured to interact with an atom.

Disclosed embodiments may include any one of the following bullet-pointed features alone or in combination with one or more other bullet-pointed features, whether implemented as a system and/or method, by at least one processor or circuitry, and/or stored as executable instructions on non-transitory computer readable media or computer readable media.

- Use of a Cavity-QED as photon source for a Quantum computer implementation.
- Use of a Cavity-QED as an entangling element for a Quantum computer implementation.
- Use of a photonic circuit Cavity-QED as a photon source for a Quantum computer implementation.
- Use of a photonic circuit Cavity-QED as an entangling element for a Quantum computer implementation.
- Capturing an atom between two or more waveguides.
- Creating an opening on a photonic chip, allowing the trapping of an atom between two waveguides.
- Photonic circuit to trap and cool an atom and create a Cavity-QED interface between the atom and single photons.
- A resonator and one or more waveguides for trapping and cooling an atom and creating a Cavity-QED interface between the atom and single photons.
  - One waveguide is coupled to the resonator, and another waveguide coupled to the atom and not directly coupled to the resonator.
  - One waveguide is coupled to the resonator, and one or more waveguides is not directly coupled to the resonator.
- A photonic chip, vacuum chamber with an atom source, auxiliary lasers, and a system controller used for graph state generation.
- A photonic chip and a one or more atoms used for graph state generation.
- A photonic chip, trapping lasers and one or more trapped atoms used for graph state generation.
- A photonic chip, trapping and/or cooling and/or atomic state manipulation fields and one or more trapped atoms used for graph state generation.
- A photonic circuit which implements a round shaped resonator (e.g., a circular resonator).
- A photonic circuit which implements an egg-shaped resonator (or an oval resonator).
- A photonic circuit which implements a racetrack shaped resonator (or an elliptic resonator).
- A silicon nitride resonator couplable to an alkali atom.
- A silicon nitride resonator couplable to an alkali atom and configured to generate a plurality of photonic qubits.
- A silicon nitride resonator couplable to an alkali atom and configured to cause entanglement between at least two of the plurality of photonic qubits.
- A first silicon nitride resonator couplable to a first alkali atom and configured to generate a plurality of photonic qubits, and a second silicon nitride resonator couplable to a second alkali atom and configured to cause entanglement between at least two of the plurality of photonic qubits.

A laser configured to trap an alkali atom.

A laser configured to cool an alkali atom.

A laser configured to manipulate an alkali atom.

A plurality of lasers configured to trap a first alkali atom and a second alkali atom.

A plurality of lasers configured to cool a first alkali atom and a second alkali atom.

A plurality of lasers configured to manipulate a first alkali atom and a second alkali atom.

A plurality of lasers configured to trap a first alkali atom and a second alkali atom, cool the first alkali atom and the second alkali atom, and manipulate the first alkali atom and the second alkali atom.

A detector configured to detect a presence of a trapped alkali atom.

A plurality of detectors configured to detect a presence of a trapped first alkali atom and a trapped second alkali atom.

A detector configured to measure one or more photonic qubits.

A plurality of detectors configured to measure photonic qubits.

At least one processor configured to receive at least one input signal from at least one of a plurality of detectors, the at least one input signal indicating a presence of a trapped first alkali atom and/or a trapped second alkali atom.

At least one processor configured to, based on a received at least one input, control at least some of a plurality of lasers to manipulate at least one of a trapped first alkali atom and a trapped second alkali atom to thereby generate photonic qubits using the trapped first alkali atom or generate entanglement between photonic qubits transmitted to the trapped second alkali atom.

At least one processor configured to receive at least one input signal from at least one of a plurality of detectors, the at least one input signal indicating a presence of a trapped first alkali atom and a trapped second alkali atom, and, based on the received at least one input, control at least some of the plurality of lasers to manipulate at least one of the trapped first alkali atom and the trapped second alkali atom to thereby generate photonic qubits using the trapped first alkali atom or generate entanglement between photonic qubits transmitted to the trapped second alkali atom.

At least one processor configured to perform a logic operation by selecting bases for photonic qubit measurements to measure photonic qubits.

At least one processor configured to manipulate measurement bases of subsequent photonic qubits using results of measurements of prior photonic qubits.

A plurality of optical switches, wherein manipulating measurement bases includes changing states of the plurality of (optical) switches.

A plurality of phase shifters, wherein manipulating measurement bases includes changing states of the plurality of phase shifters.

A plurality of birefringent elements, wherein manipulating measurement bases includes changing states of the plurality of birefringent elements.

Trapping a first alkali atom and a second alkali atom.

Trapping a first alkali atom and a second alkali atom, wherein the first alkali atom is couplable to a first silicon nitride resonator and the second alkali atom is couplable to a second nitride resonator.

Cooling an alkali atom.

Cooling a first alkali atom and a second alkali atom.

Detecting a presence of a trapped alkali atom.

Detecting a presence of a trapped first alkali atom and a trapped second alkali atom.

Detecting a presence of a trapped first alkali atom and a trapped second alkali atom, and, based on at least one input signal indicating a presence of the trapped first alkali atom and the trapped second alkali atom, controlling at least some of a plurality of lasers to manipulate at least one of the trapped first alkali atom and the trapped second alkali atom to thereby generate photonic qubits using the trapped first alkali atom or generate entanglement between photonic qubits transmitted to the trapped second alkali atom.

Measuring photonic qubits using a plurality of detectors.

Performing a logic operation by selecting bases for photonic qubit measurements to measure photonic qubits.

Manipulating measurement bases of subsequent photonic qubits using results of measurements of prior photonic qubits.

Manipulating measurement bases including changing states of a plurality of switches.

Manipulating measurement bases including changing states of a plurality of phase shifters.

Manipulating measurement bases including changing states of a plurality of birefringent elements.

A whispering-gallery mode optical resonator configured to define a closed loop-like mode including an evanescent field portion.

A whispering-gallery mode optical resonator configured to be tuned to support a resonance frequency associated with a transition frequency of an atom.

A whispering-gallery mode optical resonator configured to define a closed loop-like mode including an evanescent field portion, wherein the optical resonator is configured to be tuned to support a resonance frequency associated with a transition frequency of an atom.

At least one trapping laser configured to cause an atom to be trapped adjacent a whispering-gallery mode optical resonator.

A plurality of trapping lasers, wherein at least one of the plurality of trapping lasers is configured to exert an attractive force on an atom, and wherein at least another of the plurality of trapping lasers is configured to exert a repelling force on the atom.

At least one trapping laser including a single trapping laser configured to repel an atom to counter a Van der Waals attraction.

At least one cooling laser configured to manipulate a state of an atom to thereby cool the atom.

At least one optical atom presence detector for outputting an atom presence signal.

At least one processor configured to control operation of at least one trapping laser to cause an atom to be trapped adjacent an optical resonator and within an evanescent field portion.

At least one processor configured to provide, based on an atom presence signal, an indication that an atom is trapped adjacent an optical resonator.

At least one processor configured to control operation of at least one cooling laser and thereby cool an atom.

At least one processor configured to control operation of at least one trapping laser to cause an atom to be trapped adjacent an optical resonator and within an evanescent field portion, provide, based on an atom presence signal, an indication that the atom is trapped adjacent an optical resonator, and control operation of at least one cooling laser and thereby cool the atom.

At least one optical detector for outputting a cooling signal reflecting a position or a vibrational state of an atom.

At least one optical detector for outputting a cooling signal reflecting a position or a vibrational state of an atom, and at least one processor configured to use the cooling signal to control operation of at least one cooling laser.

Tuning a whispering-gallery mode optical resonator to support a resonance frequency associated with a transition frequency of an atom.

Tuning a whispering-gallery mode optical resonator to support a resonance frequency associated with a transition frequency of an atom, the optical resonator being configured to define a closed loop-like mode including an evanescent field portion.

Controlling operation of at least one trapping laser to cause an atom to be trapped adjacent an optical resonator and within an evanescent field portion.

Controlling operation of at least one trapping laser including controlling at least one of an intensity, a frequency, a polarization, or a duration of the at least one trapping laser.

Controlling operation of at least one trapping laser including controlling at least one of an intensity, a frequency, a polarization, or a duration of the at least one trapping laser, wherein the controlling at least one of an intensity, a frequency, a polarization, or a duration includes adjusting the at least one of an intensity, a frequency, a polarization, or a duration.

At least two trapping lasers, wherein at least one of the trapping lasers has a lower frequency than another trapping laser.

Providing, based on an atom presence signal from at least one optical atom presence detector, an indication that an atom is trapped adjacent an optical resonator.

Controlling operation of at least one cooling laser to cool an atom.

Controlling operation of at least one cooling laser to cool an atom including using a cooling signal from at least one optical detector, wherein the cooling signal reflects a position or a vibrational state of the atom.

Controlling operation of at least one cooling laser to cool an atom, wherein the at least one cooling laser is configured to manipulate a state of the atom to thereby cool the atom.

Controlling operation of at least one cooling laser including controlling at least one of an intensity, a frequency, a polarization, or a duration of the at least one cooling laser.

Controlling operation of at least one cooling laser including controlling at least one of an intensity, a frequency, a polarization, or a duration of the at least one cooling laser, wherein the controlling at least one of an intensity, a frequency, a polarization, or a duration includes adjusting the at least one of an intensity, a frequency, a polarization, or a duration.

Exerting an attractive force on an atom using at least one trapping laser.

Exerting a repelling force on an atom using at least one trapping laser.

Exerting an attractive force on an atom using at least one trapping laser, and exerting a repelling force on the atom using at least another trapping lasers.

Repelling an atom to counter a Van der Waals attraction using a single trapping laser.

An atom source input associated with a vacuum chamber.

A Photonic Integrated Circuit (PIC) having an interaction region configured to interact with an atom from an atom source.

A Photonic Integrated Circuit (PIC) having an interaction region configured to interact with an atom from an atom source, the interaction region being arranged for at least partial exposure to a vacuum.

A coupling location, associated with a PIC, for atom positioning.

A Photonic Integrated Circuit (PIC) including a resonator.

A Photonic Integrated Circuit (PIC) including a resonator, and a coupling location associated with the resonator.

At least one trapping laser for trapping an atom in a coupling location.

At least one excitation laser for manipulating an electronic state or a nuclear state of an atom.

At least one excitation laser configured for use in generating a stream of single photons.

At least one excitation laser configured for use in generating entangled photons.

A waveguide for guiding input light to a coupling location.

A waveguide, associated with a coupling location, configured for guiding, or configured to guide, light at a wavelength in a range of 750 to 930 nm.

A waveguide, associated with a coupling location, configured for guiding, or configured to guide, light at a wavelength in a range of 750 to 820 nm.

A waveguide configured for coupling an atom in an absence of an intermediate resonator.

At least one output channel for directing quantum light generated at a coupling location, out of a vacuum chamber as a resource for quantum computing.

At least one output channel including a free space channel.

Receiving an atom from an atom source.

Trapping an atom in a coupling location.

Trapping an atom in a coupling location associated with a Photonic Integrated Circuit (PIC).

Guiding input light using a waveguide associated with a coupling location.

Using at least one output channel to direct quantum light from a coupling location as a resource for quantum computing.

Using at least one excitation laser and a trapped atom to generate a stream of single photons.

Using at least one excitation laser and a trapped atom to generate a stream of entangled photons.

A plurality of optical resonators tunable to a resonance of an alkali atom.

A plurality of optical resonators tuned to a resonance of an alkali atom.

A plurality of optical resonators implemented with a Photonic Integrated Circuit (PIC).

At least one trapping laser for maintaining an alkali atom within a mode of one or more optical resonators.

An atom excitation laser for inducing photon emissions.

A plurality of waveguides configured to couple photons to and from optical resonators.

A plurality of waveguides implemented with Silicon Nitride (SiN).

A plurality of waveguides including a free space.

A plurality of waveguides including an optical fiber.

A plurality of detectors configured to detect a presence or absence of an atom-resonator coupling.

A plurality of optical switches for switching between at least two of a plurality of waveguides.

A plurality of optical switches controllable to switch between at least two of a plurality of waveguides at a time resolution of less than 1 microsecond.

At least one processor configured to receive output signals from a plurality of detectors and control a plurality of optical switches.

At least one processor configured to control a plurality of optical switches to selectively associate between at least two of a plurality of waveguides coupled to an atom-coupled optical resonator.

At least one waveguide including at least one photonic delay line configured to synchronize between photonic processing stages, the at least one photonic delay line located downstream of at least one of a plurality of optical resonators.

At least one processor configured to control at least one of a plurality of optical switches to selectively associate between at least one of a plurality of waveguides coupled to an atom-coupled optical resonator and at least one photonic delay line, thereby controlling passage of at least one photon through the at least one photonic delay line.

Tuning a plurality of optical resonators to a resonance of an alkali atom.

Maintaining an alkali atom within a mode of optical resonators using at least one trapping laser.

Inducing photon emissions using an atom excitation laser.

Detecting a presence or absence of an atom-resonator coupling using a plurality of detectors.

Controlling a plurality of optical switches to switch between a plurality of waveguides configured to couple photons to and from optical resonators.

Controlling a plurality of optical switches including controlling to selectively associate between at least two waveguides coupled to an atom-coupled optical resonator.

Controlling of a plurality of optical switches including controlling to switch between at least two of a plurality of waveguides at a time resolution of less than 1 microsecond.

Synchronizing between photonic processing stages using at least one delay line located downstream of at least one of a plurality of optical resonators.

Controlling a plurality of optical switches including controlling to selectively associate between at least one of a plurality of waveguides coupled to an atom-coupled optical resonator and at least one photonic delay line, thereby controlling passage of at least one photon through the at least one photonic delay line.

One or more of the above-mentioned processes or systems employing a neutral atom.

One or more of the above-mentioned processes or systems employing a ion.

One or more of the above-mentioned processes or systems employing a rubidium atom.

One or more of the above-mentioned processes or systems employing a cesium atom.

One or more of the above-mentioned processes or systems employing a francium atom.

One or more of the above-mentioned processes or systems employing at least one of a Lithium, Sodium, Potassium, Strontium, Erbium, Ytterbium, Calcium, Barium, Beryllium, or Magnesium atom.

Also disclosed herein are following clauses.

Clause Set I Relating to an Example Deterministic Photon Graph State Generator:

Clause 1. A method for sourcing a graph state of quantum-entangled photons, the method comprising:
  providing a photon source unit for sourcing single photons, said photon source unit comprising a source unit atom disposed within an intra-cavity field of a source-optical cavity;
  providing a photon entanglement unit for quantum entanglement of photonic states, said photon entanglement unit atom disposed within an intra-cavity field of an entanglement-optical cavity;
  sending a photon pulse to the photon entanglement unit to set the entanglement unit atom to an atomic quantum superposition state $$\frac{1}{\sqrt{2}}(|0\rangle + |1\rangle);$$

sending a photon pulse to the photon source unit to initialize the source unit atom to a quantum state $|1\rangle$;
  sending a photon pulse of photons in a first photonic mode into the photon source unit to cause the source unit atom to output a single photon in a second photonic mode, wherein the first photonic mode couples to a first transition of the source unit atom, and wherein the second photonic mode couples to a second transition of the source unit atom;
  routing the single photon in the second photonic mode to the photon entanglement unit to a superposition of a third photonic mode and a fourth photonic mode;
    wherein the third photonic mode couples to a third transition of the entanglement unit atom;
    wherein the fourth photonic mode does not couple to any transition of the source unit atom;
    wherein the fourth photonic mode does not couple to the entanglement-optical cavity; and
    wherein the output photon in a superposition of a third photonic mode and a fourth photonic mode is quantum-entangled with the entanglement unit atom;
  repeating the routing at least once to route at least one additional single photon in the second photonic mode to the photon entanglement unit in a superposition of the third photonic mode and the fourth photonic mode in quantum entanglement with the entanglement unit atom;
  performing a measurement on the entanglement unit atom, thereby disentangling it from the photons in the superposition state of the third photonic mode and the fourth photonic mode;
    wherein the at least two photons in the superposition state of the third photonic mode and the fourth photonic mode are quantum entangled; and
  outputting the at least two photons in the superposition state of the third photonic mode and the fourth photonic mode as time-sequenced mutually entangled photons.

Clause 2. The method according to clause 1, wherein performing a measurement on the entanglement unit atom includes performing a measurement in an x-y plane of a Bloch sphere.

Clause 3. A device for sourcing a graph state of quantum-entangled photons, the device comprising:
a plurality of single photon source units;
a first stage of linear optics elements; and
a first plurality of entanglement units;
wherein the plurality of single photon source units, the first stage of linear optics elements, and the first plurality of entanglement units are correspondingly displaced along a predetermined spatial axis;
wherein each single photon source unit of the plurality of photon source units outputs single photons to the first stage of linear optics elements, and therefrom into a respective entanglement unit of the first plurality of entanglement units; and
wherein the first plurality of entanglement unit outputs a one-dimensional spatial array of entangled photons in a time-dimensional sequence.

Clause 4. The device according to clause 3, wherein the single photon source units and/or the entanglement units each comprise:
an atom in a first ground state, a first excited state, a second ground state, a second excited state, or a superposition thereof;
the atom being further configured to selectively undergo;
a first transition between the first ground state and the first excited state;
a second transition between the first excited state and the second ground state; and
a third transition between the second ground state and the second excited state;
the device comprising an optical cavity defining an intra-cavity field for disposing therewithin the atom, a photonic waveguide coupled to the optical cavity, a magnet configured to produce a magnetic field on the atom, and a laser source configured to produce pulses of photons in coherent states, the device being configured such that each of said transitions are within the resonance of the optical cavity.

Clause 5. The device according to clause 4, wherein the first and second transitions are selected such that they are orthogonally polarized with respect to each other.

Clause 6. The device according to any one of clauses 4 and 5, wherein the first and second excited states are at the same energy level.

Clause 7. The device according to any one of clauses 4 through 6, wherein the first and second ground states are at different energy levels from one another.

Clause 8. The device according to any one of clauses 4 through 7, wherein said laser source is configured for selectively generating:
a pulse of initializing photons configured to initialize the atom by inducing it to undergo the first and second transitions from the first ground state to the second ground state via the first excited state; and
a pulse of sourcing photons configured to source a single photon from the atom by inducing it to undergo the second and first transitions from the second ground state to the first ground state via the first excited state.

Clause 9. The device according to any one of clauses 4 through 8, said laser source being configured for selectively generating a preparation photon configured to set the state of the atom to a quantum superposition state, the preparation photon being in state of superposition of first and second preparation modes, wherein interaction of the preparation photon with the atom results in its first and second ground states being in a state of superposition corresponding to the state of superposition of the first and second preparation modes.

Clause 10. The device according to any one of clauses 4 through 9, wherein the atom is a Rubidium atom.

Clause 11. The device according to any one of clauses 4 through 10, wherein the magnet is a solenoid.

Clause 12. The device according to any one of clauses 3 through 11, wherein the first stage of linear optics elements includes phase control.

Clause 13. The device according to any one of clauses 3 through 12, further comprising:
a second stage of linear optics elements; and
a second plurality of entanglement units;
wherein the second stage of linear optics elements, and the second plurality of entanglement units are correspondingly displaced with the plurality of single photon source units, the first stage of linear optics elements, and the first plurality of entanglement units along the predetermined spatial axis, and
wherein the single photons in an entangled state output from each respective entanglement unit of the first plurality of entanglement units are input to the second stage of linear optics elements and therefrom into a respective entanglement unit of the second plurality of entanglement units.

Clause 14. The device according to clause 13, wherein the second plurality of entanglement unit is configured to output a two-dimensional spatial array of entangled photons in a time-dimensional sequence.

Clause 15. The device according to any one of clauses 3 through 14, configured to produce entangled qubits for use with a quantum computer.

Clause 16. The device according to any one of clauses 3 through 15, configured to carry out the method according to any one of clauses 1 and 2.

Clause 17. The device of any one of clauses 3 to 16, wherein the first stage of linear optics elements or/and the second stage of linear optics elements includes one or more optical switch.

Clause 18. The device of any one of clauses 4 to 9, or clauses 11 to 17 when dependent on clause 4, wherein the atom is a cesium atom.

Clause 19. The method of clause 1 or 2, wherein the source unit atom or entanglement unit atom includes a rubidium atom.

Clause 20. The method of clause 1 or 2, or clause 19, wherein the source unit atom or entanglement unit atom includes a cesium atom.

Clause Set II Relating to Silicon Nitride Resonators for Qubit Generation and Entanglement:

Clause 21. A quantum computing system, comprising: a first silicon nitride resonator couplable to a first alkali atom and configured to generate a plurality of photonic qubits; a second silicon nitride resonator couplable to a second alkali atom and configured to cause entanglement between at least two of the plurality of photonic qubits; a plurality of lasers configured to trap the first alkali atom and the second alkali atom, cool the first alkali atom and the second alkali atom, and manipulate the first alkali atom and the second alkali atom; a plurality of detectors configured to detect a presence of the trapped first alkali atom and the trapped second alkali atom; and at least one processor configured to receive at least one input signal from at least one of the plurality of detectors, the at least one input signal indicating a presence of the trapped first alkali atom and the trapped second alkali atom, and, based on the received at least one input, control at least some of the plurality of lasers to manipulate at least one of the trapped first alkali atom and the trapped second alkali atom to thereby generate photonic qubits using the trapped first alkali atom or generate entanglement between photonic qubits transmitted to the trapped second alkali atom.

Clause 22. The system of clause 21, wherein the plurality of detectors are configured to measure photonic qubits.

Clause 23. The system of clause 21 or 22, wherein the at least one processor is configured to perform a logic operation by selecting the bases for the photonic qubit measurements to measure the photonic qubits.

Clause 24. The system of any one of clauses 21 to 23, wherein the at least one processor is configured to manipulate measurement bases of subsequent photonic qubits using results of measurements of prior photonic qubits.

Clause 25. The system of clause 24, further comprising a plurality of optical switches, wherein manipulating the measurement bases includes changing states of the plurality of switches.

Clause 26. The system of clause 24 or 25, further comprising a plurality of phase shifters, wherein manipulating the measurement bases includes changing states of the plurality of phase shifters.

Clause 27. The system of any one of clauses 24 to 26, further comprising a plurality of birefringent elements, wherein manipulating the measurement bases includes changing states of the plurality of birefringent elements.

Clause 28. A quantum computing method, comprising: trapping a first alkali atom and a second alkali atom, wherein the first alkali atom is couplable to a first silicon nitride resonator and the second alkali atom is couplable to a second nitride resonator; cooling the first alkali atom and the second alkali atom; manipulating the first alkali atom and the second alkali atom; detecting a presence of the trapped first alkali atom and the trapped second alkali atom; and, based on at least one input signal indicating a presence of the trapped first alkali atom and the trapped second alkali atom, controlling at least some of a plurality of lasers to manipulate at least one of the trapped first alkali atom and the trapped second alkali atom to thereby generate photonic qubits using the trapped first alkali atom or generate entanglement between photonic qubits transmitted to the trapped second alkali atom.

Clause 29. The method of clause 28, further comprising measuring photonic qubits using a plurality of detectors.

Clause 30. The method of clause 28 or 29, further comprising performing a logic operation by selecting the bases for the photonic qubit measurements to measure the photonic qubits.

Clause 31. The method of any one of clauses 28 to 30, further comprising manipulating measurement bases of subsequent photonic qubits using results of measurements of prior photonic qubits.

Clause 32. The method of clause 31, wherein manipulating the measurement bases includes changing states of a plurality of switches.

Clause 33. The method of clause 31 or 32, wherein manipulating the measurement bases includes changing states of a plurality of phase shifters.

Clause 34. The method of any one of clauses 31 to 33, wherein manipulating the measurement bases includes changing states of a plurality of birefringent elements.

Clause 35. The system of any one of clauses 21 to 27, or the method of any one of clauses 28 to 34, wherein the first alkali atom or the second alkali atom includes a rubidium atom.

Clause 36. The system of any one of clauses 21 to 27 or 35, or the method of any one of clauses 28 to 34 or 35, wherein the first alkali atom or the second alkali atom includes a cesium atom.

Clause 37. A non-transitory computer-readable storage medium or a computer readable medium including instructions that, when executed by at least one processor (or a system or a circuitry or a device or an apparatus), cause the at least one processor (or the system or the circuitry or the device or the apparatus) to carry out a quantum computing method, the method comprising: controlling a plurality of lasers to trap a first alkali atom and a second alkali atom, wherein the first alkali atom is couplable to a first silicon nitride resonator and the second alkali atom is couplable to a second silicon nitride resonator, cool the first alkali atom and the second alkali atom, and manipulate the first alkali atom and the second alkali atom; controlling a plurality of detectors to detect a presence of the trapped first alkali atom and the trapped second alkali atom; and receiving at least one input signal from at least one of the plurality of detectors, the at least one input signal indicating a presence of the trapped first alkali atom and the trapped second alkali atom, and, based on the received at least one input, controlling at least some of the plurality of lasers to manipulate at least one of the trapped first alkali atom and the trapped second alkali atom to thereby generate photonic qubits using the trapped first alkali atom or generate entanglement between photonic qubits transmitted to the trapped second alkali atom.

Clause 38. The non-transitory computer-readable storage medium or a computer readable medium of clause 37, wherein the method further comprises: measuring photonic qubits using a plurality of detectors; and manipulating measurement bases of subsequent photonic qubits using results of measurements of prior photonic qubits.

Clause 39. The non-transitory computer-readable storage medium or a computer readable medium of clause 37 or 38, wherein the method is a method of any one of clauses 28 to 36.

Clause 40. The system of any one of clauses 21 to 27, or clauses 35 to 36, configured to carry out the method of any one of clauses 28 to 36.

Clause Set III Relating to Use of an Optical Resonator Such as a Whispering-Gallery Mode Optical Resonator:

Clause 41. A quantum computing system, comprising: a whispering-gallery mode optical resonator configured to define a closed loop-like mode including an evanescent field portion, wherein the optical resonator is configured to be tuned to support a resonance frequency associated with a transition frequency of an atom; at least one trapping laser configured to cause the atom to be trapped adjacent the whispering-gallery mode optical resonator; at least one cooling laser configured to manipulate a state of the atom to thereby cool the atom; at least one optical atom presence detector for outputting an atom presence signal; and at least one processor configured to control operation of the at least one trapping laser to cause the atom to be trapped adjacent the optical resonator and within the evanescent field portion, provide, based on the atom presence signal, an indication that the atom is trapped adjacent the optical resonator, and control operation of the at least one cooling laser and thereby cool the atom.

Clause 42. The system of clause 41, further comprising at least one optical detector for outputting a cooling signal reflecting a position or a vibrational state of the atom, and wherein the at least one processor is configured to use the cooling signal to control operation of the at least one cooling laser.

Clause 43. The system of claim 41 or 42, wherein the at least one trapping laser includes a plurality of trapping lasers, and wherein at least one of the plurality of trapping lasers is configured to exert an attractive force on the atom and wherein at least another of the plurality of trapping lasers is configured to exert a repelling force on the atom.

Clause 44. The system of any one of clauses 41 to 43, wherein the at least one trapping laser includes a single trapping laser configured to repel the atom to counter a Van der Waals attraction.

Clause 45. A quantum computing method, comprising: tuning a whispering-gallery mode optical resonator to support a resonance frequency associated with a transition frequency of an atom, the optical resonator being configured to define a closed loop-like mode including an evanescent field portion; controlling operation of at least one trapping laser to cause the atom to be trapped adjacent the optical resonator and within the evanescent field portion; providing, based on an atom presence signal from at least one optical atom presence detector, an indication that the atom is trapped adjacent the optical resonator; and controlling operation of at least one cooling laser to cool the atom, wherein the at least one cooling laser is configured to manipulate a state of the atom to thereby cool the atom.

Clause 46. The method of clause 45, wherein controlling operation of the at least one cooling laser includes using a cooling signal from at least one optical detector, wherein the cooling signal reflects a position or a vibrational state of the atom.

Clause 47. The method of clause 45 or 46, further comprising: exerting an attractive force on the atom using at least one of the trapping lasers; and/or exerting a repelling force on the atom using at least another of the trapping lasers.

Clause 48. The method of any one of clauses 45 to 47, further comprising repelling the atom to counter a Van der Waals attraction using a single trapping laser.

Clause 49. The system of any one of clauses 41 to 44, or the method of any one of clauses 45 to 48, wherein controlling operation of the at least one cooling laser or/and controlling operation of the at least one trapping laser includes controlling at least one of an intensity, a frequency, a polarization, or a duration of the at least one cooling laser or/and the at least one trapping laser.

Clause 50. The system of any one of clauses 41 to 44 or clause 49, or the method of any one of clauses 45 to 49, wherein the at least one trapping laser includes at least two trapping lasers, and at least one of the trapping lasers has a lower frequency than another trapping laser.

Clause 51. The system of any one of clauses 41 to 44 or clauses 49 to 50, or the method of any one of clauses 45 to 50, wherein the atom is neutral.

Clause 52. The system of any one of clauses 41 to 44 or clauses 49 to 50, or the method of any one of clauses 45 to 50, wherein the atom is an ion.

Clause 53. The system of any one of clauses 41 to 44 or clauses 49 to 52 or the method of any one of clauses 45 to 52, wherein the atom is a rubidium atom.

Clause 54. The system of any one of clauses 41 to 44 or clauses 49 to 52, or the method of any one of clauses 45 to 52, wherein the atom is a cesium atom.

Clause 55. The system of any one of clauses 41 to 44 or clauses 49 to 52, or the method of any one of clauses 45 to 52, wherein the atom is a francium atom.

Clause 56. The system of any one of clauses 41 to 44 or clauses 49 to 52, or the method of any one of clauses 45 to 52, wherein the atom is one of a Lithium, Sodium. Potassium, Strontium, Erbium, Ytterbium, Calcium, Barium, Beryllium, or Magnesium atom.

Clause 57. The system of clause 49, or any one of clauses 50 to 56 when dependent on clause 49, or the method of clause 49, or any one of clauses 50 to 56 when dependent on clause 49, wherein the controlling at least one of an intensity, a frequency, a polarization, or a duration includes adjusting the at least one of an intensity, a frequency, a polarization, or a duration.

Clause 58. A non-transitory computer-readable storage medium or a computer readable medium including instructions that, when executed by at least one processor (or a system or a circuitry or a device or an apparatus), cause the at least one processor (or the system or the circuitry or the device or the apparatus) to carry out a quantum computing method, the method comprising: tuning a whispering-gallery mode optical resonator to support a resonance frequency associated with a transition frequency of an atom, the optical resonator being configured to define a closed loop-like mode including an evanescent field portion; controlling operation of at least one trapping laser to cause the atom to be trapped adjacent the optical resonator and within the evanescent field portion; providing, based on an atom presence signal from at least one optical atom presence detector, an indication that the atom is trapped adjacent the optical resonator; and controlling operation of at least one cooling laser to cool the atom, wherein the at least one cooling laser is configured to manipulate a state of the atom to thereby cool the atom.

Clause 59. The non-transitory computer-readable storage medium or a computer readable medium of clause 58, wherein the method is a method of any one of clauses 45 to 57.

Clause 60. The system of any one of clauses 41 to 44, or clauses 49 to 57, configured to carry out the method of any one of clauses 45 to 57.

Clause Set IV Relating to a Resource for Quantum Computing:

Clause 61. A quantum computing system, comprising: a vacuum chamber; an atom source input associated with the vacuum chamber; a Photonic Integrated Circuit (PIC) having an interaction region configured to interact with an atom from the atom source, the interaction region being arranged for at least partial exposure to the vacuum; a coupling location, associated with the PIC, for atom positioning, at least one trapping laser for trapping the atom in the coupling location; at least one excitation laser for manipulating an electronic state or a nuclear state of the atom; a waveguide for guiding input light to the coupling location; and at least one output channel for directing quantum light generated at the coupling location, out of the vacuum chamber as a resource for quantum computing.

Clause 62. The system of clause 61, wherein the at least one excitation laser is configured for use in generating a stream of single photons.

Clause 63. The system of clause 61 or 62, wherein the at least one excitation laser is configured for use in generating entangled photons.

Clause 64. A quantum computing method, comprising: receiving an atom from an atom source; trapping the atom in a coupling location associated with a Photonic Integrated Circuit (PIC); manipulating an electronic state or a nuclear state of the atom; guiding input light using a waveguide associated with the coupling location; and using at least one output channel to direct quantum light from the coupling location as a resource for quantum computing.

Clause 65. The method of clause 64, further comprising using at least one excitation laser and the trapped atom to generate a stream of single photons.

Clause 66. The method of clause 64 or 65, further comprising using at least one excitation laser and the trapped atom to generate a stream of entangled photons.

Clause 67. The system of any one of clauses 61 to 63, or the method of any one of clauses 64 to 66, wherein the PIC includes a resonator, and the coupling location is associated with the resonator.

Clause 68. The system of any one of clauses 61 to 63 or clause 67, or the method of any one of clauses 64 to 67, wherein the waveguide associated with the coupling location is configured for guiding, or is configured to guide, light at a wavelength in a range of 750 to 930 nm.

Clause 69. The system of any one of clauses 61 to 63 or clauses 67 to 68, or the method of any one of clauses 64 to 68, wherein the waveguide associated with the coupling location is configured for guiding, or is configured to guide, light at a wavelength in a range of 750 to 820 nm.

Clause 70. The system of any one of clauses 61 to 63 or clauses 67 to 69, or the method of any one of clauses 64 to 69, wherein the waveguide is configured for coupling the atom in an absence of an intermediate resonator.

Clause 71. The system of any one of clauses 61 to 63 or clauses 67 to 70, or the method of any one of clauses 64 to 70, wherein the at least one output channel includes an optical fiber.

Clause 72. The system of any one of clauses 61 to 63 or clauses 67 to 71, or the method of any one of clauses 64 to 71, wherein the at least one output channel includes a free space channel.

Clause 73. The system of any one of clauses 61 to 63 or clauses 67 to 72, or the method of any one of clauses 64 to 72, wherein the atom is an ion.

Clause 74. The system of any one of clauses 61 to 63 or clauses 67 to 72, or the method of any one of clauses 64 to 72, wherein the atom is a neutral atom.

Clause 75. The system of any one clauses 61 to 63 or clauses 67 to 74, or the method of any one of clauses 64 to 74, wherein the atom includes a rubidium atom.

Clause 76. The system of any one of clauses 61 to 63 or clauses 67 to 75, or the method of any one of clauses 64 to 75, wherein the atom includes at least one of a cesium atom or a francium atom.

Clause 77. The system of any one of clauses 61 to 63 or clauses 67 to 76, or the method of any one of clauses 64 to 76, wherein the atom includes at least one of Lithium, Sodium, Potassium, Strontium, Erbium, Ytterbium, Calcium, Barium, Beryllium, or Magnesium atom.

Clause 78. A non-transitory computer-readable storage medium or a computer readable medium including instructions that, w % ben executed by at least one processor (or a system or a circuitry or a device or an apparatus), cause the at least one processor (or the system or the circuitry or the device or the apparatus) to carry out a quantum computing method, the method comprising: receiving an atom from an atom source; trapping the atom in a coupling location associated with a Photonic Integrated Circuit (PIC); manipulating an electronic state or a nuclear state of the atom; guiding input light using a waveguide associated with the coupling location; and using at least one output channel to direct quantum light from the coupling location as a resource for quantum computing.

Clause 79. The non-transitory computer-readable storage medium or a computer readable medium of clause 78, wherein the method is a method of any one of clauses 64 to 77.

Clause 80. The system of any one of clauses 61 to 63, or clauses 67 to 77, configured to carry out the method of any one of clauses 64 to 77.

Clause Set V Relating to a Combination of Detectors, Optical Switches, and Waveguides Associated with Optical Resonators:

Clause 81. A quantum computing system, comprising: a vacuum enclosure configured to sustain a vacuum; a plurality of optical resonators tuned to a resonance of an alkali atom; at least one trapping laser for maintaining the alkali atom within a mode of the optical resonators; an atom excitation laser for inducing photon emissions; a plurality of waveguides configured to couple photons to and from the optical resonators; a plurality of detectors configured to detect a presence or absence of an atom-resonator coupling; a plurality of optical switches for switching between at least two of the plurality of waveguides; and at least one processor configured to receive output signals from the plurality of detectors and control the plurality of optical switches, and optionally wherein the vacuum is sustained below $10^{-3}$ millibar.

Clause 82. The system of clause 81, wherein the at least one processor is configured to control the plurality of optical switches to selectively associate between at least two of the plurality of waveguides coupled to an atom-coupled optical resonator.

Clause 83. The system of clause 81 or 82, wherein the plurality of optical switches is controlled to switch between the at least two of the plurality of waveguides at a time resolution of less than 1 microsecond.

Clause 84. The system of any one of clauses 81 to 83, wherein at least one of the plurality of waveguides includes at least one photonic delay line configured to synchronize between photonic processing stages, the at least one photonic delay line located downstream of at least one of the plurality of optical resonators.

Clause 85. The system of clause 84, wherein the at least one processor is configured to control at least one of the plurality of optical switches to selectively associate between at least one of the plurality of waveguides coupled to an atom-coupled optical resonator and the at least one photonic delay line, thereby controlling passage of at least one photon through the at least one photonic delay line Clause 86. A quantum computing method, comprising: sustaining a vacuum; tuning a plurality of optical resonators to a resonance of an alkali atom; maintaining the alkali atom within a mode of the optical resonators using at least one trapping laser; inducing photon emissions using an atom excitation laser; detecting a presence or absence of an atom-resonator coupling using a plurality of detectors; receiving output signals from the plurality of detectors; and controlling a plurality of optical switches to switch between a plurality of waveguides configured to couple photons to and from the optical resonators, and optionally wherein the sustaining a vacuum includes sustaining the vacuum below $10^{-3}$ millibar.

Clause 87. The method of clause 86, wherein the controlling a plurality of optical switches includes controlling to selectively associate between at least two waveguides coupled to an atom-coupled optical resonator.

Clause 88. The method of clause 86 or 87, wherein the controlling of the plurality of optical switches includes controlling to switch between the at least two of the plurality of waveguides at a time resolution of less than 1 microsecond.

Clause 89. The method of any one of clauses 86 to 88, further comprising synchronizing between photonic processing stages using at least one delay line located downstream of at least one of the plurality of the optical resonators.

Clause 90. The method of clause 89, wherein the controlling a plurality of optical switches include controlling to selectively associate between at least one of the plurality of waveguides coupled to an atom-coupled optical resonator and the at least one photonic delay line, thereby controlling passage of at least one photon through the at least one photonic delay line.

Clause 91. The system of any one of clauses 81 to 85, or the method of any one of clauses 86 to 90, wherein the plurality of optical resonators includes at least three optical resonators.

Clause 92. The system of any one of clauses 81 to 85 or clause 91, or the method of any one of clauses 86 to 90 or clause 91, wherein the plurality of optical resonators is implemented with a Photonic Integrated Circuit (PIC).

Clause 93. The system of any one of clauses 81 to 85 or clauses 91 to 92, or the method of any one of clauses 86 to 90 or clauses 91 to 92, wherein the plurality of waveguides is implemented with Silicon Nitride (SiN).

Clause 94. The system of any one of clauses 81 to 85 or clauses 91 to 93, or the method of any one of clauses 86 to 90 or clauses 91 to 93, wherein the plurality of waveguides includes a free space.

Clause 95. The system of any one of clauses 81 to 85 or clauses 91 to 94, or the method of any one of clauses 86 to 90 or clauses 91 to 94, wherein the plurality of waveguides includes an optical fiber.

Clause 96. The system of any one of clauses 81 to 85 or clauses 91 to 95, or the method of any one of clauses 86 to 90 or clauses 91 to 95, wherein the alkali atom includes a rubidium atom.

Clause 97. The system of any one of clauses 81 to 85 or clauses 91 to 95, or the method of any one of clauses 86 to 90 or clauses 91 to 95, wherein the alkali atom includes a cesium atom.

Clause 98. A non-transitory computer-readable storage medium or a computer readable medium including instructions that, when executed by at least one processor (or a system or a circuitry or a device or an apparatus), cause the at least one processor (or the system or the circuitry or the device or the apparatus) to carry out a quantum computing method, the method comprising: sustaining a vacuum, tuning a plurality of optical resonators to a resonance of an alkali atom; maintaining the alkali atom within a mode of the optical resonators using at least one trapping laser; inducing photon emissions using an atom excitation laser; detecting a presence or absence of an atom-resonator coupling using a plurality of detectors; receiving output signals from the plurality of detectors; and controlling a plurality of optical switches to switch between a plurality of waveguides configured to couple photons to and from the optical resonators, and optionally wherein the sustaining a vacuum includes sustaining the vacuum below $10^{-3}$ millibar.

Clause 99. The non-transitory computer-readable storage medium or a computer readable medium of clause 98, wherein the method is a method of any one of clauses 86 to 90 or clauses 91 to 97.

Clause 100. The system of any one of clauses 81 to 85, or clauses 91 to 97, configured to carry out the method of any one of clauses 86 to 90 or clauses 91 to 97.

Clause Set VI Relating to a System or a Method;

Clause 101. A quantum computing system comprising at least one of: the device of any one of clauses 3 to 18; the system of any one of clauses 21 to 27, or clauses 35 or 36, or clause 40; the non-transitory computer-readable storage medium or the computer readable medium of any one of clauses 37 to 39: the system of any one of clauses 41 to 44, or clauses 49 to 57, or clause 60; the system of any one of clauses 61 to 63, or clauses 67 to 77, or clause 80; or/and the system of any one of clauses 81 to 85, or clauses 91 to 97, or clause 100.

Clause 102. A quantum computing method comprising at least one of: the method of clause 1 or 2, or clause 19 or 20; the method of any one of clauses 28 to 36: the method of any one of clauses 45 to 57; the method of any one of clauses 64 to 77; or/and the method of any one of clauses 86 to 90 or clauses 91 to 97.

Clause 103. A non-transitory computer-readable storage medium or a computer readable medium including instructions that, when executed by at least one processor (or a system or a circuitry or a device or an apparatus), cause the at least one processor (or the system or the circuitry or the device or the apparatus) to carry out the method of clause 102.

It is to be understood that the embodiment, clause, claim, or example described herein using optical photons or optical elements are also implementable using photons at other frequencies of the electromagnetic spectrum, such as microwaves and infrared photons. Thus, all references to optical photons herein are to be considered as also disclosing photons in general.

It is also to be understood that the embodiment, clause, claim, or example described herein using photons or photonic chips are also implementable using phonons, instead of, or in addition to, photons. Thus, all references to photons herein are to be considered as also disclosing phonons, as such photon-based implementations can result in equivalent phonon-based functionality.

This disclosure employs open-ended permissive language, indicating for example, that some embodiments or definitions "may" employ, involve, or include specific features. The use of the term "may" and other open-ended terminology is intended to indicate that although not every embodiment may employ the specific disclosed feature, at least one embodiment employs the specific disclosed feature.

Systems and methods disclosed herein involve unconventional improvements over conventional approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and, accordingly, all suitable modifications and equivalents may be resorted to, falling within the scope of the disclosure.

Computer programs based on the written description and methods of this specification are within the skill of a software developer. The various functions, scripts, programs, or modules may be created using a variety of programming techniques. For example, programs, scripts, functions, program sections or program modules may be designed in or by means of languages, including JAVASCRIPT, C, C++, JAVA, PHP, PYTHON, RUBY, PERL, BASH, or other programming or scripting languages. One or more of such software sections or modules may be integrated into a computer system, non-transitory computer readable media, or existing communications software. The programs, modules, or code may also be implemented or replicated as firmware or circuit logic.

Moreover, while illustrative embodiments have been described herein, the scope may include any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps or inserting or deleting steps. It is intended, therefore, that the specification and examples be considered as exemplary only, with a true scope and spirit being indicated by the following claims and their full scope of equivalents.

The invention claimed is:

1. A quantum computing system, comprising:
a vacuum enclosure configured to sustain a vacuum below $10^{-3}$ millibar;
a plurality of optical resonators tuned to a resonance of an alkali atom;
at least one trapping laser for maintaining the alkali atom within a mode of the optical resonators;
an atom excitation laser for inducing photon emissions;
a plurality of waveguides configured to couple photons to and from the optical resonators;
a plurality of detectors configured to detect a presence or absence of an atom-resonator coupling;
a plurality of optical switches for switching between at least two of the plurality of waveguides;
at least one processor configured to:
receive output signals from the plurality of detectors and control the plurality of optical switches.

2. The system of claim 1, wherein the at least one processor is configured to control the plurality of optical switches to selectively associate between at least two of the plurality of waveguides coupled to an atom-coupled optical resonator.

3. The system of claim 1, wherein the plurality of optical resonators includes at least three optical resonators.

4. The system of claim 1, wherein the plurality of optical resonators is implemented with a Photonic Integrated Circuit (PIC).

5. The system of claim 1, wherein the plurality of waveguides is implemented with Silicon Nitride (SiN).

6. The system of claim 1, wherein the plurality of waveguides includes a free space.

7. The system of claim 1, wherein the plurality of waveguides includes an optical fiber.

8. The system of claim 1, wherein the alkali atom includes a rubidium atom.

9. The system of claim 1, wherein the alkali atom includes a cesium atom.

10. The system of claim 1, wherein the plurality of optical switches is controlled to switch between the at least two of the plurality of waveguides at a time resolution of less than 1 microsecond.

11. The system of claim 1, wherein at least one of the plurality of waveguides includes at least one photonic delay line configured to synchronize between photonic processing stages, the at least one photonic delay line located downstream of at least one of the plurality of optical resonators.

12. The system of claim 11, wherein the at least one processor is configured to control at least one of the plurality of optical switches to selectively associate between at least one of the plurality of waveguides coupled to an atom-coupled optical resonator and the at least one photonic delay line, thereby controlling passage of at least one photon through the at least one photonic delay line.

13. A quantum computing method, comprising
sustaining a vacuum below $10^{-3}$ millibar;
tuning a plurality of optical resonators to a resonance of an alkali atom;
maintaining the alkali atom within a mode of the optical resonators using at least one trapping laser;
inducing photon emissions using an atom excitation laser;
detecting a presence or absence of an atom-resonator coupling using a plurality of detectors;

receiving output signals from the plurality of detectors; and controlling a plurality of optical switches to switch between a plurality of waveguides configured to couple photons to and from the optical resonators.

14. The method of claim 13, wherein the controlling a plurality of optical switches includes controlling to selectively associate between at least two waveguides coupled to an atom-coupled optical resonator.

15. The method of claim 13, wherein the plurality of optical resonators include at least three optical resonators.

16. The method of claim 13, wherein the alkali atom includes a rubidium atom or a cesium atom.

17. The method of claim 13, wherein the controlling of the plurality of optical switches includes controlling to switch between the at least two of the plurality of waveguides at a time resolution of less than 1 microsecond.

18. The method of claim 13, further comprising synchronizing between photonic processing stages using at least one delay line located downstream of at least one of the plurality of the optical resonators.

19. The method of claim 18, wherein the controlling a plurality of optical switches include controlling to selectively associate between at least one of the plurality of waveguides coupled to an atom-coupled optical resonator and the at least one photonic delay line, thereby controlling passage of at least one photon through the at least one photonic delay line.

20. A non-transitory computer-readable storage medium including instructions that, when executed by at least one processor, cause the at least one processor to carry out a quantum computing method, the method comprising:

sustaining a vacuum below $10^{-3}$ millibar;

tuning a plurality of optical resonators to a resonance of an alkali atom;

maintaining the alkali atom within a mode of the optical resonators using at least one trapping laser;

inducing photon emissions using an atom excitation laser;

detecting a presence or absence of an atom-resonator coupling using a plurality of detectors;

receiving output signals from the plurality of detectors; and controlling a plurality of optical switches to switch between a plurality of waveguides configured to couple photons to and from the optical resonators.

* * * * *